United States Patent
Thompson et al.

(10) Patent No.: US 12,316,655 B1
(45) Date of Patent: May 27, 2025

(54) CYBER RESILIENCE AGENTIC MESH

(71) Applicant: AS0001, Inc., Carmel, IN (US)

(72) Inventors: Jonathan J. Thompson, Carmel, IN (US); Simon Mullaney, Dublin (IE)

(73) Assignee: AS0001, Inc., Carmel, IN (US)

( * ) Notice: Subject to any disclaimer, the term of this patent is extended or adjusted under 35 U.S.C. 154(b) by 0 days.

(21) Appl. No.: 19/041,984

(22) Filed: Jan. 30, 2025

(51) Int. Cl.
*H04L 9/40* (2022.01)

(52) U.S. Cl.
CPC ................ *H04L 63/1416* (2013.01)

(58) Field of Classification Search
CPC .................................. H04L 63/1416
USPC ............................................ 726/23
See application file for complete search history.

(56) References Cited

U.S. PATENT DOCUMENTS

| | | | |
|---|---|---|---|
| 11,783,062 B2 * | 10/2023 | Lounsberry | G06F 21/6218 726/30 |
| 2019/0377712 A1 | 12/2019 | Miller et al. | |
| 2022/0116335 A1 * | 4/2022 | Sharma Banjade | H04W 24/02 |
| 2023/0186293 A1 | 6/2023 | Dolev et al. | |
| 2023/0344860 A1 * | 10/2023 | Agranonik | G06N 3/08 |
| 2024/0091646 A1 | 3/2024 | McDonnell | |
| 2024/0256525 A1 | 8/2024 | Manamohan et al. | |
| 2025/0028873 A1 * | 1/2025 | Sun | H02J 13/00001 |
| 2025/0080416 A1 * | 3/2025 | Mitrache | H04L 41/16 |

FOREIGN PATENT DOCUMENTS

WO    WO-2020/189926 A1    9/2020

OTHER PUBLICATIONS

Ahmed et al., "Blockchain-Based Identity Management System and Self-Sovereign Identity Ecosystem: A Comprehensive Survey", IEEE Access, date of publication Oct. 25, 2022, date of current version 3 Nov. (Year: 2022).

* cited by examiner

*Primary Examiner* — Badri Narayanan Champakesan
(74) *Attorney, Agent, or Firm* — Foley & Lardner LLP

(57) ABSTRACT

Systems, methods, and computer-readable media for autonomous agents are disclosed. The autonomous agent can include one or more processing circuits configured to receive or identify a dynamic data structure comprising one or more functions or one or more frameworks for performing a plurality of cyber resilience operations. The processing circuits can register the autonomous agent with a decentralized network, centralized network, or data source (DNCNDS). The processing circuits can receive or identify, from at least one computing system external or internal to the DNCNDS, cyber resilience data. The processing circuits can perform, in real-time, the at least one cyber resilience operation of the plurality of cyber resilience operations based at least on selecting at least one function of the one or more functions of the dynamic data structure based at least on the cyber resilience data.

20 Claims, 27 Drawing Sheets

CYBER RESILIENCE AGENTIC MESH

BACKGROUND

The present implementations relates generally to computer security architecture and software for information security and cybersecurity. In a computer networked environment, entities such as people or companies have vulnerabilities that can result in security incidents. Some entities can desire to implement protections and/or provide protections.

SUMMARY

Some implementations of the present disclosure relate to autonomous agents for cyber resilience. Systems and methods are disclosed that improve cyber resilience by utilizing autonomous agents configured to perform a plurality of cyber resilience operations. Systems and methods are disclosed that include dynamic data structures including functions and frameworks for performing cyber resilience operations. For example, systems and methods in accordance with the present disclosure can register autonomous agents with decentralized networks, centralized networks, or data sources to perform operations based on identified cyber resilience data. Additionally, the disclosed systems and methods can include real-time operations for updating computing environments, generating and providing assessments, or updating dashboards. The disclosed systems and methods can also generate new functions within the dynamic data structures based on cyber resilience data, where the functions are configured to address cybersecurity challenges such as safeguarding computing environments, monitoring vulnerabilities, and generating new cybersecurity operations. By using dynamic data structures and autonomous agents, the disclosed systems and methods improve cyber resilience by providing adaptive, data-driven responses for applications such as infrastructure security, assessment generation, and/or dynamic operations management.

Some implementations of the present disclosure relate to systems for deploying and managing autonomous agents in cyber resilience. Systems and methods are disclosed that improve cyber resilience by configuring and deploying autonomous agents to perform cyber resilience operations. Systems and methods are disclosed that include dynamic data structures including functions and frameworks for configuring autonomous agents to perform operations in decentralized networks, centralized networks, or data sources. For example, systems and methods in accordance with the present disclosure can configure and deploy a first autonomous agent to perform a plurality of first cyber resilience operations and a second autonomous agent to perform a plurality of second cyber resilience operations. Additionally, the disclosed systems and methods can receive cyber resilience data and perform operations, including applying functions and frameworks from dynamic data structures, to model or update cyber resilience for one or more entities. The disclosed systems and methods can dynamically facilitate the operations of multiple autonomous agents based on identified cyber resilience data to address cybersecurity challenges such as entity-specific risk modeling and/or vulnerability monitoring. By using dynamic data structures, multiple autonomous agents, and/ or cyber resilience data, the disclosed systems and methods improve cybersecurity by providing collaborative, multi-agent workflows for real-time (or near real-time) resilience operations, vulnerability management, and/or system updates.

Some implementations of the present disclosure relate to cryptographic systems for managing cyber resilience data. Systems and methods are disclosed that improve cyber resilience by utilizing quantum-resistant cryptographic models, secure data channels, and/or post-quantum signature schemes. Systems and methods are disclosed that include generating protected data packages including cyber resilience data, applying cryptographic processes to secure the data, and storing the packages in decentralized networks, centralized networks, or data sources. For example, systems and methods in accordance with the present disclosure can generate digital signatures for the protected data packages using a post-quantum signature scheme and store the signatures in a secure manner to maintain data integrity. Additionally, the disclosed systems and methods can provide protected data packages through secure data channels using identifiers, interfaces, or endpoints that can be accessed within or external to the storage networks. The disclosed systems and methods can facilitate secure sharing and management of cyber resilience data, addressing challenges such as data tampering, unauthorized access, and/or fragmented data security frameworks. By using quantum-resistant cryptographic systems, secure data channels, and/or protected data storage mechanisms, the disclosed systems and methods improve cybersecurity by providing enhanced protection, verifiable data integrity, and/or secure accessibility for cyber resilience applications.

Some implementations of the present disclosure relate to an autonomous agent. The autonomous agent can include one or more processing circuits. In some implementations, the one or more processing circuits can be configured to receive or identify a dynamic data structure including one or more functions or one or more frameworks for performing a plurality of cyber resilience operations. In some implementations, the one or more processing circuits are configured to register the autonomous agent with a decentralized network, centralized network, or data source (DNCNDS) to cause the one or more processing circuits to be discoverable on the DNCNDS. In some implementations, the one or more processing circuits are configured to receive or identify, from at least one computing system external or internal to the DNCNDS, cyber resilience data. In some implementations, the one or more processing circuits are configured to perform, in real-time, the at least one cyber resilience operation of the plurality of cyber resilience operations based at least on selecting at least one function of the one or more functions of the dynamic data structure based at least on the cyber resilience data, wherein the at least one function corresponds to (i) updating a computing environment, (ii) generating and providing an assessment to a plurality of computing systems, (iii) updating a dashboard or generating a new function based at least on the one or more frameworks of the dynamic data structure, wherein the new function corresponds to generating at least one new cyber resilience operation based on to the cyber resilience data.

In some implementations, performing the at least one cyber resilience operation includes generating a data package corresponding to the new function or at least one function of the one or more functions, wherein the data package includes one or more deployable sub-functions of the new function or at least one function of the one or more functions. In some implementations, performing the at least one cyber resilience operation includes providing, via DNCNDS, the data package configured to deploy on at least one entity computing system.

In some implementations, the one or more processing circuits are configured to store the new function in the dynamic data structure. In some implementations, the one or more processing circuits are configured to provide the new function and corresponding performance data to at least one second autonomous agent of the DNCNDS, wherein the new function and the corresponding performance data causes the at least one second autonomous agent of the DNCNDS to update a corresponding dynamic data structure.

In some implementations, the one or more processing circuits are configured to apply the at the least one cyber resilience operation as input to an artificial intelligence (AI) model to cause the AI model to generate a performance metric corresponding with selecting the at least one function of the one or more functions or generating the new function; and update the dynamic data structure based at least on the performance metric.

In some implementations, the one or more processing circuits are configured to generate one or more tokens including at least one proof of the at least one cyber resilience operation, wherein the at least one proof corresponds with a verification of at least a portion of the cyber resilience data or at least a portion of one or more outputs of the new function or at least one function of the one or more functions. In some implementations, one or more processing circuits are configured to, in response to determining the cyber resilience data corresponds with a verification request, transmit at least one of the one or more tokens to the DNCNDS for verification of the at least one cyber resilience operation or cyber resilience data.

In some implementations, the one or more processing circuits are configured to update the dynamic data structure based on the cyber resilience operation performed. In some implementations, the one or more processing circuits are configured to re-register with the DNCNDS to cause the one or more processing circuits to be discoverable on the DNCNDS with the updated dynamic data structure.

In some implementations, the one or more processing circuits are configured to register and re-register with the DNCNDS, wherein registering and re-registering with the DNCNDS allows the autonomous agent to be discoverable by at least one entity computing system via the DNCNDS, wherein registering and re-registering with the DNCNDS includes (1) causing the one or more processing circuits and one or more of the one or more functions or one or more of the one or more frameworks received by the dynamic data structure to be discoverable on the DNCNDS.

In some implementations, the one or more processing circuits are configured to identify (1) a portion of the cyber resilience operation to perform corresponding to the at least one or more functions or one or more frameworks of the dynamic data structure and (2) a portion of the cyber resilience operation to transmit to the DNCNDS for performance by a second agent. In some implementations, the one or more processing circuits are configured to provide usage statistics and metrics of the dynamic data structure to the DNCNDS for the DNCNDS, the second agent or an entity to track activity levels and resource consumption.

Some implementations of the present disclosure relate to a method, including receiving or identifying, by one or more processing circuits, a dynamic data structure including one or more functions or one or more frameworks for performing a plurality of cyber resilience operations. In some implementations, the method can include registering, by the one or more processing circuits, the autonomous agent with a decentralized network, centralized network, or data source (DNCNDS) to cause the one or more processing circuits to be discoverable on the DNCNDS. In some implementations, the method can include receiving or identifying, by the one or more processing circuits, from at least one computing system external or internal to the DNCNDS, cyber resilience data. In some implementations, the method can include performing, by the one or more processing circuits, in real-time, the at least one cyber resilience operation of the plurality of cyber resilience operations based at least on selecting at least one function of the one or more functions of the dynamic data structure based at least on the cyber resilience data, wherein the at least one function corresponds to (i) updating a computing environment, (ii) generating and providing an assessment to a plurality of computing systems, (iii) updating a dashboard or generating a new function based at least on the one or more frameworks of the dynamic data structure, wherein the new function corresponds to generating at least one new cyber resilience operation based on to the cyber resilience data.

In some implementations, the method can include generating a data package corresponding to the new function or at least one function of the one or more functions, wherein the data package includes one or more deployable sub-functions of the new function or at least one function of the one or more functions. In some implementations, the method can include providing, via DNCNDS, the data package configured to deploy on at least one entity computing system.

In some implementations, the method can include storing the new function in the dynamic data structure. In some implementations, the method can include providing the new function and corresponding performance data to at least one second autonomous agent of the DNCNDS, wherein the new function and the corresponding performance data causes the at least one second autonomous agent of the DNCNDS to update a corresponding dynamic data structure.

In some implementations, the method can include applying, by the one or more processing circuits, the at the least one cyber resilience operation as input to an artificial intelligence (AI) model to cause the AI model to generate a performance metric corresponding with selecting the at least one function of the one or more functions or generating the new function. In some implementations, the method can include updating, by the one or more processing circuits, the dynamic data structure based at least on the performance metric.

In some implementations, the method can include generating, by the one or more processing circuits, one or more tokens including at least one proof of the at least one cyber resilience operation, wherein the at least one proof corresponds with a verification of at least a portion of the cyber resilience data or at least a portion of one or more outputs of the new function or at least one function of the one or more functions. In some implementations, the method can include, in response to determining the cyber resilience data corresponds with a verification request, transmitting, by the one or more processing circuits, at least one of the one or more tokens to the DNCNDS for verification of the at least one cyber resilience operation or cyber resilience data.

In some implementations, the method can include updating, by the one or more processing circuits, the dynamic data structure based on the cyber resilience operation performed. In some implementations, the method can include re-registering, by the one or more processing circuits, with the DNCNDS to cause the one or more processing circuits to be discoverable on the DNCNDS with the updated dynamic data structure.

In some implementations, the method can include registering and re-registering with the DNCNDS, wherein registering and re-registering with the DNCNDS allows the autonomous agent to be discoverable by at least one entity computing system via the DNCNDS, wherein registering and re-registering with the DNCNDS includes (1) causing the one or more processing circuits and one or more of the one or more functions or one or more of the one or more frameworks received by the dynamic data structure to be discoverable on the DNCNDS.

In some implementations, the method can include identifying, by the one or more processing circuits, (1) a portion of the cyber resilience operation to perform corresponding to the at least one or more functions or one or more frameworks of the dynamic data structure and (2) a portion of the cyber resilience operation to transmit to the DNCNDS for performance by a second agent. In some implementations, the method can include providing, by the one or more processing circuits, usage statistics and metrics of the dynamic data structure to the DNCNDS for the DNCNDS, the second agent or an entity to track activity levels and resource consumption.

In some implementations, the method can include receiving or identifying cyber resilience data from at least one computing system external to the DNCNDS, including receiving or identifying cyber resilience data form an entity computing system, third-party computing system, or data source and receiving or identifying cyber resilience data from at least one computing system internal to the DNCNDS includes receiving or identifying cyber resilience data from an agent network, second autonomous agent, or orchestration computing system.

Some implementations of the present disclosure relate to a non-transitory computer readable medium (CRM). In some implementations, the CRM can include one or more instructions stored thereon and executable by one or more processors to receive or identify a dynamic data structure including one or more functions or one or more frameworks for performing a plurality of cyber resilience operations. In some implementations, the one or more instructions can be executable by the one or more processors to register an autonomous agent with a decentralized network, centralized network, or data source (DNCNDS) to cause the one or more processors to be discoverable on the DNCNDS. In some implementations, the one or more instructions can be executable by the one or more processors receive or identify, from at least one computing system external or internal to the DNCNDS, cyber resilience data. In some implementations, the one or more instructions can be executable by the one or more processors to perform, in real-time, the at least one cyber resilience operation of the plurality of cyber resilience operations based at least on selecting at least one function of the one or more functions of the dynamic data structure based at least on the cyber resilience data, wherein the at least one function corresponds to (i) updating a computing environment, (ii) generating and providing an assessment to a plurality of computing systems, (iii) updating a dashboard or generating a new function based at least on the one or more frameworks of the dynamic data structure, wherein the new function corresponds to generating at least one new cyber resilience operation based on to the cyber resilience data.

In some implementations, the one or more instructions can be executable by the one or more processors to generate a data package corresponding to the new function or at least one function of the one or more functions, wherein the data package includes one or more deployable sub-functions of the new function or at least one function of the one or more functions. In some implementations, the one or more instructions can be executable by the one or more processors to provide, via DNCNDS, the data package configured to deploy on at least one entity computing system.

Some implementations of the present disclosure relate to a method, including configuring, by one or more processing circuits of at least one decentralized network, centralized network, or data source (DNCNDS), a first autonomous or independent agent to perform a plurality of first cyber resilience operations, and configuring the first autonomous or independent agent includes generating or identifying a first dynamic data structure including one or more first functions or one or more first frameworks for performing the plurality of first cyber resilience operations. In some implementations, the method can include deploying, by the one or more processing circuits, the first autonomous or independent agent to the at least one DNCNDS to model or update cyber resilience of one or more entities. In some implementations, the method can include configuring, by the one or more processing circuits, a second autonomous or independent agent to perform a plurality of second cyber resilience operations, and configuring the second autonomous or independent agent includes generating or identifying a second dynamic data structure including one or more second functions or one or more second frameworks for performing the plurality of second cyber resilience operations. In some implementations, the method can include deploying, by the one or more processing circuits, the second autonomous or independent agent to the at least one DNCNDS to model or update the cyber resilience of the one or more entities. In some implementations, the method can include identifying or receiving, by the one or more processing circuits, cyber resilience data, and performing, by the one or more processing circuits, based on the cyber resilience data, at least one of at least one first operation of the plurality of first cyber resilience operations on the first autonomous or independent agent using the one or more first functions or the one or more first frameworks of the first dynamic data structure or at least one second operation of the plurality of second cyber resilience operations on the second autonomous or independent agent using the one or more second functions or the one or more second frameworks of the second dynamic data structure.

In some implementations, the method can include identifying, by the one or more processing circuits, the first autonomous or independent agent or the second autonomous or independent agent to perform the at least one of the at least one first operation or the at least one second operation, and identifying includes determining one or more operational, performance, or capacity metrics corresponding with the first autonomous or independent agent, the second autonomous or independent agent, or the at least one DNCNDS.

In some implementations, the one or more operational, performance, or capacity metrics correspond with one or more processing loads or memory allocations of the first autonomous or independent agent or the second autonomous or independent agent, and the method can include allocating, by the one or more processing circuits, at least a portion the cyber resilience data to the first autonomous or independent agent or the second autonomous or independent agent based at least on balancing the one or more processing loads or memory allocations.

In some implementations, the method can include selecting, by the one or more processing circuits, the first autonomous or independent agent or the second autonomous or independent agent to perform the at least one of the at least one first operation or the at least one second operation, and selecting includes distributing, based on determining the cyber resilience data corresponds with the one or more first functions or the one or more first frameworks, at least a portion of the cyber resilience data to the first autonomous or independent agent or distributing, based on determining the cyber resilience data corresponds with the one or more second functions or the one or more second frameworks, the at least a portion of the cyber resilience data to the second autonomous or independent agent.

In some implementations, the method can include selecting the first autonomous or independent agent or the second autonomous or independent agent to perform the at least one of the at least one first operation or the at least one second operation, and selecting includes presenting, by the one or more processing circuits, a graphical user interface (GUI) including a plurality of selectable elements corresponding to an agent marketplace including the first autonomous or independent agent and the second autonomous or independent agent and receiving, by the one or more processing circuits in the agent marketplace via the GUI, a selection of at least one of the plurality of selectable elements corresponding to the first autonomous or independent agent or the second autonomous or independent agent.

In some implementations, identifying or receiving the cyber resilience data can include identifying or receiving, by the one or more processing circuits via at least one of an endpoint or interface, the cyber resilience data from at least one first computing system internal to the at least one DNCNDS or at least one second computing system external to the at least one DNCNDS.

In some implementations, the method can include generating, by the one or more processing circuits, one or more tokens embedded with at least one proof, and the at least one proof corresponds with a verification of at least a portion of the cyber resilience data, the at least one of the at least one first operation or the at least one second operation, or at least a portion of one or more outputs of the one or more first functions or the one or more second functions. In some implementations, the method can include, responsive to determining the cyber resilience data corresponds with a verification request, transmitting, by the one or more processing circuits, using the at least one of the endpoint or interface, the at least one proof or an indication of the at least one proof to the at least one first computing system or the at least one second computing system.

In some implementations, performing the at least one of the at least one first operation or the at least one second operation includes identifying, by the one or more processing circuits, a plurality of sub-operations based on the cyber resilience data, the plurality of sub-operations corresponding with the at least one of the at least one first operation or the at least one second operation. In some implementations, performing the at least one of the at least one first operation or the at least one second operation includes allocating, by the one or more processing circuits, at least one first sub-operation of the plurality of sub-operations to the first autonomous or independent agent. In some implementations, performing the at least one of the at least one first operation or the at least one second operation includes allocating, by the one or more processing circuits, at least one second sub-operation of the plurality of sub-operations to the second autonomous or independent agent, and the plurality of sub-operations include at least two modeling operations, storage operations, or data exchange operations corresponding with the performance of the at least one of the at least one first operation or the at least one second operation.

In some implementations, performing the at least one of the at least one first operation or the at least one second operation includes determining, by the one or more processing circuits, at least one sub-operation of the plurality of sub-operations fail to correspond with the one or more first functions or one or more first frameworks or the one or more second functions or one or more second frameworks. In some implementations, performing the at least one of the at least one first operation or the at least one second operation includes distributing, by the one or more processing circuits, via the first autonomous or independent agent or the second autonomous or independent agent, at least a portion of the cyber resilience data for performing one or more of the plurality of sub-operations to at least one third autonomous or independent agent, and the at least one third autonomous or independent agent includes one or more functions or frameworks configured to perform the at least one sub-operation.

In some implementations, receiving or identifying the cyber resilience data can include segmenting, by the one or more processing circuits, the cyber resilience data into one or more portions based on a data type, priority level, or size of the cyber resilience data and allocating, by the one or more processing circuits, at least one first portion of the one or more portions to the at least one first autonomous or independent agent and at least one second portion of the one or more portions to the at least one second autonomous or independent agent.

Some implementations relate to a system including one or more processing circuits of at least one decentralized network, centralized network, or data source (DNCNDS) configured to configure a first autonomous or independent agent to perform a plurality of first cyber resilience operations, and configuring the first autonomous or independent agent includes generating or identifying a first dynamic data structure including one or more first functions or one or more first frameworks for performing the plurality of first cyber resilience operations. In some implementations, the one or more processing circuits can be configured to deploy the first autonomous or independent agent to the at least one DNCNDS to model or update cyber resilience of one or more entities. In some implementations, the one or more processing circuits can be configured to configure a second autonomous or independent agent to perform a plurality of second cyber resilience operations, and configuring the second autonomous or independent agent includes generating or identifying a second dynamic data structure including one or more second functions or one or more second frameworks for performing the plurality of second cyber resilience operations. In some implementations, the one or more processing circuits can be configured to deploy the second autonomous or independent agent to the at least one DNCNDS to model or update the cyber resilience of the one or more entities. In some implementations, the one or more processing circuits can be configured to identify or receive cyber resilience data. In some implementations, the one or more processing circuits can be configured to perform, based on the cyber resilience data, at least one of at least one first operation of the plurality of first cyber resilience operations on the first autonomous or independent agent using the one or more first functions or the one or more first frameworks of the first dynamic data structure or at least one second operation of the plurality of second cyber resilience operations on the second autonomous or independent agent using the one or more second functions or the one or more second frameworks of the second dynamic data structure.

In some implementations, the one or more processing circuits can be configured to identify the first autonomous or independent agent or the second autonomous or independent agent to perform the at least one of the at least one first operation or the at least one second operation, and identifying includes determining one or more operational, performance, or capacity metrics corresponding with the first autonomous or independent agent, the second autonomous or independent agent, or the at least one DNCNDS.

In some implementations, the one or more operational, performance, or capacity metrics correspond with one or more processing loads or memory allocations of the first autonomous or independent agent or the second autonomous or independent agent, and the one or more processing circuits can be configured to allocate at least a portion the cyber resilience data to the first autonomous or independent agent or the second autonomous or independent agent based at least on balancing the one or more processing loads, memory allocations.

In some implementations, the one or more processing circuits can be configured to select the first autonomous or independent agent or the second autonomous or independent agent to perform the at least one of the at least one first operation or the at least one second operation, and selecting includes distributing, based on determining the cyber resilience data corresponds with the one or more first functions or the one or more first frameworks, at least a portion of the cyber resilience data to the first autonomous or independent agent, or distributing, based on determining the cyber resilience data corresponds with the one or more second functions or the one or more second frameworks, the at least a portion of the cyber resilience data to the second autonomous or independent agent.

In some implementations, the one or more processing circuits can be configured to select the first autonomous or independent agent or the second autonomous or independent agent to perform the at least one of the at least one first operation or the at least one second operation, and selecting includes presenting a graphical user interface (GUI) including a plurality of selectable elements corresponding to an agent marketplace including the first autonomous or independent agent and the second autonomous or independent agent and receiving, in the agent marketplace via the GUI, a selection of at least one of the plurality of selectable elements corresponding to the first autonomous or independent agent or the second autonomous or independent agent.

In some implementations, to identify or receive the cyber resilience data, the one or more processing circuits can be configured to identify or receive, via at least one of an endpoint or interface, the cyber resilience data from at least one first computing system internal to the at least one DNCNDS or at least one second computing system external to the at least one DNCNDS.

In some implementations, the one or more processing circuits can be configured to generate one or more tokens embedded with at least one proof, and the at least one proof corresponds with a verification of at least a portion of the cyber resilience data, the at least one of the at least one first operation or the at least one second operation or at least a portion of one or more outputs of the one or more first functions or the one or more second functions. In some implementations, the one or more processing circuits can be configured to, responsive to determining the cyber resilience data corresponds with a verification request, transmit, using the at least one of the endpoint or interface, the at least one proof or an indication of the at least one proof to the at least one first computing system or the at least one second computing system.

In some implementations, to perform the at least one of the at least one first operation or the at least one second operation, the one or more processing circuits can be configured to identify a plurality of sub-operations based on the cyber resilience data, the plurality of sub-operations corresponding with the at least one of the at least one first operation or the at least one second operation, allocate at least one first sub-operation of the plurality of sub-operations to the first autonomous or independent agent, allocate at least one second sub-operation of the plurality of sub-operations to the second autonomous or independent agent, and the plurality of sub-operations include at least two modeling operations, storage operations, or data exchange operations corresponding with the performance of the at least one of the at least one first operation or the at least one second operation.

In some implementations, to perform the at least one of the at least one first operation or the at least one second operation, the one or more processing circuits can be configured to determine at least one sub-operation of the plurality of sub-operations fail to correspond with the one or more first functions or one or more first frameworks or the one or more second functions or one or more second frameworks and distribute, via the first autonomous or independent agent or the second autonomous or independent agent, at least a portion of the cyber resilience data for performing one or more of the plurality of sub-operations to at least one third autonomous or independent agent, and the at least one third autonomous or independent agent includes one or more functions or frameworks configured to perform the at least one sub-operation.

Some implementations relate to a non-transitory computer readable medium (CRM) including one or more instructions stored thereon and executable by one or more processors to configure a first autonomous or independent agent to perform a plurality of first cyber resilience operations, and configuring the first autonomous or independent agent includes generating or identifying a first dynamic data structure including one or more first functions or one or more first frameworks for performing the plurality of first cyber resilience operations. In some implementations, the one or more instructions can be executable by the one or more processors to deploy the first autonomous or independent agent to at least one decentralized network, centralized network, or data source (DNCNDS) to model or update cyber resilience of one or more entities. In some implementations, the one or more instructions can be executable by the one or more processors to configure a second autonomous or independent agent to perform a plurality of second cyber resilience operations, and configuring the second autonomous or independent agent includes generating or identifying a second dynamic data structure including one or more second functions or one or more second frameworks for performing the plurality of second cyber resilience operations. In some implementations, the one or more instructions can be executable by the one or more processors to deploy the second autonomous or independent agent to the at least one DNCNDS to model or update the cyber resilience of the one or more entities. In some implementations, the one or more instructions can be executable by the one or more processors to identify or receive cyber resilience data. In some implementations, the one or more instructions can be executable by the one or more processors to perform, based on the cyber resilience data, at least one of at least one first operation of the plurality of first cyber resilience operations on the first autonomous or independent agent using the one or more first functions or the one or more first frameworks of the first dynamic data structure or at least one second operation of the plurality of second cyber resilience operations on the second autonomous or independent agent using the one or more second functions or the one or more second frameworks of the second dynamic data structure.

Some implementations of the present disclosure relate to a system. In some implementations, the system can include a cyber resilience system configured receive or identify cyber resilience data corresponding with at least one cyber resilience operation performed in at least one decentralized network, centralized network, or data source (DNCNDS). In some implementations, the system can include a cryptography system configured to apply a quantum-resistant model to cause the quantum-resistant model to generate a protected data package including at least the cyber resilience data, generate, using a post-quantum signature scheme, one or more digital signatures of the protected data package, and store the protected data package and the one or more digital signatures with the at least one DNCNDS. In some implementations, the system can include a secure data channel configured to provide the protected data package via at least one of an identifier, interface, or endpoint within the at least one DNCNDS or external to the at least one DNCNDS.

In some implementations, the protected data package secures the cyber resilience data during transmission via the secure data channel, the one or more digital signatures validate an authenticity of the cyber resilience data, and performing the at least one cyber resilience operation includes at least one of (i) identifying, receiving, or transmitting, (ii) modeling or updating, or (iii) encrypting at least a portion of the cyber resilience data.

In some implementations, the cyber resilience system is configured to register one or more nodes with the DNCNDS, and the one or more nodes exchange the cyber resilience data corresponding to the at least one cyber resilience operation.

In some implementations, the system can include a node analysis system configured to identify historical performance data corresponding to a plurality of cyber resilience operations performed by the one or more nodes, determine, based on the historical performance data, at least one ranking or evaluation metric corresponding to the one or more nodes, and update the at least one ranking or evaluation metric responsive to performance of the at least one cyber resilience operation by at least one of the one or more nodes.

In some implementations the one or more nodes include one or more autonomous or independent agents configured to perform the at least one cyber resilience operation using at least one function or frameworks of the one or more autonomous or independent agents, and the at least one function or framework corresponds to at least one of (i) updating a computing environment, (ii) generating and providing an assessment to a plurality of computing systems, or (iii) updating a dashboard.

In some implementations, the system can include a compliance verification system configured to: generate or identify one or more cryptographic proofs of compliance corresponding with the at least one cyber resilience operation satisfying at least one operational or regulatory parameter, and the one or more cryptographic proofs include at least one zero-knowledge proof (ZKP), and transmit, via at least one of the identifier, interface, or endpoint, compliance data corresponding with the at least one ZKP to at least one third-party or regulatory entity.

In some implementations, the quantum-resistant model or the post-quantum signature scheme corresponds with at least one of a lattice-based, hash-based, code-based, or multivariate polynomial technique, and the protection data package is represented as a token.

In some implementation, cryptography system is configured to apply a hybrid cryptographic model including the quantum-resistant model or post-quantum signature scheme and at least one non-quantum model or signature scheme configured to encrypt or validate at least a portion of the cyber resilience data.

In some implementations, the cryptography system is configured to select the quantum-resistant model, the post-quantum signature scheme, or the at least one non-quantum model or signature scheme based on a configuration or type corresponding with the at least one of the identifier, interface, or endpoint.

Some implementations of the present disclosure relate to a method including receiving or identifying, by one or more processing circuits using a cyber resilience system, cyber resilience data corresponding with at least one cyber resilience operation performed in at least one decentralized network, centralized network, or data source (DNCNDS). In some implementations, the method can include applying, by the one or more processing circuits using a cryptography system, a quantum-resistant model to cause the quantum-resistant model to generate a protected data package including at least the cyber resilience data. In some implementations, the method can include generating, by the one or more processing circuits using the cryptography system and using a post-quantum signature scheme, one or more digital signatures of the protected data package and storing, by the one or more processing circuits using the cryptography system, the protected data package and the one or more digital signatures with the at least one DNCNDS. In some implementations, the method can include providing, by the one or more processing circuits using a secure data channel, the protected data package via at least one of an identifier, interface, or endpoint within the at least one DNCNDS or external to the at least one DNCNDS.

In some implementations, the protected data package secures the cyber resilience data during transmission via the secure data channel, and the one or more digital signatures validate an authenticity of the cyber resilience data, and performing the at least one cyber resilience operation includes at least one of (i) identifying, receiving, or transmitting, (ii) modeling or updating, or (iii) encrypting at least a portion of the cyber resilience data.

In some implementations, the method can include registering, by the one or more processing circuits using a cyber resilience system, one or more nodes with the DNCNDS, and the one or more nodes exchange the cyber resilience data corresponding to the at least one cyber resilience operation.

In some implementations, the method can include identifying, by the one or more processing circuits using a node analysis system, historical performance data corresponding to a plurality of cyber resilience operations performed by the one or more nodes, determining, by the one or more processing circuits using the node analysis system and based on the historical performance data, at least one ranking or evaluation metric corresponding to the one or more nodes, and updating, by the one or more processing circuits using the node analysis system, the at least one ranking or evaluation metric responsive to performance of the at least one cyber resilience operation by at least one of the one or more nodes.

In some implementations, the one or more nodes include one or more autonomous or independent agents, and the method can include performing, by the one or more processing circuits using the one or more autonomous or independent agents, the at least one cyber resilience operation using at least one function or frameworks of the one or more autonomous or independent agents, and the at least one function or framework corresponds to at least one of (i) updating a computing environment, (ii) generating and providing an assessment to a plurality of computing systems, or (iii) updating a dashboard.

In some implementations, the method can include generating or identifying, by the one or more processing circuits using a compliance verification system, one or more cryptographic proofs of compliance corresponding with the at least one cyber resilience operation satisfying at least one operational or regulatory parameter, and the one or more cryptographic proofs include at least one zero-knowledge proof (ZKP), and transmitting, by the one or more processing circuits using the compliance verification system and via at least one of the identifier, interface, or endpoint, compliance data corresponding with the at least one ZKP to at least one third-party or regulatory entity.

In some implementations, the quantum-resistant model or the post-quantum signature scheme corresponds with at least one of a lattice-based, hash-based, code-based, or multivariate polynomial technique, the protection data package is represented as a token.

In some implementations, the method can include applying, by the one or more processing circuits using the cryptography system, a hybrid cryptographic model including the quantum-resistant model or post-quantum signature scheme and at least one non-quantum model or signature scheme configured to encrypt or validate at least a portion of the cyber resilience data.

In some implementations, the method can include selecting, by the one or more processing circuits using the cryptography system, the quantum-resistant model, the post-quantum signature scheme, or the at least one non-quantum model or signature scheme based on a configuration or type corresponding with the at least one of the identifier, interface, or endpoint.

Some implementations relate to a non-transitory computer readable medium (CRM) including one or more instructions stored thereon and executable by one or more processors to receive or identify, using a cyber resilience system, cyber resilience data corresponding with at least one cyber resilience operation performed in at least one decentralized network, centralized network, or data source (DNCNDS). In some implementations, the instructions can be executable by the one or more processors to apply, using a cryptography system, a quantum-resistant model to cause the quantum-resistant model to generate a protected data package including at least the cyber resilience data. In some implementations, the instructions can be executable by the one or more processors to generate, using the cryptography system and using a post-quantum signature scheme, one or more digital signatures of the protected data package. In some implementations, the instructions can be executable by the one or more processors to store, using the cryptography system, the protected data package and the one or more digital signatures with the at least one DNCNDS. In some implementations, the instructions can be executable by the one or more processors to provide, using a secure data channel, the protected data package via at least one of an identifier, interface, or endpoint within the at least one DNCNDS or external to the at least one DNCNDS.

In implementations, the protected data package secures the cyber resilience data during transmission via the secure data channel, the one or more digital signatures validate an authenticity of the cyber resilience data, and performing the at least one cyber resilience operation includes at least one of (i) identifying, receiving, or transmitting, (ii) modeling or updating, or (iii) encrypting at least a portion of the cyber resilience data.

Figure 1A:
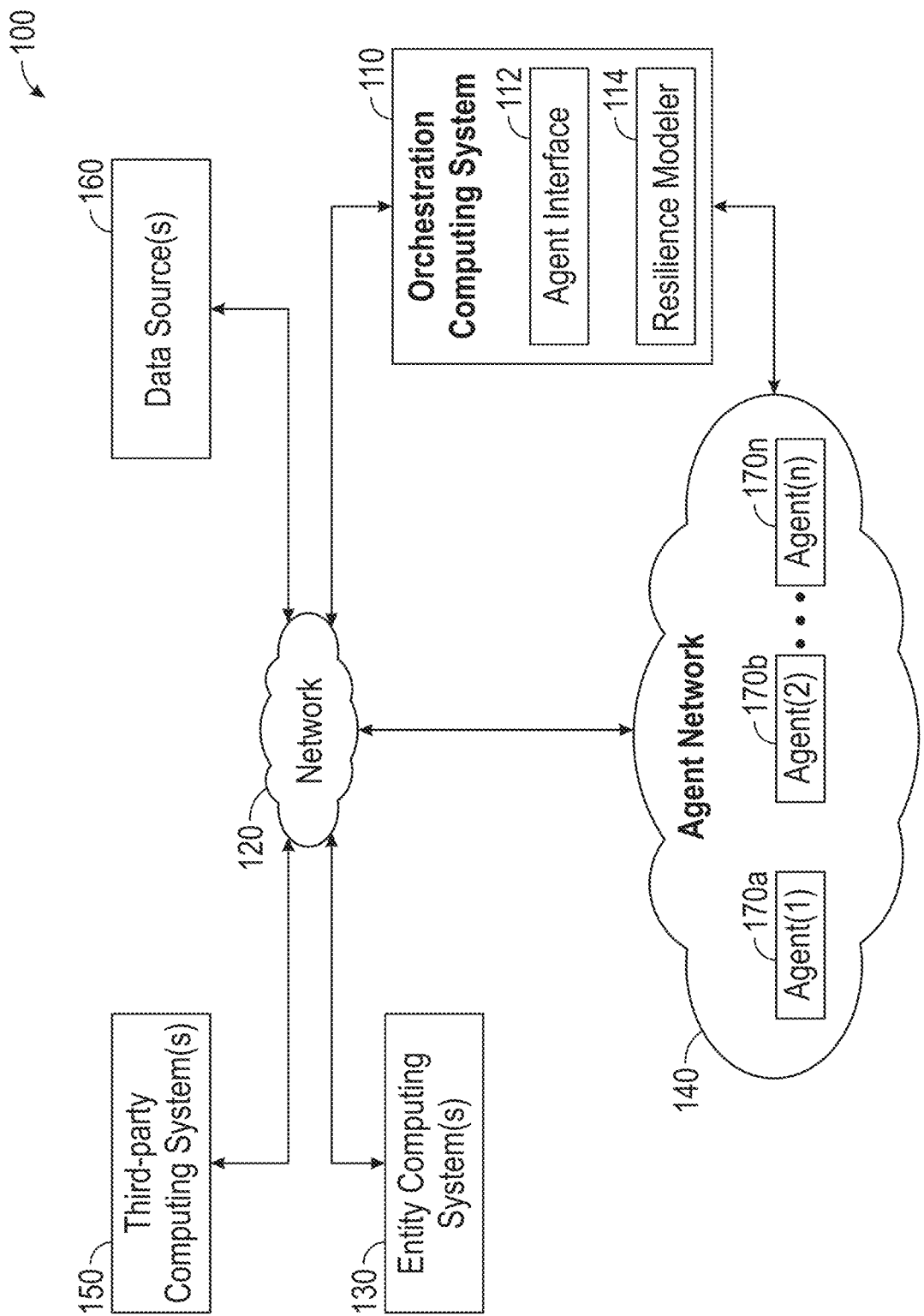
FIGS. 1A-1B depict a block diagram of an implementation of a system for agent orchestration, according to some implementations.

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Referring generally to the FIGURES, systems and methods relate generally to implementing a cybersecurity framework. In some implementations, the system represents an implementation of a security architecture that employs modeling to distribute verified intelligence, and/or employs the generating of various data packages for proof of controls and configurations. In some implementations, the system represents an implementation of a security architecture that models cyber resilience data using cyber resilience identities and associated metadata.

Systems and methods are disclosed related to autonomous agents for cyber resilience. Cyber resilience operations vary in scope and complexity, influencing the security of computing environments. For example, operations can include protecting sensitive data, monitoring cybersecurity status, generating assessments, and/or dynamically updating computing environments. These operations can rely on autonomous agents using dynamic data structures to adapt to cybersecurity conditions. Operations can also depend on external factors, such as the type of cyber resilience data provided and/or specific vulnerabilities identified in the system. Addressing these factors introduces challenges in designing systems capable of adapting to evolving cybersecurity needs. Thus, the disclosed systems and methods provide autonomous and/or independent agents configured to dynamically adapt their functions and/or frameworks based on real-time or near real-time cybersecurity conditions, improving the functionality of monitors and agents to facilitate protections against threats and vulnerabilities.

Certain existing systems use static rules and/or fixed processes for managing cybersecurity, which lack flexibility to address newly emerging threats and/or changes in infrastructure. For example, static systems do not generate new functions based on real-time cyber resilience data and/or provide timely updates to dashboards and/or assessments. Such systems often face delays in identifying and/or addressing vulnerabilities, reducing overall security effectiveness. That is, while monitors can be employed in systems, the monitors fail to dynamically reconfigure operations based on incoming cyber resilience data and/or generate context-aware tasks for addressing specific vulnerabilities. Thus, the disclosed systems and methods address these technical problems by providing agents that adapt dynamically based on real-time (or near real-time) data inputs, reconfiguring their operations to provide effective and timely responses to evolving cybersecurity conditions. Additionally, these systems allow for integration of agents within decentralized, centralized networks, and/or data sources to facilitate coordinated resilience operations.

Systems and methods in accordance with the present disclosure allow autonomous agents to select and/or generate functions and/or frameworks from a data structure to perform cyber resilience operations. The system supports operations such as real-time (or near real-time) updates to computing environments, automated assessment generation, and/or dashboard updates. The system can be implemented in decentralized and/or centralized networks and/or data sources to register autonomous agents and/or facilitate their interactions. The dynamic data structure adapts to cybersecurity conditions, providing customized functions and/or generating new ones based on incoming data. That is, the disclosed systems and methods provide a framework where dynamic data structures allow agents to continuously, automatically, and/or periodically align operations with evolving cybersecurity requirements, improving the adaptability of cyber resilience processes. Thus, the systems support real-time and/or near real-time updates to agent operations, improve coordination and/or communication between agents across networks and data sources, and/or address cybersecurity challenges through continuous, automatic, and/or periodic operational refinement.

For example, an autonomous agent can process cyber resilience data from a computing environment and/or identify a function from the dynamic data structure. The identified function can include updating a computing environment, generating assessments for connected systems, and/or modifying a dashboard. Additionally, the agent can create a new function using frameworks in the dynamic data structure to address specific cybersecurity challenges, such as vulnerabilities and/or compliance tasks. The agent can apply these functions to improve the security of the computing environment in real time.

In some implementations, the autonomous agent can register with a decentralized and/or centralized network and/or data source to increase its operational scope. Registration can support communication with other systems, access to updated resilience data, and/or collaborative operations. By dynamically adapting functions and/or frameworks from the data structure, the agent improves security by addressing various cybersecurity concerns.

Additionally, systems and methods are disclosed related to deploying and facilitating autonomous agents for cyber resilience. Cyber resilience operations can include tasks such as monitoring vulnerabilities, performing system updates, executing incident response procedures, identifying security gaps, generating compliance assessments, mitigating detected threats, coordinating with external cybersecurity vendors, applying remediation strategies, and/or any operations related to enhancing the security posture of computing environments. Configuring agents for such operations can use dynamic data structures, which can include functions and/or frameworks customized to cybersecurity scenarios. For example, agents can model and/or update the resilience posture of entities by using configurations and/or frameworks. Configuring and deploying agents to adapt to the cybersecurity needs of decentralized and/or centralized networks and/or data sources presents technical challenges. Thus, the systems can utilize dynamic and adaptive agent orchestration systems, allowing autonomous agents to continuously adjust operations based on real-time or near real-time resilience data, providing targeted responses and coordinated cybersecurity processes that extend beyond static configurations.

Some systems rely on static configurations and/or fixed agent roles, which reduce the flexibility of agents to adapt to diverse cybersecurity environments. For example, static configurations are often unable to dynamically coordinate the activities of multiple agents and/or respond to evolving cybersecurity threats in real time (or near real-time). Static approaches also fail to adjust agent operations based on updated cyber resilience data, reducing the ability to provide cybersecurity support. That is, while monitors can be employed in existing systems, such implementations generally lack the ability to adapt dynamically to incoming threats, orchestrate complementary agent operations effectively, and/or maintain continuous and/or automatic alignment with updated system vulnerabilities and resilience data. Thus, the systems provide an agent configuration and deployment that uses dynamic data structures to define flexible, role-specific functions and/or frameworks for at least one (e.g., each) agent. Additionally, the systems addresses the technical problem of inter-monitor and/or inter-agent communication and/or communication by providing improved technical solutions for agents to operate collaboratively within decentralized and/or centralized environments, facilitating adaptation to evolving threats and cyber resilience requirements.

Systems and methods in accordance with the present disclosure can configure and deploy multiple autonomous agents using dynamic data structures to perform various cyber resilience operations. The system can include a plurality of dynamic data structures containing and/or otherwise storing functions and/or frameworks for configuring agents. For example, the system can configure a first agent with a dynamic data structure for performing a first set of resilience operations and/or a second agent with a different dynamic data structure for performing complementary operations. These agents can be deployed within decentralized and/or centralized networks and/or data sources to perform tasks and/or actions such as identifying vulnerabilities, applying mitigation measures, updating system configurations, monitoring network traffic, generating incident response reports, assessing compliance with regulatory requirements, generate protection plans, coordinating with other agents, managing secure data exchanges, conducting threat simulations, analyzing security postures, and/or any operations associated with cyber resilience. That is, the disclosed systems and methods provide a coordinated multi-agent architecture such that dynamic data structures can provide modular and scalable agent functionalities, allowing agents to perform specialized tasks individually and/or in collaboration with other agents. Thus, these systems allow for improved deployment of cybersecurity resources, real-time or near real-time adaptability to evolving threats, and/or continuous integration of resilience data into agent operations.

For example, the system can configure a first autonomous agent to perform operations such as detecting vulnerabilities and/or modeling cybersecurity postures. Configuration can include generating and/or identifying a dynamic data structure including functions and/or frameworks of the operations of an agent. In some implementations, the system can configure a second autonomous agent to execute complementary tasks such as applying mitigation strategies and/or generating reports. The system can also provide cyber resilience data to these agents, allowing functions and/or operations to adapt in response to updated data and/or evolving security conditions.

The system can facilitate multiple agents in real time (or near real-time) to improve efficiency and/or accuracy in managing cyber resilience. For example, one agent can monitor network traffic for vulnerabilities while another agent can apply updates to affected systems based on identified risks. The ability to dynamically configure, deploy, and/or coordinate agents supports cybersecurity operations across diverse network environments, enhancing the resilience of computing systems.

Furthermore, systems and methods are disclosed related to cryptographic systems for protection and/or otherwise securing cyber resilience data. Protecting sensitive data, such as vulnerability reports, incident logs, threat intelligence data, encryption keys, proprietary algorithms, compliance information, and/or any data critical to cybersecurity operations, can be important to maintaining robust cyber resilience. For example, data protection can involve preventing unauthorized access, maintaining data integrity, verifying that resilience data remains secure during transmission and/or storage, ensuring data authenticity, tracking changes to sensitive information, validating access permissions, safeguarding against insider threats, and/or any operations related to maintaining cybersecurity standards. Addressing these technical challenges can often include cryptographic systems implemented to counteract evolving threats and/or address limitations in static cryptographic protocols, including vulnerability introduced by quantum computing technologies. Thus, cryptographic systems disclosed herein can dynamically adapt to protect evolving cybersecurity data by incorporating decentralized architectures, tokenization methods, and/or post-quantum validation techniques.

Traditional cryptographic systems do not provide protection against advanced threats such as quantum-based attacks. For example, systems relying on classical cryptographic techniques are vulnerable to quantum computing capabilities that can compromise existing security protocols. Additionally, centralized storage of resilience data introduces risks of breaches and/or unauthorized access, particularly in environments where data is shared across decentralized and/or centralized networks and/or data sources. That is, while quantum-resistant algorithms can be employed to enhance data encryption, they often fail to provide mechanisms for distributed validation and/or continuous security monitoring of resilience data in transit and/or storage. Thus, the cryptographic systems disclosed herein combine quantum-resistant algorithms with post-quantum signature schemes, tokenization, and/or secure access protocols to provide an improved protection framework. Additionally, these systems utilize secure distributed ledgers and/or consensus-based methods to maintain data authenticity and improve overall system reliability.

Systems and methods in accordance with the present disclosure can generate and/or protect protected data packages containing cyber resilience data by employing quantum-resistant cryptographic models and/or secure communication channels. The system can include a cryptographic system configured to apply a post-quantum signature scheme to generate digital signatures for protected data packages. The protected data packages and/or signatures can be stored in decentralized and/or centralized networks and/or data sources to maintain security and/or integrity. That is, the system provides dynamic tokenization of resilience data and distributed consensus models to facilitate validation across multiple points within a network. Thus, cryptographic processes are no longer confined to isolated or centralized environments but instead extend across interconnected systems to improve security, reliability, and/or scalability.

For example, the system processes cyber resilience data received from a computing environment and applies quantum-resistant cryptographic models to create a protected data package. The system can generate one and/or more digital signatures for the package using post-quantum signature schemes. These packages and/or signatures can be stored securely within decentralized, centralized networks, and/or data sources, ensuring that the data remains tamper-proof and/or confidential. The system can also provide access to the protected data packages through secure communication channels, which can include interfaces, identifiers, and/or endpoints accessible internally and/or externally to the storage networks.

The use of secure communication channels supports controlled access to resilience data. For example, a secure data channel can transmit the protected data package to authorized entities for tasks such as compliance verification, risk assessment, incident reporting, cross-network coordination, forensic analysis, and/or any data-driven cybersecurity operation. Quantum-resistant cryptographic techniques and/or secure communication methods protect resilience data from unauthorized access and/or manipulation. These approaches address challenges posed by advanced cybersecurity threats, supporting reliable and robust cyber resilience systems.

Additionally, existing cybersecurity systems and architectures exhibit multiple technical limitations, reducing effectiveness in managing and responding to cyber threats. One technical limitation involves the absence of integrated incident response capabilities. Numerous systems operate in isolation, utilizing separate tools for threat detection, response, and/or recovery, leading to delays in response times, communication challenges between components, and/or fragmented visibility into the overall security posture. Another limitation includes the absence of streamlined processes for engaging third-party vendors for incident response services, often including navigation through complex procurement protocols during a cyber incident, which delays mitigation efforts. Systems frequently implement incomplete assessment mechanisms for readiness in incident response, resulting in unclear visibility into system capabilities and constraints, complicating communication with potential response providers. Static defenses, often employed by current systems, fail to adjust to emerging threats. These static defenses introduce vulnerabilities, as attackers continuously evolve their strategies and methods. Systems fail to account for changes in infrastructure and operations, such as the integration of new technologies or modifications in business processes, introducing new potential attack vectors. The reliance on static defenses limits the system from maintaining a robust security posture, increasing exposure to an evolving threat landscape.

The implementations described herein provide technical solutions for preventing cyber threats, including unauthorized access, data breaches, and/or cyberattacks, by providing autonomous and/or independent agents to perform cyber resilience operations within an agent network. That is, multiple agent computing systems can operate in combination to perform tasks or operations, such as identifying current cybersecurity vulnerabilities, facilitating connections with other autonomous agents and connected systems, processing claims, determining incident readiness, providing proofs, etc. Thereby, the autonomous or independent agents or agent network can provide improved data protections by performing operations to safeguard sensitive information such as medical records, financial data, and/or proprietary business information. The autonomous or independent agents or agent network can also reduce economic and infrastructure burdens associated with data breaches, including expenses related to infrastructure failures, forensic investigations, and/or legal actions. That is, the autonomous or independent agents or agent network described herein can detect and address vulnerabilities while providing dynamic monitoring of relationships between networks, hardware, devices, and/or financial entities. The autonomous or independent agents or agent network can also improve cybersecurity by performing operations to improve network, infrastructure, technology, and/or data security. For example, entities or third parties can interact with the autonomous or independent agents or the agent network to actively monitor and provide responses to potential threats, improving the overall security posture of entity computing and networking infrastructures. That is, the autonomous or independent agents or agent network addresses existing vulnerabilities and anticipate future threats by performing operations, which provides an adaptive and proactive solution to cybersecurity.

For example, the autonomous or independent agents or agent network can identify existing vulnerabilities, map vulnerabilities to assets, and/or provide targeted protection strategies, which provides a technical benefit of generating remediation recommendations and preventing successful hacking activities, cyberattacks, data breaches, and/or other cyber incidents. The autonomous or independent agents or agent network disclosed herein can also facilitate connections of systems to suitable vendors and other entities, offering security plans customized to vulnerabilities and technical needs. Implementations of the autonomous or independent agents or agent network can improve the process of identifying and addressing vulnerabilities by streamlining resources, allowing continuous monitoring of the cybersecurity status of a system by vendors, providing dynamic responses to potential threats, and/or maintaining the integrity and security of system infrastructure. For example, the autonomous or independent agents or agent network provide technical capabilities to facilitate determinations about cybersecurity strategies by selecting from a range of vendor plans and services, activating plans dynamically, and/or determining cybersecurity is actively monitored and managed.

A technical improvement in dynamic cybersecurity architecture comprehension is provided by leveraging the agent orchestration system and agent network to unify and streamline cyber resilience processes. This approach addresses the fragmented landscape of cybersecurity, insurance, and/or incident response by integrating data from various sources into a cohesive framework. For example, maintaining separate inventories of network weaknesses, infrastructure vulnerabilities, and/or operating system susceptibilities can be reduced or eliminated by the autonomous or independent agents or agent network. In some examples, implementations of the agent orchestration system and agent network include identifying potential security gaps associated with system identifiers, such as domain identifiers, IP addresses, and/or subnets. That is, the autonomous or independent agents or agent network can provide a unified view into the computing environment of the target system and manages the identification of different types of vulnerabilities and associated security threats. Vulnerability identification operations can include computer-executed processes to model one or more cybersecurity statuses, determine vulnerabilities based on statuses, and/or integrate or connect systems to suitable vendors offering appropriate cybersecurity plans.

Additionally, the agent orchestration system and agent network enhance data management and sharing through tokenization of cybersecurity information. Tokenization can encrypt cybersecurity posture and insurance information for secure access and storage, with access controlled by smart contracts. Tokenization can be used to prevent unauthorized access and improve data integrity, enhancing data sharing and trust among stakeholders. Additionally, Distributed Non-Fungible Tokens (DNFTs) can provide transparency in tracking and verifying cybersecurity management events and insurance-related activities. Transparency in these processes can improve the accuracy of cyber risk assessments and reduce the likelihood of fraud, as multiple parties can verify the authenticity of performance history events through mechanisms such as multi-signature wallets or signature verification within smart contracts. Tokenization of cybersecurity information, using NFTs or DNFTs, provides real-time visibility into a cyber risk posture of a client. For example, dynamic visibility can facilitate monitoring of compliance and adjustments to policies based on the current risk status of the client. Access to up-to-date information facilitates insurers to provide accurate and fair policy pricing, aligning incentives between insurers, brokers, and/or policyholders. Real-time monitoring capabilities provided by the autonomous or independent agents or agent network can also provide responsive updates to potential threats and improve the overall security posture of an entity or organization.

In some examples, token integration within the agent orchestration system and agent network provides a unified or dimensional view of system cybersecurity status. By consolidating information from various security systems into a single platform, the implementations can conduct cyber threat and risk assessments with greater accuracy and efficiency by accessing data mapped to tokens. The implementations facilitate communication and collaboration between systems, vendors, and/or carriers to identify cyber risks collectively. Data location mapping, connection of security stacks, and/or provision of targeted protection strategies can improve alignment of incentives between various cyber resilience entities. Tokenization further improves cyber resilience systems through enhanced protection and fair policy pricing, providing insurers, vendors, and/or brokers with access to cyber protection data.

The autonomous or independent agents or agent network can use or include decentralized ledger implementations, such as Blockchain, to improve the security and integrity of data exchange processes. That is, decentralized ledgers provide transactions and data entries that are immutable and verifiable, offering a secure and transparent audit trail for cybersecurity activities. For example, the autonomous or independent agents or agent network can use a blockchain architecture that provides a distributed consensus mechanism that validates transactions without using a central authority, reducing the risk of data tampering and unauthorized access. That is, the decentralized nature of Blockchain improves interoperability between different security platforms and facilitates communication among various cybersecurity tools and stakeholders, improves reliability in cyber risk assessments, safeguards or protects data, and/or enhances stakeholder access to implemented security measures and other cyber resilience data.

Agent Orchestration Framework

Referring generally to FIG. 1A, a block diagram of an implementation of system 100 for agent orchestration is shown, according to some implementations. The implementation shown in FIG. 1A includes an orchestration computing system 110, a network 120, entity computing system(s) 130, agent network 140, third-party computing system(s) 150, and/or data sources 160. In some implementations, the orchestration computing system 110 can include an agent interface 112 and a resilience modeler 114. In some implementations, the agent network 140 can include one or more agent systems (e.g., agent system 170a, agent system 170b, . . . agent system 170n) herein referred to as agent systems 170a-170n, agent computing systems 170a-170n (collectively, agent computing systems 170), and/or agents 170a-170n. In some implementations, at least one (e.g., each) of the systems or devices shown in FIG. 1A can be interconnected or communicate with other systems or devices via network 120. It should be understood that, although systems or devices of FIG. 1A can be described or illustrated herein in a singular form, the implementation shown FIG. 1A can include any number of such systems or device. Devices, systems, and/or components shown in FIG. 1A can be added, deleted, integrated, separated, and/or rearranged in various implementations of the disclosure.

Each system or device of FIG. 1A (e.g., orchestration computing system 110, agent interface 112, resilience modeler 114, network 120, entity computing system(s) 130, agent network 140, third-party computing system(s) 150, data sources 160, agent computing systems 170, etc.) can include one or more processors, memories, network interfaces (sometimes referred to herein as a "network circuit") or user interfaces. For example, the orchestration computing system 110, agent interface 112, resilience modeler 114, network 120, entity computing system(s) 130, agent network 140, third-party computing system(s) 150, data sources 160, and/or agent computing systems 170 can include one or more logic devices, which can be one or more computing devices equipped with one or more processing circuits that run instructions stored in a memory device to perform various operations. The processing circuit can be made up of various components such as a microprocessor, an ASIC, and/or an FPGA, and/or the memory device can be any type of storage or transmission device capable of providing program instructions. The instructions can include code from various programming languages commonly used in the industry, such as high-level programming languages, web development languages, and/or systems programming languages.

Each system or device of FIG. 1A can include memory that can store programming logic that, when executed by the processor, controls the operation of the corresponding computing system or device. The memory can also store data in databases. For example, memory can store programming logic that when executed by a processor within a processing circuit, causes a database to update parameters or store a system or event log. The network interfaces can allow the computing systems and devices to communicate wirelessly or otherwise. The various systems or devices shown in FIG. 1A can be implemented via hardware (e.g., circuitry), software (e.g., executable code), and/or any combination thereof. In some implementations, one or more systems or devices of FIG. 1A can also include one or more databases for storing data or receiving and providing data to other systems and devices on the network 120. In some implementations, one or more systems or devices of FIG. 1A can also include, provide, and/or display one or more graphical user interfaces or GUIs.

In some implementations, the systems or components of FIG. 1A can interface and/or otherwise communicate over network 120. Network 120 can include computer networks such as the Internet, local, wide, metro or other area networks, intranets, satellite networks, other computer networks such as voice or data mobile phone communication networks, combinations thereof, and/or any other type of electronic communications network. Network 120 can include or constitute a display network. As a non-limiting example, network 120 can implement transport layer security (TLS), secure sockets layer (SSL), hypertext transfer protocol secure (HTTPS), and/or any other secure communication protocol. In some implementations, network 120 can be composed of various network devices (nodes) communicatively linked to form one or more data communication paths between participating devices. The network 120 can facilitate communication between the various nodes, such as the orchestration computing system 110, agent interface 112, resilience modeler 114, network 120, entity computing system(s) 130, agent network 140, third-party computing system(s) 150, data sources 160, agent computing systems 170, etc. (e.g., using an OSI layer-4 transport protocol such as the User Datagram Protocol (UDP), the Transmission Control Protocol (TCP), Stream Control Transmission Protocol (SCTP), etc.). at least one (e.g., each) networked device can include at least one network interface for receiving and/or transmitting data, typically as one or more data packets. An illustrative network 120 is the Internet (however, other networks can be used). Network 120 can be an autonomous system (AS), e.g., a network that is operated under a consistent unified routing policy (or at least appears to from outside the AS network) and is generally managed by a single administrative entity (e.g., a system operator, administrator, and/or administrative group).

In some implementations, the orchestration system 110, entity computing system(s) 130, third-party computing system(s) 150, and/or agent computing systems 170 can execute and/or otherwise invoke a software application (e.g., a web browser, an installed application, and/or other application) to retrieve content from other computing systems and devices over network 120. Such an application can be configured to retrieve an interfaces and dashboards from the systems of devices of FIG. 1. In some implementations, the orchestration computing system 110, agent interface 112, resilience modeler 114, entity computing system(s) 130, third-party computing system(s) 150, agent computing systems 170, etc. can refer to or include one or more computing devices, nodes, mobile devices, networked devices, smartphones, desktop computing devices, servers, tablets, smart watches, smart sensors, and/or any other device configured to facilitate receiving, displaying, and/or interacting with data (e.g., web pages, mobile applications, etc.). For example, the orchestration computing system 110, agent interface 112, resilience modeler 114, entity computing system(s) 130, third-party computing system(s) 150, and/or agent computing systems 170 can include an application to receive and display content and to receive user interaction with the content (e.g., a web browser, a mobile application, etc.).

In some implementations, the orchestration computing system 110, agent interface 112, resilience modeler 114, entity computing system(s) 130, third-party computing system(s) 150, agent computing systems 170, etc. can be communicatively coupled to one or more databases, such as data sources 160. The databases can be structured as a data repository that is configured to store data, such as cyber resilience data. For example, the data sources 160 can include data structures for storing information such as, but not limited to, configuration data, compliance metrics, incident history logs, performance benchmarks, policy definitions, cryptographic data or keys, tokens, cyber resilience attributes, posture or state data, historical data, analytic results derived from cyber resilience modeling processes, etc. In some implementations, data sources 160 can include one or more storage mediums.

In some implementations, the orchestration computing system 110, agent interface 112, resilience modeler 114, entity computing system(s) 130, third-party computing system(s) 150, agent computing systems 170 APIs can access and/or otherwise retrieve data of data sources 160 by performing database functions (e.g., managing, synchronizing, and/or linking data stored in data sources). The APIs can be but are not limited to SQL, ODBC, JDBC, NOSQL and/or any other data storage and manipulation API.

In some implementations, the entity computing system(s) 130 can include any computing device associated with an organization, institution, user, and/or customer. For example, the entity computing system(s) 130 can include any computing infrastructures, networks, and/or devices managed by an entity to perform operations such as data storage, processing, and/or communication. In some implementations, the entity computing system(s) 130 can communicate or interface with various systems or devices of shown in FIG. 1A (e.g., exchanging data with the orchestration computing system 110, coordinating functions with agent computing systems 170 (e.g., autonomous or independent agents), accessing or sharing resources with data sources 160, interacting with third-party computing system(s) 150, etc.) For example, the entity computing system(s) 130 can interact with the orchestration computing system 110 to deploy, coordinate, and/or monitor agent computing systems 170, as further described herein.

In some implementations, the third-party computing system(s) 150 can include any computing devices or systems associated with an external organization or entity. For example, the third-party computing system(s) 150 can include or refer to various devices or systems managed by vendors providing cybersecurity tools or services, insurers assessing or underwriting risk based on cyber resilience data, regulatory bodies performing compliance audits, cloud service providers hosting or securing data, third-party data analytics platforms evaluating cyber resilience metrics, software providers offering patches or updates, external auditors reviewing entity safeguards, consultants managing incident response strategies, managed service providers overseeing security operations, law enforcement agencies investigating cyber incidents, penetration testing firms conducting vulnerability assessments, threat intelligence platforms monitoring emerging threats, forensic analysis teams analyzing breach data, and/or any systems or entities supporting cybersecurity operations and resilience strategies. In some implementations, the third-party computing system(s) 150 can communicate or exchange data with various components of FIG. 1A (orchestration computing system 110, agent interface 112, resilience modeler 114, entity computing system(s) 130, data sources 160, agent computing systems 170) to perform various operations, as further described herein.

In some implementations, the agent network 140 can include or refer to any decentralized network, centralized network, and/or data source (DNCNDS). For example, the agent network 140 can include a decentralized network including multiple interconnected nodes (e.g., agent computing systems 170, autonomous or independent agents, etc.) configured to exchange data or perform cyber resilience operations. That is, the agent network 140 can include any type of decentralized network implementing a distributed or node-based architecture, such as a blockchain, decentralized ledger, peer-to-peer networks, federated learning network, a content delivery network (CDN), and/or other decentralized communication architectures. In some implementations, the agent network 140 can include or refer to a centralized network including multiple nodes managed by a centralized authority or controller. For example, the centralized network can include a client-server model where a central server node coordinates data exchange with other nodes. That is, the centralized network can include any type of hierarchical network architecture, such as a local area network (LAN), wide area network (WAN), hub-and-spoke architecture, and/or cloud-based network. In some implementations, the agent network 140 can include or refer to a data source including one or more repositories for storing, managing, and/or accessing agent data. For example, the agent network 140 can include or refer to databases, distributed storage systems, and/or file repositories configured to store cyber resilience data, agent data compliance records, operational metrics, etc. That is, the agent network 140 can include any type of storage medium or infrastructure, such as relational databases, NoSQL databases, and/or object-based storage systems. In some examples, the agent network 140 can include cloud-based storage platforms, on-premises storage devices, and/or hybrid storage systems that combine local and remote storage resources.

Figure 1B:
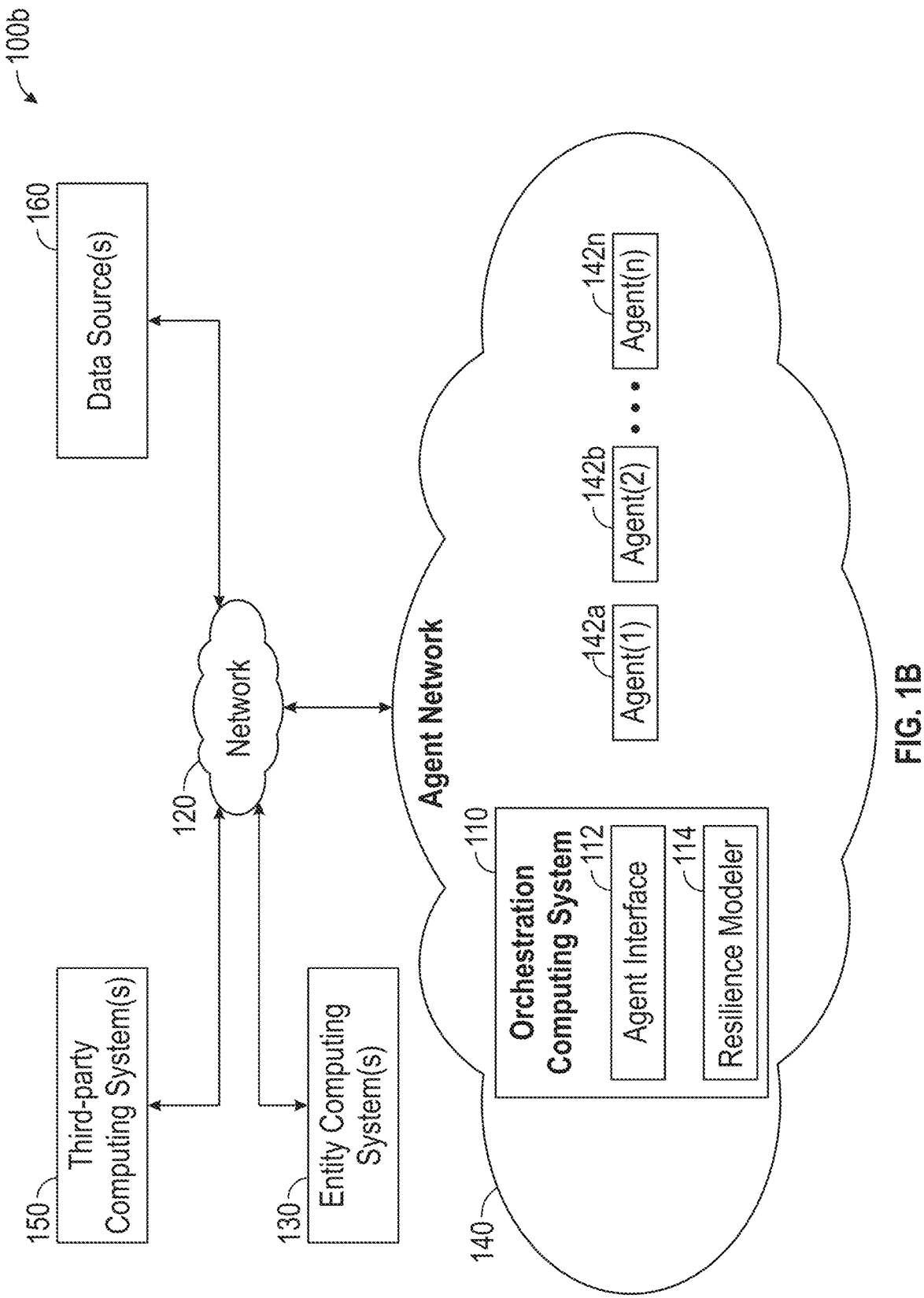

In some implementations, the orchestration computing system 110 can be a part of or separate from the agent network 140. For example, as shown in FIG. 1A, the orchestration computing system 110 can be connected with the agent network 140 via another network or communication channel (e.g., network 120). That is, the orchestration computing system 110 can be an external system configured to receive data or metrics associated with the agent network 140 via network 120 and transmit data or instructions to one or more nodes (e.g., agent computing systems 170) of the agent network 140 via network 120. In another example, as shown in FIG. 1B, the orchestration computing system 110 can be included within the agent network 140 (e.g., as one or more nodes within a centralized or decentralized network). That is, the orchestration computing system 110 can include or refer to any system, device, node, and/or group of nodes within the agent network 140 that facilitates data exchange, workflow orchestration, and/or agent coordination. In some implementations, the orchestration computing system 110 can operate as a master node in a centralized network and perform operations including distributing or coordinating flows of data to various nodes, managing access controls, and/or monitoring operational metrics associated with the nodes. In some implementations, the orchestration computing system 110 can include or refer to a function, system, sub-system, and/or component of agent computing systems 170.

In some implementations, the agent computing systems 170 can include or refer to one or more computing devices configured to exchange data or perform operations via the agent network 140. For example, at least one (e.g., each) of the agent computing systems 170 can include one or more processors, memory devices, and/or communication interfaces for interacting with systems or devices (e.g., other agent computing systems 170, orchestration computing system 110, etc.) via a decentralized network, centralized network, and/or data source. That is, the agent computing systems 170 can include computing devices such as servers, nodes, endpoints, and/or other networked systems executing software or applications to perform data exchanges, cyber resilience operations, and/or other processing or storage operations. For example, the agent computing systems 170 can include nodes configured to collect, process, and/or analyze cyber resilience data in collaboration with other nodes in a decentralized network (e.g., agent network 140). For example, the agent computing systems 170 can include devices, servers, processors executing software, and/or nodes configured to support hierarchical data exchange and control operations in a centralized network (e.g., agent network 140). In some implementations, the agent computing systems 170 can include devices configured to interact with data sources (e.g., agent network 140, data sources 160, etc.). For example, the agent computing systems 170 can include computing devices configured to retrieve, store, and/or process data from relational databases, distributed file systems, and/or other storage mediums.

In some implementations, the agent computing systems 170 can include or refer to autonomous or independent agents configured to perform cyber resilience operations or processes. For example, at least one (e.g., each) agent computing system 170 can include one or more functions (e.g., executable functions, code blocks, etc.) or frameworks (e.g., protocols, software frameworks, instructions, etc.) that are executable by one or more processing circuits of the agent computing systems 170 to perform various operations. That is, the agent computing systems 170 can operate as self-contained or independent systems configured to execute tasks autonomously or in coordination with other agent computing systems 170.

In some implementations, the agent computing system 170 can perform and/or otherwise execute operations. For example, the agent computing systems 170 can perform operations associated with analyzing, processing, and/or exchanging cyber resilience data. In some examples, the agent computing systems 170 can perform operations based on one or more frameworks or functions associated with the agent computing systems 170, including dynamic modeling, risk assessment, token generation, data encryption, and/or compliance verification. In some examples, the agent computing systems 170 can operate based on various parameters or data associated with a cyber resilience task, such as input from cyber resilience data sources (e.g., logs, incident records, policy benchmarks) or parameters provided by the orchestration computing system 110.

In some implementations, the orchestration computing system 110 can execute and/or otherwise perform various operations to deploy, configure, model, identify, receive, generate, and/or provide data within an interconnected agent orchestration framework. In some implementations, the orchestration computing system 110 can cause sub-systems, such as agent interface 112 or resilience modeler 114, to perform various operations or tasks associated with an interconnected agent orchestration framework. In some implementations, the orchestration computing system 110 can configure a first autonomous or independent agent. That is, the agent interface 112 or resilience modeler 114 can configure a first autonomous or independent agent to perform a plurality of first cyber resilience operations. For example, the first cyber resilience operations can include evaluating compliance with regulatory standards, modeling entity resilience based on historical data, generating tokens or accessing tokens, performing data exchanges with cyber data, orchestrating incident response workflows, etc. In some examples, configuring the first autonomous or independent agent can include the orchestration computing system 110, agent interface 112, and/or resilience modeler 114 identifying or generating data corresponding with operational or regulatory parameters, frameworks, and/or data structures used by agent computing systems 170 to perform cyber resilience operations.

In some implementations, configuring the first autonomous or independent agent can include generating or identifying a first dynamic data structure including one or more first functions or one or more first frameworks for performing the plurality of first cyber resilience operations. For example, the orchestration computing system 110 or resilience modeler 114 (e.g., cyber resilience system) can model or retrieve a first dynamic data structure including executable functions, protocols, metadata, and/or data models used by the first autonomous or independent agent (e.g., agent computing system 170*a*) to execute tasks such as evaluating compliance, modeling resilience, and/or performing data exchanges. That is, the one or more first functions or one or more first frameworks can correspond with or define operational parameters or processes used by the first autonomous or independent agent to perform and complete an assigned cyber resilience operation. In some implementations, generating or identifying the first dynamic data structure can include the orchestration computing system 110 or resilience modeler 114 accessing or adjusting machine-readable instructions, modifying or implemented configuration files, and/or assembling modular code blocks into executable runtime environment or data package that is loaded and programmatically executed by processing circuits of the agent computing systems 170. For example, the first dynamic data structure can provide a structured set of algorithms or workflows used or applied by a first autonomous or independent agent to process incoming data, apply decision-making logic, and/or interface with external systems (e.g., other agents, databases, third-party platforms, etc.).

In some implementations, the orchestration computing system 110 can deploy and/or otherwise provide the first autonomous or independent agent to at least one decentralized network, centralized network, and/or data source (DNCNDS) to model or update cyber resilience of one or more entities. That is, the orchestration computing system 110 can transmit the first dynamic data structure, including machine-readable instructions, configuration settings, and/or operational metadata, to a designated agent computing system 170 within a target network (e.g., agent network 140). For example, deploying the first autonomous or independent agent can include the orchestration computing system 110 or agent interface 112 initiating a secure handshake protocol with the agent network 140 or a target agent computing system 170 using cryptographic keys or certificates, establishing an encrypted communication channel, packaging the first dynamic data structure as a containerized environment or virtualized application executable by the processing circuits of the designated agent computing system, and/or providing the packaged data structure to a designated agent or network using the established communication channel. For example, the orchestration computing system 110 or agent interface 112 can interact with APIs or messaging interfaces of the decentralized or centralized network to assign network-specific identifiers to the first autonomous or independent agent, allocate network resources such as storage or processing capacity to the agent, and/or configure network routing setting or parameters to facilitate data exchanges between the agent and other devices or nodes. For example, deploying the first autonomous or independent agent can include programmatically adjusting topology or permissions associated with a target network, updating access control lists (ACLs) or firewall rules to permit communications, and/or updating node registries or smart contract configurations.

In some implementations, the orchestration computing system 110 can configure and/or otherwise initialize a second autonomous or independent agent to perform a plurality of second cyber resilience operations. For example, the second cyber resilience operations can include any operation, such as analyzing cyber resilience metrics for anomalies, updating a security posture of an entity, processing claims or distributions, providing real-time incident response actions, updating cryptographic keys or tokens, synchronizing data between various decentralized or centralized networks, orchestrating operations with other agents, etc. In some implementations, configuring the second autonomous or independent agent includes generating or identifying a second dynamic data structure including one or more second functions or one or more second frameworks for performing the plurality of second cyber resilience operations. For example, the orchestration computing system 110 or resilience modeler 114 can update, access, and/or provide a second dynamic data structure including executable code blocks, metadata models, and/or system parameters that define operational workflows or decision-making processes to be executed by the second autonomous or independent agent. In some implementations, the orchestration computing system 110 can deploy the second autonomous or independent agent to the at least one decentralized network, centralized network, and/or data source (DNCNDS) to model or update the cyber resilience of the one or more entities. That is, the orchestration computing system 110 or agent interface 112 can transmit the second dynamic data structure with associated configuration settings and/or operational metadata to a target agent computing system 170. For example, deploying the second autonomous or independent agent can include the orchestration computing system 110 or agent interface 112 establishing a secure communication channel with the agent network 140 or an agent computing system 170, allocating computational resources within the target network, and/or synchronizing the second autonomous or independent agent with other deployed agents to perform collaborative and/or distributed cyber resilience tasks.

In some implementations, the orchestration computing system 110 or agent interface 112 can identify or receive cyber resilience data. For example, the orchestration computing system 110 and/or agent interface 112 can identify or receive cyber resilience data by interfacing with one or more data sources (e.g., agent network 140, data sources 160, and/or external systems) or systems (e.g., agent computing systems 170) to access and/or query structured, semi-structured, and/or unstructured data stored therein. In some examples, identifying or receiving cyber resilience data can include accessing data via secure APIs, querying relational or NoSQL databases, polling distributed ledger entries, and/or retrieving logs and/or metrics from monitoring systems. That is, the orchestration computing system 110 or agent interface 112 can perform operations such as sending requests to external platforms, subscribing to real-time data streams, receiving periodic data feeds, scanning file repositories, and/or performing metadata searches across indexed datasets.

In some implementations, the orchestration computing system 110 or agent interface 112 can identify and/or otherwise retrieve cyber resilience data by scanning and/or otherwise parsing one or more patterns, tags, and/or attributes within datasets and/or outputs associated with a decentralized or centralized network. Additionally, the orchestration computing system 110 or agent interface 112 can identify or receive cyber resilience data generated by agent computing systems 170 during the performance of one or more operations (e.g., compliance verification, data encryption, incident response). For example, the agent computing systems 170 can transmit operational logs, status updates, performance metrics, and/or results of completed tasks to the orchestration computing system 110 for further analysis, modeling, and/or storage. In some implementations, the orchestration computing system 110 or agent interface 112 can associate the received cyber resilience data with operations, agents, and/or network events. For example, identifying or receiving cyber resilience data can include receiving and/or processing a request to retrieve performance metrics, operational logs, and/or compliance status from agent computing systems 170 and/or other networked components, where the request can include data and/or parameters such as data types, time ranges, and/or system identifiers used by the orchestration computing system 110 to allocate tasks and/or operations to various agents.

In some implementations, the orchestration computing system 110 can perform and/or otherwise execute various operations or cause agent computing systems 170 to perform operations based on the cyber resilience data. For example, the orchestration computing system 110 can perform, based on the cyber resilience data, at least one first operation of the plurality of first cyber resilience operations on the first autonomous or independent agent using the one or more first functions or the one or more first frameworks of the first dynamic data structure. That is, the orchestration computing system 110 can perform at least one first operation of the plurality of first cyber resilience operations by transmitting instructions and/or parameters to a decentralized or centralized network (e.g., agent network 140) that directs the first autonomous or independent agent to utilize the one or more first functions or one or more first frameworks of the first dynamic data structure. That is, the orchestration computing system 110 can analyze the cyber resilience data to determine tasks or workflows and send corresponding directives to the network, which facilitates communication and coordination with the first autonomous or independent agent. For example, the orchestration computing system 110 can transmit operational parameters (e.g., task priorities, workflow triggers, and/or resource allocations) to the network, where the parameters are routed to the first autonomous or independent agent for execution through the processing circuits and defined workflows of the first dynamic data structure.

In some implementations, the orchestration computing system 110 can perform, based on the cyber resilience data, at least one second operation of the plurality of second cyber resilience operations on the second autonomous or independent agent using the one or more second functions or the one or more second frameworks of the second dynamic data structure. For example, the orchestration computing system 110 can perform the at least one second operation by transmitting instructions or configurations to the decentralized or centralized network (e.g., agent network 140), which then directs the second autonomous or independent agent to utilize the one or more second functions or one or more second frameworks of the second dynamic data structure to perform the second operation. That is, the orchestration computing system 110 or resilience modeler 114 can use the cyber resilience data to identify workflows, thresholds, and/or conditions associated with the second operation, and/or the orchestration computing system 110 or agent interface 112 can transmit data associated with the workflows, thresholds, conditions, and/or other directives via agent network 140 to the second autonomous or independent agent to execute an assigned operation. For example, the orchestration computing system 110 can transmit instructions, event triggers, and/or other inputs corresponding with the cyber resilience data to the agent network 140 and the agent network 140 can relays the inputs to the second autonomous or independent agent. For example, the second autonomous or independent agent can apply one or more second functions or one or more second frameworks stored within a second dynamic data structure to process the transmitted data, execute assigned workflows, and/or fulfill operation-specific conditions by interacting with other agents, data sources, and/or external systems through the agent network 140.

In some implementations, performing at least one of the first or second operations can include the autonomous or independent agent utilizing and/or otherwise including one or more functions or one or more frameworks of the corresponding dynamic data structure to process cyber resilience data and generate an output. For example, the agent computing systems 170 can apply predefined algorithms, execute workflows, and/or implement protocols defined within the functions or frameworks to analyze, transform, and/or act upon the cyber resilience data. The output generated can include processed data, operational metrics, compliance results, security alerts, and/or any other actionable information relevant to the assigned cyber resilience operation. That is, the autonomous or independent agent can utilize the capabilities or invoke functions embedded in the dynamic data structure to perform tasks such as evaluating resilience, encrypting data, managing cyber claims, identifying incidents, synchronizing distributed records, and/or generating reports. In some implementations, performing the operation can include the agent computing systems 170 interacting with external systems, other agents, and/or databases via the network (e.g., agent network 140). For example, the agent computing systems 170 can retrieve additional inputs, validate intermediate results, and/or transmit completed outputs for further use by the orchestration computing system 110 or other devices or systems of FIG. 1.

Figure 2:
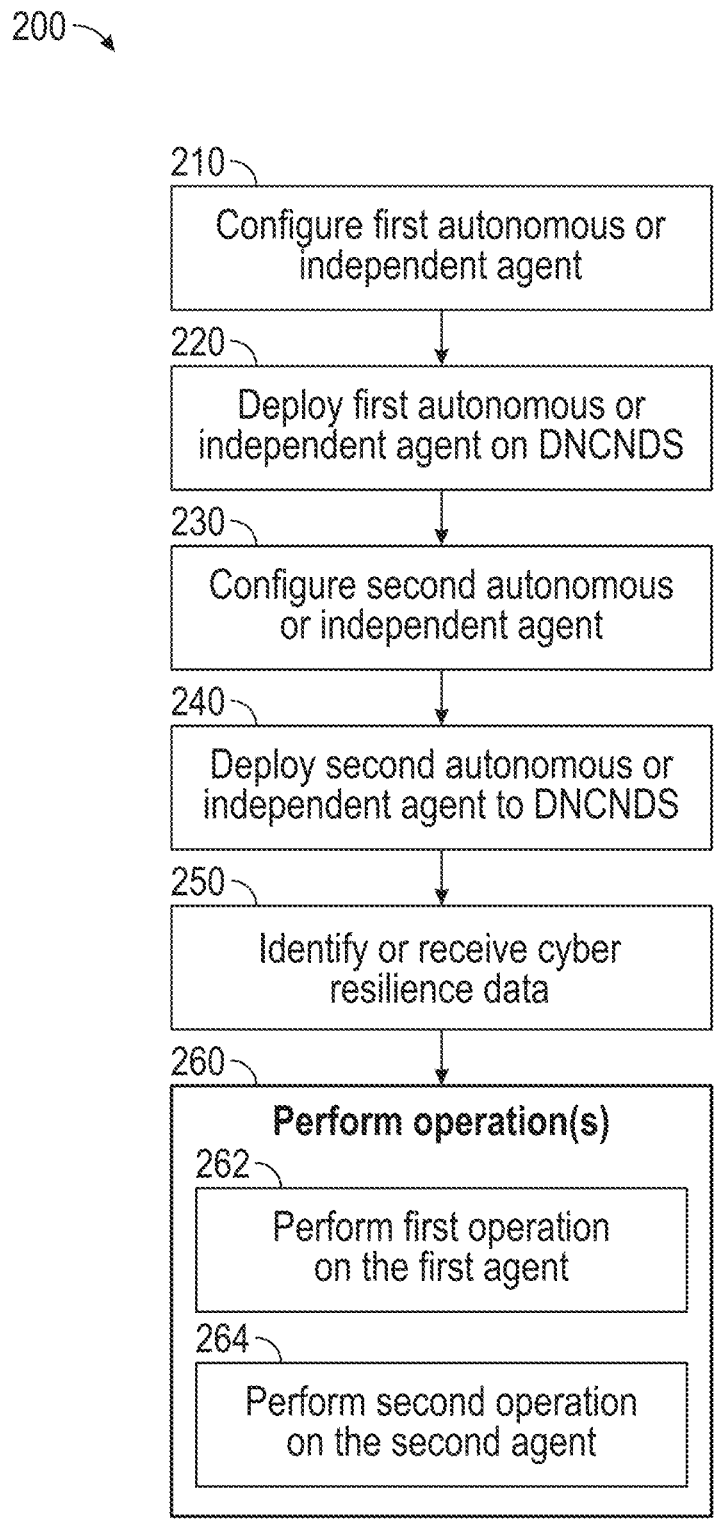
FIG. 2 depicts a flowchart for a method of agent orchestration, according to some implementations.

Referring now to FIG. 2, a method 200 for agent orchestration is shown, according to some implementations. In some implementations, one or more devices, systems, and/or components described with respect to FIGS. 1A-1B can perform or be utilized to perform the steps of method 200. For example, the orchestration computing system 110, agent network 140, and/or agent computing systems 170 can perform one or more of the steps of the method 200. In some implementations, some, and/or all operations of method 200 can be performed by one or more processors executing on one or more computing devices, networks, systems, and/or servers. In some implementations, at least one (e.g., each) operation of method 200 can be re-ordered, added, removed, and/or repeated. In some implementations, the method 200 can include additional, fewer, and/or different operations.

In a broad overview of method 200, at block 210, one or more processing circuits of a decentralized network, centralized network, and/or data source (e.g., processing circuits of orchestration computing system 110, agent network 140, agent computing systems 170, and/or any system or device associated with agent network 140, etc.) can configure a first autonomous or independent agent. At block 220, the one or more processing circuits can deploy the first autonomous or independent agent on the decentralized network, centralized network, and/or data source (DNCNDS). At block 230, the one or more processing circuits can configure a second autonomous or independent agent. At block 240, the one or more processing circuits can deploy the second autonomous or independent agent on the DNCNDS. At block 250, the one or more processing circuits can identify or receive cyber resilience data. At block 260, the one or more processing circuits can perform operation(s). At block 262, the one or more processing circuits can perform a first operation on the first agent. At block 264, the one or more processing circuits can perform a second operation on the second agent.

In some implementations, at block 210, one or more processing circuits of a decentralized network, centralized network, and/or data source (DNCNDS) can configure a first autonomous or independent agent. In some implementations, the one or more processing circuits can configure a first autonomous or independent agent to perform a plurality of first cyber resilience operations. For example, the agent network 140 can retrieve operational parameters (e.g., task priorities, workflow definitions, and/or resource allocations) associated with a first agent (e.g., agent computing system 170a) and transmit configuration instructions to the first agent using a communication channel of the agent network 140. In another example, the one or more processing circuits can analyze cyber resilience data, such as compliance metrics or historical incident logs, to determine operational values or modeling parameters, and/or can dynamically generate configuration data or executable instructions for embedding within a data structure of the first agent based on the analyzed data.

In some implementations, configuring the first autonomous or independent agent can include generating or identifying a first dynamic data structure including one or more first functions or one or more first frameworks for performing the plurality of first cyber resilience operations. That is, the one or more processing circuits can create or otherwise model a structured set of instructions and/or protocols defining the tasks and logic for the first agent to utilize in performing operations. For example, the first dynamic data structure can include modular code blocks or metadata models to facilitate operations such as modeling resilience, processing cyber claims, detecting incidents, determining security postures, evaluating compliance with regulatory standards, and/or orchestrating data exchanges. For example, the orchestration computing system 110 or agent network 140 can transmit the first dynamic data structure to the first agent with instructions to cause the first agent to embed, initialize, and/or execute functions (e.g., data parsing algorithms, decision-making routines, cryptographic processes, data validation scripts, machine learning models, heuristic functions, and/or data aggregation mechanisms) or frameworks (e.g., compliance verification protocols, incident response workflows, tokenization models, resilience modeling architectures, distributed ledger update frameworks, access control evaluation schemas, and/or encryption key management processes) utilized or executed to perform various operations.

In some implementations, at block 220, the one or more processing circuits can deploy the first autonomous or independent agent on the DNCNDS to model or update cyber resilience of one or more entities. That is, the orchestration computing system 110 or agent network 140 can initiate a deployment process by transmitting the first dynamic data structure (e.g., a data package including operational parameters and associated configurations) to a target node within the DNCNDS (e.g., to update an existing node with new functions or frameworks), and/or to a centralized system or interface of the DNCNDS (e.g., to initiate or provide a new node). For example, the one or more processing circuits can establish a communication channel (e.g., using TLS, SSL, and/or other encryption protocols) and deliver a deployment package including the first dynamic data structure to a designated agent computing system 170 via the communication channel.

In some implementations, deploying the first autonomous or independent agent can include provisioning and/or otherwise allocating computational resources (e.g., memory, processing capacity, and/or storage), configuring network routing or access control parameters of the agent network 140, and/or registering the first agent with the agent network 140. For example, the orchestration computing system 110 can transmit initialization scripts, runtime environments, and/or containerized application bundles (e.g., Docker images, virtual machine instances) utilized or integrated by the first agent (e.g., agent computing system 170a) to execute or perform operations. That is, deploying the first autonomous or independent agent can include integrating the agent into a DNCNDS infrastructure and verifying the agent is operationally ready to process cyber resilience data, interact with other agents, and/or perform assigned tasks autonomously or collaboratively. For example, deployment can include synchronizing the first agent with network-wide protocols, verifying integration through handshake protocols, and/or updating permissions and credentials to facilitate secure communications and data exchanges between various agents within the DNCNDS.

In some implementations, at block 230, the one or more processing circuits can configure and/or otherwise modify or initialize a second autonomous or independent agent. In some implementations, the one or more processing circuits can configure a second autonomous or independent agent to perform a plurality of second cyber resilience operations. For example, the orchestration computing system 110 or resilience modeler 114 can analyze cyber resilience data (e.g., threat intelligence feeds, compliance metrics, and/or incident logs) to determine functions, tasks, and/or workflows for the second agent and generate corresponding configuration instructions for transmission to a second agent (e.g., agent computing system 170b). In some implementations, configuring the second autonomous or independent agent includes generating or identifying a second dynamic data structure including one or more second functions or one or more second frameworks for performing the plurality of second cyber resilience operations. That is, the second dynamic data structure can include or otherwise define a set of executable codes, workflows, and/or protocols for agent computing system 170b to use in performing operations including posture state determinations, insurance processing, anomaly detection, incident reporting, and/or any data exchange. For example, the orchestration computing system 110 can assemble modular functions and/or frameworks into a dynamic configuration package and transmit the package to the second agent for initialization, embedding, and/or execution of the defined operations.

At block 240, the one or more processing circuits can deploy and/or otherwise provide the second autonomous or independent agent on the DNCNDS to model or update the cyber resilience of the one or more entities. That is, the orchestration computing system 110 or agent interface 112 can transmit the second dynamic data structure, including operational parameters and configuration data, to a target node (e.g., agent computing system 170b) within the DNCNDS. For example, deploying the second autonomous or independent agent can include allocating computational resources, registering the agent within the network, and/or synchronizing an agent based on networking parameters or protocols implemented in agent network 140. In some implementations, modeling or updating the cyber resilience of one or more entities can include performing various operations to determine, assess, model, and/or improve the cyber resilience of systems, networks, and/or infrastructure. Cyber resilience can include or refer to the ability of systems, networks, and/or infrastructures to detect, prevent, respond to, recover from, and/or adapt to cyber threats, vulnerabilities, disruptions, and/or changes, encompassing capabilities such as threat detection, incident response, system recovery, operational continuity, data protection, compliance with regulatory or industry standards, security posture optimization, adaptive resource management, vulnerability mitigation, and/or maintaining overall system integrity and availability in dynamic and evolving cyber environments. For example, modeling cyber resilience can include the one or more processing circuits aggregating and analyzing cyber resilience data to generate predictive metrics, simulating incident response scenarios, determining or updating a security posture, and/or identifying potential vulnerabilities or threats. For example, updating cyber resilience can include the one or more processing circuits performing real-time adjustments or modifications to configurations or safeguards, applying patches, optimizing resource allocations, modifying security configurations, and/ or updating compliance records based on evolving regulatory or operational parameters.

In some implementations, at block 250, the one or more processing circuits can identify or receive cyber resilience data. For example, the orchestration computing system 110 or agent interface 112 can identify or receive cyber resilience data by querying one or more data sources (e.g., agent network 140, data sources 160, and/or external systems) or systems (e.g., agent computing systems 170) to access structured, semi-structured, and/or unstructured data. For example, the agent network 140 can identify cyber resilience data from agent operations by capturing or receiving outputs of agent computing systems 170, such as performance metrics, task execution results, data processing logs, and/or any data generated from the execution of assigned workflows (e.g., compliance verification, anomaly detection, and/or encryption processes). That is, the one or more processing circuits can identify or receive cyber resilience data by interfacing with data repositories, polling distributed ledgers, retrieving operational logs, and/or subscribing to real-time data streams. For example, identifying cyber resilience data can include scanning datasets or parsing network traffic for predefined patterns, attributes, and/or tags corresponding to agent outputs, exchanged data, security incidents, compliance states, threat intelligence, and/or performance metrics. In some implementations, identifying or receiving cyber resilience data can include the orchestration computing system 110 or agent interface 112 processing requests or responses containing metadata, event triggers, and/or operational metrics exchanged with decentralized or centralized networks In some examples, the orchestration computing system 110 or agent network 140 can parse, aggregate, and/or catalog the identified or received data to identify one or more agents for allocation.

In some implementations, at block 260, the one or more processing circuits can perform and/or otherwise execute one or more operation(s). For example, the one or more processing circuits can perform at least one of at least one first operation or at least one second operation based on the cyber resilience data. In some implementations, at block 262, the one or more processing circuits can perform a first operation on the first agent. In some implementations, at block 262, the one or more processing circuits can perform at least one first operation of the plurality of first cyber resilience operations on the first autonomous or independent agent using the one or more first functions or the one or more first frameworks of the first dynamic data structure. For example, the one or more processing circuits can transmit operational parameters, workflow instructions, and/or configuration data to the first autonomous or independent agent (e.g., agent computing system 170*a*), which causes or directs the first agent to, at block 262, apply a corresponding dynamic data structure to performing operations or execute tasks such as evaluating compliance against regulatory standards, processing cyber resilience claims, generating incident response recommendations, and/or orchestrating data exchanges with other systems or networks through agent network 140.

In some implementations, at block 264, the one or more processing circuits can perform and/or otherwise execute a second operation on the second agent. In some implementations, the one or more processing circuits can perform at least one second operation of the plurality of second cyber resilience operations on the second autonomous or independent agent using the one or more second functions or the one or more second frameworks of the second dynamic data structure. For example, the one or more processing circuits can transmit task-specific directives, operational parameters, and/or triggers to the second autonomous or independent agent (e.g., agent computing system 170*b*), instructing the second agent to execute workflows or processes defined within the second dynamic data structure. That is, the second agent can invoke one or more embedded functions based on a corresponding framework or protocol to perform tasks such as detecting anomalies in cyber resilience metrics, updating a security posture based on evolving regulatory or operational requirements, performing data synchronization across networks, and/or orchestrating collaborative responses to security incidents with other agents or systems via agent network 140. For example, the one or more processing circuits can cause the second agent to aggregate and process threat intelligence feeds, generate updates to compliance status, and/or modify encryption configurations based on real-time or historical cyber resilience data.

In some implementations, the one or more processing circuits can identify and/or otherwise determine the first autonomous or independent agent or the second autonomous or independent agent to perform the at least one of the at least one first operation or the at least one second operation. That is, the one or more processing circuits can allocate or otherwise distribute tasks to different agents based on performance metrics, operational capacity, and/or other characteristics of the agents. For example, the orchestration computing system 110 or the agent network 140 can analyze data associated with one or more of the agent computing systems 170 to retrieve and/or identify various metrics (e.g., task completion times, error rates, resource utilization, etc.) associated with agent performance or availability and identify one or more candidate agents available to execute an operation. In some implementations, identifying includes determining one or more operational, performance, and/or capacity metrics corresponding with the first autonomous or independent agent, the second autonomous or independent agent, and/or the at least one DNCNDS. For example, the one or more processing circuits can access or otherwise determine metrics such as an operational status of the first agent (e.g., agent computing system 170*a*) by querying stored performance data or monitoring resource availability, such as memory usage or processing capacity of the agent computing system 170*a*, to determine a readiness of the agent to perform one or more operations. For example, the one or more processing circuits can assess the second agent (e.g., agent computing system 170*b*) by analyzing historical performance data, such as latency in completing prior workflows or accuracy in anomaly detection tasks, to determine if the second agent is configured or available to perform one or more operations. For example, the one or more processing circuits can determine historical performance data or metrics associated with a DNCNDS by analyzing network traffic, bandwidth, node availability, network congestion, and/or other network information associated with agent network 140. In some examples, the one or more processing circuits allocate operations to agents to improve overall network efficiency and minimizes delays or operational failures, as further described herein.

In some implementations, the one or more operational, performance, and/or capacity metrics can correspond with one or more processing loads or memory allocations of the first autonomous or independent agent or the second autonomous or independent agent. That is, the one or more processing circuits can evaluate operational, performance, and/or or capacity metrics such as processing queue lengths, memory usage, and/or active thread counts associated with agent computing systems 170 to assess workload distribution or capacity for operations. For example, the orchestration computing system 110 or agent network 140 can query agent computing systems 170 to retrieve operational, performance, or capacity metrics such as real-time data on resource availability or utilization (e.g., CPU usage, RAM allocation, storage capacity) and determine whether the first autonomous or independent agent (e.g., agent computing system 170*a*) has sufficient capacity to execute a first operation. For example, the one or more processing circuits can assess the second autonomous or independent agent (e.g., agent computing system 170*b*) by analyzing operational, performance, or capacity metrics such as recent task completions, error rates during data exchanges, and/or system resource allocation thresholds to identify if the second agent can execute a second operation.

In some implementations, the one or more processing circuits can allocate and/or otherwise provide at least a portion of the cyber resilience data to the first autonomous or independent agent or the second autonomous or independent agent based on balancing the one or more processing loads or memory allocations (e.g., using the operational, performance, or capacity metrics). That is, the one or more processing circuits can balance or dynamically redistribute loads or data assignments among agents to improve resource utilization or reduce processing bottlenecks within agent network 140. For example, the one or more processing circuits can allocate complex or resource-intensive operations, such as real-time compliance analysis or encryption processing, to agents with higher available memory or processing power, while assigning simpler tasks, such as log aggregation or status monitoring, to agents with lighter workloads. For example, the orchestration computing system 110 can analyze historical workload data and/or assign operations to agents to reduce latency or increase operational throughput by balancing allocations and/or balancing loads across the DNCNDS.

In some examples, balancing processing loads or balancing memory allocations can include and/or refer to using a reverse proxy technique or similar methods to route incoming requests to agents with available resources to evenly distribute processing loads or memory allocations (e.g., resources used to perform an operations) across various agents within a network. Additionally, the one or more processing circuits can monitor fluctuations in resource availability and dynamically reallocate or balance tasks to adjust the processing loads or memory allocations and to prevent overloads on any single agent. For example, if the processing load and/or memory allocation of an agent exceeds a predefined resource usage threshold, the one or more processing circuits can transfer a portion of the workload to another agent with lower utilization to balance the loads of the respective agents. In some implementations, processing loads or memory allocations can include or refer to computational effort or resources used to execute operations, the allocation of system memory to support those operations, and/or the dynamic adjustments made to balance processing loads or memory allocations across multiple agents to improve performance within the network.

In some implementations, the one or more processing circuits can select and/or otherwise identify the first autonomous or independent agent or the second autonomous or independent agent to perform the at least one of the at least one first operation or the at least one second operation. That is, the orchestration computing system 110 or agent network 140 can determine which agent to allocate tasks or workflows by analyzing functional configurations or operational capabilities of agents embedded within respective dynamic data structures. In some implementations, selecting can include distributing, by the one or more processing circuits, based on determining the cyber resilience data corresponds with the one or more first functions or the one or more first frameworks, at least a portion of the cyber resilience data to the first autonomous or independent agent. For example, the one or more processing circuits can analyze or otherwise process cyber resilience data to identify operational parameters and/or operations associated with the cyber resilience data (e.g., determining a security posture, identifying catastrophic incidents, and/or modeling compliance workflows), match the parameters or operations to one or more functions or frameworks configured within the first autonomous or independent agent (e.g., agent computing system 170*a*), and/or transmit task-specific parameters, data, and/or instructions to the first agent through the agent network 140 to cause the first agent to execute an operation autonomously using stored functions or frameworks.

In some implementations, based on determining the cyber resilience data corresponds with the one or more second functions or the one or more second frameworks, the at least a portion of the cyber resilience data to the second autonomous or independent agent. For example, the orchestration computing system 110 or agent network 140 can determine that the second agent is configured to execute or otherwise perform a function, such as processing claims, updating security configurations, and/or managing cryptographic token exchanges by querying operational metadata, retrieving stored or logged data, and/or accessing a dynamic data structure of the second agent to identify code modules, workflows, and/or protocols configured to perform an operation. Once identified, the one or more processing circuits can package and transmit the relevant cyber resilience data or operational parameters to the second agent via the agent network 140 such that the agent can perform the requested operations using configured capabilities.

In some implementations, selecting can include presenting, by the one or more processing circuits, a graphical user interface (GUI) including a plurality of selectable elements corresponding to an agent marketplace including the first autonomous or independent agent and the second autonomous or independent agent. An agent marketplace can include or refer to any interface, platform, repository, and/or dashboard configured to provide access to information about agents, such as supported functions (e.g., compliance verification, encryption processing, threat modeling), operational metrics (e.g., resource availability, task readiness, performance history), and/or configurations (e.g., allocated resources, preloaded workflows). For example, the agent marketplace can include a graphical user interface or GUI, web-based platform, API-driven interface, and/or integrated system module displaying agents as selectable items with associated data, such as descriptions of task readiness, latency metrics, supported cyber resilience operations, and/or real-time workload information. For example, the agent marketplace can display or otherwise include various graphical elements or content associated with agent computing systems 170. That is, the orchestration computing system 110 or agent interface 112 can generate an agent marketplace graphical user interface (e.g., agent marketplace GUI) to facilitate the selection, allocation, and/or management of agents within the agent network 140 using one or more selectable elements.

In some implementations, selecting can include receiving, by the one or more processing circuits in the agent marketplace via the GUI, a selection of at least one of the plurality of selectable elements corresponding to the first autonomous or independent agent or the second autonomous or independent agent. That is, the orchestration computing system 110 or agent interface 112 can receive input through an agent marketplace or graphical user interface including a user selection, programmatic trigger, and/or automated selection mechanism and can identify one or more agents for performing operations in response to the received input. For example, the one or more processing circuits can select an agent computing system (e.g., agent computing system 170*a* or 170*b*) based on a selection of supported functions, operational readiness, and/or resource availability displayed within the agent marketplace. That is, selecting can include receiving user input or graphical elements selections corresponding with operational criteria or other parameters (e.g., performance thresholds, resource limits, and/or task priorities) and dynamically matching the criteria with one or more agents in real-time by the GUI. In some implementations, the one or more processing circuits can automatically register a selection, allocate associated operations, and/or update a status or configuration of selected agent(s) within the agent network 140 in response to an agent marketplace selection.

In some implementations, the GUI can include a dashboard interface for real-time threat monitoring, incident response panels, system health metrics. In some implementations, the GUI can include visualization tools such as graph-based attack path analysis, behavioral analysis, and/or threat intelligence integration. In some implementations, the GUI can include configuration and management settings or tools to facilitate or update policy management protocols, automated workflow configurations, and/or cryptographic settings.

In some implementations, the agent marketplace or graphical user interface can display and/or otherwise provide a centralized interface for managing interactions with the agent network and can support features such as browsing, allocating, and/or monitoring agents and/or tasks via displayed content or selectable elements. In some implementations, the marketplace includes an agent catalog, which displays a list of available agents with detailed metadata, certifications, and/or operational metrics (e.g., task readiness, historical reliability, supported workflows, and/or resource allocations). In some implementations, the marketplace can implement or otherwise include search and filtering capabilities that can locate agents based on criteria such as functional configurations, compliance status, and/or industry-related attributes and can present one or more selectable elements corresponding with the agents or associated information. In some examples, the marketplace can include a task management dashboard with selectable elements for tracking active tasks in real-time and supporting features such as progress indicators, status updates, estimated completion times, and/or interactive controls to pause, modify, and/or terminate tasks. In some implementations, the marketplace includes notifications or alerts to indicate milestones or events associated with agent operations. In some implementations, the agent marketplace integrates a compliance and reporting interface that displays compliance checkpoints, tracks assessments completed by agents, and/or provides access to tokenized data or proofs generated by resilience agents. Additionally, the agent marketplace can generate and/or display automated reports via selectable elements or content items that aggregate and/or present operational data collected from multiple interconnected agents.

In some implementations, the one or more processing circuits can identify or receive via at least one of an endpoint or interface, the cyber resilience data from at least one first computing system internal to the at least one DNCNDS or at least one second computing system external to the at least one DNCNDS. That is, the orchestration computing system 110 or agent interface 112 can interface with various internal systems (e.g., agent computing systems 170) or external systems (e.g., third-party platforms, regulatory data sources, and/or distributed networks) to access or query structured, semi-structured, and/or unstructured cyber resilience data. For example, the one or more processing circuits can retrieve internal data from the agent network 140 by polling distributed ledgers, scanning logs, and/or accessing databases maintained within the DNCNDS, such as relational or NoSQL data stores containing agent operation records or system performance metrics. For example, the one or more processing circuits can interface with external computing systems, such as regulatory compliance platforms, threat intelligence providers, and/or incident response systems, to query and/or collect data streams, logs, and/or analytics reports related to security resilience. In some examples, the one or more processing circuits can monitor and process network traffic, event triggers, and/or real-time alerts generated by either internal or external systems to analyze or identify cyber resilience data or corresponding operations. An endpoint or interface can include or refer to any system, platform, communication channel, and/or protocol used to facilitate the exchange, retrieval, and/or transmission of cyber resilience data, such as APIs, user interfaces, web services, messaging queues, database connections, secure communication protocols (e.g., TLS, SSH), distributed ledger nodes, and/or other hardware or software components configured to interact with internal or external computing systems.

In some implementations, the one or more processing circuits can generate and/or otherwise provide one or more tokens embedded with at least one proof. That is, the one or more processing circuits can generate one or more tokens by embedding or otherwise generating a structured data object with data to represent a verifiable attribute or state associated with cyber resilience data, operations, and/or agent interactions. For example, the orchestration computing system 110 or agent interface 112 can process data related to compliance, security incidents, and/or operational metrics to generate tokens encapsulating cryptographic proofs, such as Zero-Knowledge Proofs (ZKPs) or integrity hashes. For example, a compliance token can include data that validates a security configuration or compliance checkpoint, such as the application of security patches, completion of audits, and/or alignment with regulatory standards. For example, an incident token can represent or store information associated with a detected security event or response action, including timestamps, affected resources, and/or remediation actions. In some implementations, the at least one proof corresponds with a verification of at least a portion of the cyber resilience data, the at least one of the at least one first operation or the at least one second operation, and/or at least a portion of one or more outputs of the one or more first functions or the one or more second functions. For example, the orchestration computing system 110 or agent computing systems 170 can generate a token including data (e.g., a ZKP) that validates or verifies any portion, value, and/or amount associated with the cyber resilience data, such as a received notification or request, attributes of system configurations, activity logs, and/or operational states associated with resilience tasks. In some examples, the proof can verify aspects of an operation, such as actions taken during compliance processes or responses to identified incidents. Additionally, the proof can include validate outputs, such as results generated from security assessments, incident responses, and/or compliance evaluations.

In some implementations, responsive to determining the cyber resilience data corresponds with a verification request, the one or more processing circuits can transmit, using at least one endpoint or interface, the at least one proof or an indication of the at least one proof to the at least one first computing system or the at least one second computing system. That is, the one or more processing circuits can identify a request to verify or validate a portion of the cyber resilience data or any data associated with the cyber resilience data, such as a verification request associated with compliance or incidents associated with an entity, and/or can transmit a corresponding proof to internal systems (e.g., agent computing systems 170) or external platforms (e.g., regulatory systems or third-party incident response tools) in response to the request. For example, the proof can be transmitted as a communication or query provided to validate attributes, operations, and/or outputs associated with tokenized data. In some examples, an indication of a proof can include a notification, message, prompt, including transmissions associated with compliance statuses, response actions taken, and/or operational metrics verified using the generated proof that is transmitted in response to the verification request. That is, a verification request can include or refer to a query or prompt to validate compliance attributes, a verification request associated with operational metrics or response actions, and/or a verification request for confirming the authenticity of tokenized data or outputs.

In some implementations, performing the at least one of the at least one first operation or the at least one second operation includes identifying, by the one or more processing circuits, a plurality of sub-operations based on the cyber resilience data, the plurality of sub-operations corresponding with the at least one of the at least one first operation or the at least one second operation. That is, performing can include the orchestration computing system 110 or agent network 140 dividing and/or otherwise modeling the task into subtasks and allocating portions of the task to multiple agents based on configured functions or operational frameworks. In some implementations, the one or more processing circuits can allocate at least one first sub-operation of the plurality of sub-operations to the first autonomous or independent agent. For example, the orchestration computing system 110 or agent network 140 can identify a discrete operation, such as applying compliance frameworks or performing security analyses, associated with the cyber resilience data and with a functional configuration of agent computing system 170a, and/or can transmit the corresponding cyber resilience data or parameters to the agent computing system 170a for processing. In some implementations, the one or more processing circuits can allocate at least one second sub-operation of the plurality of sub-operations to the second autonomous or independent agent. For example, the orchestration computing system 110 or agent network 140 can identify a second sub-operation of an overall operation, such as managing data storage or facilitating data exchange with external systems, and/or transmit the corresponding task data to agent computing system 170b for execution.

In some implementations, the plurality of sub-operations include at least two modeling operations, storage operations, and/or data exchange operations corresponding with the performance of the at least one of the at least one first operation or the at least one second operation. For example, the first sub-operation can include one or more modeling operations, storage operations, and/or data exchange operations associated with an overall operation (e.g., processing portions of the cyber resilience data, performing a portion of compliance checkpoints, performing risk assessments for an overall posture state determination, processing claims or a subset of claims, etc.). For example, the second sub-operation can include one or more modeling operations, storage operations, and/or data exchange operations (e.g., exchanging data with external systems, validating portions of incident data, etc.). That is, the at least two modeling operations, storage operations, and/or data exchange operations can include one or more or a combination of modeling operations (e.g., updating data, determining resilience, determining agent performance, predictive modeling for risk analysis, incident response determinations, etc.), storage operations (e.g., saving encrypted compliance data, storing tokens, storing data on an agent network or with agents, archiving operational logs for audits, etc.), and/or data exchange operations (e.g., transmitting data, receiving data, interfacing between regulatory systems and internal platforms, synchronizing tokenized data with external systems, etc.). In some examples, outputs of the at least two modeling operations, storage operations, and/or data exchange operations can be combined to complete or perform the task (e.g., combining predictive risk models with archived compliance data to generate a resilience score, integrating stored incident logs with exchanged data to validate response actions, and/or merging synchronized tokenized data with performance metrics to assess overall system compliance).

In some implementations, performing the at least one of the at least one first operation or the at least one second operation includes determining, by the one or more processing circuits, at least one sub-operation of the plurality of sub-operations fail to correspond with the one or more first functions or one or more first frameworks or the one or more second functions or one or more second frameworks. For example, the one or more processing circuits can evaluate the functional configurations and/or operational capabilities of the first autonomous or independent agent or the second autonomous or independent agent and identify a sub-operation that cannot be executed within their respective frameworks (e.g., that an operation would be unsuccessful or fail). That is, the one or more processing circuits can allocate a sub-operation to a different agent based on determining that the currently assigned agents are unable and/or would fail to perform the task due to insufficient capabilities and/or incompatible configurations.

In some implementations, the one or more processing circuits can distribute, via the first autonomous or independent agent or the second autonomous or independent agent, at least a portion of the cyber resilience data for performing one or more of the plurality of sub-operations to at least one third autonomous or independent agent, and/or the at least one third autonomous or independent agent can include one or more functions or frameworks configured to perform the at least one sub-operation. For example, the orchestration computing system 110 can identify a third agent (e.g., agent computing system 170n) within the agent network 140 configured to execute the sub-operation (e.g., by performing a portion of compliance verification, executing a subset of a complex modeling task, etc.) and transmit the cyber resilience data to the identified third agent for processing. In some examples, the orchestration computing system 110 or network 140 can reallocate and/or otherwise distribute tasks to an agent (e.g., first, second, third, etc.) dynamically in response to real-time updates, such as workload changes, resource availability, and/or operational constraints within the agent network 140.

In some implementations, receiving or identifying the cyber resilience data includes segmenting, by the one or more processing circuits, the cyber resilience data into one or more portions based on a data type, priority level, and/or size of the cyber resilience data. That is, the orchestration computing system 110 or agent network 140 can use a sharding mechanism to distribute portions of the data to multiple nodes. That is, the orchestration computing system 110 or agent network 140 can segment the data into distinct portions to improve processing or allocation tasks based on data size or memory use, node or agent configurations, priorities or permissions, and/or any other data or metric. For example, the one or more processing circuits can separate data into portions corresponding to data types, such as compliance data (e.g., regulatory assessments or audit reports), security incident data (e.g., event logs or threat alerts), and/or operational metrics (e.g., system performance or workload analytics). In some examples, the one or more processing circuits can identify priority levels by distinguishing between urgent compliance updates (e.g., policy changes requiring immediate review) and lower-urgency data (e.g., historical performance records or archived logs) and segment, divide, and/or partition the data for allocation based on the identified priority levels. For example, the one or more processing circuits can segment and/or otherwise allocate or distribute the cyber resilience data based on the identified priority levels (e.g., a distributing a high priority-level task before a low priority-level task).

In some examples, the one or more processing circuits can evaluate and/or otherwise determine a size or memory footprint of the cyber resilience data and segment larger data sets (e.g., comprehensive or larger-sized system logs or extensive compliance datasets) into smaller portions for parallel or distributed processing, while data sets of a small size (e.g., concise operational metrics or single-agent performance data) can be allocated to individual agents. The size of the data sets and the size of the data sent and received by the system 300 can change dynamically throughout the course of the system implementation. In some implementations, the one or more processing circuits can allocate at least one first portion of the one or more portions to the at least one first autonomous or independent agent and at least one second portion of the one or more portions to the at least one second autonomous or independent agent. For example, the cyber resilience data can include an incident portion (e.g., security event logs or threat detection analytics) and a claims portion (e.g., compliance proofs or incident response summaries), and/or the orchestration computing system 110 or agent network 140 can route or transmit the incident portion to an agent configured with incident-related functionalities or frameworks and the claims portion to an agent configured with compliance and/or claims processing frameworks.

Figure 3A:
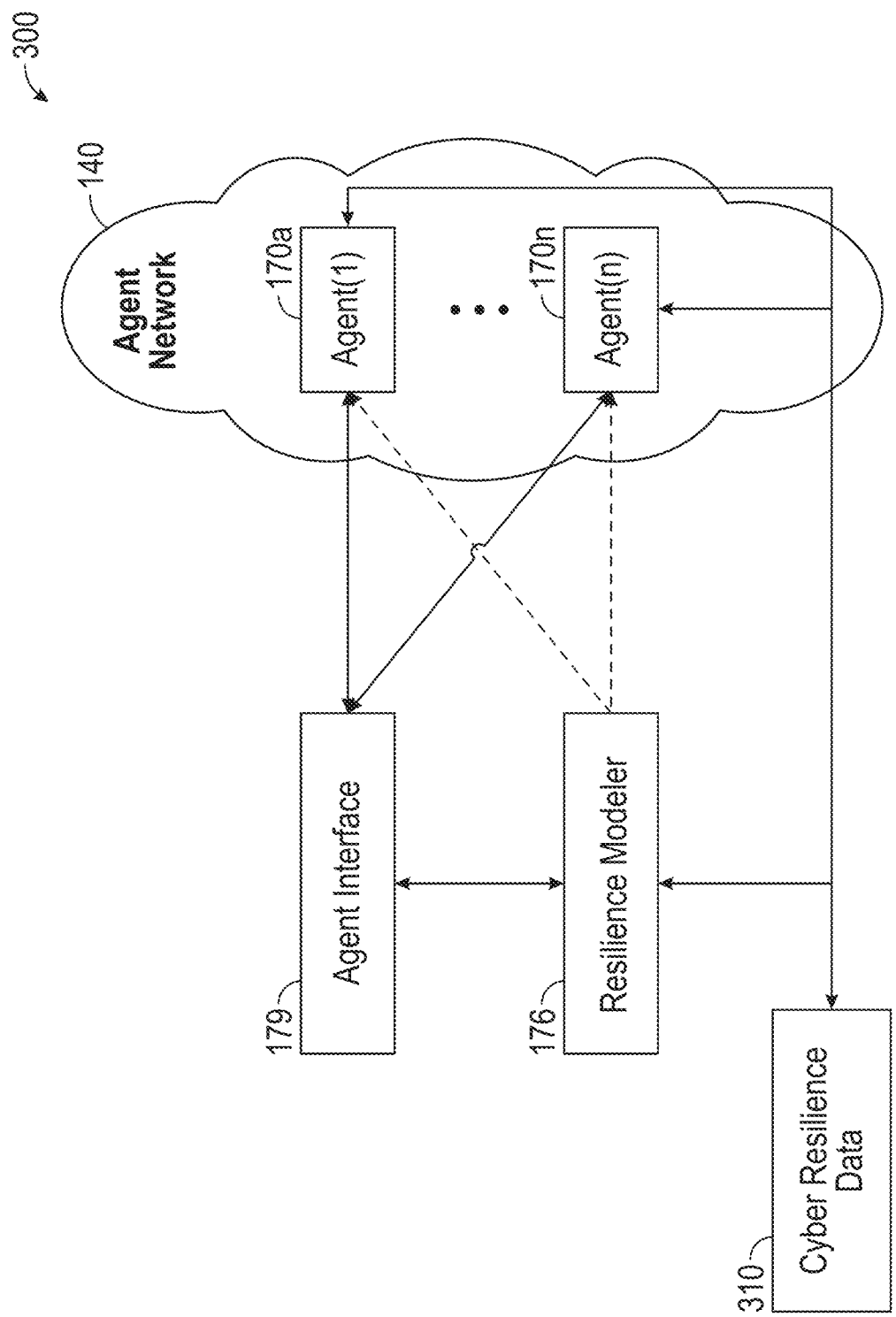
FIGS. 3A-3B depicts a block diagram of an implementation of a system for agent orchestration, according to some implementations.

Referring generally to FIG. 3A, a block diagram of an implementation of system 300 for an interconnected agent orchestration framework is shown, according to some implementations. Referring now to FIG. 3A, the system 300 can include agent network 140, agent computing systems 170, a resilience modeler 176, an agent interface 179, and/or cyber resilience data 310. In some implementations, the resilience modeler 176 can incorporate similar features or functionalities as described regarding the resilience modeler 114 of FIG. 1. In some implementations, the agent interface 179 can include similar features or functionalities as described regarding the agent interface 112 of FIG. 1. It should be understood that, although systems or devices of FIG. 3A can be described or illustrated herein in a singular form, the implementation shown FIG. 3A can include any number of such systems or device. Devices, systems, and/or components shown in FIG. 3A can be added, deleted, integrated, separated, and/or rearranged in various implementations of the disclosure.

In some implementations, the resilience modeler 176 or agent computing systems 170 can receive and/or otherwise identify the cyber resilience data 310. For example, the resilience modeler 176 can receive a request from an entity or a third-party including the cyber resilience data 310, such as a request to verify an aspect of the cyber resilience data 310, fetch associated data with the cyber resilience data 310, perform an operation including or associated with cyber resilience data 310, etc. In another example, the resilience modeler 176 can receive input data and identify corresponding cyber resilience data 310 accessible through external systems or interfaces (e.g., APIs, GUIs, etc.), such as data stored in a local repository, a distributed leger, and/or any data source. In some examples, the agent computing systems 170 can include or store the cyber resilience data 310 or can retrieve the cyber resilience data 310 from other connected agents via the agent network 140. For example, receiving or identifying the cyber resilience data 310 can include establishing network connections, parsing historical data, monitoring or detecting incidents, determining attributes associated with agents or the agent network 140, and/or consolidating data from distributed sources using an interface or endpoint (e.g., API, encrypted communication channel, data stream, etc.) corresponding to agent network 140.

In some implementations, the resilience modeler 176 can determine and/or otherwise identify an allocation or distribution for one or more portions of the received cyber resilience data 310 between agent computing systems 170 via the agent network 140. For example, the resilience modeler 176 (e.g., cyber resilience system) can analyze the cyber resilience data 310 to determine or identify portions or aspects of the data relevant to the capabilities or operational roles (e.g., functions or frameworks) of agent computing systems 170a and 170n. For example, the resilience modeler 176 can allocate and distribute compliance-related data or aspects of the cyber resilience data 310 to a compliance agent (e.g., agent computing system 170a) configured to execute compliance functions, and/or allocate and distribute incident or breach-related data of the cyber resilience data 310 to an incident agent (e.g., computing system 170n) configured to executed incident-related functions. In some examples, the resilience modeler 176 can determine or prioritize an allocation based on task urgency, resource availability, and/or parameters corresponding to the agent network 140 or agent computing systems 170. In some implementations, the resilience modeler 176 can transmit allocated portions of the cyber resilience data 310 or other data (e.g., metadata or processing instructions) to the agent interface 179 for transmission to one or more agent computing systems 170.

In some implementations, the agent interface 179 can receive and/or transmit the cyber resilience data 310. For example, the agent interface 179 can receive allocated portions of the cyber resilience data 310 or other data (e.g., metadata or processing instructions) from the resilience modeler 176. In some examples, the agent interface 179 can process the received cyber resilience data 310 to determine one or more routing or distribution paths within the agent network 140 for transmission to one or more agent computing systems 170. In some examples, the agent interface 179 can allocate and/or otherwise distribute data based on analyzing cyber resilience data 310, metadata, and/or associated parameters (e.g., as task priority, processing requirements, resource availability). For example, the agent interface 179 can determine or identify predefined roles or capabilities of agent computing systems 170 and dynamically adapt an allocation based on network conditions associated with agent network 140 or real-time feedback from agent computing systems 170. In some implementations, the agent interface 179 can facilitate bidirectional communication by receiving processed data (e.g., operational outputs) or updates from agent computing systems 170, transmitting the data to the resilience modeler 176 (e.g., cyber resilience system) for analysis or storage, and/or redistributing updated information, data, and/or instructions to one or more agent computing systems 170 via the agent network 140.

Figure 3B:
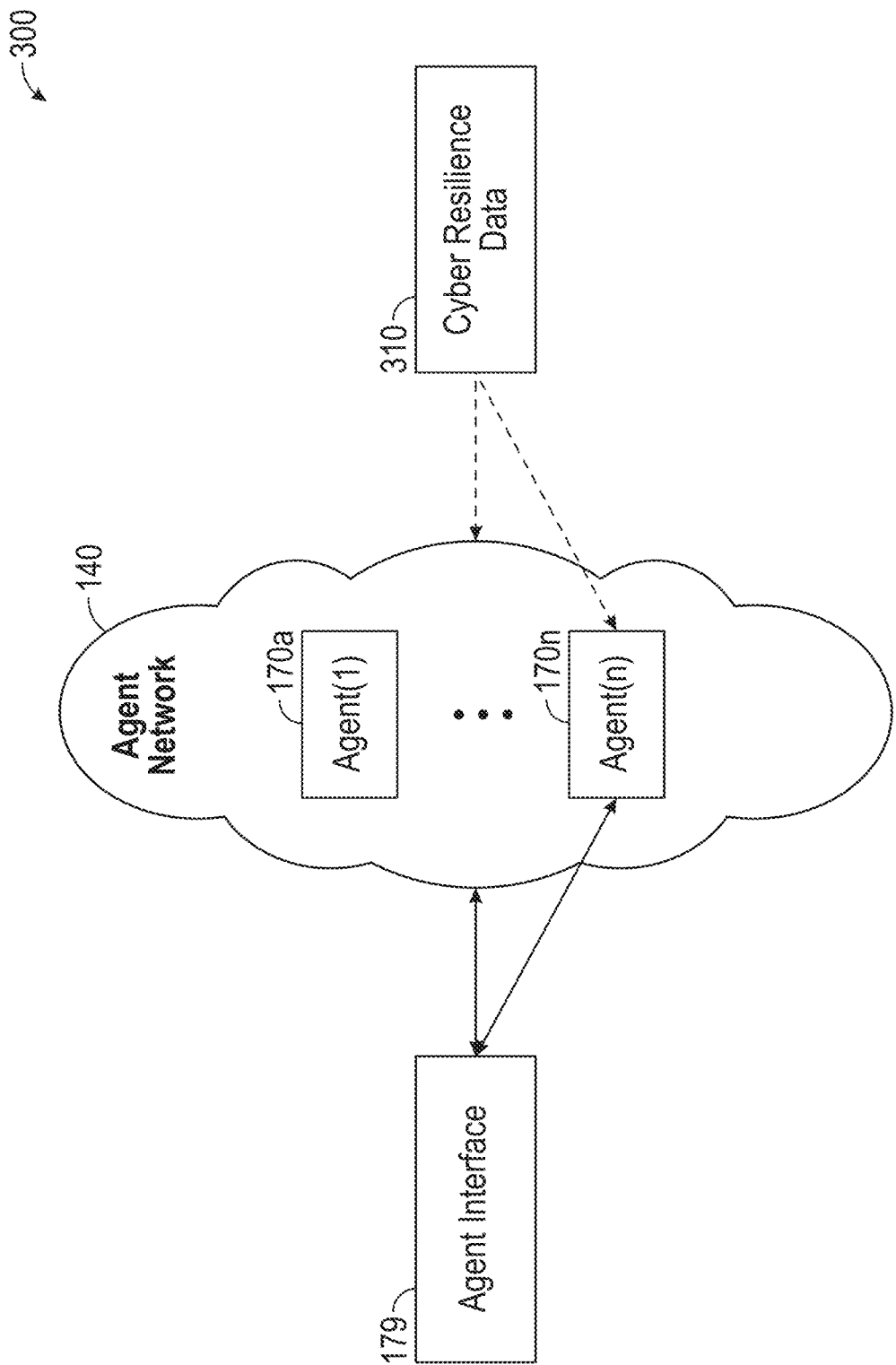

Referring now to FIG. 3B, the system 300 can include agent network 140, agent computing systems 170, agent interface 179, and/or cyber resilience data 310. In some implementations, the agent network 140 can include or refer to a decentralized communication fabric or data fabric that facilitates secure data exchanges between agent computing systems 170 and other systems or devices associated with a cyber resilience ecosystem. In some examples, the agent network 140 can orchestrate data routing, storage, and/or retrieval operations between agents using protocol-based interactions. For example, the agent network 140 can implement a publish-subscribe (pub-sub) messaging system where agents register capabilities and subscribe to one or more data types or event triggers. In some examples, agent computing systems 170 can broadcast updates or query relevant agents for subsets of cyber resilience data 310 or using one or more pre-established connections via the agent network 140. Additionally, the agent network 140 can utilize peer-to-peer (P2P) communication protocols, such as distributed hash tables (DHTs), to locate and retrieve data or services. For example, agent computing system 170a can request a compliance validation task, and/or the agent network 140 can parse or search an index of agent capabilities stored in a decentralized registry or other data source.

In some examples, the agent network 140 can access and/or otherwise use a combination of DHT lookups or cryptographically signed metadata to identify or connect with agent computing systems 170 capable of fulfilling a request or performing an operation or sub-operation. In some arrangements, the agent network 140 can communicate with cybersecurity tool providers or vendors (e.g., Security Information and Event Management (SIEM) and Endpoint Detection and Response (EDR) providers, etc.) using one or more data feeds or communication channels associated with the data fabric, and the agent network 140 can update or reconfigure agents based on the received data. In some arrangements, the agent network 140 can include and/or otherwise interface or communicate with one or more Large Language Models (LLMs). For example, one or more Large Language Models (LLMs) can recommend configuration changes (e.g., updates to functions or frameworks of agents), define new detection rules, or propose updated security policies by analyzing ongoing threat intelligence data associated with the agent network 140 and/or agent computing systems 170.

In some implementations, the agent network 140 can secure and/or otherwise protect cyber resilience data 310 by securing data exchanges occurring between agents of the agent network 140. For example, the agent network 140 can incorporate and/or otherwise include end-to-end encryption (E2EE) for data exchanges and mutual authentication mechanisms for agent interactions. In some examples, the agent network 140 can provide or establish secure communication channels for agent computing system 170 to transmit or receive data using a public key infrastructure (PKI) or cryptographic algorithms (e.g., post-quantum algorithms). For example, agent computing system 170a can exchange an authenticated key with the agent computing system 170n before initiating data transfer via the agent network 140. In some implementations, the agent network 140 or agent computing systems 170 can incorporate decentralized trust mechanisms (e.g., using trusted or distributed ledgers, cryptographic proofs, etc.) to validate agent transactions and enforce compliance with data exchange or operational parameters associated with the cyber resilience data 310, the agent network 140, and/or the agent computing systems 170. For example, the agent network 140 can include or manage a distributed ledger and can record or store performance tokens or compliance tokens generated by agent computing systems 170 on the distributed ledger such that when an agent accesses or processes cyber resilience data 310, the ledger verifies the authenticity and integrity of the data exchange through consensus-driven validation processes (e.g., using a Proof-of-Stake (POS) mechanism to validate token transactions or exchanges, where participating nodes in the network confirm the validity of the token-related operations by reaching a cryptographic consensus).

In some implementations, the agent network 140 can allocate and/or otherwise distribute cyber resilience data 310 between agent computing systems 170 or other systems or devices associated with the agent network 140 (e.g., databases, external APIs, etc.). In some examples, the agent network 140 can data transfer optimization techniques, such as bandwidth-aware routing and data chunking to improve network efficiency and reduce network traffic or performance bottlenecks. For example, if the cyber resilience data 310 includes a large data set, the agent network 140 can segment the dataset into smaller chunks and route at least one (e.g., each) data chunk independently or collectively through one or more paths within the agent network 140 based on real-time network conditions, agent capabilities or functions, and/or other parameters. That is, the agent network 140 can improve resource availability and reduce latency by providing data channels for multiple agents to simultaneously interact with or perform on shared or partitioned data. In some examples, the agent network 140 can use a combination of asynchronous messaging and real-time streaming protocols to allocate or distribute tasks efficiently between agents. For example, agent computing systems 170 can push processed data or operational updates to the agent interface 179 via a secure messaging queue provided by agent network 140 and receive real-time processing instructions and/or new data allocations via the agent network 140.

Agent System(s)

Figure 4A:
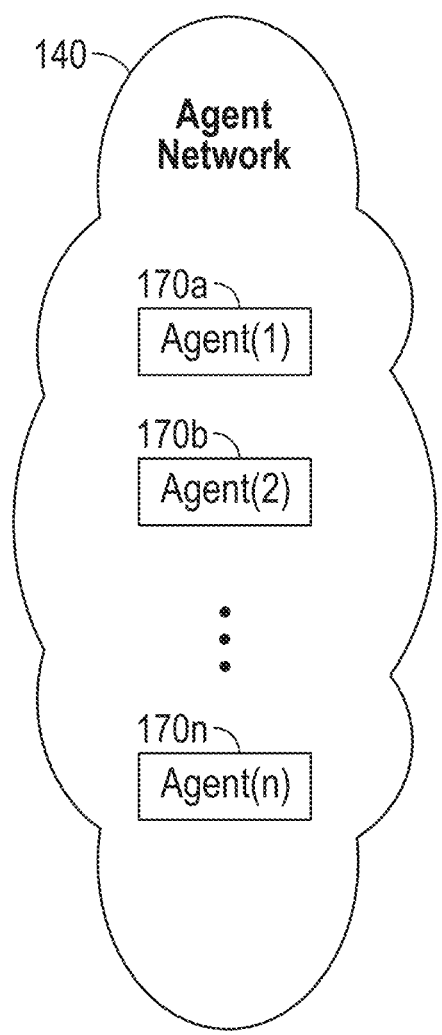
FIGS. 4A-4B depicts a block diagram of an implementation of an agent network and agent system, according to some implementations.
Figure 4B:
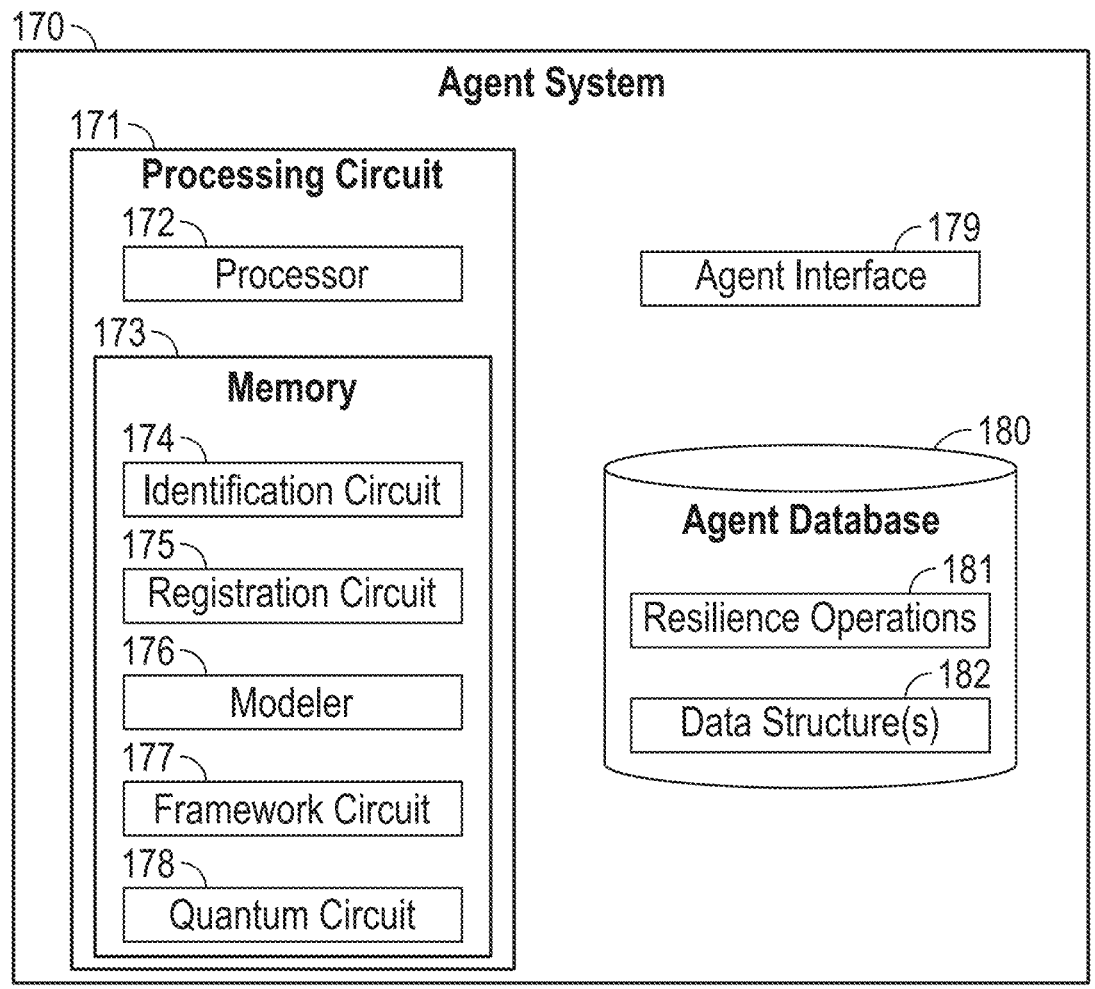

Referring now to FIGS. 4A and 4B, an agent network 140 and agent system(s) 170 (e.g., agent system 170a, agent system 170b, agent system 170n) are shown. In some implementations, the agent system 170 can include a processing circuit 171, and/or agent interface 179, and/or an agent database 180. The processing circuit 171 can include a processor 172 and memory 173. The memory 173 can include an identification circuit 174, a registration circuit 175, a modeler 176, a framework circuit 177, and/or a quantum circuit 178, as further described herein. The agent database 180 can include resilience operations 181 and data structure(s) 182, as further described herein. The components of FIGS. 4A and 4B are meant for illustrative purposes only and should not be limiting in any manner. In some implementations, the agent network 140 and agent system 170 can incorporate similar features or functionalities as described regarding FIG. 1.

In some implementations, one or more elements of an agent system 170 can be communicably coupled (connected) to a decentralized network (e.g., blockchain, web3), centralized network, and/or data source, collectively DNCNDS. For example, the agent database 180 can be a private ledger, and/or data transactions (e.g., resilience operations 181, data structures 182, updates to proof/posture state data, cybersecurity parameters, entity data, etc.) can be validated against entries recorded on a public ledger (e.g., data source 160, agent network 140, entity computing systems 130, third-party computing system(s) 150, orchestration computing system 110). In same implementations, the agent system 170 can be connected with the agent network 140 and the agent system 170 can be included within the agent network 140 (e.g., as one or more nodes within a centralized or decentralized network). That is, the agent system 170 can refer to any system, device, node, and/or group of nodes within the agent network 140 that facilitates data exchange, workflow orchestration, and/or agent coordination. In some implementations, agent system 170a can operate as a master node in a centralized network and perform operations including distributing and coordinating flows of data to various nodes (e.g., agent system 170b, agent system 170n), managing access controls, and/or monitoring operational metrics associated with the nodes. In some implementations, the agent system 170 (e.g., agent system 170b) can include or refer to a function, sub-system, and/or component of another agent system 170 (e.g., agent system 170b). The agent systems 170 and components described herein can collaborate with cybersecurity tool providers (e.g., SIEM, EDR solutions) to integrate entity and third-party data feeds into a data fabric (e.g., orchestration computing systems 110, agent network 140, enhancing the capabilities, functions, and performance of other integrated systems (e.g., agent systems 170). Additionally, the agent systems 170 and components described herein can collaborate with insurance carriers and brokerage networks such as to streamline policy underwriting and claims processes, such as through using tokenized compliance data. Additionally, the agent systems 170 and components described herein can collaborate with regulatory bodies (e.g., NIST, ISO) to contribute to standardization initiatives for agent interactions and data tokenization, allowing the integrated network (e.g., agent network 140, orchestration computing system 110) to facilitate industry practices.

The memory 173 can be one or more devices (e.g., RAM, ROM, Flash memory, hard disk storage) for storing data and/or computer code for completing and/or facilitating the various processes described herein. The memory 173 can be or include non-transient volatile memory, non-volatile memory, and/or non-transitory computer storage media. Memory 173 can include database components, object code components, script components, and/or any other type of information structure for supporting the various activities and information structures described herein. Memory 173 can be communicably coupled to the processor 172 and include computer code or instructions for executing one or more processes described herein. The processor 172 can be implemented as one or more application integrated circuits (ASICs), field programmable gate arrays (FPGAs), a group of processing components, and/or other suitable electronic processing components. As such, the agent system 170 is configured to run a variety of application programs and store associated data in a database of the agent system 170 (e.g., agent database 180). One such application can be to provide data to the identification circuit 174, registration circuit 175, modeler 176, framework circuit 177, and/or quantum circuit 178.

The identification circuit 174 can be configured to access or retrieve a dynamic data structure including one or more executable functions (e.g., code modules, algorithmic routines, system calls, etc.) and/or one or more operational frameworks (e.g., communication protocols, software architecture definitions, instruction sets, task automation templates, etc.). The functions and frameworks can be executed by one or more processing circuits of the agent system 170 to perform various resilience operations (e.g., incident response planning, vulnerability assessment, risk analysis, security gap detection, resource allocation, continuous system monitoring, data backup and recovery, threat intelligence analysis, simulated cyber-attack execution, patch deployment, regulatory compliance validation, anomaly pattern detection, collaborative threat resolution, and/or any operations supporting the enhancement of cybersecurity environments). For example, a dynamic data structure can include machine-readable code, configurable logic circuits, and/or structured data elements defining agent functionality. The dynamic data structure, including associated functions and frameworks, can be utilized by modeler 176, modified by framework circuit 177, and/or stored within agent database 180 for ongoing reference. The identification circuit 174 can also retrieve or identify agent functions corresponding to operational requirements or interactions with third-party computing systems 150 or entity computing systems 130.

Generally, the dynamic data structure can be any structure or arrangement of data that includes and/or references information, functions, frameworks, or parameters used for configuring, adapting, and/or executing operations by an autonomous system (e.g., executable code blocks, software libraries, configuration files, machine learning models, algorithms, protocol definitions, security policies, data schemas, environmental variables, system identifiers, metadata, network parameters, access control rules, encryption keys, audit logs, decision trees, rule-based engines, workflow definitions, task queues, resource allocation settings, monitoring criteria, compliance standards, vulnerability mappings, and/or any other data elements supporting operational tasks). In some implementations, the identification circuit 174 can obtain and/or otherwise access the dynamic data structure by interfacing with one or more data sources (e.g., agent network 140, data sources 160, and/or external systems) and/or systems (e.g., orchestration computing system 110, agent system 170, third-party computing systems 150, entity computing systems 130, and/or external systems). For example, the identification circuit 174 can retrieve a structured dataset, set of executable instructions, and/or protocol definitions (e.g., dynamic data structure) in response to a performance request initiated by an external system or entity (e.g., third-party computing systems 150). In another example, the identification circuit 174 can access a modular code segment, metadata schema, and/or functional framework (e.g., dynamic data structure) by processing a system service request. These dynamic data structures can be used to facilitate operations such as resilience modeling, processing cyber claims, incident detection, evaluating security postures, validating compliance with regulatory requirements, and/or managing secure data exchanges across interconnected systems.

In some implementations, one or more functions can be executed to improve the capability of an organization to withstand and recover from cyber incidents. For example, a dynamic data structure can include executable components such as data parsing algorithms, decision-making routines, cryptographic processes, data validation mechanisms, machine learning models, heuristic evaluation functions, and/or data aggregation algorithms (e.g., functions) configured to model and/or otherwise assess the effectiveness of organizational security controls. The dynamic data structure can further include decision-making routines (e.g., functions and/or automated) for updating security configurations. The identification circuit 174 can access or identify a function within the dynamic data structure using mechanisms such as pointer references, class method calls, dynamic operational allocation techniques, and/or other identification processes. For example, the identification circuit 174 can process the dynamic data structure to extract a function for automating and/or otherwise performing a risk assessment process from a set of available, identifiable functions.

In some implementations, one or more frameworks can be used to define and/or generate adaptive resilience operations. For example, a dynamic data structure can include elements such as dynamic compliance verification protocols, incident response frameworks, tokenization models, resilience modeling architectures, distributed ledger update routines, access control evaluation schemas, and/or encryption key management workflows (e.g., frameworks) configured and/or otherwise implemented to update current operations or generate new ones. In another example, the dynamic data structure can utilize data structures such as lists, heaps, graphs, and/or hash tables to dynamically allocate memory for unstructured operational objects (e.g., frameworks). The identification circuit 174 can identify a framework within the dynamic data structure by processing pointer references, invoking class methods, performing dynamic operation allocation, and/or employing other identification methodologies. For example, the dynamic data structure can include frameworks designed to interface with Security Information and Event Management (SIEM) systems, allowing the update of the dynamic data structure to maintain real-time (or near real-time) event logs and threat intelligence databases for automating and/or otherwise performing cybersecurity operations (e.g., updating security postures, applying detection rules, facilitating policy renewals, etc.).

Generally, a cyber resilience operation can include any action or process related to maintaining or improving cybersecurity, including analyzing cyber resilience metrics for anomalies, updating a security posture of an entity, processing claims or distributions, executing real-time incident response actions, rotating or updating cryptographic keys or tokens, synchronizing data across decentralized or centralized networks, and/or coordinating operations with other agents. Cyber resilience data can include information such as threat intelligence data, network and system logs, incident response records, risk assessment reports, backup and recovery plans, security configuration details, compliance and policy documentation, business records, customer and user information, access control logs, performance and availability metrics, machine learning models, and/or anomaly detection outputs. It should be understood that any interaction with such cyber resilience data can constitute a cyber resilience operation.

Additionally, the identification circuit 174 can be configured to receive or identify cyber resilience data (e.g., legal structure of an entity, number of protected records, preparedness for cyber insurance, etc.). For example, the identification circuit 174 can receive cyber resilience data pertaining to businesses, brokers, insurers, incident response (IR) firms, etc. The identification circuit 174 can be configured to receive data from computing systems external or internal to the DNCNDS. That is, the identification circuit 174 of a first agent system (e.g., agent system 170*a*) can be configured to receive data from another agent system (e.g., agent system 170*b*) connected to the agent network 140 or discoverable by orchestration computing system 110. Depending on the orientation of system 100 and network access, entity computing system(s) 130, third-party computing system(s) 130, and/or data source(s) 160 can be considered external to the network to silo security implementations within a system (e.g., system 100).

For example, if the agent system 170 is performing a cyber resilience operation for a third-party, a third-party computing system (e.g., third-party computing system 150) can facilitate an open channel of communication through a network (e.g., network 120) to agent system 170 allowing the third-party computing system to be internal to the DNDNDS to allow the agent system 170 to access, operate, update, and/or otherwise interact on the third-party computing system while an entity computing system can have a secure communication link with network 120 (closed channel), where the entity computing system is external to the DNCNDS and can communicate via the closed channel with the agent system 170. For example, identification circuit 174 can receive data from internal computing systems when the internal computing systems have the same private network (e.g., LAN), acceptable IP subnet, TCP/IP exchanges, UDP communication, direct routing, etc. Additionally, identification circuit 174 can receive data from external computing systems when the external computing systems are located outside the private network, use HTTP/HTTPS for web-based data, use FTP/SFTP for file transfers, use APIs for service-based communication, route data through external gateways, routers, and/or firewalls, and/or other configurations. In some implementations, the distinction between a computing system internal or external to the DNCNDS can depend on the configuration and protocols of the DNCNDS, agent network 140, agent system 170, etc.

In some implementations, the agent system 170 can include a registration circuit 175. The registration circuit 175 can be configured to register the autonomous agent with a DNCNDS to cause the one or more processing circuits to be discoverable on the DNCNDS. For example, the registration circuit 175 can communicate with or transmit an object, signal, message, etc. to a target node within the DNCNDS (e.g., to note availability to perform an operation) or to a centralized system or interface of the DNCNDS (e.g., to initiate a corresponding operation for another agent).

For example, the one or more processing circuits can establish a communication channel (e.g., using TLS, SSL, and/or other encryption protocols) and deliver a signal denoting received functions, frameworks, and/or cyber resilience operations of the agent system 170 via the communication channel. In some implementations, registering the agent with the DNCNDS includes denoting an availability status to perform operations. For example, the agent system 170 can receive a dynamic data structure including instructions for updating security configurations of a third-party, register with the DNCNDS, and/or receive instructions (e.g., from orchestration computing system 110 or agent network 140) to perform the security configurations updates. For example, the one or more processors can deploy the agent system to the agent network 140. That is, the agent system 170 can integrate into a DNCNDS infrastructure, verifying the agent system 170 is operationally ready to process cyber resilience data, interact with other agents, and/or performed assigned tasks autonomously or collaboratively. For example, registration can include synchronizing the agent with network-wide protocols, verifying integration through handshake protocols, and/or updating permissions and credentials to facilitate secure communications and data exchanges between various agents, third-parties, entities, and/or systems within the DNCNDS.

In some implementations, the agent system 170 can include a modeler 176. In some implementations, the modeler 176 can be configured to perform cyber resilience operations. For example, the cyber resilience operations can be a function selected from one or more stored functions (e.g., resilience operations 181 stored in agent database 180). The modeler 176 can perform functions including updating a computing environment, generating and providing an assessment to a plurality of computing systems, generating and updating a dashboard. That is, the modeler 176 can perform a stored function corresponding to a business, broker, insurer, IR firm, and/or other third-party. For example, the modeler 176 can update a computing environment (e.g., third-party computing system 150, entity computing system 130) by executing automated patch management, dynamic configuration management, incident response and recovery, compliance enforcement, adaptive access control, and/or other cyber resilience operations. Additionally, the modeler 176 can generate and provide an assessment to a plurality of computing systems by executing and/or transmitting automated vulnerability scans, real-time threat analysis, compliance audits, incident response evaluation, predictive risk assessment, and/or other assessments. In some implementations, the modeler 176 can perform real time monitoring of a cybersecurity posture of an organization. That is, the modeler 176 can integrate with security information and event management (SIEM) solutions, endpoint protection tools, and/or threat intelligence feeds to provide a holistic view of the security posture of the organization. The modeler 176 can update a dashboard including updating a plurality of data to transmit to a computing system (e.g., agent system 170, entity computing systems 130, third-party computing systems 150, orchestration computing systems 110).

In some implementations, the modeler 176 can generate and embed an output (e.g., from a model) within a protection parameter (e.g., content field) of a data structure (e.g., data structure 182). For example, the modeler 176 can model a protection application (e.g., cybersecurity protection parameter) and implement features and functionalities of a cyber resilience operation (e.g., resilience operation 181). In some implementations, the modeler 176 can implement and execute a generative artificial intelligence (GAI) model. For example, the modeler 176 can model a protection application by identifying at least one protection parameter (e.g., content field, such as user input field on an electronic form) of the plurality of protection parameters or application and generating an output (e.g., for the protection parameter/content field) using a trained GAI model (e.g., using a large language model (LLM)) based on receiving, accessing, and/or identifying structured or unstructured data (e.g., drag-n-drop file uploads, to data dumps, to accessing various data streams of the entity) of an entity, third-party, autonomous agent, data source, and/or other source. In some implementations, the modeler 176 can implement a generative pre-trained transformer (GPT) model (e.g., trained on a training dataset including cyber security data, protection data, protection control schemas, historical protection data, etc.) and can prompt the GPT model based on identified information (e.g., protection parameters) of a request to perform a resilience operation. In some implementations, the modeler 176 can incorporate the GAI model to parse and/or extract unstructured input data and/or data structure in performing the resilience operation. Additionally, the agent 170, such as through the modeler 176, can integrate models such as an LLM to recommend configuration changes, policy updates, and new detection rules based on the latest threat data.

Additionally, the modeler 176 can automate protection and/or compliance tasks. For example, the modeler 176 can identify vulnerabilities and compliance gaps, initiate fixes, and/or coordinate with third-party tools for remediation. Additionally, the modeler 176 can generate compliance tokens (e.g., cryptographic proofs, such as Zero-Knowledge Proofs (ZKPs), integrity hashes, authentication tokes, cryptographic communication tokens, API tokens, session tokens, NFTs, smart contracts, access control tokens, security assertion tokens, among other tokens). For example, the modeler 176 can issue tokenized proofs of compliance (e.g., insurability tokens). The tokenized proofs can include Zero-Knowledge Proofs (ZKPs) to determine verifiable compliance status for insurers without revealing sensitive data.

In some implementations, the tokenized proofs can be included in a knowledge graph. For example, a knowledge graph can include nodes and edges. That is, the nodes of a knowledge graph can represent tokens and at least one edge (e.g., each) can be a relationship. The modeler 176 can encapsulate cyber resilience data into tokens. For example, at least one (e.g., each) node of the knowledge graph can correspond to a digital representation of a compliance state or cyber resilience data. For example, cyber resilience data can be represented as a token before or after an agent performs and operation. The modeler 176 can encapsulate critical data such as compliance parameters met, incident resolutions, timing phases, and/or any other cyber resilience data.

The edges of the knowledge graph can be relationships between the tokens, such as dependencies, causal links, and/or shared attributes across different nodes. That is, at least one (e.g., each) edge can include one or more associations between the first token and additional tokens. That is, an edge can denote that compliance in one organization is dependent on the security safeguards of another organization or has been updated based on agent functions.

Additionally, the modeler 176 can evaluate the effectiveness of security controls of an organization. For example, the modeler 176 can identify weaknesses and recommend improvements. That is, the modeler 176 can analyze data from security tools received by the agent system 170 from systems external or internal to the DNCNDS. That is, the modeler 176 can use data parsing algorithms, decision-making routines, cryptographic processes, data validation, machine learning models, heuristic functions, and/or data aggregation mechanisms (e.g., functions) to identify gaps in a current defense strategy. Further, the modeler 176 can generate prioritized mitigation steps corresponding to the latest threat intelligence and compliance requirements. For example, the modeler 176 can update and upgrade security posture, software, identity management, ecosystem recovery, etc. In some implementations, the modeler 176 can integrate with another agent system 170 to implement identified improvements dynamically. For example, the modeler 176 can send a data package to a resilience agent (e.g., agent system 170) tasked with automating a compliance task, enhancing third-party security posture. In some implementations, the GAI model can generate a structured format (e.g., tabular) of tactics, techniques, and/or procedures (TTPs) (e.g., ransomware, phishing, domain fronting, zero-day exploit, privilege escalation, etc.) and incident facts (e.g., cybersecurity incident facts related to a security breach, such as data accessed, time period of breach, methods used by attackers, etc.). In some implementations, the structure format of TTPs can be a framework of a data structure and incident facts corresponds to human-readable instructions outputted by the GAI model.

The modeler 176 can include any one or more artificial intelligence models (e.g., machine learning models, supervised models, neural network models, deep neural network models), rules, heuristics, algorithms, functions, or various combinations thereof to perform operations including analyzing cyber resilience data, generating security assessments, classifying threat intelligence, updating cybersecurity configurations, and coordinating autonomous agents, such as processing incident response data, generating compliance verification reports, and optimizing resilience strategies. That is, the AI model can be a neural network and/or machine-learning (ML) model trained to detect anomalies in cybersecurity data, classify threats based on attack patterns, recommend adaptive security policies, or generate predictive models for risk assessment. In some implementations, the modeler 176 can output security posture metrics (e.g., system vulnerability scores, anomaly detection indicators, attack surface reduction statistics, and/or any compliance validation reports). For example, the output can be a classification label indicating whether a detected event corresponds to a security breach or a normal system fluctuation. In another example, the output can be a probability score reflecting the likelihood of an identified threat being a false positive. In some implementations, the security posture metrics can be provided to modeler 176 to perform adaptive policy recommendations, dynamically reconfigure agent networks, or refine compliance assessments based on evolving cybersecurity threats.

In some implementations, the modeler 176 can maintain, execute, train, update, and/or otherwise process, refine, or apply one or more artificial intelligence (AI) models during the cyber resilience operation stage. In some implementations, the AI model(s) can include any type of anomaly detection AI model capable of classifying cyber threats (e.g., intrusion detection models, fraud detection models) to enhance cybersecurity monitoring. For example, the AI model(s) can be trained and/or updated to identify previously unknown threat signatures, generate adaptive response strategies, or refine access control policies, among other real-time security operations. The AI model(s) can be or include a transformer-based model (e.g., a generative pre-trained transformer (GPT) model, a bidirectional encoder representations from transformers (BERT)). The machine-learning model(s) can be or include a reinforcement learning model, in some implementations. The modeler 176 can execute the AI model to generate outputs. The modeler 176 can receive data to provide as input to the AI model(s), which can include historical security logs, real-time network traffic data, threat intelligence reports, and/or any cyber resilience metrics.

In some implementations, the modeler 176 can execute one or more AI models by utilizing a federated learning framework to improve the performance of the AI model during the continuous adaptation stage. The framework can include implementing techniques such as gradient descent, backpropagation, and distributed training to process large-scale datasets. The AI model(s) can incorporate mechanisms such as dropout regularization and weight pruning to maintain efficiency and prevent overfitting. For example, during execution, the modeler 176 can partition input data into mini-batches, apply loss functions, and update model parameters iteratively. The AI models can support inference operations that include processing feature vectors, transforming raw input data, and generating probabilistic predictions and/or metrics. The modeler 176 can integrate hardware accelerators such as GPUs or TPUs to handle computational demands, for example when performing real-time threat detection across distributed systems.

In some implementations, the modeler 176 can train and update AI models through a cybersecurity analysis pipeline that includes data preprocessing, feature engineering, and hyperparameter tuning. The preprocessing stage can include normalizing datasets, processing missing data, and augmenting inputs for training the AI models. Feature engineering can include dimensionality reduction techniques, such as principal component analysis (PCA) or t-SNE. The AI models can incorporate attention mechanisms, ReLU activations, and layered architectures to facilitate learning. In some implementations, the modeler 176 can evaluate trained models using security-specific metrics (e.g., precision, recall, and/or F1 score) and/or any adversarial robustness evaluation, to determine readiness for deployment and/or inference operations.

In some implementations, the modeler 176 can include at least one AI model (e.g., AI model). The AI model can include an input layer, an output layer, and/or one or more intermediate layers, such as hidden layers, which can each have respective nodes. That is, the model 176 processes cybersecurity telemetry data through multiple transformation layers to extract risk indicators. For example, the input layer receives raw system logs, network traffic patterns, and behavioral telemetry. For example, the output layer generates risk scores, intrusion classification labels, or mitigation recommendations. For example, the intermediate layers apply non-linear transformations, convolutional filters, and recurrent processing mechanisms to detect temporal attack sequences.

In some implementations, the AI model can include a hierarchical architecture including an input processing layer, a feature transformation layer, and/or an output generation layer. Each layer can include a plurality of nodes or sub-components configured to perform specific computations. That is, the AI model can process input data by propagating it through the layers. For example, the input processing layer can extract structured attributes by normalizing raw input data or extracting initial embeddings. For example, the feature transformation layer can refine representations by applying non-linear transformations or performing dimensionality reduction using operations such as matrix multiplication and activation functions. For example, the output generation layer can generate security classifications, anomaly probability scores, or compliance verification results based on the processed data.

In some implementations, the system 100 can configure (e.g., train, update, fine-tune, apply transfer learning to) the AI model by modifying or updating one or more parameters, such as weights and/or biases, of various nodes of the AI model responsive to evaluating estimated outputs of the AI model (e.g., generated in response to receiving training examples in a training dataset, such as a training dataset including security incidents, compliance benchmarks, and real-world attack simulations). The modeler 176 can be or include various neural network models, including models that can operate on or generate data including but not limited to security event logs, user authentication sequences, encrypted transaction records, and/or various combinations thereof.

In some implementations, the modeler 176 can be configured (e.g., trained, updated, fine-tuned, has transfer learning performed, etc.) based at least on the training data of the at least one training dataset (e.g., incident response reports, adversarial attack logs, compliance audit records). For example, one or more example network intrusion patterns and/or malware attack sequences of the training data can be applied (e.g., by the system 100, or in a pre-training process performed by the system 100 or another system) as input to the modeler 176 to cause the modeler 176 to generate an estimated output. The estimated output can be evaluated and/or compared with ground truth labels (or security expert annotations) of the training data that correspond with the one or more example network intrusion patterns and/or malware attack sequences, and the AI model of the modeler 176 can be updated based at least on the loss function evaluation and/or feature importance analysis. For example, based at least on an output of a real-time anomaly detection model, one or more parameters (e.g., weights and/or biases) of the AI model of the modeler 176 can be updated to enhance detection sensitivity while minimizing false positives.

In some implementations, the modeler 176 can be configured to automate updating security configurations and implement new detection rules to ensure security optimization of a third-party or entity. For example, the modeler 176 can apply configuration changes and new detection rules based on real-time threat data. That is, the modeler can connect to threat intelligence feeds provided by a system (e.g., agent network 140, agent system 170, orchestration computing system 110, third-party computing system 150, data source 160, entity computing system 130, and/or other systems) to model and implement configuration changes. For example, the modeler 176 can include a self-learning or improvement model. That is, the modeler 176 can use past configuration data to train a model to analyze cyber resilience data of a third-party and generate a response.

In some embodiments, the modeler 176 can include leveraging natural language processing (NLP) and machine learning techniques to extract actionable insights from unstructured data sources like surveys and incident reports. That is, the modeler 176 can be an artificial intelligence (AI) or machine learning (ML) model designed to identify, detect, and/or respond to incidents, claims, and/or cyber threats. The modeler 176 can include a preprocessing layer and a feature engineering layer. The modeler 176 can use a model training layer to train the modeler 176 to model the incident data by using one or more training data sets within the agent database 180. The artificial intelligence (AI) model can incorporate advanced machine learning (ML) models, including deep learning and reinforcement learning, to detect and predict cyber threats. The artificial intelligence (AI) model can include integrating with intrusion detection systems (IDS) to monitor network traffic for suspicious activities. The artificial intelligence (AI) model can provide for automated response mechanisms, behavioral analysis, threat intelligence integration, cryptographic techniques, and/or other intelligence models. The AI model can incorporate any or all artificial intelligence model directed to cyber resilience.

In some implementations, the modeler 176 can include a model evaluation layer to evaluate the trained model using one or more validation data sets within the agent database 180. In some implementations, the modeler 176 can execute heuristic analysis, pattern identification, anomaly identification, and/or threat projections. For example, the modeler 176 can refine actions, recommendations, other outputs and/or communications with other agents and systems over time. That is, the modeler 176 can provide a feedback loop to a resilience agent (e.g., agent system 170). Within an agent network 140, the modeler 176 can include or communicate with a self-improvement model prior to or after generating a response to improve the modeler capabilities. Utilizing statistical analysis and correlation techniques, the modeler 176 can analyze, correlate, and/or cross-reference datasets to identify patterns indicative of potential security threats or vulnerabilities. This process can employ algorithms capable of detecting anomalies in network traffic, unauthorized access attempts, and/or the presence of malicious software by comparing observed behaviors against established norms, further assuring defense optimization and reducing the need for manual intervention in updating security defenses by aligning security posture of an organization with evolving threat landscapes and attacks.

In some implementations, the modeler 176 can be configured to automate client communication and track compliance progress. For example, the modeler 176 can provide brokers with a dashboard view of the compliance readiness of at least one (e.g., each) client. The dashboard can include tracking active tasks in real-time and supporting features such as progress indicators, status updates, estimated completion times, and/or interactive controls to pause, modify, and/or terminate tasks. In some implementations, when the modeler 176 provides a dashboard, the modeler can also communicate with another agent system 170 to initiate remediation tasks. For example, the modeler 176 can determine compliance status and communicate with a claim management agent (e.g., agent system 170) to verify compliance status and interface with (via agent interface 179) a review agent (e.g., agent system 170) to streamline submission processes and provide updated compliance proofs, reducing workload for third-parties and providing data packages (e.g., smart contracts, proofs, renewals, etc.) before internal deadlines configured with the DNCNDS.

In some implementations, the agent system 170 can include a framework circuit 177. In some implementations, the modeler 176 and/or framework circuit 177 can be configured to generate and/or perform a new function. For example, the new function can be based at least on the one or more frameworks of the dynamic data structure. Further, the new function can correspond to generating a new cyber resilience operation based on the cyber resilience data. For example, the dynamic data structure can include frameworks (e.g., protocols, software frameworks, instructions, etc.) that can be used to generate cyber resilience operations. For example, the dynamic data structure can include an adaptable software framework containing generic objects, methods, and/or other functions that, when reading cyber resilience data, can generate a cyber resilience operation. For example, the agent system 170 can serve as a central hub during a cyber security incident, wherein the modeler 176 and/or framework circuit 177 can generate code based on a generic framework to implement software that writes incident reports for compliance companies and tokenizes data for clients. The framework allows the modeler 176 and/or framework circuit 177 to create responses for both third-parties and entities wherein a static cyber resilient operation function stored in a database can handle responses for third-parties.

In some implementations, the framework circuit 177 can generate a new function based at least on the one or more frameworks of the dynamic data structure. In some implementations, modeler and/or framework circuit can generate at least one new cyber resilience operation based on the cyber resilience data. Further, generating a new function can include the framework circuit 177 executing a framework (e.g., compliance verification, incident response workflows, tokenization models, resilience modeling architectures, distributed ledger update frameworks, access control evaluation schemas, and/or encryption key management processes) compatible with the cyber resilience data. For example, the framework circuit 177 can represent the cyber resilience data as a dynamic graph framework, and/or when a new threat is detected (e.g., received by the agent system 170, detected by the modeler 176), the modeler 176 or framework circuit 177 can update the graph to include threat characteristics and impact. Additionally, the modeler 176 or framework circuit 177 can generate a new function capable of isolating affected nodes and reroute traffic to maintain network integrity.

In some implementations, the agent system 170 can include a quantum circuit 178. In some implementations, the quantum circuit 178 can execute one or more functions or frameworks of the dynamic data structure. Additionally, the quantum circuit 178 can execute or apply a lattice-based technique, a hash-based technique, and/or a multivariate polynomial technique to encrypt or protect at least a portion of the cyber resilience data from quantum attacks. In some examples, applying a lattice-based encryption technique can include the one or more processing circuits (e.g., quantum circuit 178) constructing a cryptographic lattice structure, deriving or determining programmatically intensive mathematical problems (e.g., Shortest Vector Problem (SVP) or Learning with Errors (LWE)), and/or generating a private key associated with the encrypted data. For example, the quantum circuit 178 can encode the cyber resilience data into vectors within a lattice such that recovering the original data without a private key would include solving problems that are computationally infeasible (e.g., exponential time and resources on both classical and quantum computing systems due to the inherent hardness of approximating solutions to SVP or LWE within high-dimensional spaces).

In some examples, applying a hash-based encryption technique can include the quantum circuit 178 generating cryptographic hash based on one-way functions that are computationally resistant to inversion by quantum computing systems. For example, the quantum circuit 178 can apply a Merkle Tree structure by partitioning the cyber resilience data into data blocks, hashing the data recursively to create a hierarchical structure, and/or linking the data to a root hash representing the entire dataset. Further, the one or more processing circuits can verify an integrity and authenticity of the data package by verifying any data block against the root hash using a computationally efficient path. Quantum computing systems, even with advanced parallel processing capabilities, are not well-suited to reversing one-way functions used in cryptographic hashes because of pre-image resistance (e.g., finding the original input data from a hash would include attempting an infeasibly large number of combinations) and collision resistance (e.g., discovering two distinct inputs producing the same hash would similarly demand computational resources exceeding the capabilities of known quantum algorithms (e.g., Grover algorithm)). In some examples, applying a multivariate polynomial encryption technique can include the one or more processing circuits constructing a cryptographic framework using multivariate quadratic equations over finite fields to encode the cyber resilience data. For example, the quantum circuit 178 can generate a private key including transformations for scrambling polynomial variables and a corresponding public key for encrypting data. That is, the encrypted data can be represented as polynomial mappings of the original data, where decrypting or reconstructing the plaintext can include inverting the complex transformations. Without the private key, the computational difficulty of solving systems of nonlinear multivariate equations (e.g., MQ problems) renders the multivariate polynomial encryption techniques resistant to both classical and quantum-based cryptographic attacks.

In some implementations, the agent system 170 can include an agent interface 179. The agent interface 179 can identify or receive cyber resilience data by interfacing with one or more data sources (e.g., agent network 140, data sources 160, and/or external systems) or systems (e.g., agent computing systems 170, orchestration computing system 110) to assess or query structured, semi-structured, and/or unstructured data stored therein. In some examples, identifying or receiving cyber resilience data can include accessing data via secure APIs, querying relational or NoSQL databases, polling distributed ledger entries, and/or retrieving logs or metrics from monitoring systems. That is, the agent system 170 or agent interface 179 can perform operations such as sending requests to external platforms, subscribing to real-time data streams, receiving periodic data feeds, scanning file repositories, and/or performing metadata searches across indexed datasets. In some implementations, the agent system 170 or agent interface 179 can identify cyber resilience data by scanning for predefined patterns, tags, and/or attributes within datasets or outputs associated with a decentralized or centralized network.

Additionally, the agent system 170 or agent interface 179 can identify or receive cyber resilience data generated by agent computing systems 170 during the 12 performance of one or more operations (e.g., compliance verification, data encryption, incident response). For example, the agent computing systems 170 can transmit operational logs, status updates, performance metrics, and/or results of completed tasks to the orchestration computing system 110 for further analysis, modeling, and/or storage. In some implementations, the agent systems 170 or agent interface 179 can associate the received cyber resilience data with operations, functions, frameworks, agents, and/or network events. For example, identifying or receiving cyber resilience data can include receiving or processing a request to model performance data from a data source, where the agent database has a corresponding model or framework to perform the reliance operation or generate a new operation based on performing the model. In some implementations, agent interface 179 can transmit data associated with the workflows, thresholds, conditions, and/or other directives via agent network 140 to the second autonomous or independent agent to execute an assigned operation. For example, the agent interface 179 can communicate with at least one computing system external or internal to the DNCNDS. That is, the agent interface 179 of a first agent system 170*a* can communicate with an agent interface 179 of a second agent system 170*b*. For example, an agent system 170 that identifies vulnerabilities and compliance gaps can communicate with an agent system 170 that acts as a project manager to streamline policy renewals.

In some implementations, agent system 170 can include an agent database 180. Agent database 180 can include resilience operations 181 and data structure(s) 182. In some implementations, the agent database 180 can be communicably coupled or connected to a distributed ledger (e.g., blockchain) or other authoritative data source to provide data integrity and security. For example, the database 180 can be a private ledger and data source 160 can be a public ledger, and/or data transactions (e.g., resilience operations 181, data structure(s) 182, updates to proof/posture state data, cybersecurity parameters, entity data, etc.) recorded on the database 180 can be validated against entries recorded on the data source 160 to verify that resilience operations 181 or data structure(s) 182 are accurately corresponding to third-party resilience requests. The database 180 can include data structures for storing information such as, but not limited to, the front-end information, interfaces, dashboards, incident information, claim information, user information, vendor information, contact information, invoices, a blockchain ledger, etc. Further, the database 180 can store resilience operations 181 and data structure(s) 182. That is, the agent database 180 can store the functions and frameworks of received resilience operations 181 (e.g., resilience operations received by identification circuit 174).

In some implementations, the agent system 170 and components thereof (e.g., modeler 176, framework circuit 177) can access the resilience operations 181 or data structure(s) 182 stored in the database to perform agent functions (e.g., resilience operations). For example, the modeler can access policy submissions stored in agent database 180 to determine whether the policy submissions are in alignment with established third-party criteria.

Figure 5:
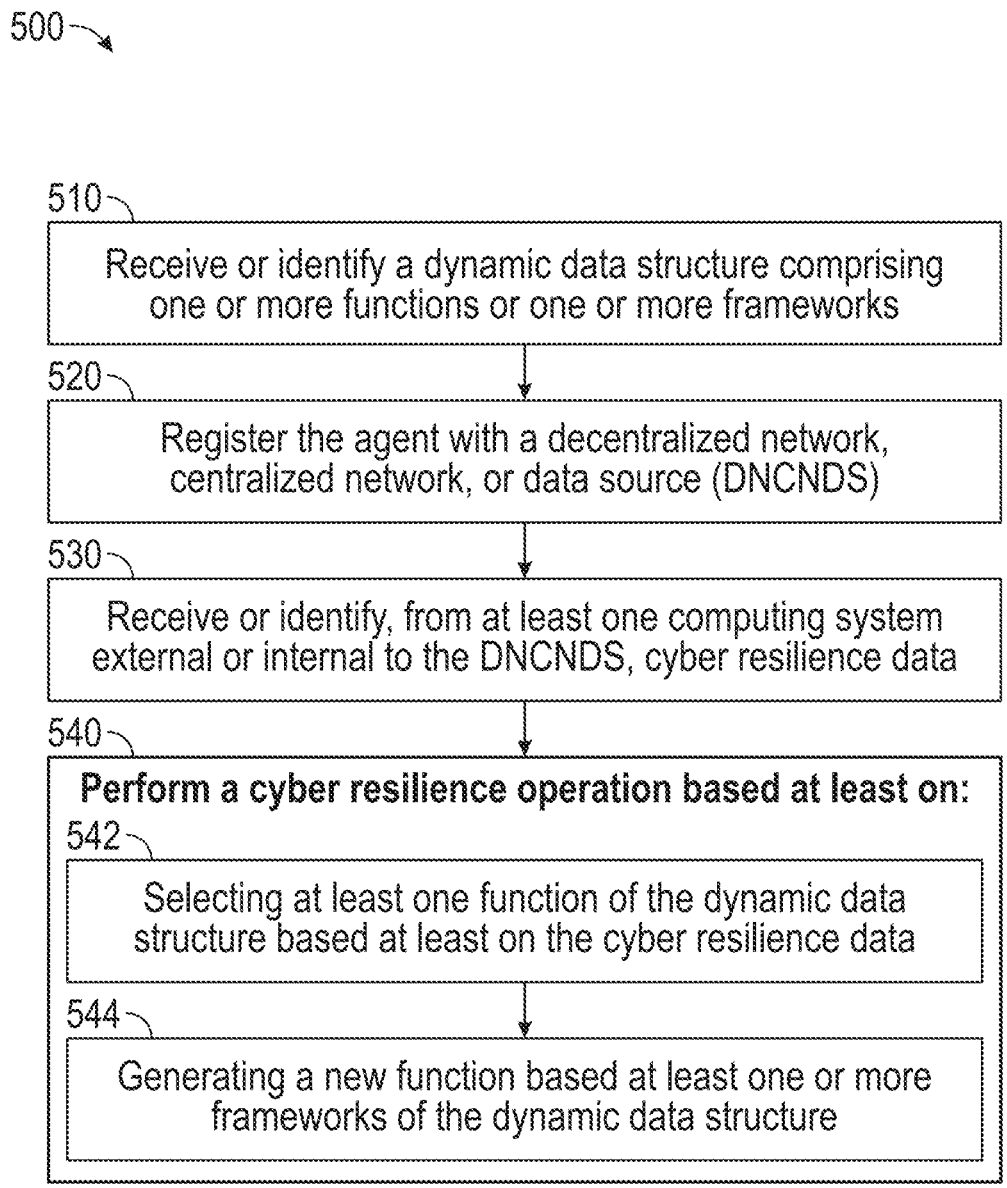
FIG. 5 depicts a flowchart for a method of executing an autonomous agent, according to some implementations.

Referring now to FIG. 5, a method 500 for an autonomous agent performing cyber resilience operations is shown, according to some implementations. In some implementations, one or more devices, systems, and/or components described with respect to FIGS. 1A-1B and FIGS. 4A-4B can perform or be utilized to perform the steps of method 500. For example, the orchestration computing system 110, agent network 140, and/or agent computing systems 170 can perform one or more of the steps of the method 200. In some implementations, some, and/or all operations of method 500 can be performed by one or more processors executing on one or more computing devices, networks, systems, and/or servers. In some implementations, at least one (e.g., each) operation of method 500 can be re-ordered, added, removed, and/or repeated. In some implementations, the method 500 can include additional, fewer, and/or different operations.

In a broad overview of method 500, at block 510, one or more processing circuits of a decentralized network, centralized network, and/or data source (e.g., processing circuits of orchestration computing system 110, agent network 140, agent computing systems 170, and/or any system or device associated with agent network 140, etc.) can receive or identify a dynamic data structure. At block 520, the one or more processing circuits can register the autonomous agent with a decentralized network, centralized network, and/or data source (DNCNDS). At block 530, the one or more processing circuits can receive or identify cyber resilience data. At block 540, the one or more processors can perform resilience operation(s). At block 542, the one or more processors can perform cyber resilience operation(s) based at least on selecting at least one function of the dynamic data structure. At block 544, the one or more processors can perform cyber resilience operation(s) based at least on generating a new function based at least on the one or more frameworks of the dynamic data structure.

In some implementations, at block 510, one or more processing circuits can receive or identify a dynamic data structure. In some implementations, dynamic data structure can include one or more functions or one or more frameworks for performing cyber resilience operation(s). For example, an agent system 170 can receive operational parameters (e.g., task priorities, workflow definitions, and/or resource allocations) through a communication channel (e.g., agent interface 179) from agent network 140 or orchestration computing system 110. In another example, the one or more processing circuits can receive a data structure that is embedded with functions and frameworks to perform cyber resilience operations. That is, the data structure can include a structured set of instructions or protocols defining the tasks and logic for the autonomous agent to utilize in performing operations. For example, the data structure can include modular code blocks or metadata models to facilitate operations such as modeling resilience, processing cyber claims, detecting incidents, determining security postures, evaluating compliance with regulatory standards, and/or orchestrating data exchanges. For example, the one or more processing circuits can receive the dynamic data structure with instructions to embed, initialize, and/or execute functions e.g., data parsing algorithms, decision-making routines, cryptographic processes, data validation scripts, machine learning models, heuristic functions, and/or data aggregation mechanisms) or frameworks (e.g., compliance verification protocols, incident response workflows, tokenization models, resilience modeling architectures, distributed ledger update frameworks, access control evaluation schemas, adaptable security frameworks, and/or encryption key management processes) utilized or executed to perform various operations.

In some implementations, at block 520, the one or more processing circuits can register the autonomous agent with the DNCNDS. That is, the one or more processing circuits can be discoverable on the DNCNDS. For example, the agent system 170 can communicate with or transmit an object, signal, message, etc. to a target node within the DNCNDS (e.g., to note availability to perform an operation) or to a centralized system or interface of the DNCNDS (e.g., to initiate a corresponding operation for another agent) to denote discoverability. For example, registering for discoverability can include the one or more processing circuits establishing a communication channel (e.g., using TLS, SSL, and/or other encryption protocols) and delivering a signal denoting received functions, frameworks, and/or cyber resilience operations of the agent system 170 via the communication channel. In some implementations, registering the agent to be discoverable with the DNCNDS includes denoting an availability status to perform operations. For example, the agent system 170 can receive a dynamic data structure including instructions for updating security configurations of a third-party, register with the DNCNDS, and/or receive instructions (e.g., from orchestration computing system 110 or agent network 140) to perform the security configurations updates. For example, the one or more processors can deploy the agent system to the agent network 140. That is, the agent system 170 can integrate into a DNCNDS infrastructure, verifying the agent system 170 is operationally ready to process cyber resilience data, interact with other agents, and/or performed assigned tasks autonomously or collaboratively. For example, registration can include synchronizing the agent with network-wide protocols, verifying integration through handshake protocols, and/or updating permissions and credentials to facilitate secure communications and data exchanges between various agents, third-parties, entities, and/or systems within the DNCNDS.

In some implementations, the one or more processors can update or re-register with the DNCNDS. That is, the agent system 170 can receive additional functions/sub-functions, frameworks, and/or additional data corresponding to cyber resilience operations entailing an update to discoverability.

For example, if the agent system 170 is performing an operation, the one or more processors can re-register with the DNCNDS to update the operationally readiness of the agent for other systems and entities in communication with the DNCNDS. Re-registering the agent with the DNCNDS can update cyber resilience operations and availability of the agent. Additionally, re-registering can include any form of registering as discussed herein. For example, an agent system 170 performing risk assessment operations for policy applications can continually provide updates and re-register with the DNCNDS to request additional data from data sources 160 or additional agents performing additional operations (e.g., coordination agents, predictive assessment agents).

Additionally, the one or more processors can register and re-register the functions and frameworks of the dynamic data structure with the DNCNDS. For example, the one or more processing circuits can indicate agent functions and capabilities with computing systems communicably coupled with the DNCNDS and transmit usage statistics. For example, usage statistics can include memory and processor availability, response metrics, function usage, framework usage, model usage, etc. Additionally, the one or more processors can identify a portion of the cyber resilience operation the agent system is to perform corresponding to the one or more functions or one or more frameworks of the dynamic data structure and can identify a portion of the cyber resilience operation to transmit to the DNCNDS for performance by a second agent. For example, the agent system 170 can analyze cyber resilience data (e.g., threat intelligence feeds, compliance metrics, and/or incident logs) to determine tasks to be performed by the agent system 170 and determine tasks to be performed by a second agent. That is, the one or more processing circuits can provide usage statistics and metrics of the dynamic data structure to the DNCNDS for the DNCNDS, second agent, and/or entity to track activity levels or consumption. For example, the agent system 170 can report memory consumption, memory usage, insertion time, deletion time, search time, insertions, deletions, traversals, loading factors, fragmentation, scalability, and/or other usage statistics to determine agent capability of the agent system 170 in relation to the agent network 140.

In some implementations, at block 530, the one or more processors can receive or identify cyber resilience data. For example, the agent system 170 or agent interface 179 can identify or receive cyber resilience data by querying one or more data sources (e.g., agent network, data sources 160, orchestration computing system 110, and/or external systems) or systems (e.g., agent computing systems 170) to access structured, semi-structured, and/or unstructured data. For example, the agent network 140 can identify cyber resilience data from agent operations by capturing or receiving outputs of agent computing systems 170, such as performance metrics, task execution results, data processing logs, and/or any data generated from the execution of assigned workflows (e.g., compliance verification, anomaly detection, and/or encryption processes). That is, the one or more processing circuits can identify or receive cyber resilience data by interfacing with data repositories, polling distributed ledgers, retrieving operational logs, and/or subscribing to real-time data streams. For example, identifying cyber resilience data can include scanning datasets or parsing network traffic for predefined patterns, attributes, and/or tags corresponding to agent outputs, exchanged data, security incidents, compliance states, threat intelligence, and/or performance metrics.

In some implementations, identifying or receiving cyber resilience data can include the orchestration computing system 110 or agent interface 112 processing requests or responses containing metadata, event triggers, and/or operational metrics exchanged with decentralized or centralized networks. In some examples, the orchestration computing system 110 or agent network 140 can parse, aggregate, and/or catalog the identified or received data to identify one or more agents for allocation. Additionally, the one or more processors can receive or identify cyber resilience data from at least one computing system external or internal to the DNCNDS. That is, the agent system 170 can interface with various internal systems (e.g., agent computing systems 170, orchestration computing systems 110) or external systems (e.g., third-party platforms, regulatory data sources, and/or distributed networks) to access or query structured, and/or unstructured cyber resilience data. For example, the one or more processing circuits can receive internal data from the agent network 140 by polling distributed ledgers, scanning logs, and/or accessing databases maintained within the DNCNDS, such as relational or NoSQL data stores containing agent operation records or system performance metrics. For example, the one or more processing circuits can interface with external computing systems, such as regulatory compliance platforms, threat intelligence providers, and/or incident response systems, to query or collect data streams, logs, and/or analytics reports related to security resilience.

In some examples, the one or more processing circuits can monitor and process network traffic, event triggers, and/or real-time alerts generated by either internal or external systems to analyze or identify cyber resilience data or corresponding operations. An endpoint or interface can include or refer to any system, platform, communication channel, and/or protocol used to facilitate the exchange, retrieval, and/or transmission of cyber resilience data, such as APIs, user interfaces, web services, messaging queues, database connections, secure communication protocols (e.g., TLS, SSH), distributed ledger nodes, and/or other hardware or software components configured to interact with internal or external computing systems.

In some implementations, at block 540, the one or more processing circuits can perform operation(s). In some implementations, at block 540, the one or more processing circuits can perform at least one operation based on selecting at least one function of the dynamic data structure. In some implementations, at block 540, the one or more processing circuits can perform operations based on generating a new function based on the one or more frameworks of the dynamic data structure. For example, the one or more processing circuits can execute tasks such as evaluating compliance against regulatory standards, processing cyber resilience claims, generating incident response recommendations, orchestrating data exchanges with other systems or networks, monitor a security posture, automate compliance tasks, evaluate security controls, update security configurations, automate client communications, track compliance progress, automate risk assessment, create, update, and/or modify simulation scenarios, and/or generate detection rules.

In some implementations, at block 542 the one or more processing circuits can perform at least one operation based on selecting at least one function of the dynamic data structure. In some implementations, the at least one function corresponds to updating a computing environment. That is, the one or more processing circuits can update a computing environment (e.g., third-party computing system 150, entity computing system 130) by executing automated patch management, dynamic configuration management, incident response and recovery, compliance enforcement, adaptive access control, and/or other cyber resilience operation on a computing system internal or external to the DNCNDS. For example, the one or more processing circuits can gather structured data and apply predefined rules executed by the function to validate claims or escalate a response to a user.

In some implementations, the at least one function corresponds to generating and providing an assessment to a plurality of computing systems. For example, the one or more processing circuits can process received data and execute a stored function corresponding to a cyber resilience operation. That is, the one or more processing circuits can perform functions such as retrieval-augmented generation (RAG) to relevant information from unstructured data sources such as cyber threat intelligence (CTI) reports, incident logs, and/or threat advisories. Further, the one or more processing circuits can disseminate threat insights and improvement plans to computing systems (e.g., across CTI, red, and blue teams) That is, the one or more processing circuits can provide a data package configured to deploy on at least on entity computing system (e.g., agent system 170, third-party computing system 150, entity computing system 130, etc.). In some implementations, the one or more processors can break down silos between teams (e.g., red, blue, and CTI teams), sending data packages or causing information sharing between each and coordinating response actions.

In some implementations, the one or more processors provide the data package via the DNCNDS. For example, the one or more processing circuits can transmit the data package incorporating steps such as data packaging and container images, security hardening tools, encryption, deployment automation, pipeline tools, and/or other deployment tools. In some implementations, performing the at least one cyber resilience operation can include the one or more processing circuits generating a data package corresponding to the new function or at least one function of the one or more functions. In some implementations, the one or more data packages can include one or more deployable sub-functions/sub-operations of the new function or at least one function of the one or more functions. In some implementations, sub-functions can include any or all operations of the original function. For example, the one or more processing circuits can transmit a sub-function to a computing system (e.g., agent system 170, third-party computing system 150, entity computing system 130, orchestration system 110, etc.). The sub-function (e.g., sub-task, sub-operation) can include modeling operations, storage operations, and/or data exchange operations corresponding with the performance of the at least one first function.

For example, the first sub-function can include processing portions of the cyber resilience data, such as evaluating compliance checkpoints or performing risk assessments. For example, the second sub-function/sub-operation can include executing storage operations, exchanging data with external systems, and/or validating portions of incident data. For example, a third-party computing system can request a security environment review and share secure customer data with the agent system. The one or more processors can perform a function of modeling the environment and generate a threat posture update with sub-functions of corresponding to different types of customer entities. The one or more processors can send the sub-functions to the third-party computing system or to other agent systems that can be equipped to handle sub-functions corresponding to the different customer entities. In some implementations, the one or more functions correspond to updating a dashboard. For example, the one or more processing circuits can map assets to threat vulnerabilities and threat indicators. The one or more processing circuits can cross reference asset data with threat intelligence reports to update a dashboard.

For example, the dashboard can compare compliance of an entity with security policies and regulations such as GDPR or HIPAA. The dashboard can include tracking active tasks in real-time and supporting features such as progress indicators, status updates, estimated completion times, and/or interactive controls to pause, modify, and/or terminate tasks. The dashboard can be stored on a system internal or external to the agent system or DNCNDS. For example, the dashboard can be stored within the agent system for another agent within the agent network to read the dashboard and perform a function such as providing security posture updates. In some implementations, the dashboard can be transmitted to or stored on a computing system. For example, the one or more processors can transmit the dashboard to an entity computing system 130 for internal evaluation.

In some implementations, at block 544, the one or more processing circuits can generate a new function based on at least the one or more frameworks of the dynamic data structure. In some implementations, the new function can correspond to at least on the one or more frameworks of the dynamic data structure. In some implementations, modeler and/or framework circuit can generate at least one new cyber resilience operation based on the cyber resilience data. Further, generating a new function can include the one or more processors executing a framework (e.g., compliance verification protocols, incident response workflows, tokenization models, resilience modeling architectures, distributed ledger update frameworks, access control evaluation schemas, and/or encryption key management processes) compatible with the cyber resilience data. For example, the framework circuit the one or more processors can represent the cyber resilience data as a dynamic graph framework, and/or when a new threat is detected, the one or more processors can update the graph to include threat characteristics and impact. Additionally, the one or more processors can generate a new function capable of isolating affected nodes and reroute traffic to maintain network integrity.

In some implementations, the one or more processors can include models to adapt data structures, functions, frameworks, and/or additional data to generate new functions. The new function can correspond to a cyber resilience function stored by the agent or a network in communication with the DNCNDS. For example, the one or more processors can generate a new function corresponding to an attack scenario by modeling historical data corresponding to attacks to an organization. The one or more processors can use RAG and artificial intelligence (AI) models (e.g., LLMs) to generate new functions such as attack scenarios based on known adversary behaviors and tactics, techniques, and/or procedures (TTPs). In some implementations, the one or more processing circuits can store the new function in the dynamic data structure. In some implementations, the one or more processors can coordinate with teams to run simulations, validating the effectiveness of existing security controls. That is, the one or more processing circuits can update a database and transmit a signal corresponding to the updating database and functionality of the agent system to systems communicably coupled with the DNCNDS. The one or more processors can coordinate with other computing systems (E.g., third-party computing system 150, entity computing system 130, additional agent system 170) to run simulations validating the effectiveness of existing security controls. The one or more processors can use feedback from the model and generated functions in addition to feedback from other computing systems to continuously update the model and generate new functions. Additionally, the agent system 170 can include domain-specific LLMs corresponding to the functions, such as including LLMs for threat analysis, compliance interpretation, and/or incident response planning.

In some implementations, the one or more processing circuits can apply a cyber resilience operation as input to an artificial intelligence (AI) model to generate at least one performance metric. In some implementations, the performance metric corresponds with selecting at least one function or generating the new function. The performance metric can include performance of a computing system in relation to configuration data, compliance metrics, incident history logs, performance benchmarks, policy definitions, cryptographic data or keys, tokens, cyber resilience attributes, posture or state data, historical data, analytic results derived from cyber resilience modeling processes, etc. In some implementations, the one or more processing circuits can update the dynamic data structure based at least on the performance metric. In some implementations, the one or more processing circuits can provide the new function and corresponding performance data to at least one second autonomous agent of the DNCNDS.

In some implementations, new function and/or corresponding performance data can cause the second autonomous agent of the DNCNDS to update a corresponding data structure. For example, the one or more processors can generate attack scenarios and send to an additional agent for save the scenario to use for updating the data structure of the second agent or save to the database of the second agent. In some implementations, the one or more processing circuits can identify a portion of the cyber resilience operation to perform corresponding to the at least one or more functions or one or more frameworks of the dynamic data structure. Additionally, the one or more processing circuits can identify a portion of the cyber resilience operation to transmit to the DNCNDS for performance by a second agent. That is, the one or more processing circuits can dynamically redistribute loads or data assignments. In some implementations, the one or more processing circuits can provide usage statistics and metrics of the dynamic data structure to the DNCNDS for the DNCNDS, the second agent or an entity to track activity levels and resource consumption. Resource consumption can include processing and distributing computational resources, memory used, network bandwidth, energy consumption, storage, human oversight and/or other resource consumption manners. The one or more processing circuits can allocate complex or resource-intensive operations, such as real-time compliance analysis or encryption processing, to agents with higher available memory or processing power, while assigning simpler tasks, such as log aggregation or status monitoring, to agents with lighter workloads.

In some implementations, the one or more processing circuits can use LLMs to refine scenario models. In some implementations, the one or more processors can evaluate the effectiveness of the defenses of organizations following simulations, identifying gaps and providing target recommendations for improvement. For example, the one or more processing circuits can analyze simulation results to determine which security measures held up and which failed against specific attack techniques, generating prioritized recommendations for improving defenses, including configuration changes and new detection rules. The one or more processors can feed insights back into another system (e.g., agent system 170) and/or through an artificial intelligence model to update a posture of an organization in real time.

In some implementations, the one or more processing circuits can generate one or more tokens. In some implementations, the one or more tokens can include at least one proof of the at least one cyber resilience operation. That is, the That is, the one or more processing circuits can generate one or more tokens by embedding a structured data object with data to represent a verifiable attribute or state associated with cyber resilience data, operations, and/or agent interactions. For example, the agent system 170 or agent interface 179 can process data related to compliance, security incidents, and/or operational metrics to generate tokens encapsulating cryptographic proofs, such as Zero-Knowledge Proofs (ZKPs) or integrity hashes. For example, a compliance token can 24 include data that validates a security configuration or compliance checkpoint, such as the application of security patches, completion of audits, and/or alignment with regulatory standards. For example, an incident token can represent or store information associated with a detected security event or response action, including timestamps, affected resources, and/or remediation actions.

In some implementations, the at least one proof corresponds with a verification of at least a portion of the cyber resilience data, the at least one of the at least one first operation or the at least one second operation, and/or at least a portion of one or more outputs of the one or more first functions or the one or more second functions. For example, the orchestration computing system 110 or agent computing systems 170 can generate a token including data (e.g., a ZKP) that validates or verifies any portion, value, and/or amount associated with the cyber resilience data, such as a received notification or request, attributes of system configurations, activity logs, and/or operational states associated with resilience tasks. In some examples, the proof can verify aspects of an operation, such as actions taken during compliance processes or responses to identified incidents. Additionally, the proof can include validate outputs, such as results generated from security assessments, incident responses, and/or compliance evaluations.

In some implementations, responsive to determining the cyber resilience data corresponds with a verification request, the one or more processing circuits can transmit, using at least one endpoint or interface, the at least one proof or an indication of the at least one proof to the at least one first computing system or the at least one second computing system. That is, the one or more processing circuits can identify a request to verify or validate a portion of the cyber resilience data or any data associated with the cyber resilience data, such as a compliance token or incident token, and/or can transmit a corresponding proof to internal systems (e.g., agent computing systems 170, agent network 140, orchestration computing system 110) or external platforms (e.g., regulatory systems or third-party incident response tools) in response to the request. For example, the proof can be transmitted as a communication or query provided to validate attributes, operations, and/or outputs associated with tokenized data. In some examples, an indication of a proof can include a notification, message, prompt, including transmission associated with compliance statuses, response actions taken, and/or operational metrics verified using the generated proof.

Figure 6:
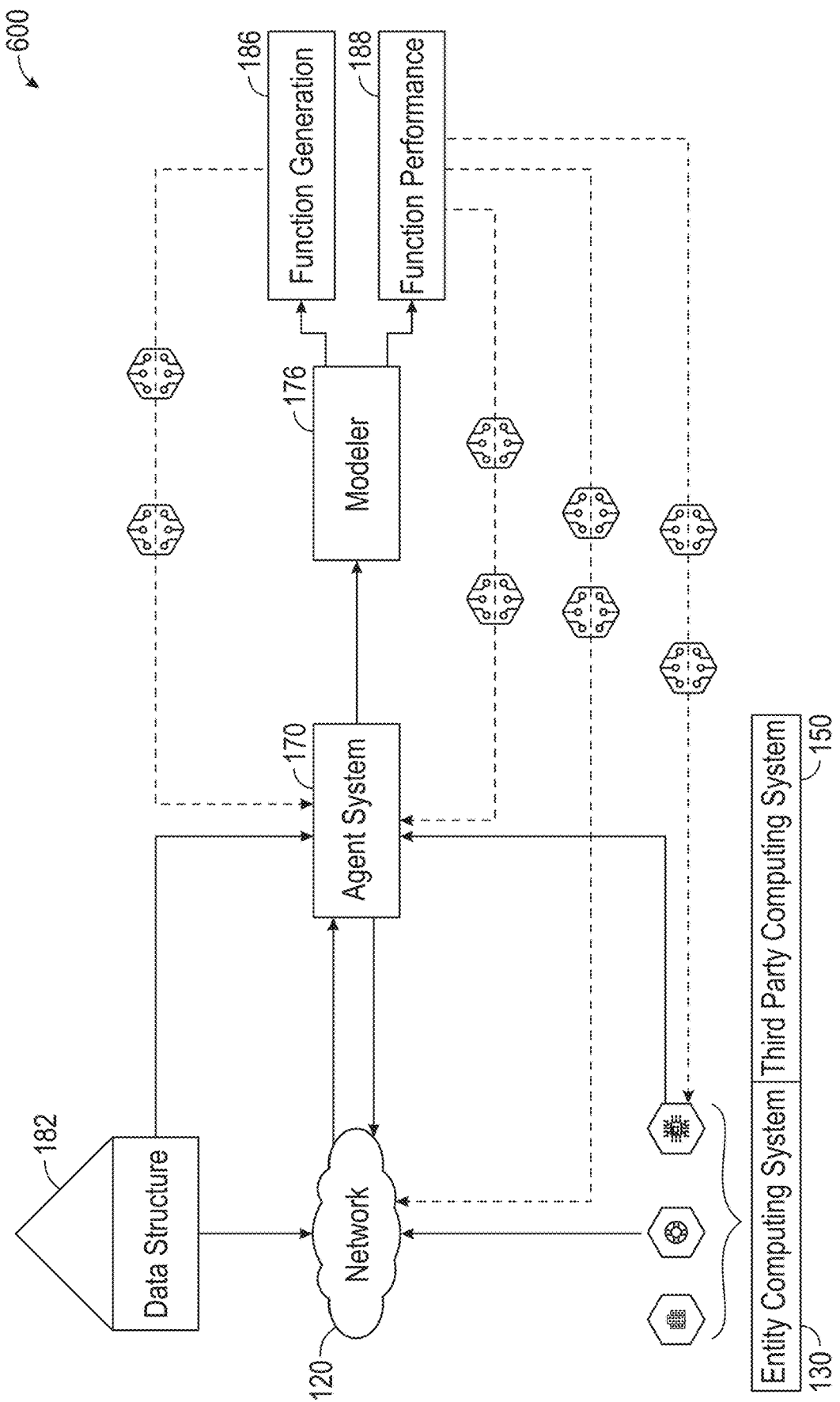
FIG. 6 depicts a block diagram of an implementation of an agent system, according to some implementations.

Referring now to FIG. 6, a block diagram of an implementation of a system 600 for an agent framework is shown, according to some implementations. The system 600 can include network 120, entity computing system 130, third-party computing system 150, data structure 182, agent system 170, modeler 176, function generation 186, and/or function performance 188 In some implementations, the agent system 170 and modeler 176 can include similar features or functionalities as described regarding the agent system 170 and modeler 176 of FIG. 4B. It should be understood that, although systems or devices of can be described or illustrated herein in a singular form, the implementation shown FIG. 4B can include any number of such systems or device. Devices, systems, and/or components shown in FIG. 4B can be added, deleted, integrated, separated, and/or rearranged in various implementations of the disclosure.

In some implementations, the agent system 170 can receive a data structure 182 or other data (e.g., metadata or processing instructions. Additionally, the agent system 170 can receive entity data or other data (e.g., cyber resilience data) from an entity computing system 130 or third-party computing system 150. Additionally, agent system 170 can receive a request from an entity or a third-party including the data. The request can be a request to verify an aspect of the cyber resilience data, fetch associated data with the cyber resilience data, perform an operation including or associated with the data, etc. The agent system 170 can receive the data structure 182, entity data, and/or other data through communications associated with network 120. The agent system 170 can receive the data and/or data structure 182 through external systems or interfaces (e.g., APIs), such as data stored in a local repository, a distributed leger, and/or any data source. In some examples, the agent system 170 can include or store the data and/or data structures 182 or retrieve the data and/or data structures 182 from other connected agents via the network 120. For example, receiving or identifying a data structure 182 can include establishing network connections, parsing historical data, monitoring, and/or detecting incidents, determining attributes associated with agents or third-parties, and/or consolidating data from distributed sources using an interface or endpoint (e.g., API, encrypted communication channel, data stream, etc.). For example, the agent system 170 can receive compliance data and an assessment request from a third-party computing system 150 and an assessment model data structure via the network 120. The assessment request can be to provide a policy assessment compared with third-party criteria.

In some implementations, the modeler 176 can perform the request. For example, the modeler 176 can perform a cyber resilience operation based on the request. The modeler can perform a predefined function (e.g., function performance 188) of the received data structure or generate a new function (function generation 186) of a framework of a received dynamic data structure 182. That is, the modeler 176 can execute the request to perform a cyber resilience operation by initiating executable functions of the data structure 182. For example, the data structure 182 can include executable functions, protocols, metadata, and/or data models. That is, the modeler can perform functions of the data structure 182 at function performance 188. For example, the data structure 182 can include executable code to assess policies using compliance tokens and in comparison to historical data. While performing functions (e.g., function performance 188), the agent system can facilitate bidirectional communication with additional or updated data to and from an entity computing system 130, third-party computing system 150, agent system 170 or network 120. For example, when the agent system 170 performs an assessment process, it can communicate to a computing system (e.g., agent system 170, entity computing system 130, third-party computing system 150) the validated compliance claims, such as through proof data.

Additionally, the modeler can perform function generation 186. That is, the modeler can generate a function corresponding to a request by using a framework of data structure 182. For example, the agent system can receive a data structure 182 including a framework to monitor data. The modeler 176 can generate functions (e.g., function generation 186) using the adaptable framework of the data structure 182 to provide incident reports to stakeholders at critical stages of the incident response timeline. That is, the modeler 176 can adjust the framework transmitted to the agent 170 from a monitoring framework to a split monitoring network and reporting data structure. The new function generated by the modeler allows the agent to communicate the outputs through the network 120 or to other computing systems discussed herein. When a new function is generated, the agent system 170 can store the new function in a database internal to the agent system 170 (e.g., database 180) or external to the agent system 170 (e.g., database communicably coupled with network 120 to store data structures 182, such as agent network 140).

Figure 7:
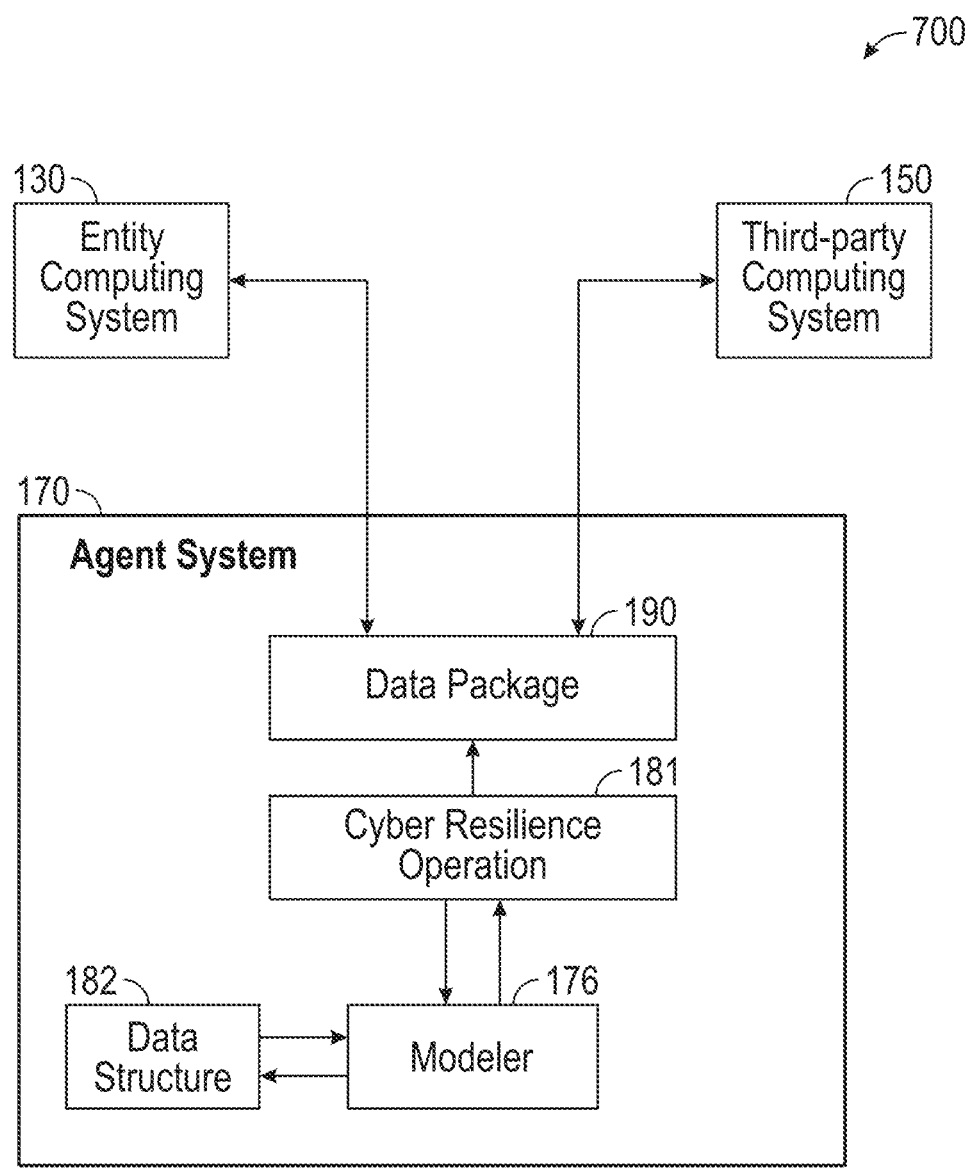
FIG. 7 depicts a block diagram of an implementation of an agent system, according to some implementations.

Referring now to FIG. 7, a block diagram of an implementation of a system 700 for an agent system 170 is shown, according to some implementations. The system 170 can include entity computing system 130, third-party computing system 150, and/or agent system 170. Agent system 170 can include data package 190, cyber resilience operation 181, modeler 176, and/or data structure 182. In some implementations, the agent system 170 and modeler 176 can include similar features or functionalities as described regarding the agent system 170 and modeler 176 of FIG. 4B. It should be understood that, although systems or devices of can be described or illustrated herein in a singular form, the implementation shown FIG. 4B can include any number of such systems or device. Devices, systems, and/or components shown in FIG. 4B can be added, deleted, integrated, separated, and/or rearranged in various implementations of the disclosure. In some implementations, the agent system 170 can include cyber resilience operations 181 and data structure 182. In some implementations, the data structure 182 and cyber resilience operation 181 can bilaterally interact with the modeler 176. In some implementations, the agent system 170 can request a compliance validation task by sending a data package 190 or data package request to a computing system (e.g., entity computing system 130, third-party computing system 150).

In some implementations, the agent system 170 can receive a data package 190. The data package 190 can correspond to a cyber resilience operation 181. For example, an entity computing system 130 and/or third-party computing system 150 can transmit a data package 190 corresponding to the defense posture of a third-party or entity. Additionally, the data package can correspond to a simulation request. The agent system 170 can determine which stored cyber resilience operation 181 and/or data structure 182 corresponds to the received data package 190. The modeler 176 can use functions and frameworks of the data structure 182 to perform cyber resilience operations 181. For example, the modeler 176 can perform a simulation request by retrieving and executing executable code from the data structure 182 that corresponds to a simulation model. That modeler 176 can update the framework of the simulation model by accessing one or more parameters of cyber resilience operations 181. The modeler 176 can incorporate the updated data structure 182 into the cyber resilience operation 181 and prepare a data package 190 to transmit to the entity computing system 130 or third-party computing system 150. In some examples, the modeler 176 can provide for a feedback loop between data structure 182 and data cyber resilience operations 181. That is, the modeler can read, model, update, write, and/or otherwise provide feedback to the data structure 182 and data cyber resilience operations 181. The feedback loops can provide for updated data packages 190 to be transmitted to computing systems. That is, the results of modeler 176 analysis can feed back into data structure 182, such as by updated data entries, refined data models, and/or enhanced function performance. The data structure 182 can additionally provide the modeler 176 with updated frameworks for performing cyber resilience operations 181. In some implementations, the modeler 176 can feed analysis and outputs into the cyber resilience operation 181 such as by updating security policies, improving detection algorithms, and/or optimizing response strategies.

Quantum-Resistant Architecture

Figure 8:
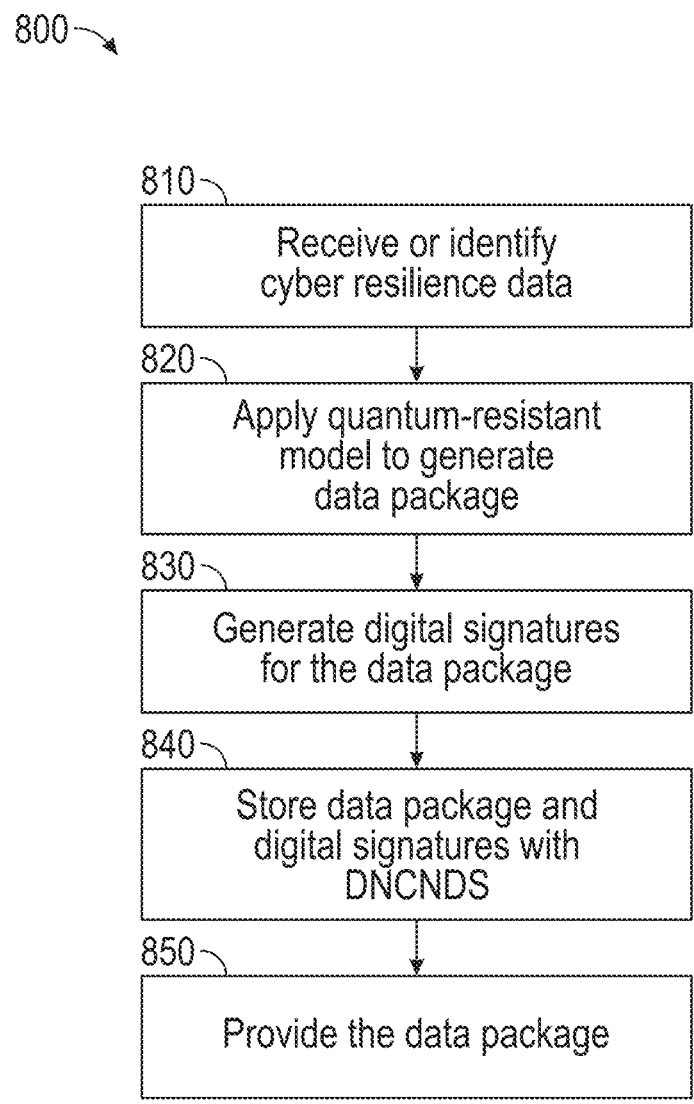
FIG. 8 depicts a flowchart of a method for providing a quantum-resistant architecture, according to some implementations.

Referring now to FIG. 8, a method 800 for providing a quantum-resistant architecture is shown, according to some implementations. In some implementations, one or more devices, systems, and/or components described with respect to FIGS. 1A-1B or FIGS. 4A-4B can perform or be utilized to perform the steps of method 800. For example, the orchestration computing system 110, agent network 140, agent computing systems 170, and/or quantum circuit 178 can perform one or more of the steps, blocks, and/or operations of the method 800. In some implementations, some, and/or all operations of method 800 can be performed by one or more processors executing on one or more computing devices, networks, systems, and/or servers. In some implementations, at least one (e.g., each) operation of method 800 can be re-ordered, added, removed, and/or repeated. In some implementations, the method 800 can include additional, fewer, and/or different operations.

In a broad overview of method 800, at block 810, one or more processing circuits (e.g., quantum circuit 178, agent network 140, etc.) can receive or identify cyber resilience data. At block 820, the one or more processing circuits can apply a quantum-resistant model to generate a data package. At block 830, the one or more processing circuits can generate digital signatures for the data package. At block 840, the one or more processing circuits can store the data package and digital signatures with a DNCNDS. At block 850, the one or more processing circuits can provide the data package.

In some implementations, at block 810, the one or more processing circuits can receive or identify cyber resilience data. In some implementations, the one or more processing circuits can receive or identify, using a cyber resilience system, cyber resilience data corresponding with at least one cyber resilience operation performed in at least one decentralized network, centralized network, and/or data source (DNCNDS). That is, the one or more processing circuits can monitor one or more autonomous or independent agents and receive data corresponding with outputs of agent functions or operations (e.g., a security posture update, generation of a new token, a request for plan pricing, etc.). For example, the cyber resilience data can include compliance-related information, security posture states, configurations or safeguards of entities, incident logs, and/or performance metrics generated by agent computing systems 170 performing one or more cyber resilience operations within the agent network 140. In some examples, the one or more processing circuits can interface with APIs or programmatic connectors provided by the agent network 140 to collect data asynchronously or in real-time. For example, an API can expose endpoints for querying updates or retrieving tokens, and/or the one or more processing circuits can initiate secure requests to the endpoints to pull relevant data sets or receive event-driven notifications related to performance of one or more operations (e.g., a compliance validation, a processing of claims, an incident detection, etc.). In some examples, the one or more processing circuits can establish and/or otherwise provide programmatic connections to external data repositories or third-party services, such as risk management platforms or compliance tools, and/or can receive or identify cyber resilience data via the established programmatic connections.

In some implementations, at block 820, the one or more processing circuits can apply and/or otherwise implement a quantum-resistant model to generate a data package. In some implementations, the one or more processing circuits can apply, using a cryptography system, a quantum-resistant model to cause the quantum-resistant model to generate a protected data package including at least the cyber resilience data. That is, the one or more processing circuits can execute cryptographic protocols configured to safeguard the cyber resilience data against potential quantum computing vulnerabilities and transform the data into a protected format. A quantum-resistant model can include or refer to any algorithm or technique configured to withstand or resistant cryptanalytic methods used by quantum computing systems. For example, the quantum circuit 178 (e.g., cryptography system) can execute and/or otherwise apply a lattice-based technique, a hash-based technique, and/or a multivariate polynomial technique to encrypt or protect at least a portion of the cyber resilience data from quantum attacks. In some implementations, the protection data package can be represented as a token. For example, the one or more processors can tokenize the cyber resilience data to generate a structured data object (e.g., performance token, proof token, safeguards token) for storage and/or transmission. That is, the one or more processors can generate a quantum-resistant or quantum-proof token including protected data secured from quantum-based computing attacks, and the quantum-resistant tokens can be used for various operations as described herein regarding other (e.g., non-quantum resistant) tokens.

In some examples, applying a lattice-based encryption technique can include the one or more processing circuits (e.g., quantum circuit 178) constructing a cryptographic lattice structure, deriving or determining programmatically intensive mathematical problems (e.g., Shortest Vector Problem (SVP) or Learning with Errors (LWE)), and/or generating a private key associated with the encrypted data. For example, the quantum circuit 178 (e.g., cryptography system) can encode the cyber resilience data into vectors within a lattice such that recovering the original data without a private key would include solving problems that are computationally infeasible (e.g., exponential time and resources on both classical and quantum computing systems due to the inherent hardness of approximating solutions to SVP or LWE within high-dimensional spaces). In some examples, applying a hash-based encryption technique can include the quantum circuit 178 generating cryptographic hashes based on one-way functions that are computationally resistant to inversion by quantum computing systems. For example, the quantum circuit 178 can apply a Merkle Tree structure by partitioning the cyber resilience data into data blocks, hashing the data recursively to create a hierarchical structure, and/or linking the data to a root hash representing the entire dataset. Further, the one or more processing circuits can verify an integrity and authenticity of the data package by verifying any data block against the root hash using a computationally efficient path.

Quantum computing systems, even with advanced parallel processing capabilities, are not well-suited to reversing one-way functions used in cryptographic hashes because of pre-image resistance (e.g., finding the original input data from a hash would provide for attempting an infeasibly large number of combinations) and collision resistance (e.g., discovering two distinct inputs producing the same hash would similarly demand computational resources exceeding the capabilities of known quantum algorithms (e.g., Grover's algorithm)). In some examples, applying a multivariate polynomial encryption technique can include the one or more processing circuits constructing a cryptographic framework using multivariate quadratic equations over finite fields to encode the cyber resilience data. For example, the quantum circuit 178 can generate a private key including transformations for scrambling polynomial variables and a corresponding public key for encrypting data. That is, the encrypted data can be represented as polynomial mappings of the original data, where decrypting or reconstructing the plaintext would include inverting the complex transformations. Without the private key, the computational difficulty of solving systems of nonlinear multivariate equations (e.g., MQ problems) renders the multivariate polynomial encryption techniques resistant to both classical and quantum-based cryptographic attacks.

In some implementations, at block 830, the one or more processing circuits can generate and/or otherwise provide digital signatures for the data package. In some implementations, the one or more processing circuits can generate, using the cryptography system, using a post-quantum signature scheme, one or more digital signatures of the protected data package. That is, the one or more processing circuits can digitally sign the encrypted cyber resilience data with quantum-safe digital signatures to verify an authenticity of the cyber resilience data or an associated data exchange. Digital signatures can include or refer to cryptographic mechanisms configured to validate or verify an authenticity, an integrity, and/or a non-repudiation of data or communications. In some implementations, a digital signature can operate as a mathematical or cryptographic association between the data and the signer, such that the digital signature uniquely binds the signer to the data. In some implementations, the digital signature can be generated by encrypting a digest or condensed representation of the data using a private key associated with the signer.

In some examples, the digital signature can be verified by decrypting and/or otherwise identifying the signature using a corresponding public key and comparing the result with a newly computed digest of the data, thereby confirming that the data has not been altered and verifying an association with the signer. For example, the one or more processing circuits can implement lattice-based signature schemes, hash-based signature schemes, and/or multivariate polynomial-based signature schemes to generate quantum-resistant digital signatures. In a lattice-based approach, the one or more processing circuits can generate a signature by solving a structured lattice problem (e.g., a short integer solution problem (SIS)) using a private key, with verification performed using the corresponding public key to confirm the validity of the signed data package. In a hash-based approach, the one or more processing circuits can construct the digital signature by applying a cryptographic hash chain (e.g., using Merkle trees or XMSS (eXtended Merkle Signature Scheme)) to generate a compact and verifiable signature. In a multivariate polynomial-based approach, the one or more processing circuits can create the digital signature by encoding a data package using a system of nonlinear polynomial equations and signing the data with a private key to produce a solution to the equations.

In some implementations, at block 840, the one or more processing circuits can store the data package and digital signatures with the at least one DNCNDS. That is, the quantum circuit 178 can interface with one or more storage systems, databases, ledgers, and/or platforms to record or maintain the protected data package and corresponding digital signatures. In some implementations, storing the data package can include recording the encrypted data and corresponding digital signatures in a secure format (e.g., an immutable blockchain structure, a tamper-evident database, and/or a distributed hash table) that resists or indicates tampering (e.g., by incorporating cryptographic hashing to detect alterations, employing consensus protocols to validate updates, and/or implementing audit trails for historical tracking) and provides access to the data package for subsequent operations. For example, the one or more processing circuits can store the data package within a decentralized blockchain system, where at least one (e.g., each) transaction is cryptographically signed and linked to previous transactions. In some examples, the one or more processing circuits can utilize a distributed hash table to fragment and distribute the data package across multiple nodes or agents. In some examples, the one or more processing circuits can store the data package and digital signatures in a tamper-evident database (e.g., a write-once, read-many (WORM) storage system or a system leveraging cryptographic append-only logs).

In some implementations, at block 850, the one or more processing circuits can provide the data package. In some implementations, the one or more processing circuits can provide, using a secure data channel, the protected data package via at least one of an identifier, interface, and/or endpoint within the at least one DNCNDS or external to the at least one DNCNDS. That is, the one or more processing circuits can provide one or more quantum-safe data channels or identifiers (e.g., a public address, an API, etc.) for accessing the protected or quantum-proof cyber resilience data. For example, the one or more processing circuits can establish quantum-safe data channels using cryptographic protocols (e.g., quantum encryption models, post-quantum secure key exchange algorithms, etc.) to securely transmit the protected data package to designated recipients (e.g., entity computing systems, third-party computing systems, nodes, agents, etc.) and/or endpoints (e.g., APIs accessible to agent network 140, one or more agent computing systems 170, etc.).

In some implementations, providing the data package can include configuring and/or otherwise adjusting the secure data channel to support internal or external data transmission. For example, an internal secure data channel can operate within a network (e.g., protected data exchanges between agent computing systems 170 or other components of the DNCNDS), and/or an external secure data channel can facilitate communication with third-party computing systems or external entities (e.g., via a quantum-safe VPN or an encrypted external API endpoint). In some implementations, the secure data channel can include quantum-resistant cryptographic protocols to maintain the integrity and confidentiality of the transmitted data package. For example, the one or more processing circuits can apply lattice-based encryption or a post-quantum key exchange algorithm to protect or secure the communication channel against quantum computing capabilities.

In some examples, the one or more processing circuits can provide an identifier or reference to the data package that can be internally or externally accessible. For example, an internally provided identifier can reference a protected location within a centralized database or ledger accessible by components of the agent network 140. Alternatively, an externally provided identifier can link to a distributed ledger for external systems to locate and verify the data package. For example, the identifier can include a cryptographic hash that recipients use to confirm the authenticity of the data package upon retrieval. In some implementations, the one or more processing circuits can provide the data package through interfaces configured for internal or external access. An internal interface can include programmatic connections between agent computing systems 170 or other subsystems within the DNCNDS, such as private APIs or system-level interconnections. An external interface can include public APIs or external connectors that are used by third-party systems to request and retrieve the data package under controlled access conditions (e.g., requiring authentication tokens or digital signatures). In another example, providing the data package via an endpoint can include determining or exposing network-accessible endpoints that are internal or external to the DNCNDS. For example, an internal endpoint can include an IP address or port number associated with a secure node or agent in the agent network 140, and/or an external endpoint can include a web service URL accessible through a quantum-safe communication protocol.

In some implementations, the protected data package secures and/or otherwise protects the cyber resilience data during transmission via the secure data channel. For example, the protected data package can include a layered cryptographic structure embedded with metadata, encrypted payloads, and/or digital signatures used for secure validation and decryption while maintaining compatibility with various quantum-resistant encryption protocols. In another example, the protected data package can include a quantum-resistant key encapsulation mechanism (KEM) with a digitally signed payload wrapper that binds the cyber resilience data to a post-quantum signature and verifies that authorized systems can decrypt and verify the data while preventing unauthorized replay or modification. In some implementations, the one or more digital signatures validate an authenticity of the cyber resilience data. That is, the digital signatures, generated using quantum-resistant cryptographic schemes (e.g., lattice-based or hash-based signature algorithms), can confirm the origin and integrity of the cyber resilience data. For example, the one or more processing circuits can compare a signature embedded in the data package with a public key associated with the sender to verify the data package has not been altered and is authentic.

In some implementations, performing the at least one cyber resilience operation includes at least one of (i) identifying, receiving, and/or transmitting, (ii) modeling or updating, and/or (iii) encrypting at least a portion of the cyber resilience data. That is, the one or more processing circuits can perform various functions to process, analyze, manage, and/or protect the cyber resilience data. For example, identifying can include monitoring or analyzing data to detect patterns, anomalies, and/or other information associated with the cyber resilience data, and/or receiving or transmitting the data can include interfacing with agent computing systems 170 or external systems to facilitate secure data exchanges. In another example, modeling or updating the cyber resilience data can include applying algorithms or techniques to analyze the cyber resilience data, generating insights or forecasts about potential vulnerabilities or threats, and/or modifying or adjusting configurations, safeguards, and/or other protections based on the cyber resilience data. In some examples, encrypting at least a portion of the data can include applying quantum-resistant algorithms to encode sensitive information within the data package.

In some implementations, the one or more processing circuits can register one or more nodes with the DNCNDS. That is, the one or more processing circuits can configure or authenticate nodes (e.g., entity computing system(s) 130, third-party computing system(s) 150, agent computing systems 170, etc.) to participate in data exchanges via the agent network 140. For example, registering a node can include assigning an identifier to agent computing system 170*n*, authenticating the agent using a digital signature or token, and/or establishing secure communication channels between the agent and other components of the DNCNDS. In some examples, registering can include updating a distributed ledger or other data source accessible via agent network 140 with data or metadata describing capabilities, permissions, and/or associated data corresponding with functions, frameworks, and/or types of the agent computing systems 170.

In some implementations, the one or more nodes exchange the cyber resilience data corresponding to the at least one cyber resilience operation. That is, the agent computing systems 170 can transmit, receive, and/or process cyber resilience data to collaboratively support operations such as threat detection, configuration management, and/or performance monitoring. For example, the nodes or agents can exchange encrypted data packets containing incident logs, compliance metrics, and/or security posture updates via quantum-resistant communication protocols with other systems or devices of the agent network 140 or external to the agent network 140. In another example, the nodes can aggregate and relay cyber resilience data to a centralized processing node or master agent.

In some implementations, the one or more processing circuits can identify, using a node analysis system, historical performance data corresponding to a plurality of cyber resilience operations performed by the one or more nodes. That is, the one or more processing circuits can collect and analyze performance logs, operational metrics, and/or other historical data associated with agent computing systems 170 participating in the DNCNDS to determine a reputation or other metric associated with one or more agents. For example, the node analysis system can identify or access data describing past configurations, threat detections, response times, and/or compliance verifications performed by the nodes during prior cyber resilience operations by querying distributed ledgers, centralized databases, and/or other repositories data such as activity and outcomes or outputs associated with nodes. In some implementations, the one or more processing circuits can determine, using the node analysis system, based on the historical performance data, at least one ranking or evaluation metric corresponding to the one or more nodes. That is, the node analysis system can apply algorithms, machine learning models, predefined scoring criteria, matrices, and/or other rankings to evaluate the effectiveness, reliability, and/or efficiency of the nodes.

For example, the one or more processing circuits can calculate and/or otherwise determine a performance score for at least one (e.g., each) node based on factors such as response accuracy, execution speed, and/or success rates of completed cyber resilience operations. In some examples, the ranking or evaluation metrics can include categorizations such as high-priority nodes, critical nodes, and/or low-performing nodes, which can inform operational decision-making within the DNCNDS. In some implementations, the one or more processing circuits can update, using the node analysis system, the at least one ranking or evaluation metric responsive to performance of the at least one cyber resilience operation by at least one of the one or more nodes. That is, the node analysis system can dynamically adjust a ranking or evaluation metric dynamically or periodically based on the results, outputs, and/or performance data associated of performed operations. For example, if agent computing system 170*a* successfully mitigates a detected threat or improves compliance with security standards, the ranking or evaluation metric of the agent can increase. In another example, if agent computing system 170*b* fails to respond within a predefined timeframe or produces errors during a cyber resilience operation, the evaluation metric of the agent can decrease. In some examples, receiving or identifying an updated ranking or evaluation metric can trigger automated actions or responses, such as reallocating tasks to higher-performing nodes or initiating maintenance protocols or updates for underperforming nodes.

In some implementations, the one or more nodes include one or more autonomous agents configured to perform the at least one cyber resilience operation using at least one function or frameworks of the one or more autonomous or independent agents. That is, the nodes can execute independent or coordinated tasks to analyze, protect, and/or improve the cyber resilience of the DNCNDS using stored functions (e.g., threat detection algorithms, compliance validation routines, and/or performance monitoring protocols) or frameworks (e.g., role-based access control structures, encryption schemes, and/or machine learning models). In some examples, the autonomous agents can operate asynchronously or in real-time to perform actions such as identifying vulnerabilities, updating configurations, and/or generating insights based on received data. In some implementations, the at least one function or framework corresponds to at least one of (i) updating a computing environment, (ii) generating and providing an assessment to a plurality of computing systems, and/or (iii) updating a dashboard.

For example, updating a computing environment can include the one or more processing circuits or an agent modifying or adjusting system configurations, deploying security patches, and/or reconfiguring access controls to enhance the resilience of the environment against potential threats. In some examples, generating and providing an assessment can include the one or more processing circuits or an agent aggregating cyber resilience metrics, analyzing performance trends, and/or identifying vulnerabilities and providing reports and/or recommendations to the agent network 140 or external systems. In another example, updating a dashboard can include the one or more processing circuits or an agent dynamically presenting and/or otherwise providing real-time or historical cyber resilience data, visualizing compliance metrics, and/or displaying system statuses and actionable insights to support decision-making processes.

In some implementations, the one or more processing circuits can generate or identify, using a compliance verification system, one or more cryptographic proofs of compliance corresponding with the at least one cyber resilience operation satisfying at least one operational or regulatory parameter. That is, generating or identifying the proofs can include the one or more processing circuits verifying whether actions or configurations performed by the nodes align with predefined rules or standards (e.g., an operational or regulation parameter) and generating cryptographic evidence of the compliance with the rules or standards. For example, the compliance verification system can validate that a security update was applied successfully or that access controls conform to operational or regulatory parameters (e.g., GDPR, HIPAA, etc.) using one or more proofs. For example, the one or more processing circuits can generate an indication that a data encryption protocol is satisfying current confidentiality thresholds or other operational standards. For example, the compliance verification system can generate cryptographic proofs corresponding with or satisfying regulatory requirements, such as those related to data retention policies for sensitive information. That is, satisfying at least one operational or regulatory parameter can include satisfying data encryption requirements, satisfying access control thresholds, and/or verifying compliance with data retention standards.

In some implementations, the one or more cryptographic proofs include at least one zero-knowledge proof (ZKP). That is, the compliance verification system can generate cryptographic evidence that provides or demonstrates compliance without revealing underlying sensitive data. For example, a zero-knowledge proof of ZKP can confirm that a data exchange or other task (e.g., any type of operation, process, etc.) aligns with various standards (e.g., encryption standards) or requirements (e.g., audit requirements, etc.) without exposing the contents of the data exchanged and while safeguarding or protecting associated transaction details. In some examples, the ZKP can include a succinct non-interactive argument of knowledge (SNARK) or other quantum-resistant proof schemes to protect against quantum computing techniques. In some implementations, the one or more processing circuits can transmit, using the compliance verification system, via at least one of the identifier, interface, and/or endpoint, compliance data corresponding with the at least one ZKP to at least one third-party or regulatory entity. That is, the compliance verification system can interface with external systems or entities (e.g., third-party or regulatory entity) to share compliance-related information securely. For example, the compliance verification system can transmit a ZKP to a regulatory authority or a third-party auditor via an API or encrypted communication channel. A third-party or regulatory entity can include or refer to any external organization, authority, and/or other stakeholder (e.g., protection vendors, insurers, cybersecurity monitoring services, auditors, compliance officers, government agencies, contractual partners, industry certification bodies, and/or other entities) associated with evaluating, verifying, certifying, and/or supporting a compliance of the cyber resilience operations with various standards, policies, contractual obligations, and/or regulations.

In some implementations, the quantum-resistant model or the post-quantum signature scheme corresponds with at least one of a lattice-based, hash-based, code-based, or multivariate polynomial technique. That is, the quantum circuit 178 (e.g., cryptography system) can apply quantum-safe techniques or algorithms to protect or safeguard data, as described above. In some implementations, the one or more processing circuits can apply a hybrid cryptographic model including the quantum-resistant model and/or post-quantum signature scheme and at least one non-quantum model or signature scheme configured to encrypt or validate at least a portion of the cyber resilience data. For example, a hybrid cryptographic model can include a non-quantum model including symmetric encryption algorithms (e.g., AES, DES, 3DES, Blowfish, ChaCha20), public key encryption techniques (e.g., RSA, ElGamal, Diffie-Hellman, which rely on integer factorization or discrete logarithms and are distinct from lattice-based quantum-resistant methods), cryptographic hash functions (e.g., SHA-1, SHA-256, MD5, RIPEMD, as opposed to quantum-resistant Merkle Tree-based hashing), key derivation functions (e.g., PBKDF2, bcrypt, Argon2), format-preserving encryption, deterministic encryption, stream ciphers (e.g., RC4, Salsa20), lightweight encryption protocols for IoT, and/or proprietary or industry-specific cryptographic standards (e.g., PCI DSS-compliant encryption, HIPAA-compliant methods).

For example, a hybrid cryptographic model can include a non-quantum signature scheme including RSA-based digital signatures, Elliptic Curve Digital Signature Algorithm (ECDSA, which uses elliptic curves over finite fields and differs from multivariate polynomial-based quantum-resistant schemes), Digital Signature Algorithm (DSA), hash-based message authentication codes (HMAC, as distinct from post-quantum hash-based signature systems like XMSS), certificate-based signatures using X.509 certificates, Merkle Tree-based signatures (non-quantum versions relying on classical hash functions), threshold cryptography for distributed signing, Lamport signatures (non-quantum forms), and/or systems using certificate authorities for hierarchical trust models (e.g., TLS, PKI). A hybrid cryptographic model or hybrid protocol can include or refer to using or implementing a combination of quantum-safe cryptographic techniques and non-quantum-safe cryptographic methods to encrypt, validate, and/or process portions of the cyber resilience data.

In some implementations, the one or more processing circuits can select, using the cryptographic system, the quantum-resistant model, the post-quantum signature scheme, and/or the at least one non-quantum model or signature scheme based on a configuration or type corresponding with the at least one of the identifier, interface, and/or endpoint. That is, the cryptographic system can analyze operational or regulatory parameters or attributes associated with the data, such as sensitivity, intended recipients, regulatory requirements, and/or performance constraints, to determine an appropriate cryptographic approach (e.g., whether to use quantum-safe techniques, non-quantum techniques, and/or a combination of both). For example, the cryptographic system can prioritize quantum-resistant models for endpoints associated with long-term data storage or high-security transactions to protect against future quantum computing threats, while selecting non-quantum models for environments with compatibility requirements or existing system constraints. In some examples, the cryptographic system can determine or evaluate a type of data package or identifier (e.g., whether the package or identifier corresponds with sensitive compliance information, operational data, and/or metadata) and apply quantum-resistant techniques (e.g., lattice-based encryption) for sensitive data and non-quantum techniques (e.g., AES) for less sensitive data. In another example, the cryptographic system (e.g., quantum circuit 178) can assess that an interface or endpoint supports or does not support internal communications within the agent network 140 or external interactions with third-party systems, apply lightweight encryption or non-quantum models (e.g., for speed) to internal endpoints and/or interfaces, and/or apply quantum-resistant models and post-quantum signature schemes to improve data integrity and/or authenticity during external exchanges.

Figure 9:
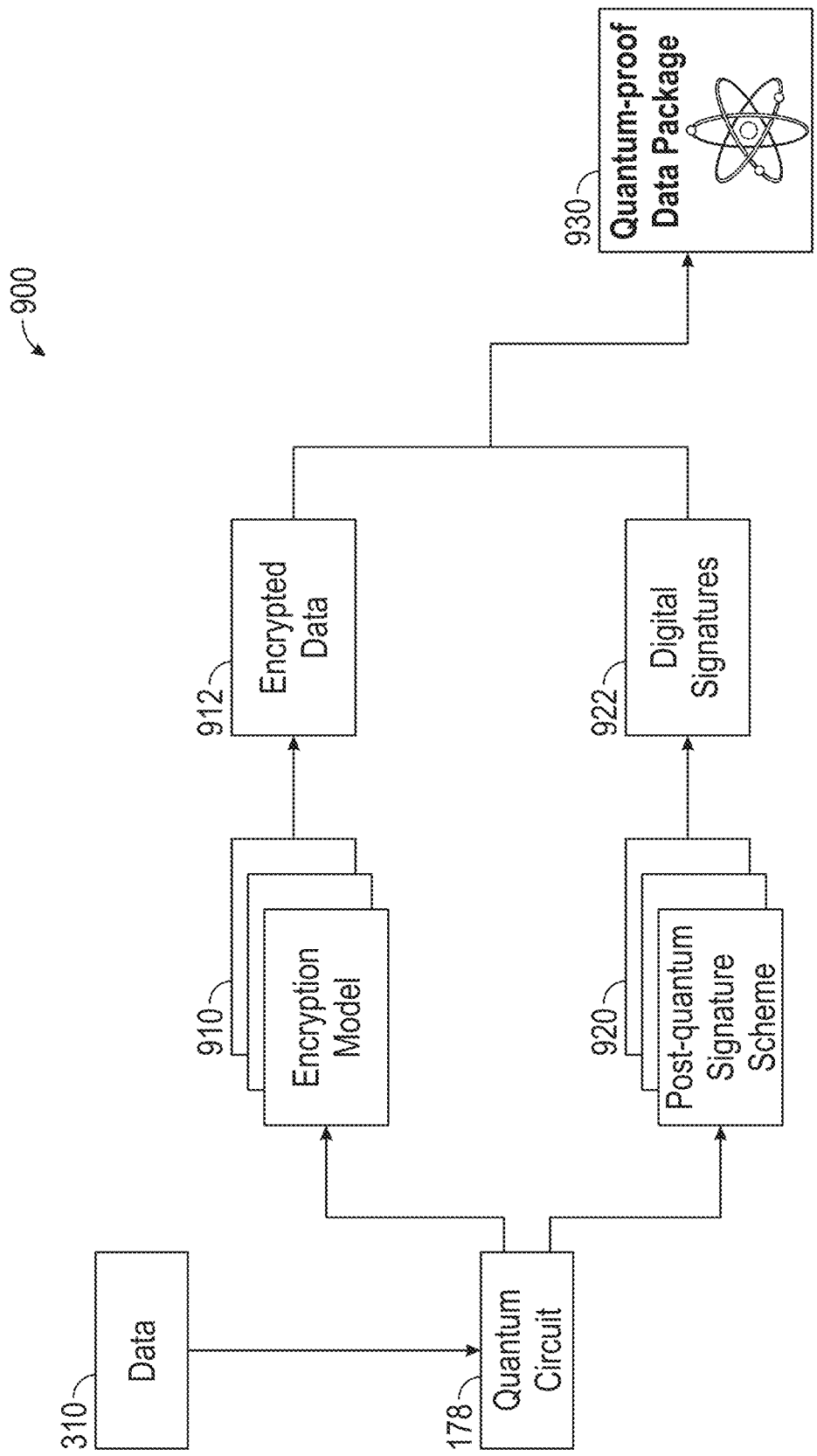
FIG. 9 depicts a block diagram of an implementation of a system for providing a quantum-resistant architecture, according to some implementations.

Referring now to FIG. 9, a system 900 for providing a quantum-resistant architecture is shown, according to some implementations. In some implementations, the implementation shown on FIG. 9 includes the quantum circuit 178, data 310 (e.g., cyber resilience data 310), encryption model(s) 910, encrypted data 912, post-quantum signature scheme(s) 920, digital signatures 922, and/or a quantum proof data package 930. It should be understood that, although systems or devices of FIG. 9 can be described or illustrated herein in a singular form, the implementation shown FIG. 9 can include any number of such systems or device. Devices, systems, and/or components shown in FIG. 9 can be added, deleted, integrated, separated, and/or rearranged in various implementations of the disclosure.

In some implementations, the quantum circuit 178 can receive or identify cyber resilience data 310. That is, the quantum circuit 178 can interface with one or more data sources, systems, and/or platforms within or external to the DNCNDS (e.g. agent network 140) to obtain cyber resilience data 310. For example, the quantum circuit 178 can monitor agent computing systems 170 (e.g., autonomous or independent agents) or query distributed ledgers, databases, and/or external APIs to retrieve performance metrics, security configurations, compliance data, and/or other parameters. In some examples, the quantum circuit 178 can utilize network protocols or secure data channels to collect data asynchronously or in real-time from various sources. In some implementations, the quantum circuit 178 can preprocess or classify the received data (e.g., separating sensitive data from operational metadata) to prepare the data for encryption or signature generation.

In some implementations, the quantum circuit 178 can include, interface with, and/or access one or more encryption models 910 or post-quantum signature schemes 920. For example, the quantum circuit 178 can access and/or otherwise identify the encryption model 910 to retrieve or execute algorithms such as lattice-based encryption, code-based encryption, and/or hybrid quantum-safe encryption techniques (e.g., hybrid cryptographic model) configured to protect sensitive data against potential quantum cryptographic threats. In another example, the quantum circuit 178 can interface with the post-quantum signature schemes 920 to generate, validate, and/or manage cryptographic signatures using post-quantum algorithms, such as hash-based schemes (e.g., XMSS), lattice-based schemes (e.g., Dilithium), and/or multivariate polynomial schemes (e.g., Rainbow). In some examples, the encryption models 910 and post-quantum signature schemes 920 can be dynamically selected or configured based on operational or regulatory parameters and/or other values (e.g., sensitivity of the data, compatibility with external systems) regulatory compliance parameters, etc.

In some implementations, the quantum circuit 178 can apply and/or otherwise utilize the encryption model 910 with the cyber resilience data 310 to generate encrypted data 912. That is, the quantum circuit 178 can execute quantum-resistant encryption techniques provided by the encryption model 910 to transform the cyber resilience data 310 into a secure and/or encrypted format. For example, the quantum circuit 178 can apply lattice-based encryption algorithms to encode the data into high-dimensional structures that are computationally infeasible for quantum or classical systems to decrypt without the appropriate key.

In another example, the quantum circuit 178 can implement and/or otherwise utilize code-based encryption techniques to generate encrypted data 912 by encoding the data using error-correcting codes (e.g., McEliece cryptosystem). That is, a code-based technique can include or refer to code-based encryption models, code-based key generation mechanisms, and/or error-correcting code-based algorithms for transforming data into secure or encrypted formats. In some examples, the quantum circuit 178 can apply hybrid encryption techniques (e.g., a hybrid cryptographic model) that combine quantum-resistant methods with non-quantum cryptographic approaches (e.g., AES for performance optimization alongside lattice-based key encapsulation). That is, a hybrid cryptographic model can include both quantum and non-quantum models. In some implementations, the encrypted data 912 can include additional metadata or cryptographic elements, such as initialization vectors, nonce values, and/or digital tags, to improve security and integrity. For example, the quantum circuit 178 can append a cryptographic tag to the encrypted data to support authentication or tamper detection during transmission or storage. In another example, the encrypted data 912 can be formatted as a structured data object (e.g., a containerized payload) for interoperability with other systems or frameworks within the DNCNDS or external systems.

In some implementations, the quantum circuit 178 can apply and/or otherwise implement the post-quantum signature scheme 920 to the cyber resilience data 310 or encrypted data 912 to generate digital signatures 922. That is, the quantum circuit 178 can execute post-quantum cryptographic algorithms provided by the post-quantum signature scheme 920 to create secure and verifiable signatures associated with the cyber resilience data 310. For example, the quantum circuit 178 can apply lattice-based signature schemes generate signatures resistant to quantum cryptanalysis by leveraging the hardness of lattice-based problems. In another example, the quantum circuit 178 can utilize hash-based signature schemes (e.g., XMSS or LMS) to construct signatures by hashing the data multiple times and organizing the hashed data into a Merkle Tree structure for validation. In some examples, the quantum circuit 178 can use multivariate polynomial-based signature schemes to encode the cyber resilience data 310 into nonlinear equations, producing signatures that are computationally infeasible to forge or reverse without the private key. In some examples, the quantum circuit 178 can format the digital signatures 922 to align with industry standards or regulatory requirements. For example, the digital signatures 922 can be formatted as JSON Web Signatures (JWS) or embedded within X.509 certificates to ensure compatibility with public key infrastructure (PKI) systems. In another example, the quantum circuit 178 can transmit the digital signatures 922 alongside the encrypted data 912 (e.g., encapsulated within quantum-proof data package 930) to support end-to-end cryptographic validation across distributed systems.

In some implementations, the quantum circuit 178 can generate and/or otherwise provide the quantum proof data package 930. That is, the quantum circuit 178 can combine the encrypted data 912 and digital signatures 922 into a unified or secure data structure (e.g., a protected data package) configured to support quantum-resistant cryptographic validation. In some implementations, generating the quantum proof data package 930 can include the quantum circuit 178 organizing, encoding, and/or linking the encrypted data 912 and digital signatures 922 (e.g., with metadata or additional cryptographic elements) to form an interoperable and tamper-resistant package. For example, the quantum circuit 178 can generate a package by associating the encrypted data 912 with digital signatures 922 through references, embedded metadata, and/or linked cryptographic elements. In some implementations, generating can include the quantum circuit 178 incorporating or embedding a payload integrity mechanism (e.g. a digital checksum or other cryptographic marker) within the quantum proof data package 930 to verify data integrity during transmission or storage. In another example, the quantum circuit 178 can generate a header for the quantum proof data package 930 including routing, authentication, and/or versioning information to support compatibility with various systems or networks. For example, the header can include fields specifying the cryptographic methods used (e.g., lattice-based encryption, hash-based signature schemes) and identifiers for the origin or intended recipient of the quantum proof data package 930. In some implementations, the quantum proof data package 930 can include or refer to a protected or quantum-safe data package by linking the encrypted data 912 and digital signatures 922 in a structure configured to resist quantum-based cryptographic attacks. Quantum-based cryptographic attacks and quantum-proof techniques are described further herein with regard to FIG. 10.

Figure 10:
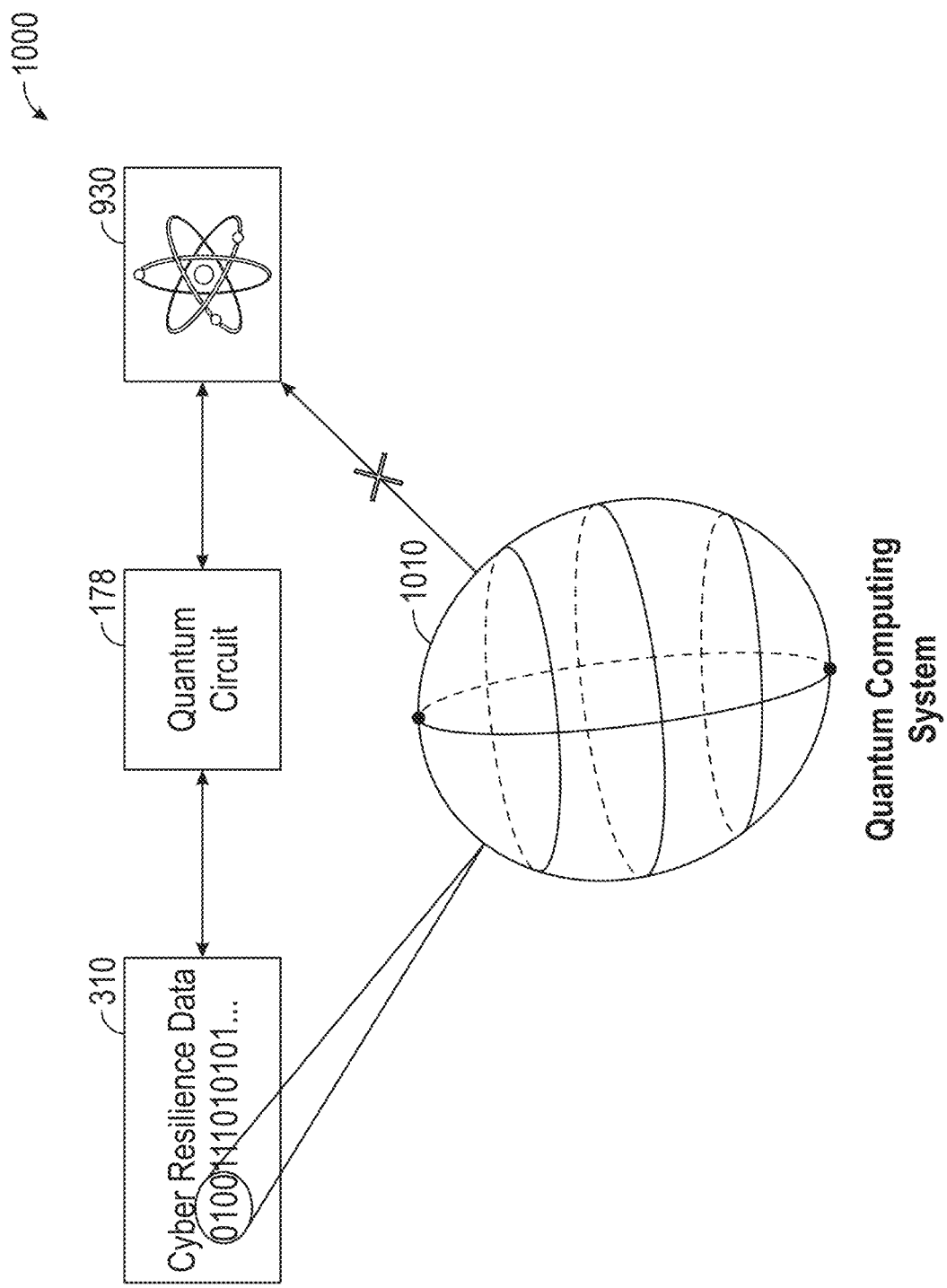
FIG. 10 depicts a block diagram of an implementation of a system for providing a quantum-resistant architecture, according to some implementations.

Referring now to FIG. 10, a system 1000 for providing a quantum-resistant architecture is shown, according to some implementations. In some implementations, the implementation shown on FIG. 10 includes the quantum circuit 178, cyber resilience data 310, quantum-proof data package 930, and/or quantum computing system 1010. In some implementations, the system 1000 resists quantum-based attacks from the quantum computing system 1010 and prevents the quantum computing system 1010 from accessing data included in the quantum-proof data package 930. It should be understood that, although systems or devices of FIG. 10 can be described or illustrated herein in a singular form, the implementation shown FIG. 10 can include any number of such systems or device. Devices, systems, and/or components shown in FIG. 10 can be added, deleted, integrated, separated, and/or rearranged in various implementations of the disclosure.

In some implementations, the quantum computing system 1010 can include or refer to computational systems configured to exploit quantum mechanical phenomena (e.g., superposition, entanglement, and/or tunneling) to perform high-complexity operations at significantly faster rates compared to classical computing systems. That is, the quantum computing system 1010 can execute one or more quantum algorithms or techniques, such as Shor's algorithm for factorizing large integers, which can compromise non-quantum models or encryption schemes, and/or Grover's algorithm, which can accelerate the search for vulnerabilities in cryptographic hashes. In some implementations, the quantum computing system 1010 includes one or more quantum bits (qubits, as shown on FIG. 10) as fundamental units of information. Unlike classical bits, which exist in binary states (0 or 1), qubits can represent and process information in multiple states simultaneously due to superposition. For example, qubits in the quantum computing system 1010 can simultaneously represent combinations of 0 and 1 and facilitate parallel computations that surpass the linear operations of classical computing systems.

In some implementations, the cyber resilience data 310 can be vulnerable and/or otherwise exposed to attacks or breaches by the quantum computing system 1010. That is, the quantum computing system 1010 can target unprotected or inadequately protected data structures (e.g., data objects secured by non-quantum techniques) by executing brute force decryption techniques at a scale that classical systems cannot achieve. For example, the quantum computing system 1010 can apply Shor's algorithm to factorize large integers or compute discrete logarithms by leveraging quantum parallelism, which allows rapid decomposition of cryptographic keys into their prime factors or resolution of mathematical problems that form the basis of encryption methods such as RSA, Diffie-Hellman, and/or ECC. For example, the quantum computing system 1010 can apply Grover's algorithm to iteratively query a superposition of all possible cryptographic keys and can use quantum parallelism to identify the correct key in roughly the square root of the total search space, significantly weakening symmetric encryption methods (e.g., AES). In another example, the quantum computing system 1010 can exploit the structure of hash functions by using quantum amplitude amplification to identify hash collisions, rapidly producing two distinct inputs that generate the same hash value, thereby undermining data integrity and authentication mechanisms used in non-quantum hash-based encryption schemes.

In some implementations, the quantum circuit 178 can transform and/or otherwise model unprotected cyber resilience data 310 into the quantum-proof data package 930 to improve network security and prevent quantum-based attacks. That is, the quantum-proof data package 930 can protect stored data within the package from unauthorized exposure or access by the quantum computing system 1010. For example, the quantum-proof data package 930 can provide a structured and verifiable cryptographic solution to address technical challenges posed by advanced computational threats, such as those introduced by quantum computing systems. For example, the quantum-proof data package 930 can combine quantum-resistant encryption algorithms with post-quantum signature schemes to provide a cryptographic framework that mitigates risks associated with quantum decryption techniques (e.g., prevents breaches or data exposures facilitated by quantum hacking techniques such as Shor's algorithm, Grover's algorithm, and/or other advanced computational or quantum-based techniques configured to break non-quantum encryption protocols). By integrating encryption and signature data into a unified structure, the quantum-proof data package 930 can reduce exposure to cryptographic attacks while supporting data validation and secure interoperability across distributed or centralized systems, networks, and/or other computing environments.

In some implementations, the quantum-proof data can be included in a knowledge graph. For example, the quantum-proof data can be encapsulated in a node in a knowledge graph including include nodes and edges. That is, the nodes of a knowledge graph can represent quantum proof-data packages and tokens thereof and at least one edge (e.g., each) can be a relationship. For example, at least one (e.g., each) node of the knowledge graph can correspond to a digital representation of the cryptographic framework. For example, cyber resilience data (e.g., quantum-proof data) can be represented as a token before or after encryption occurs. The edges of the knowledge graph can be relationships between the data packages, such as dependencies, causal links, and/or shared attributes across different nodes. That is, at least one (e.g., each) edge can include one or more associations between the first token and additional tokens. That is, an edge can denote that quantum-proof data in one organization is shares protected data within a package of another organization. The graph can include unilateral or bilateral edges to signify one- or two-way relationships between the nodes. The knowledge graph can be used to facilitate advanced analytics and AI-driven insights for cybersecurity and risk management.

Cyber Resilience Tokenization

Figure 11:
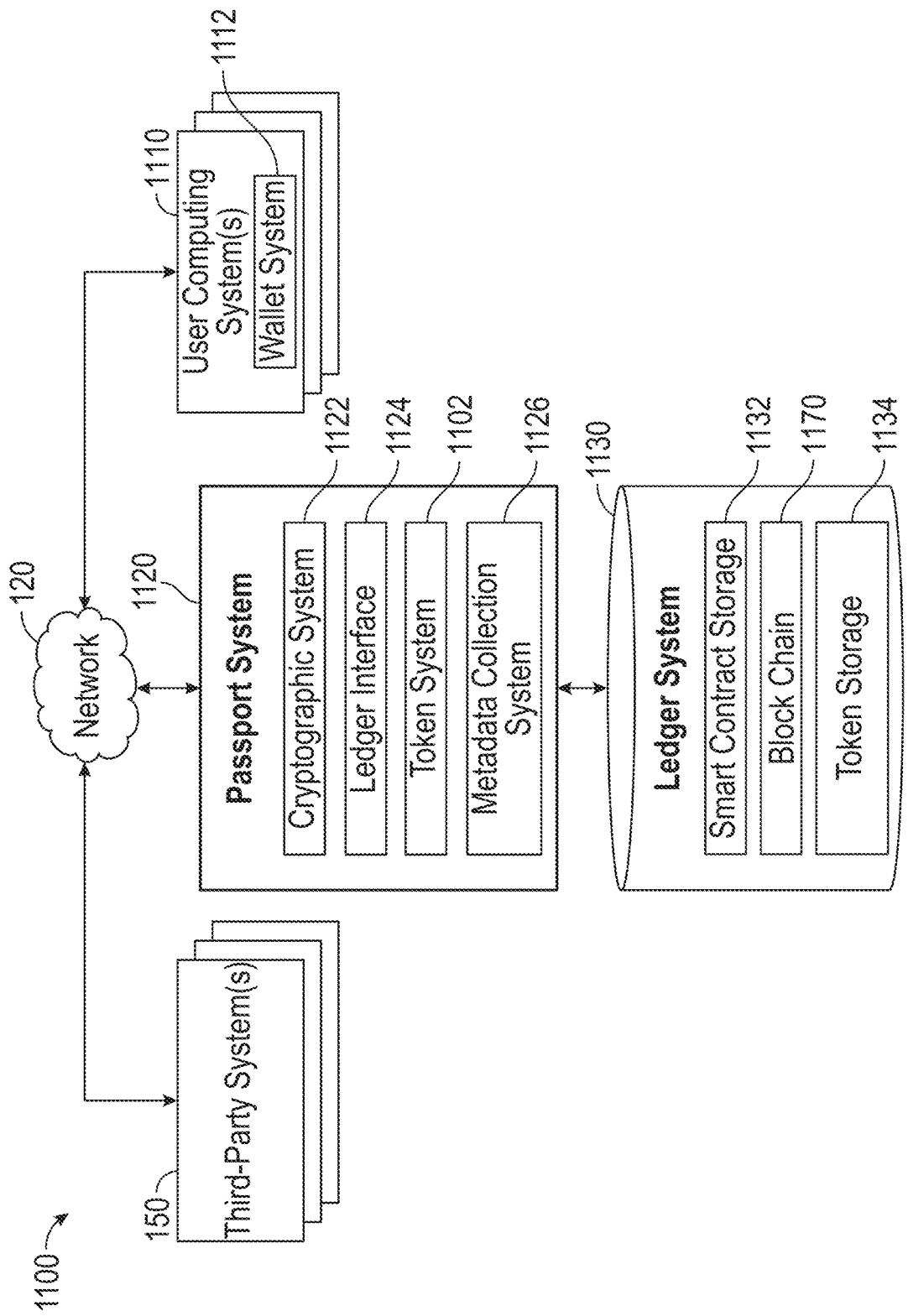
FIG. 11 depicts a block diagram of an implementation of a system for cyber resilience tokenization, according to some implementations.

Referring to FIG. 11, a block diagram of an implementation of a system for cyber resilience tokenization is shown, according to some implementations. The implementation shown in FIG. 11 can include user computing system(s) 1110, third-party system(s) 150 (also referred to herein as "third-party devices 150", "third-party systems 150", and/or "third-party devices 150"), a passport system 1120, and/or a ledger system 1130. In some implementations, the user computing system(s) 1110 can include a wallet system 1112. In some implementations, the user computing system(s) 1110 can be similar to entity computing system(s) 130 described herein. In some implementations, the passport system 1120 can include a cryptographic system 1122, a ledger interface 1124, a token system 1102, and/or a metadata collection system 1126. In some implementations, the ledger system 1130 can include smart contract storage 1132, blockchain 1170, and/or token storage 1134. These components can be interconnected through a network 120 that supports secure communications profiles (e.g., TLS, SSL, HTTPS, etc.). In some implementations, the passport system 1120 can incorporate the same or similar features and/or functionality as described regarding the response system 130 of FIG. 1. Although the various computing elements of FIG. 11 can be described in the singular form (e.g., user computing system 1110, third-party system 150, etc.), it should be understood that the implementation shown in FIG. 11 can include two or more of any device/system described herein (e.g., two or more user computing system(s) 1110, two or more third-party system(s) 150, etc.).

Each system or device of FIG. 11 can include one or more processors, memories, network interfaces (sometimes referred to herein as a "network circuit") and user interfaces (e.g., GUIs). The memory can store programming logic that, when executed by the processor, controls the operation of the corresponding computing system or device. The memory can also store data in databases. For example, memory can store programming logic that when executed by a processor within a processing circuit, causes a database to update parameters or store a system or event log. The network interfaces can allow the computing systems and devices to communicate wirelessly or otherwise. The various components of devices in system 1100 can be implemented via hardware (e.g., circuitry), software (e.g., executable code), and/or any combination thereof. Devices, systems, and/or components in FIG. 11 can be added, deleted, integrated, separated, and/or rearranged in various implementations of the disclosure.

Generally, the user computing system(s) 1110, third-party system(s) 150, passport system 1120, and/or ledger system 1130, wallet system 1112, cryptographic system 1122, ledger interface 1124, token system 1102, metadata collection system 1126, smart contract storage 1132, blockchain 1170, token storage 1134, and/or network 120 can include one or more logic devices, which can be one or more computing devices equipped with one or more processing circuits that run instructions stored in a memory device to perform various operations. The processing circuit can be made up of various components such as a microprocessor, an ASIC, and/or an FPGA, and/or the memory device can be any type of storage or transmission device capable of providing program instructions. The instructions can include code from various programming languages commonly used in the industry, such as high-level programming languages, web development languages, and/or systems programming languages. The user computing system(s) 1110, third-party system(s) 150, passport system 1120, and/or other various components of FIG. 11 can also include one or more databases for storing data that receive and provide data to other systems and devices on the network 120.

Generally, the passport system 1120 can execute and/or be utilized to execute various processes and/or tasks corresponding with modeling cyber resilience data. In some implementations, the passport system 1120 can be utilized by an agent system (e.g., agent system 170), such as a function or subfunction of an agent system 170. For example, agent system 170 can have as a function, the passport system 1120, which can provide a single sign-on gateway (e.g., using an identity management system like AuthO) facilitating access to an associated security posture of a user, threat, incident, and/or insurance data sets using data sets encapsulated within various tokens. For example, the passport system 1120 can generate a token (e.g., a passport) linked to various additional tokens and further linked to a control structure restricting access to one or more of the additional tokens based on rules (e.g., RBACs). For example, a cyber resilience identifier (e.g., passport) of an entity can include entity data and/or additional cyber resilience data stored in tokens, and/or the passport system 1120 can provide and/or restrict access to one or more portions of the tokenized data based on various conditions, entity types, data types, regulations, etc. That is, an entity can have a control structure with access controls and a passport created by the passport system 1120 linked to both sensitive (e.g., private) and non-sensitive (e.g., public) data, and/or the passport system 1120 can deny access (e.g., to sensitive data) and provide access (e.g., to non-sensitive data) based the access control (e.g., whether the user to access the data is a customer, insurer, vendor, MDR/XDR provider, etc.).

Generally, the passport system 1120 can provide secure access to token-related data and facilitate interactions between different cybersecurity systems and data sources of FIG. 11 (e.g., user computing systems 1110, third-party systems 150, ledger system 1130, etc.) based on various access controls. For example, the passport system 1120 can create a cyber resilience identity with tokens and rule-based access controls controlling access to the tokens. For example, the passport system 1120 can generate a passport for a third-party linked to controls such that the third-party can only access their own data within the token structure. In some implementations, a third-party entity can use the passport system 1120 to access performance tokens stored in the token structure, such as in a passport associated with the cybersecurity status of an entity, with RBAC rules restrict other entities from viewing or modifying these tokens. Another example can include third-party vendors having access to their own evaluation tokens that include the results of security assessments relevant to their services, without the ability to access data from other vendors.

In some implementations, the passport system 1120 can include one or more processing circuits, including processor(s) and memory. The memory can have instructions stored thereon that, when executed by processor(s), cause the one or more processing circuits to perform the various operations described herein. The operations described herein can be implemented using software, hardware, and/or a combination thereof. The processor(s) can include a microprocessor, ASIC, FPGA, etc., and/or combinations thereof. In many implementations, the processor (s) can be a multi-core processor or an array of processors. Memory can include, but is not limited to, electronic, optical, magnetic, and/or any other storage devices capable of providing processor(s) with program instructions. The instructions can include code from any suitable computer programming language. In some implementations, the passport system 1120 can include an interface circuit and function circuit.

In some implementations, the passport system 1120 can model cyber resilience data using cyber resilience identities and associated metadata. For example, the passport system 1120 can use templates to structure cyber resilience data and apply attributes to model various cyber resilience metrics (e.g., threat detection capabilities, response readiness). In some implementations, the passport system 1120 can receive or identify cyber resilience data. For example, the passport system 1120 can collect data from various sources, including security incident reports, vulnerability assessments, and/or system performance metrics. In some implementations, the passport system 1120 can encrypt a portion of the cyber resilience data. For example, the passport system 1120 can apply cryptographic techniques to secure sensitive information within the cyber resilience dataset, such as private keys or confidential incident data. In some implementations, the passport system 1120 can generate a metadata object including metadata of cyber resilience data. For example, the metadata object can include information such as data creation timestamps, data source identifiers, and/or encryption keys. In some implementations, the passport system 1120 can generate a cyber resilience identity including at least a link with the metadata object, a unique identifier (UID), and/or a performance event dataset. For example, the cyber resilience identity can include a URI linking to the metadata object, a UID for tracking the identity, and/or a dataset summarizing key performance events. In some arrangements, the cyber resilience identity and/or associated data (e.g., linked tokens) can be secured or protected using quantum-safe encryption and/or digital signature techniques.

In some implementations, the passport system 1120 can encapsulate the cyber resilience identity within a control structure restricting one or more updates and redemptions of the metadata object. For example, the control structure can use access controls and permission rules to prevent unauthorized modifications or access to the metadata object. In some implementations, the passport system 1120 can determine at least one access data structure being compatible with the control structure. For example, the passport system 1120 can analyze data structures such as access control lists (ACLs) or role-based access controls (RBAC) to facilitate compatibility with the control structure. In some implementations, the passport system 1120 can broadcast, using the control structure, the cyber resilience identity to a ledger or distributed ledger. For example, the passport system 1120 can publish the cyber resilience identity to agent network 140, and/or the identify can be securely recorded and accessed by authorized entities via the agent network 140.

In some implementations, the token system 1102 can generates various tokens. In some implementations, the token system 1102 can generate cyber resilience identities (e.g., a passport including a token linked to various additional tokens with metadata). That is, generating the cyber resilience identities can include generating tokens that include metadata objects or metadata with information corresponding to components and/or metrics of a cybersecurity posture of an entity, such as firmographic information, security safeguards, threat detection capabilities, incident response data, compliance metrics, and/or other relevant cybersecurity information. For example, the token system 1102 can generate, mint, and/or otherwise create unified safeguard tokens, unified requirements tokens, performance tokens, coverage tokens, incident readiness tokens, insurability readiness tokens, gap tokens, effectiveness tokens, and/or various additional tokens. For example, the token system 1102 can structure a token to encapsulate data sets related to different aspects of cybersecurity such that a set of tokens can facilitate an evaluation of a security status of an entity (e.g., by an insurer or vendor). The various tokens generated by the token system 1102 and encapsulated in cyber resilience identities are described in greater detail herein.

In some implementations, the cyber resilience identities can include a coverage token. The coverage token can be structured to store information about insurance policies, including policy numbers, premium amounts, and/or coverage data. That is, the token system 1102 can generate a coverage token when insurance coverage of entity data is to be documented and managed. For example, the coverage token can be created to include policy information such as the insured client, domain, and/or premium data. In generating the cyber resilience identities, the coverage token generated by the token system 1102 can include data on insurance coverage, retention terms, and/or claims associated with the policy. For example, the coverage token can store data related to premium payment schedules, policy numbers, and/or claim UIDs that are linked to an insurance policy of an entity corresponding to a cyber resilience identity. In some examples, a coverage agent can generate, receive, transmit, update, and/or otherwise model one or more coverages tokens.

In some implementations, the cyber resilience identities can include an effectiveness token. The effectiveness token can be structured to store a record of security effectiveness of an organization over time, linking to historical data through performance tokens and capturing outcomes related to incidents and claims. That is, the token system 1102 can generate an effectiveness token to document and evaluate the results of past and ongoing security measures within an organization. For example, the effectiveness token can be generated to include the effectiveness token UID, the creation date, a list of performance tokens, and/or outcomes related to security incidents and claims. In generating the cyber resilience identities, the effectiveness token generated by the token system 1102 can include references to associated performance tokens, incident tokens, and/or claims tokens, providing a longitudinal view of security effectiveness. For example, the effectiveness token can include data indicative of how various incidents have impacted the security posture of the organization over time, including the effectiveness of response efforts and any gaps identified during evaluations. In some examples, an effectiveness agent can generate, receive, transmit, update, and/or otherwise model one or more effectiveness tokens.

In some implementations, the cyber resilience identities can include a gaps token. The gaps token can be structured to record and track information about vulnerabilities and compliance issues within IT infrastructure of an organization. That is, the token system 1102 can generate a gaps token to identify and monitor security gaps that could affect cybersecurity posture of an organization. For example, the gaps token can be generated to include a gap UID, timestamp, description of the vulnerability, impact description, severity rating, and/or recommended actions for remediation. In generating the cyber resilience identities, the gaps token generated by the token system 1102 can include metadata about at least one (e.g., each) identified gap, including the category of the threat, impact on confidentiality, integrity, and/or availability, and/or references to external resources for further information. For example, the gaps token can capture the severity of a local privilege escalation vulnerability in an IT infrastructure of an organization and provide recommendations for mitigating the threat. In some examples, a gaps agent can generate, receive, transmit, update, and/or otherwise model one or more gaps tokens.

In some implementations, the cyber resilience identities can include an IOC (Indicators of Compromise) token. The IOC token can be structured to store and describe indicators of malicious activity detected within an environment of an organization. That is, the token system 1102 can generate an IOC token to catalog and track known indicators of compromise that are associated with cybersecurity incidents. For example, the IOC token can be generated to include a indicator UID, type of indicator (e.g., file hash), description of the indicator, and/or a pattern representing the malicious activity. In generating the cyber resilience identities, the IOC token generated by the token system 1102 can include data such as the confidence level in the indicator (e.g., high, medium, low, and/or a scale between 1 and 10), the type of malicious activity it represents, and/or the pattern or signature detected. For example, the IOC token can store information about a malicious file hash associated with a known malware instance, helping to identify and respond to similar threats in the future. In some examples, a compliance agent can generate, receive, transmit, update, and/or otherwise model one or more compliance tokens.

In some implementations, the cyber resilience identities can include an incident token. The incident token can be structured to capture information about a cybersecurity incident, including the type, date, outcome, and/or associated claims data. That is, the token system 1102 can generate an incident token to document and manage the lifecycle of a cybersecurity incident within an organization. For example, the incident token can be generated to include a incident UID, the title of the incident, incident data such as the type of attack, impacted data, response actions taken, and/or the associated costs. In generating the cyber resilience identities, the incident token generated by the token system 1102 can include references to related tokens, such as TTPs (Tactics, Techniques, and/or Procedures) tokens, IOC tokens, and/or breach team data, providing an overview of the incident. For example, the incident token can document the timeline of a ransomware attack, the response efforts, the root cause analysis, and/or the financial impact on the organization. In some examples, an incident response agent can generate, receive, transmit, update, and/or otherwise model one or more incident tokens.

In some implementations, the cyber resilience identities can include a performance token. The performance token can be structured to provide a record of evaluations associated with safeguards and requirements within an organization at a time. That is, the token system 1102 can generate a performance token to store the results of evaluations and assessments related to the cybersecurity safeguards of the organization. For example, the performance token can be generated to include a performance token UID, the date of creation, safeguard results, safeguard transformation results, and/or comparison results against predefined requirements. In generating the cyber resilience identities, the performance token generated by the token system 1102 can include outcomes of safeguard evaluations, transformation proofs, and/or any identified gaps in compliance at a point in time. For example, the performance token can track the effectiveness of endpoint security measures, document how well the measures meet the thresholds, and/or identify areas for improvement. In some examples, a performance agent can generate, receive, transmit, update, and/or otherwise model one or more performance tokens.

In some implementations, the cyber resilience identities can include a ransom token. The ransom token can be structured to capture data about a ransomware incident, including ransom demands, payment data, and/or outcomes. That is, the token system 1102 can generate a ransom token to document and manage the specifics of a ransomware event within an organization. For example, the ransom token can be generated to include a ransom UID, the incident UID it is associated with, data of the ransomware attack such as the group involved, payment wallet address, currency type, and/or the outcome of the payment. In generating the cyber resilience identities, the ransom token generated by the token system 1102 can include references to the breach team involved, post-incident follow-up data, and/or information about the threat actor. For example, the ransom token can document the financial impact of the ransom payment, the success rate of data decryption, and/or ongoing risks posed by the threat actor.

In some implementations, the cyber resilience identities can include a TTPs (Techniques, Tactics, and/or Procedures) token. The TTPs token can be structured to provide an overview of a detected cybersecurity threat event, outlining the tactics, techniques, and/or procedures identified. That is, the token system 1102 can generate a TTPs token when to document and analyze adversarial behaviors detected during a cybersecurity incident. For example, the TTPs token can be generated to include a TTP UID, the event data such as the event code, provider, start and end time, and/or description of the event, as well as information about the threat, including the tactic employed, techniques used, procedures followed, and/or the threat actor involved. In generating the cyber resilience identities, the TTPs token generated by the token system 1102 can include observations from the event, such as the actions taken by the adversary, the outcome of those actions, and/or any data artifacts observed. For example, the TTPs token can document a phishing attack, detailing how it was executed, the tools used by the attacker, and/or the impact on the organization.

In some implementations, the cyber resilience identities can include a unified asset token. The unified asset token can be structured to provide information about the assets managed within an organization, including types, operational statuses, and/or associated identifiers. That is, the token system 1102 can generate a unified asset token when to document and manage the lifecycle of assets within an IT infrastructure of an organization. For example, the unified asset token can be generated to include an asset UID, the date of creation, asset data such as type, name, description, location, and/or owner, and/or the operational status of the asset. In generating the cyber resilience identities, the unified asset token generated by the token system 1102 can include identifiers and sources related to the asset, such as inventory data, cloud provider information, and/or any additional metadata. For example, the unified asset token can document an operational status of a server, its cloud instance data, and/or any associated identifiers such that an organization can track and monitor assets.

In some implementations, the cyber resilience identities can include an incident readiness token. The incident readiness token can be structured to capture the attributes that demonstrate a preparedness of an organization for responding to cybersecurity incidents. That is, the token system 1102 can generate an incident readiness token to document and verify a capability of an organization to handle cybersecurity incidents effectively. For example, the incident readiness token can be generated to include a incident readiness UID, the associated passport UID, and/or a description of the readiness of the organization to respond to cybersecurity incidents. In generating the cyber resilience identities, the incident readiness token generated by the token system 1102 can include attributes such as the incident response plan, training and awareness programs, tools and technologies used, and/or testing exercises conducted. For example, the incident readiness token can document the annual incident response plan updates of the organization, quarterly training sessions, and/or various additional tools and technologies in place to detect and mitigate cybersecurity threats.

In some implementations, the cyber resilience identities can include an insurability readiness token. The insurability readiness token can be structured to capture the attributes used for an organization to qualify for cybersecurity insurance, including risk assessments, security measures, and/or incident history. That is, the token system 1102 can generate an insurability readiness token to document and assess a preparedness of an organization for obtaining cybersecurity insurance. For example, the insurability readiness token can be generated to include a insurability readiness UID, the carrier UID, the associated passport UID, and/or a description of the preparedness of the organization for cybersecurity insurance. In generating the cyber resilience identities, the insurability readiness token generated by the token system 1102 can include attributes such as risk assessments, security measures, documentation and compliance, and/or incident history. For example, the insurability readiness token can document the annual risk assessments of the organization, the implementation of strong cybersecurity controls, and/or the effective mitigation of past incidents, providing an overview of the qualifications of the organization for cybersecurity insurance.

In some implementations, the cyber resilience identities can include or be associated with a passport, which can be a token or a distinct entity interacting with other tokens. The passport can be structured to encapsulate information about an entity, including firmographic data, indicators of cybersecurity readiness, and/or more. That is, the token system 1102 can generate or link to a passport to provide certain information corresponding to an cybersecurity posture and readiness for insurance purposes of the organization. For example, the passport can contain or link to various tokens, such as unified safeguard tokens, unified requirements tokens, performance tokens, coverage tokens, incident readiness tokens, insurability readiness tokens, gap tokens, effectiveness tokens, and/or various additional tokens. For example, the token system can generate a cyber resilience identity or passport providing access to metadata inclusive of various cyber resilience data (e.g., legal structure, number of protected records, preparedness for cyber insurance, etc.) through linked tokens. Additional, token system 1102 can generate the passport linked with a control structure to limit access to data and updates, as further described herein.

In some implementations, the wallet system 1112 can include one or more processing circuits, including processor(s) and memory. The memory can have instructions stored thereon that, when executed by processor(s), cause the one or more processing circuits to perform the various operations described herein. The operations described herein can be implemented using software, hardware, and/or a combination thereof. The processor(s) can include a microprocessor, ASIC, FPGA, etc., and/or combinations thereof. In many implementations, the processor(s) can be a multi-core processor or an array of processors. Memory can include, but is not limited to, electronic, optical, magnetic, and/or any other storage devices capable of providing processor(s) with program instructions. The instructions can include code from any suitable computer programming language. In some implementations, the wallet system 1112 can include an interface circuit and function circuit. In some arrangements, the wallet system 1112 can be secured and/or protected using quantum-safe computing techniques (e.g., quantum encryption algorithms and/or quantum-safe digital signature protocols).

In some implementations, the wallet system 1112 can include a storage mechanism for holding digital assets, including cyber resilience tokens, private keys, and/or access credentials. In some examples, the wallet system 1112 can perform cryptographic operations to encrypt and decrypt token-related data and sign transactions, authenticating the user computing system 1110 during interactions with the passport system 1120 and the ledger system 1130. The wallet system 1112 can manage permissions and access control so that authorized can entities initiate or authorize updates to the cyber resilience tokens stored within the ledger system 1130. In some implementations, the wallet system 1112 can communicate with dynamic non-fungible tokens (DNFTs) or other various tokens (e.g., fungible tokens, semi-fungible tokens, fractionalized tokens, synthetic tokens, quantum-resistant tokens, cross-chain tokens) or cryptographic elements (e.g., digital signatures, hashes, encryption keys, zero-knowledge proofs, homomorphic encryption keys, lattice-based cryptographic keys, quantum entanglement signatures) associated with the cyber resilience identity. For example, the wallet system 1112 can store and manage multiple NFTs or DNFTs representing different aspects of a cybersecurity posture (e.g., cyber resilience status) of an organization or entity. The wallet system 1112 can facilitate updates to the tokens by performing cryptographic operations that validate and record changes to the cybersecurity data encapsulated within the DNFTs. The wallet system 1112 can also provide an interface that authorized entities use to access and manage the DNFTs, facilitating the review and assessment of the cybersecurity posture of the entity over time. In some implementations, the wallet system 1112 can be an agent function and/or can be stored in an agent database.

In another example, a quantum-resistant token can be structured to secure cyber resilience data against potential attacks from quantum computers using post-quantum cryptographic techniques, and/or the wallet system 1112 can store, manage, and/or facilitate access to these tokens within a cyber resilience identity framework. In yet another example, a zero-knowledge proof can be a cryptographic method allowing verification of certain cybersecurity attributes (e.g., compliance status) without revealing the underlying sensitive data, and/or the wallet system 1112 can process and validate these proofs as part of secure interactions with the cyber resilience identity. In yet another example, a quantum entanglement signature can be a method for facilitating data authenticity and integrity using entangled quantum states, and/or the wallet system 1112 can generate, store, and/or apply these signatures to authenticate and validate the integrity of cyber resilience data. In yet another example, a fractionalized token can be a representation of a cyber resilience asset divided into smaller units (e.g., portions of an insurance policy or coverage token), and/or the wallet system 1112 can manage the distribution, ownership, and/or transactions involving these fractionalized units within the tokenized cyber resilience identity.

In some implementations, the wallet system 1112 can store, create, and/or update a variety of tokens associated with the cybersecurity posture of an organization or entity. The wallet system 1112 can create and update performance tokens, which can include results of cybersecurity events, assessments, and/or incident responses (e.g., a security breach response or a periodic vulnerability assessment). The wallet system 1112 can create and maintain unified tokens, which can include data representing the state of various cybersecurity elements over time (e.g., safeguards implemented across the organization, internal and third-party requirements compliance, and/or asset management). The wallet system 1112 can capture and record evaluation tokens, which can include cybersecurity data captured at multiple points in time (e.g., snapshots of the organization cybersecurity posture at regular intervals). The wallet system 1112 can aggregate and store roll-up tokens, which can include combined data from unified and real-time tokens to provide a view of the cybersecurity performance over a specified period (e.g., annual security performance summary). The wallet system 1112 can create and update resilience tokens, which can include tokens representing different dimensions of the organization cybersecurity posture (e.g., tokens for cybersecurity resilience metrics). The wallet system 1112 can further provide interfaces for entities to access, manage, and/or review the various tokens.

In some implementations, the systems or components of FIG. 11 can communicate over network 120. Network 120 can include computer networks such as the Internet, local, wide, metro or other area networks, intranets, satellite networks, other computer networks such as voice or data mobile phone communication networks, combinations thereof, and/or any other type of electronic communications network. Network 120 can include or constitute a display network. As a non-limiting example, network 120 can implement transport layer security (TLS), secure sockets layer (SSL), hypertext transfer protocol secure (HTTPS), and/or any other secure communication protocol. In some implementations, network 120 can be composed of various network devices (nodes) communicatively linked to form one or more data communication paths between participating devices. The network 120 can facilitate communication between the various nodes, such as the user computing system(s) 1110, third-party system(s) 150, passport system 1120, etc. (e.g., using an OSI layer-4 transport protocol such as the User Datagram Protocol (UDP), the Transmission Control Protocol (TCP), Stream Control Transmission Protocol (SCTP), etc.). At least one (e.g., each) networked device can include at least one network interface for receiving and/or transmitting data, typically as one or more data packets. An illustrative network 120 is the Internet (however, other networks can be used). Network 120 can be an autonomous system (AS), e.g., a network that is operated under a consistent unified routing policy (or at least appears to from outside the AS network) and is generally managed by a single administrative entity (e.g., a system operator, administrator, and/or administrative group).

In some implementations, the ledger system 1130 can include one or more processing circuits, including processor(s) and memory. The memory can have instructions stored thereon that, when executed by processor(s), cause the one or more processing circuits to perform the various operations described herein. The operations described herein can be implemented using software, hardware, and/or a combination thereof. The processor(s) can include a microprocessor, ASIC, FPGA, etc., and/or combinations thereof. In many implementations, the processor(s) can be a multi-core processor or an array of processors. Memory can include, but is not limited to, electronic, optical, magnetic, and/or any other storage devices capable of providing processor(s) with program instructions. The instructions can include code from any suitable computer programming language. In some implementations, the ledger system 1130 can include an interface circuit and function circuit.

In some implementations, the ledger system 1130 can be a ledger or a decentralized ledger. For example, the ledger system 1130 can include a distributed ledger technology (DLT) that supports immutable record-keeping and secure data transactions. The ledger system 1130 can store various types of tokens and cybersecurity data, including performance tokens, unified tokens, evaluation tokens, roll-up tokens, and/or resilience tokens. The ledger system 1130 can securely record updates and changes to tokens (e.g., providing data integrity and traceability). For example, the ledger system 1130 can use blockchain to provide a tamper-evident record of token-related transactions.

In some implementations, the ledger system 1130 can include smart contract storage 1132, blockchain 1170, and/or token storage 1134. In some implementations, the smart contract storage 1132, blockchain 1170, and/or token storage 1134 can include one or more processing circuits, including processor(s) and memory. The memory can have instructions stored thereon that, when executed by processor(s), cause the one or more processing circuits to perform the various operations described herein. The operations described herein can be implemented using software, hardware, and/or a combination thereof. The processor(s) can include a microprocessor, ASIC, FPGA, etc., and/or combinations thereof. In many implementations, the processor(s) can be a multi-core processor or an array of processors. Memory can include, but is not limited to, electronic, optical, magnetic, and/or any other storage devices capable of providing processor(s) with program instructions. The instructions can include code from any suitable computer programming language. In some implementations, the smart contract storage 1132, blockchain 1170, and/or token storage 1134 can include an interface circuit and function circuit.

In some implementations, smart contract storage 1132 can manage and execute predefined agreements related to token transactions and updates. In one example, smart contract storage 1132 can store role-based access controls (RBACs or other rule-based control systems) or other access control mechanisms restricting access or updates to tokenized cyber resilience data stored via the ledger system 1130. In some examples, the smart contract storage 1132 can store rules or other data to automate processes such as token validation, data access control, and/or compliance checks. For example, smart contract storage 1132 can store smart contracts that define the rules and logic for managing token transactions and updates. That is, smart contracts can define rules or logic used by agent computing systems to perform operations or used by an agent management system to coordinate operations between various agent computing systems. In some examples, smart contract storage 1132 can manage contract templates that specify access permissions, including RBACs to restrict access based on user roles. That is, the smart contract storage 1132 can implement RBAC to control permissions for executing transactions or modifying token data. Smart contract storage 1132 can execute stored access controls/smart contracts to enforce access permissions, validate transactions, and/or verify compliance of entities or organizations with various cyber resilience parameters. In some implementations, smart contract storage 1132 can process transactions according to terms, parameters, and/or rules to restrict access to tokens or other cyber resilience data.

In some implementations, blockchain 1170 can include a decentralized ledger that records and validates token transactions. For example, blockchain 1170 can utilize consensus mechanisms (e.g., proof of provenance, proof of work, proof of stake) to validate transactions involving tokenized cyber resilience data across a distributed network or other computing environment. In some examples, blockchain 1170 can provide a tamper-evident and/or immutable record of token data by employing cryptographic techniques (e.g., hashing functions) to record and verify token transactions. That is, blockchain 1170 can provide transparency and traceability of token-related activities by securely recording token transactions on a distributed computing architecture.

In some implementations, token storage 1134 can store tokenized cyber resilience data. For example, token storage 1134 can store and/or manage tokens including performance tokens, unified tokens, evaluation tokens, and/or roll-up tokens generated and/or provided by the token system 1102. In some examples, token storage 1134 interfaces with blockchain 1170 to manage and organize token data. For example, token storage 1134 can handle different token types, including performance tokens, unified tokens, evaluation tokens, and/or roll-up tokens. Token storage 1134 can utilize data structures such as relational databases, NoSQL databases, and/or file systems to organize and manage tokens and/or corresponding data. In some examples, token storage 1134 can maintain data accuracy by integrating with blockchain 1170 to validate and update token records.

In some implementations, the tokenized data can be included in a knowledge graph. For example, a knowledge graph can include nodes and edges. That is, the nodes of a knowledge graph can represent tokens and at least one edge (e.g., each) can be a relationship. For example, at least one (e.g., each) node of the knowledge graph can correspond to a digital representation of a compliance state or cyber resilience data. For example, a smart contract can be tokenized and encapsulated as a node of a knowledge graph. The edges of the knowledge graph can be relationships between the tokens, such as dependencies, causal links, and/or shared attributes across different nodes. That is, at least one (e.g., each) edge can include one or more associations between the first token and additional tokens. That is, an edge can denote a correlation between parties in a first contract and a second contract. Additionally, an edge can denote that compliance in one organization is dependent on the security safeguards of another organization or has been updated based on agent functions. The graph can include unilateral or bilateral edges to signify one- or two-way relationships between the nodes. The knowledge graph can be used to facilitate advanced analytics and AI-driven insights for cybersecurity and risk management. Directionality and weights of edges can be used to identify critical points of failure, modeling cascading effects of incidents, improving resource allocation, and/or other functions to strengthen overall resilience. That is, the graph can allow systems to infer vulnerabilities, predict compliance trends, and/or recommend tailored security products to organizations.

In some implementations, the passport system 1120 can include one or more systems and/or subsystems to model cyber resilience data using cyber resilience identities and associated metadata (e.g., cryptographic system 1122, ledger interface 1124, token system 1102, and/or metadata collection system 1126). In some implementations, the cryptographic system 1122, ledger interface 1124, token system 1102, and/or metadata collection system 1126 can include one or more processing circuits, including processor(s) and memory. The memory can have instructions stored thereon that, when executed by processor(s), cause the one or more processing circuits to perform the various operations described herein. The operations described herein can be implemented using software, hardware, and/or a combination thereof. The processor(s) can include a microprocessor, ASIC, FPGA, etc., and/or combinations thereof. In many implementations, the processor(s) can be a multi-core processor or an array of processors. Memory can include, but is not limited to, electronic, optical, magnetic, and/or any other storage devices capable of providing processor(s) with program instructions. The instructions can include code from any suitable computer programming language. In some implementations, the cryptographic system 1122, ledger interface 1124, token system 1102, and/or metadata collection system 1126 can include an interface circuit and function circuit.

In some implementations, the metadata collection system 1126 can receive or identify cyber resilience data. That is, receiving or identifying can include the metadata collection system 1126 acquiring, processing, and/or categorizing data from various sources, such as cybersecurity events, system performance metrics, and/or vulnerability assessments stored on ledger system 1130. For example, the metadata collection system 1126 can gather and/or organize data attributes like event timestamps, sources, and/or types corresponding to a cyber resilience status of an entity and other cyber protection information. Additionally, the metadata collection system 1126 can link these data attributes to cyber resilience metrics and update the corresponding records to reflect changes in the cyber protection posture of the entity.

In some implementations, the cryptographic system 1122 can encrypt a portion of the cyber resilience data. That is, encrypting can include the cryptographic system 1122 securing sensitive data using cryptographic techniques tailored to the requirements of the data. For example, the cryptographic system 1122 can apply encryption algorithms to protect sensitive data, such as performance metrics or identifiers of an organization or entity. Further, the cryptographic system 1122 can utilize key management techniques to facilitate secure data encryption and decryption process such that authorized entities can access the encrypted data. Additionally, the cryptographic system 1122 can use asymmetric encryption to secure data before it is stored or transmitted. For example, the cryptographic system 1122 (e.g., cryptography system) can apply hashing algorithms to verify the integrity of data associated with cyber resilience events and assessments such that the data remains unaltered during transmission or storage. In some examples, the cryptographic system 1126 can be configured to apply quantum-resistant protections, techniques, or protocols configured to resist quantum-based computing attacks.

In some implementations, the token system 1102 and/or metadata collection system 1126 can generate a metadata object including metadata of cyber resilience data. That is, the token system 1102 can create structured metadata objects that include information about tokenized data, such as fields, tags, headers, and/or other relevant attributes like data type, source, and/or context. For example, the token system 1102 can organize metadata into formats that provide descriptions and classifications for at least one (e.g., each) element of cyber resilience data. Further, the metadata collection system 1126 can collect and integrate various metadata elements, such as timestamps, source identifiers, and/or data relevance indicators, into the metadata object. Additionally, the token system 1102 can structure the metadata to improve the understanding and usability of the collected cyber resilience data.

In some implementations, the token system 1102 can generate a cyber resilience identity including at least a link with the metadata object, a unique identifier (UID), and/or a performance event dataset. That is, generating can include creating, associating, and/or linking metadata objects, identifiers, and/or performance datasets (e.g., historical performance data) with an identifier of n organization or entity. For example, the token system 1102 can generate a passport that links to metadata stored in one or more tokens, at least one (e.g., each) containing data related to different aspects of a cyber resilience of an entity. The passport can include an identifier for tracking and linking the metadata object to other associated tokens. Further, the performance event dataset within the passport can capture and store cyber resilience performance data, such as that stored in multiple performance tokens, which can be collected at different points in time. For example, the token system 1102 can issue or mint tokens linked to a single token that reference metadata objects and include identifiers for tracking, and/or the token system 1102 can embed performance metrics and historical data within the tokens to provide insights into cyber resilience.

In some implementations, the token system 1102 can encapsulate the cyber resilience identity within a control structure restricting one or more updates and redemptions of the metadata object. That is, encapsulating can include implementing token gating mechanisms or smart contracts to enforce rules on who can update or redeem the cyber resilience identity, based on predefined criteria and access control policies. For example, the token system 1102 can establish a control structure that allows a customer to view relevant data within their own passport while restricting access of an insurer to tokenized data used for underwriting decisions. Generally, the passport system 1120 can implement a control structure that enforces rules on who can update or redeem the cyber resilience identity based on predefined criteria (e.g., entity type, user preferences/selections, etc.)

In some implementations, the ledger interface 1124 can determine at least one access data structure that is compatible with the control structure. That is, determining can include analyzing various data structures to identify or determine alignment with the access control policies and update restrictions defined by the control structure. For example, the ledger interface 1124 can evaluate different data structures to verify compatibility with access levels and permissions for interacting with the cyber resilience identity. Additionally, the ledger interface 1124 can select and implement data structures that support the secure and compliant management of access and updates within the token system 1102.

The control structure (e.g., implemented as a smart contract) governs access to a token structure containing various tokens, such as performance tokens, unified tokens, evaluation tokens, and/or roll-up tokens. The token structure can include metadata, such as unique identifiers (UIDs), creation timestamps, and/or links to related data sets. The smart contract specifies predefined rules for accessing and updating these tokens. The ledger interface 1124 can process the smart contract to extract rules that define role-based access control (RBAC) permissions. For example, the smart contract can specify that at least one (e.g., each) third-party can access their own data within the token structure. In some implementations, a third-party entity can have access its own performance tokens stored in the token structure, such as in a passport associated with the cybersecurity status of an entity. The RBAC rules restrict other entities from viewing or modifying these tokens. Another example can include third-party vendors having access to their own evaluation tokens that detail the results of security assessments relevant to their services, without the ability to access data from other vendors. In some examples, the RBAC can restrict or provide access to one or more autonomous or independent agents. That is, an orchestration system can allocate data for operations or determine a distribution for transmitting requests to various agents based on roles or permissions of the agents defined by the RBAC.

The ledger interface 1124 can configure the selected access data structure to enforce these RBAC permissions as extracted from the smart contract. That is, the configuration can include an agent or any computing system mapping the access permissions to the token structure and linking at least one (e.g., each) token type to the appropriate access control mechanisms. For example, performance tokens related to a particular third-party can be linked to a role of the third-party. Similarly, unified tokens related to internal compliance can be accessible by authorized roles within the organization itself (e.g., excluding third-party access). The ledger interface 1124 can integrate the configuration within the ledger system 1130 to apply the rules of the control structure to token-related operations. The RBAC can facilitate access to tokens to entities or individuals that have been granted access or authorized to read, update, and/or add. For example, the control structure can use an access level of an entity or individual to determine whether to allow a user to read data but not update or add to the data (e.g., a third-party or regulatory entity or insurer can access performance datasets on performance tokens linked to a passport of the prosecutive insured, but can be restricted from modifying certain performance data stored thereon), to have full rights (e.g., read/update/add, etc.), etc. That is, the passport system 1120 can determine, identify, and/or provide an access level or permissions to a person or entity attempting to access or otherwise interact with tokenized data corresponding to a cyber resilience identity, and/or the access level/permissions can be used by the passport system 1120 to restrict or allow the user or entity to perform various actions related to the tokens.

In some implementations, if the smart contract is modified, the ledger interface 1124 can reconfigure the access data structures to match the updated RBAC rules. For example, if the smart contract is updated to change access permissions for a particular third-party or regulatory entity, the ledger interface 1124 can adjust the RBAC configurations to reflect this change such that the access control mechanisms allows access and is consistent with the control structure. In some implementations, an access data structure can function as a token or another access control mechanism within the token structure. That is, the access data structure can facilitate operations, such as reading, writing, adding, and/or removing metadata objects associated with tokens in the cyber resilience identity (e.g., also operating and implemented as a token). For example, an access control token can link to other tokens representing performance, evaluation, and/or resilience data. The access control token can encapsulate the permissions for interacting with the tokens and can include metadata defining allowed operations and roles or entities authorized to perform at least one (e.g., each) operation. Additionally, an access data structure can implement write access to one or more metadata objects within the token structure. For example, an access control token can identify which entities have permission to update particular aspects of the cyber resilience identity, such as modifying performance metrics or altering the status of an evaluation token. Another access data structure can be used to manage read permissions, restricting a third-party or regulatory entity to viewing metadata associated with its own tokens within the structure without granting modification rights. In some implementations, an access control structure can function as a token that defines hierarchical permissions across multiple tokens. For example, a control structure token can specify that a designated role within an organization has the authority to add or remove tokens from the cyber resilience identity. Additionally, the access control token can be used to facilitate interactions with other tokens within the token structure to apply these permissions.

In some implementations, the ledger interface 1124 can broadcast, using the control structure, the cyber resilience identity to a ledger or distributed ledger. That is, broadcasting can include publishing, sharing, and/or otherwise transmitting a passport (e.g., cyber resilience identity) of an entity to authorized participants on the distributed ledger network, including insurers, regulators, and/or cybersecurity vendors, to facilitate secure access, auditing, and/or validation of the cybersecurity posture of the entity or for use in in providing protection or insurance quotes, verifying compliance, offering targeted cybersecurity services (e.g., through advertisements), and/or generating analytical insights based on the data of the entity. For example, the ledger interface 1124 can transmit the cyber resilience identity to a blockchain, distributed ledger, or other data source (e.g., agent network 140) to maintain an immutable record of the cyber resilience identity and associated data. In this example, the transmission process can include creating a transaction that includes the cyber resilience identity, signing the transaction using cryptographic keys associated with the control structure, and/or broadcasting the transaction to the distributed ledger network. The network nodes can then validate the transaction through a consensus mechanism (e.g., proof of work, proof of stake) and, once validated, add it to a block in the blockchain. Additionally, the ledger interface 1124 can store the cyber resilience identity locally (e.g., in a back-end database or other local data store). Further, the ledger interface 1124 can transmit or send the cyber resilience identity (e.g., via a shareable link) to various entities, who can access a portion of the data corresponding with the cyber resilience identity but not access another portion of the data based on various access controls.

Referring to the control structure (e.g., smart contract) generally, the one or more control structures can be embedded within the transaction or linked via an identifier or hash, which can be included in the transaction data. That is, the rules and conditions defined by the smart contract can be linked with the cyber resilience identity, facilitating the automated enforcement of access controls and other predefined operations when the identity is accessed or modified on the distributed ledger. In some implementations, the one or more control structures can be referenced by a smart contract address included in the transaction. That is, the reference can allow the distributed ledger to call and execute the smart contract independently when events are triggered, such as a request to access or update the cyber resilience identity. In some implementations, the one or more control structures can be included as a separate transaction linked to the cyber resilience identity transaction via a cryptographic reference. The smart contract transaction can be broadcasted and stored on the blockchain, where it can autonomously enforce the conditions and permissions associated with the cyber resilience identity when an interaction with the identity occurs on the distributed ledger. In some implementations, the one or more control structures can be encoded into the blockchain transaction as executable code. That is, the smart contract can automatically execute its logic in response to blockchain events, such as validation of the cyber resilience identity transaction.

Figure 12:
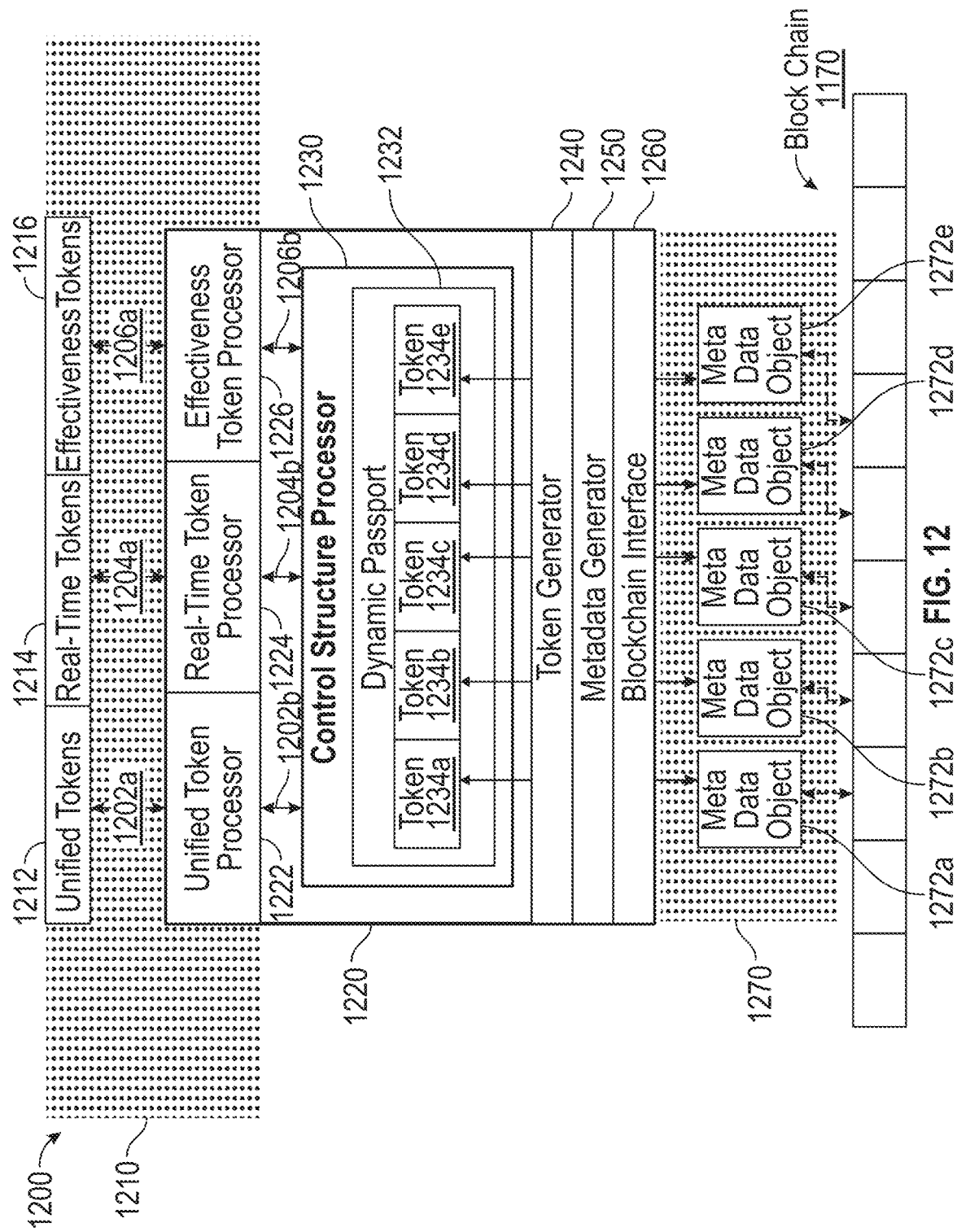
FIG. 12 depicts a block diagram of another architecture of certain systems or devices of FIG. 11, according to some implementations.

Referring now to FIG. 12, a block diagram of an architecture of certain systems or devices of FIG. 11 is shown, according to some implementations. As previously discussed, the systems of FIG. 11 can be implemented by an autonomous agent for performing cyber resilience tasks or by an orchestration computing system for allocating or distributed tasks between various autonomous agents. The implementation shown in FIG. 12 can include a token interface 1210 including unified tokens 1212, real-time tokens 1214, and/or effectiveness tokens 1216. The implementation shown in FIG. 12 can also include a smart contract control structure 1220 including a unified token processor 1222, a real-time token processor 1224, and/or an effectiveness token processor 1226. Further, the smart contract control structure 1220 can include a control structure processor 1230, a token generator 1240, a metadata generator 1250, and/or a blockchain interface 1260. In some implementations, the control structure processor 1230 can include a dynamic passport 1232, and/or dynamic passport 1232 can include tokens 1234a-1234e (collectively, 1234). at least one (e.g., each) of the tokens 1234 can be linked to a metadata interface 1270 including one or more metadata objects 1272a-1272e (collectively, metadata objects 1272). In some implementations, the implementation shown in FIG. 12 can include blockchain 1170.

In some implementations, FIG. 12 depicts an example smart contract control structure 1220. In some examples, the unified token processor 1222, real-time token processor 1224, and/or effectiveness token processor 1226 can detect a presence of a token (fungible, non-fungible, partially-fungible, etc.), and/or can transmit the token to a compatibility processor (e.g., 1222, 1224, 1226) compatible with that particular token. The detection can be responsive to an action by the token interface 1210 to transmit the tokens to the smart contract control structure 1220. In some examples, the token interface 1210 can include a communication channel between one or more of the smart contract control structure 1220 and one or more of the unified tokens 1212, real-time tokens 1214, and/or effectiveness tokens 1216. The token interface 1210 can include an application programming interface compatible with the smart contract control structure 1220 to detect various cyber resilience tokens. At least the token interface 1210 or the smart contract control structure 1220 can execute one or more instructions to determine whether one or more of the tokens are compatible with the smart contract control structure 1220.

In some implementations, the unified token processor 1222 can perform detection of unified tokens 1212 via a link 1202a or other communication channel (e.g., via a network such as network 120). The detection can be responsive to receiving a unified token from token system 1102, user computing systems 1110, and/or third-party systems 150, over link 1202a. The unified token processor 1222 can be configured to be compatible with a unified token 1212, and/or can be generated to be compatible with a particular unified token 1212. For example, the unified token processor 1222 can be integrated with or store a hash based on a unified token 1212 and a hash processor operable to generate a hash based on any unified token 1212. The unified token processor 1222 can generate a hash in response to detecting the presence of the unified token 1212, and/or can determine whether the unified token 1212 is compatible with the smart contract control structure 1220 by comparing the generated hash with the stored hash. The unified token processor 1222 can include logic to detect a unified token 1212 passed to it, by, for example, a JSON object or a header argument. Additionally, the unified token processor 1222 can provide the detected unified token to the control structure processor 1230 via link 1202b.

In some implementations, the real-time token processor 1224 can perform detection of real-time tokens 1214 via link 1204a. The detection can be responsive to receiving a real-time token 1214 from token system 1102, user computing systems 1110, and/or third-party systems 150, over link 1204a. For example, the real-time token processor 1224 can be integrated with or store a hash based on a real-time token 1214 and a hash processor operable to generate a hash based on any real-time token 1214. The real-time token processor 1224 can generate a hash in response to detecting the presence of the real-time token 1214, and/or can determine whether the real-time token 1214 is compatible with the smart contract control structure 1220 by comparing the generated hash with the stored hash. The real-time token processor 1224 can include logic to detect a real-time token 1214 passed to it, by, for example, a JSON object or a header argument. Additionally, real-time token processor 1224 can provide the detected real-time token 1214 to the control structure processor 1230 via link 1204a.

In some implementations, the effectiveness token processor 1226 can perform detection of effectiveness tokens 1216 via link 1206a. The detection can be responsive to receiving an effectiveness token 1216 from token system 1102, user computing systems 1110, and/or third-party systems 150, over link 1206a. For example, the effectiveness token processor 1226 can be integrated with or store a hash based on an effectiveness token 1216 and a hash processor operable to generate a hash based on any effectiveness token 1216. The effectiveness token processor 1226 can generate a hash in response to detecting the presence of the effectiveness token 1216, and/or can determine whether the effectiveness token 1216 is compatible with the smart contract control structure 1220 by comparing the generated hash with the stored hash. The effectiveness token processor 1226 can include logic to detect an effectiveness token 1216 passed to it, by, for example, a JSON object or a header argument. Additionally, the effectiveness token processor 1226 can provide the detected effectiveness token 1216 to the control structure processor 1230 via link 1206b.

In some implementations, the smart contract control structure 1220 can include a control structure processor 1230 configured to generate and/or store tokens 1234. The tokens 1234 can include one or more unified tokens 1212, real-time tokens 1214, and/or effectiveness tokens 1216. That is, responsive to receiving one or more of the unified tokens 1212, real-time tokens 1214, and/or effectiveness tokens 1216 from the unified token processor 1222, real-time token processor 1224, and/or effectiveness token processor 1226, the control structure processor 1230 can receive the tokens 1234 via links 1202b, 1204b, and/or 1206b. It should be understood that a control structure (or smart contract control structure) used herein can refer to a logical or structural construct that encapsulates one or more elements, such as tokens, and/or metadata objects, within a defined boundary. The control structure serves as an organizational framework that groups these elements together, allowing them to be referenced, accessed, and/or transmitted as a single unit. The smart contract control structure 1220 or other control mechanisms can manage interactions and enforce access controls based on predefined rules. For example, a control structure can be a data structure that stores references or pointers to the encapsulated elements. In another example, it could be a structure that includes metadata defining relationships and dependencies between the elements.

In some implementations, a container or wrapper can encapsulate a cyber resilience identity having a control structure, which can include multiple tokens linked to metadata objects. Encapsulation can be implemented by defining a data structure within a memory or storage system that can include relevant tokens and their associated metadata objects. The container itself can be a structured data object, such as a JSON object, a database schema, and/or a serialized data structure, that stores pointers, references, and/or data fields corresponding to at least one (e.g., each) token and its linked metadata. The smart contract control structure 1220, such as a smart contract, can be included within the container by referencing its address or embedding its bytecode within the container data structure. When the container is instantiated or accessed, the control structure processor 1230 can reference the smart contract control structure 1220 to enforce the rules and permissions associated with the cyber resilience identity.

In some implementations, a smart contract can encapsulate a cyber resilience identity, which can include multiple tokens linked to metadata objects. The smart contract can encapsulate the cyber resilience identity by defining a set of rules and data fields within its code that represent the cyber resilience identity and its components. The control structure processor 1230 can create and maintain a mapping or registry within the blockchain 1170 or distributed ledger that associates at least one (e.g., each) token with its corresponding metadata objects. The encapsulation occurs as the smart contract control structure 1220 references these tokens and metadata objects within its execution environment, using internal storage variables or linked data structures (e.g., mappings) to track and enforce relationships between them. The smart contract control structure 1220 can encapsulate the cyber resilience identity by controlling access to these mappings, allowing authorized operations as defined by the logic of the contract.

In some implementations, the control structure processor 1230 can generate a metadata object, such as a wrapper, where a smart contract control structure 1220 (e.g., a smart contract) is wrapped or otherwise linked to dynamic passport 1232, which can further include links to metadata (e.g., stored data, fields, etc.) of tokens 1234. For example, the dynamic passport 1232 can be encapsulated in a smart contract control structure 1220 and can generated by metadata generator 1250 as part of the metadata interface 1270. The linking dynamic passport 1232 and the smart contract processor 1230 can provide access to the tokenized cyber information based on the smart contract control structure 1220.

In some implementations, the control structure processor 1230 can generate a dynamic passport 1232 including a token with a link to (e.g., encapsulated in) the smart contract control structure 1220. The link can be established via a digital signature or cryptographic hash that securely associates the dynamic passport 1232 with corresponding metadata. The dynamic passport 1232 can be provided to a metadata interface 1270 such that a blockchain (e.g., blockchain 1170) can verify and store the metadata securely on the chain. Additionally, the control structure processor 1230 can encapsulate the dynamic passport 1232 and tokens 1234 within the smart contract control structure 1220. For example, encapsulating can include encrypting the data and setting permissions for data access. That is, the encapsulation can restrict outputs of the metadata objects 1272. For example, when the dynamic passport 1232 and tokens 1234 are encapsulated, the control structure processor 1230 can output when conditions or permissions are verified. In another example, when the dynamic passport 1232 and tokens 1234 are encapsulated in a smart contract control structure 1220, the control structure processor 1230 can output when a valid decryption key is presented. For example, the control structure processor 1230 can authorize transactions after verifying that compliance and regulatory requirements are met based on data of the tokens 1234.

In some implementations, the control structure processor 1230 can be configured to perform segmentation or allocation of tokens 1234 of the dynamic passport 1232 based on parameters by accessing the metadata of a token and evaluating compliance with cyber resilience standards. Accordingly, the control structure processor 1230 can automatically pool (or tranche) asset tokens (associated with underlying assets) based on parameters. For example, the parameters can be programmed into smart contracts of the control structure processor 1230. For example, the dynamic passport 1232 can include one or more segmented allocations of the tokens 1234 (e.g., with token 1234a and 1234b segmented into an allocation and tokens 1234c-1234e segmented into another allocation). While not shown in FIG. 12, a segmented allocation smart contract control structure can be within the smart contract control structure 1220 and be operated by the control structure processor 1230. In some examples, this integration facilitates automated re-segmentation based on real-time data analysis. In another example, this integration facilitates compliance checks and performance tracking without external system intervention.

In some implementations, at least one (e.g., each) of the tokens 1234 can include metadata objects 1272. For example, links can connect at least one (e.g., each) token 1234 to a respective metadata object 1272. In some examples, the metadata interface 1270 can be utilized to connect at least one (e.g., each) token 1234 to its metadata object 1272. For example, the token 1234a can be connected to the metadata object 1272a via a link, the token 1234b can be connected to the metadata object 1272b via a link, etc.

In some examples, the metadata interface 1270 can include a communication channel between one or more of the tokens in the smart contract control structure 1220 and metadata objects of blockchain 1170. That is, metadata objects 1272 can be accessed and verified through blockchain transactions to verify integrity and authenticity. Furthermore, blockchain 1170 can store links to the metadata objects 1272 or store the metadata objects 1272 in blocks of the blockchain 1170. For examples, the blockchain 1170 can store the metadata objects 1272 in blocks to verify that participants have consistent and unalterable access to the cyber resilience information stored in the tokens 1234 of the dynamic passport 1232. For example, one or more autonomous agents can record objects or other data corresponding with transactions on a blockchain or ledger.

In some implementations, the token interface 1210 can include an application programming interface compatible with the smart contract control structure 1220 to detect various cyber resilience tokens. In some examples, at least the token interface 1210 or the smart contract control structure 1220 can execute one or more instructions to determine whether one or more of the tokens (e.g., tokens 1234 or corresponding unified tokens 1212, real-time tokens 1214, and/or effectiveness tokens 1216) are compatible with the smart contract control structure 1220.

In some implementations, the token generator 1240 (e.g., token system 1102) can generate one or more tokens (e.g., fungible, semi-fungible, and/or non-fungible tokens, collectively referred to herein as "controllable electronic records") in accordance with a token obtained at one or more of the unified token processor 1222, real-time token processor 1224, and/or effectiveness token processor 1226. For example, the token generator 1240 can generate tokens based on a number of new metadata objects indicated by an obtained token, and/or linked with respective smart contract control structures. For example, the token generator 1240 can generate a cyber resilience identity (e.g., dynamic passport 1232) with links to one or more tokens at least one (e.g., each) linked with a particular smart contract control structure 1220 with which the respective token is compatible. The token generator 1240 can thus generate a corresponding number of keys that can control restrictions on output by the particular metadata object linked with the particular smart contract control structure compatible with the particular token. The token generator 1240 can modify and delete tokens (e.g., tokens 1234) linked with cyber resilience identity (e.g., dynamic passport 1232), to update control of a partial distribution or exchange of metadata object control. In some examples, one or more autonomous agent can include and/or interface with token generator 1240 to generate or update tokens.

In some implementations, the metadata generator 1250 can generate one or more metadata objects (e.g., metadata objects 1272) in accordance with a token obtained at one or more of the unified token processor 1222, real-time token processor 1224, and/or effectiveness token processor 1226 (e.g., at a compatibility processor). That is, the metadata object can include metadata of cyber resilience data. For example, metadata generator 1250 can generate multiple tokens based on a number of new metadata objects linked with respective smart contract control structure(s) 1220 and encapsulated with a cyber resilience identity (e.g., passport). For example, the metadata generator 1250 can generate one or more metadata objects 1272 at least one (e.g., each) linked to respective tokens 1234 and further linked, via the tokens 1234, to the dynamic passport 1232 with a particular smart contract control structure 1220 by which the metadata object co is controlled. In some examples, the metadata generator 1250 can modify and delete metadata objects linked with tokens or smart contract control structures to update control of a partial transfer of metadata object control. Further, the metadata generator 1250 can modify and/or update tokens and/or associated information of existing tokens (e.g., tokens 1234) corresponding to a cyber resilience identity (e.g., passport 1232).

In some implementations, the blockchain interface 1260 can include an API compatible with the blockchain 1170 via metadata generator 1250. The blockchain interface 1260 can selectively add, modify, and/or delete blocks from the blockchain 1170. The blockchain interface 1260 can add, modify, and/or delete blocks in accordance with restrictions or interfaces of the blockchain 1170, and/or can add, modify, and/or delete blocks independently of the restrictions or interfaces of the blockchain 1170 at any portion or index of the blockchain 1170.

Figure 13:
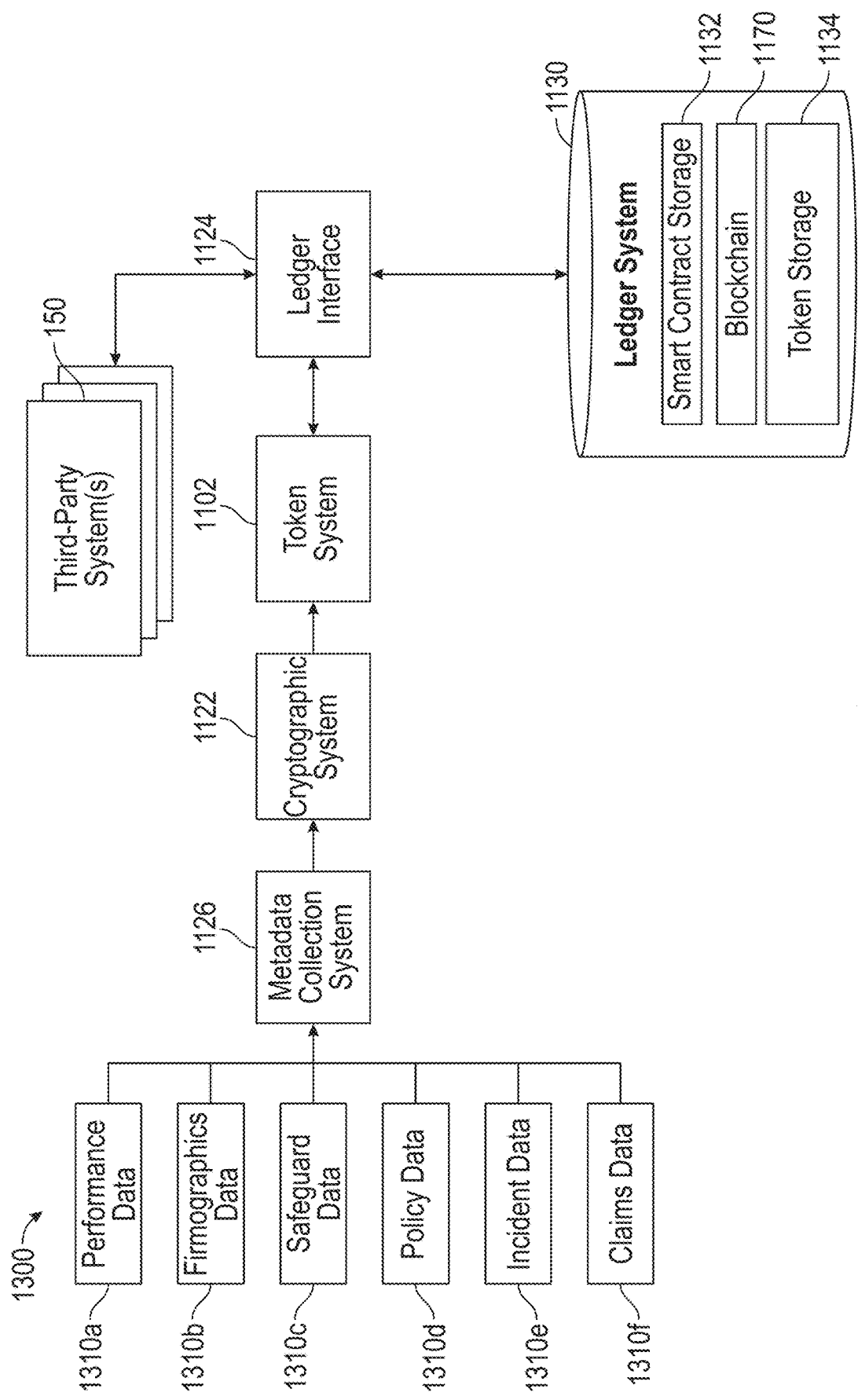
FIG. 13 depicts a block diagram of another architecture of certain systems or devices of FIG. 11, according to some implementations.

Referring now to FIG. 13, a block diagram of an architecture of certain systems or devices of FIG. 11 is shown, according to some implementations. The implementation shown in FIG. 13 includes third-party systems 150 and ledger system 1130. The ledger system 1130 can include smart contract storage 1132, blockchain 1170, and/or token storage 1134. The implementation shown in FIG. 13 can also include metadata collection system 1126, cryptographic system 1122, token system 1102, and/or ledger interface 1124. The implementation shown in FIG. 13 can also include performance data 1310*a*, firmographics data 1310*b*, safeguard data 1310*c*, policy data 1310*d*, incident data 1310*e*, and/or claims data 1310*f* (collectively, cyber resilience data 1310). In some implementations, the system 1300, metadata collection system 1126, cryptographic system 1122, token system 1102 and/or other systems described herein can be implemented as an agent function or sub-function for performing autonomous cyber resilience tasks.

In some implementations, the metadata collection system 1126 can receive or identify cyber resilience data 1310. For example, the metadata collection system 1126 can collect or retrieve performance data 1310*a* (e.g., historical performance data, metrics related to cybersecurity incidents or system performance), firmographics data 1310*b* (e.g., company size, industry type, and/or geographic location), safeguard data 1310*c* (e.g., implemented security controls or measures), policy data 1310*d* (e.g., security policies or compliance requirements), incident data 1310*e* (e.g., records of security breaches or system failures), and/or claims data 1310*f* (e.g., insurance claims or risk assessments) of an entity or organization. In some examples, the metadata collection system 1126 can integrate data from various cybersecurity tools and databases (e.g., third-party systems 150, blockchain 1170, etc.) to compile a cyber resilience dataset. In some implementations, the metadata collection system 1126 can provide the received or identified cyber resilience data to the cryptographic system 1122. In some examples, one or more autonomous or independent agents can receive, transmit, and/or process performance data 1310*a*, firmographics data 1310*b*, safeguard data 1310*c*, policy data 1310*d*, incident data 1310*e*, and/or claims data 1310*f* to perform various cyber resilience operations.

In some implementations, the cryptographic system 1122 can encrypt a portion of the cyber resilience data. For example, the cryptographic system 1122 can apply symmetric encryption algorithms (e.g., AES) to secure sensitive data such as performance data 1310*a* or firmographics data 1310*b*. In another example, the cryptographic system 1122 can use asymmetric encryption techniques (e.g., RSA) to protect keys and authentication credentials. Further, the cryptographic system 1122 can implement hashing algorithms (e.g., SHA-256) to verify the integrity of the data by generating hash values for at least one (e.g., each) data record. In another example, the cryptographic system 1122 can apply quantum-safe encryption protocols and/or digital signature schemes. In some implementations, the cryptographic system 1122 can provide the portion of encrypted cyber resilience data to the token system 1102.

In some implementations, the token system 1102 can generate a metadata object including metadata of cyber resilience data. For example, the token system 1102 can create metadata objects that encapsulate encrypted performance data, safeguard records, and/or compliance data. In some implementations, the token system 1102 can include additional metadata such as timestamps, data sources, and/or integrity checks. In some implementations, the token system 1102 can generate a cyber resilience identity including at least a link with the metadata object, a unique identifier (UID), and/or a performance event dataset. For example, the cyber resilience identity can include a UID to identify the entity, a link to a metadata object (e.g., data of one or more tokens), and/or include a dataset with performance events or incidents. In some implementations, the token system 1102 can encapsulate the cyber resilience identity within a control structure restricting one or more updates and redemptions of the metadata object. The control structure can be a data structure or other system including a cyber resilience identifier (e.g., passport) with linked tokens and restricting accessing to metadata object (e.g., data) of certain tokens. In some implementations, the token system 1102 can determine at least one access data structure being compatible with the control structure. For example, the token system 1102 can utilize various access management techniques, such as access control lists (ACLs), role-based access controls (RBACs), and/or attribute-based access controls (ABACs), to verify that the access data structure aligns with the permissions and restrictions defined within the control structure. The passport system 1120 can assess these access data structures to determine whether the structures comply with predefined standards or policies (e.g., determining whether an entity or authorized user has the appropriate credentials or attributes to access, modify, and/or update the metadata objects encapsulated within the control structure). Additionally, the token system 1102 can dynamically adjust the access parameters based on changes in roles, permissions, and/or security requirements such that the control structure remains consistent with the evolving resilience of various entities and users involved in managing or interacting with the cyber resilience identity.

In some implementations, access controls, such as role-based access controls (RBACs) or access parameters, can be implemented in various forms to manage permissions for entities interacting with the metadata object (e.g., token). Access controls can include any method or mechanism that limits, restricts, and/or authorizes access to certain data based on predefined criteria. Examples of access controls could involve establishing rules that dictate who can view, modify, and/or delete data elements within the metadata object or cyber resilience identity. Such controls can be used to regulate access across different entities, such as allowing a third-party like an insurer to view certain data, modify data, and/or be restricted from accessing other sensitive data. These access controls can also be configured within a broader access management framework, such as ACLs or RBACs, that dynamically adapts to the roles and permissions associated with different users or systems.

In some implementations, the token system 1102 can generate a cyber resilience identity including at least a link with the metadata object, a unique identifier (UID), and/or a performance event dataset. For example, the cyber resilience identity can incorporate a UID to identify the entity, link to the metadata object to reference encrypted data, and/or include a dataset detailing performance events or incidents. The token system 1102 can encapsulate the cyber resilience identity within a control structure restricting one or more updates and redemptions of the metadata object. Further, the token system 1102 can determine at least one access data structure that aligns with the control structure. For example, the token system 1102 can use access control lists or role-based access controls to verify alignment with the control structure for control over which data elements can be accessed or modified by different entities. In some implementations, the ledger interface 1124 can broadcast, using the control structure, the cyber resilience identity to a ledger or distributed ledger. For example, the ledger interface 1124 can interact with the ledger system 1130, including smart contract storage 1132, blockchain 1170, and/or token storage 1134, to submit the cyber resilience identity and associated metadata and publish the cyber resilience identity to blockchain 1170. In some examples, the ledger interface 1124 can also communicate with third-party systems 150 to share and verify the cyber resilience identity across different platforms and networks (e.g., to transmit to a vendor or insurer).

Figure 14:
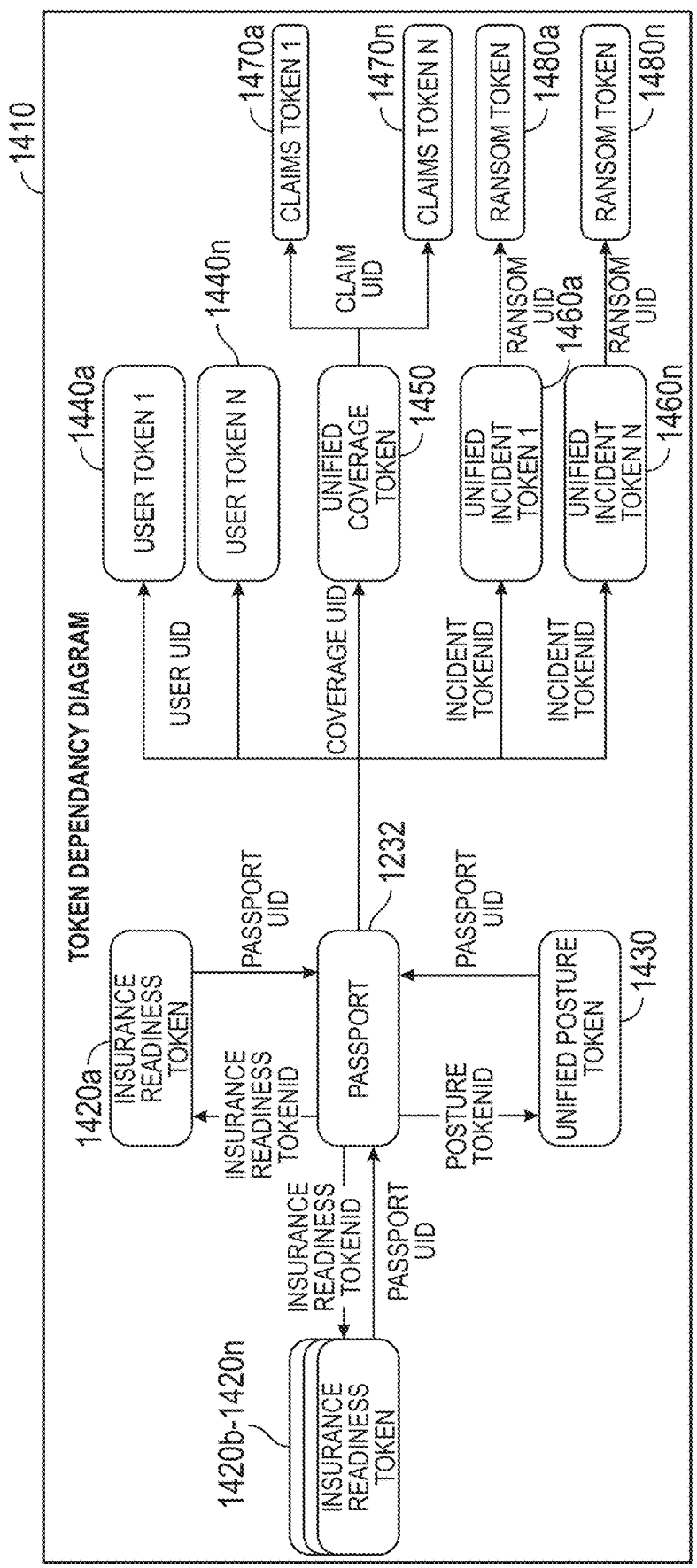
FIG. 14 depicts a block diagram of a token dependency system for tokenized cyber resilience data, according to some implementations.

Referring now to FIG. 14, a block diagram of a token dependency system 1410 for tokenized cyber resilience data is shown, according to some implementations. The implementation shown in FIG. 14 includes a dynamic passport 1232 and one or more insurance readiness tokens 1420a-1420n (collectively, 1420), a unified posture token 1430, one or more user tokens 1440a-1430n (collectively 1440), a unified coverage token 1450, one or more unified incident tokens 1460a-1460n (collectively 1460), claims tokens 1470a-1470n (collectively 1470 tokens), and/or ransom tokens 1480a-1480n. In some implementations, the token dependency system 1410, and systems and/or functions described can be implemented as an agent function or sub-function for performing autonomous cyber resilience tasks. In some examples, an orchestration system can allocate or distribute tokens described with regard to FIG. 14 and/or token-related operations (e.g., instructions to generate a token) to various autonomous or independent agents.

In some implementations, the dynamic passport 1232 can operate as a central node and be linked to tokenized cyber resilience data (e.g., tokens) to facilitate interactions across the various tokens in managing, accessing, and/or updating cyber resilience data. For example, the dynamic passport 1232 can be linked to the insurance readiness tokens 1420 via the passport UID and/or insurance readiness token ID. In another example, the dynamic passport 1232 can be linked to the unified posture token 1430 through the passport UID and/or posture token IDs. Further, the dynamic passport 1232 can be linked to user tokens 1440 through a user UID. The dynamic passport 1232 can further be linked to the user to a unified coverage token 1450 via a coverage UID. In some examples, the unified coverage token 1450 can be linked to claims tokens 1470 via a claim UID, and/or the link can provide the dynamic passport 1232 with access to the claims tokens 1470. Further, the dynamic passport 1232 can be linked with the unified incident tokens 1460 via an incident token ID. In some examples, the unified incidents tokens 1460 can be linked to the ransom tokens 1480 via a ransom UID, and/or the link can provide the dynamic passport 1232 with access to the ransom tokens 1480.

Figure 15A:
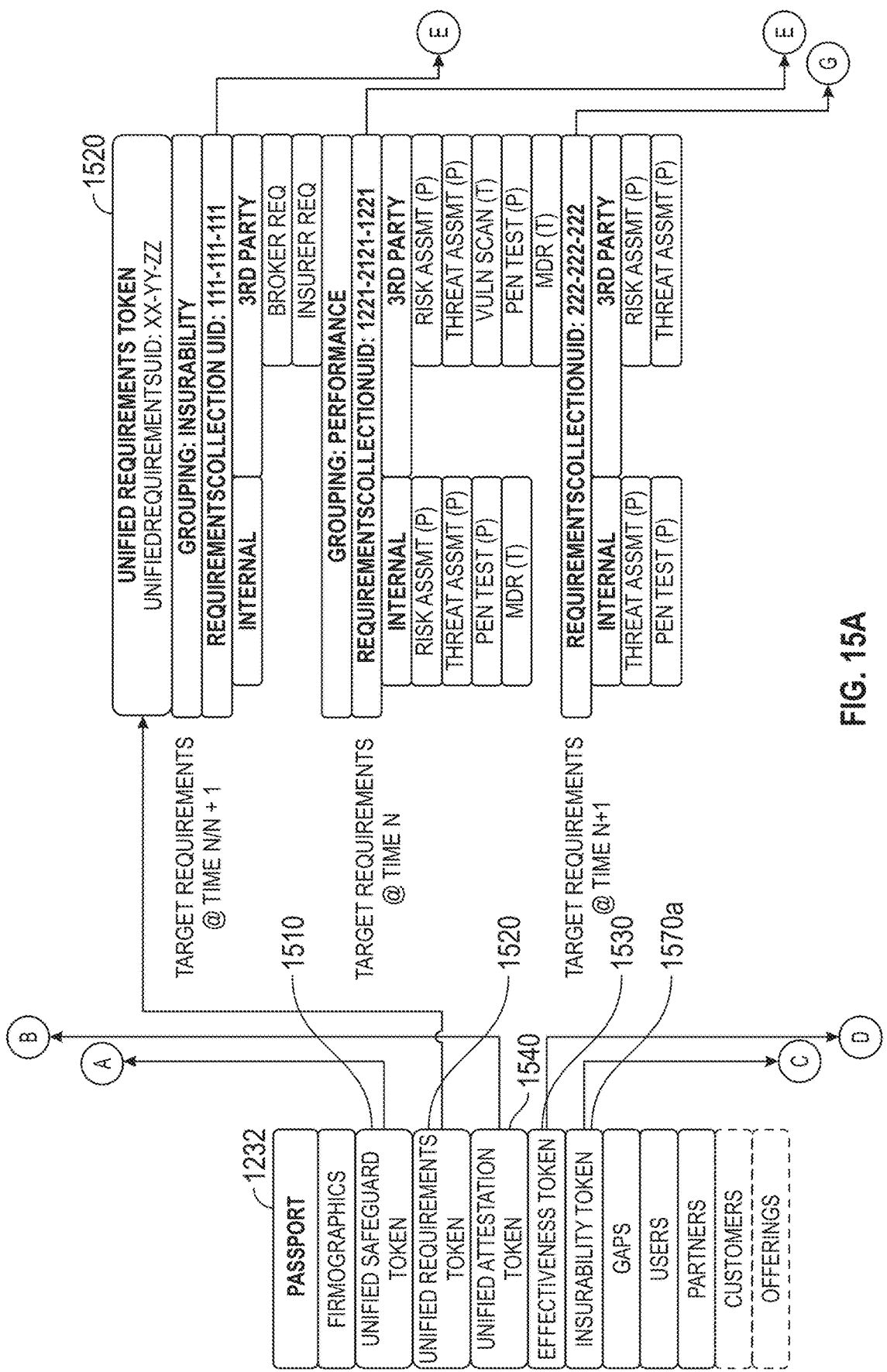
FIGS. 15A-15I depict an architecture for tokenized cyber resilience data, according to some implementations.

Referring generally to FIGS. 15A-15I, an architecture for tokenized cyber resilience data is shown, according to some implementations. Referring now to FIG. 15A, the dynamic passport 1232 can include various cyber resilience data, such as firmographics data, unified safeguards token 1510, unified requirements token 1520, unified attestation token 1540, effectiveness token 1530, insurability token 1570a, gap information, users, partners, customers, offerings, etc. In some examples, the unified safeguards token 1510 can receive data/be linked with other systems or data via node A, the unified attestation token 1540 can receive data/be linked with other systems or data via node B, the effectiveness token can receive data/be linked with other systems or data via node C, and/or the insurability token 1570a can receive data/be linked with other systems or data via node D, as further described herein. In some implementations, entities can interact with and/or access the dynamic passport 1232 and/or linked tokens (e.g., unified safeguards token 1510, unified requirements token 1520) based on various rules (e.g., access controls with various access parameters). In some implementations, the tokenized cyber resilience data implementation can be implemented as an agent function or sub-function for performing autonomous cyber resilience tasks. In some examples, an orchestration system can allocate or distribute tokens described with regard to FIG. 15 and/or token-related operations (e.g., instructions to generate a token) to various autonomous or independent agents.

In some implementations, FIGS. 15A-15I illustrates tokenized cyber security data over various times (e.g., time N/N+1, time N, time N+1, etc.). In some implementations, unified tokens (e.g., unified safeguards token 1510, unified requirements token 1520, unified attestation token 1540, etc.) can store metadata of cyber resilience data over a time period. For example, the unified requirements token 1520 can be generated by the token system 1102 and can include a unified requirements UID and an insurability grouping with grouped cyber resilience data. In another example, the unified requirements token 1520 can include a first requirements collection UID corresponding to requirements (e.g., cyber resilience standards for a policy) at a first time (e.g., time N/N+1), which can be linked with other systems/and or data via node E, as further described herein. In another example, the unified requirements token 1520 can include a second requirements collection UID corresponding to requirements at a second time (e.g., time N+1), which can be linked with other systems/and or data via node F, as further described herein. Still yet, in another example, the unified requirements token 1520 can include a third requirements collection UID corresponding to requirements at a third time (e.g., time N), which can be linked with other systems/and or data via node G, as further described herein. For example, the first, second, and/or third UID can correspond to various internal and/or third-party cyber resilience requirements at different times, such as risk assessment data, threat assessment data, other testing data, MDR data, pen test data, vulnerability scan data, broker requirements, insurer requirements, etc.

Figure 15B:
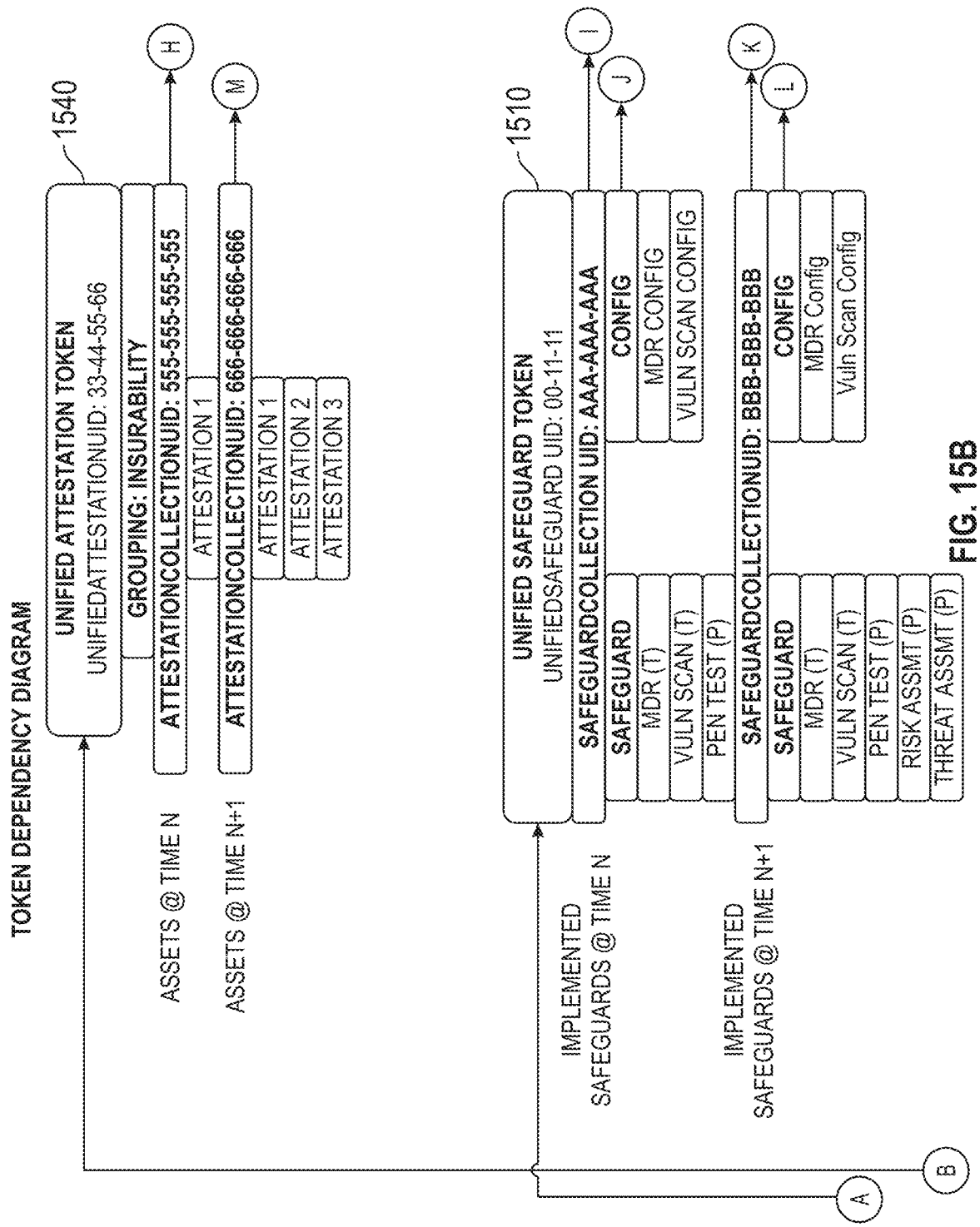

Referring now to FIG. 15B, the unified attestation token 1540 can be linked to the dynamic passport 1232 via node A. As described regarding the unified requirements token 1520, the unified attestation token 1540 can include groupings and/or data corresponding to attestations at various times. For example, the unified attestation token 1540 can be generated by the token system 1102 and can include an insurability grouping with a first attestation collection UID corresponding with assets (e.g., attestation 1) at a first time (e.g., time N), and/or the first attestation collection UID can be linked with other systems/data via node H. Further, the unified attestation token 1540 can include a second attestation collection UID corresponding with assets (e.g., attestation 1, attestation 2, attestation 3, etc.) at a second time (e.g., time N+1), and/or the second attestation collection UID can be linked with other systems/data via node M. In some implementations, the unified safeguard token 1510 can be linked to the dynamic passport 1232 via node B. For example, as described above, the unified safeguard token 1510 can include groupings and/or data corresponding to safeguards at various times. For example, the unified safeguard token 1510 can include a first safeguard collection UID corresponding with safeguards (e.g., MDR, vulnerability scans, penetration test rules, etc.) at a first time (e.g., time N), and/or the first safeguard collection UID can be linked with other systems/data via node I. The unified safeguard token 1510 can further include a first configuration, which can be linked to other data/systems via node J and include data corresponding to cyber resilience systems and/or protection techniques implemented in a cyber resilience architecture of an organization (e.g., MDR configurations, vulnerability scan configurations, etc.). Further, the unified safeguard token 1510 can include a second safeguard collection UID corresponding with safeguards implemented at a second time (e.g., time N+1), and/or the second attestation collection UID can be linked with other systems/data via node K. The unified safeguard token 1510 can further include a second configuration, which can be linked to other data/systems via node L.

Figure 15C:
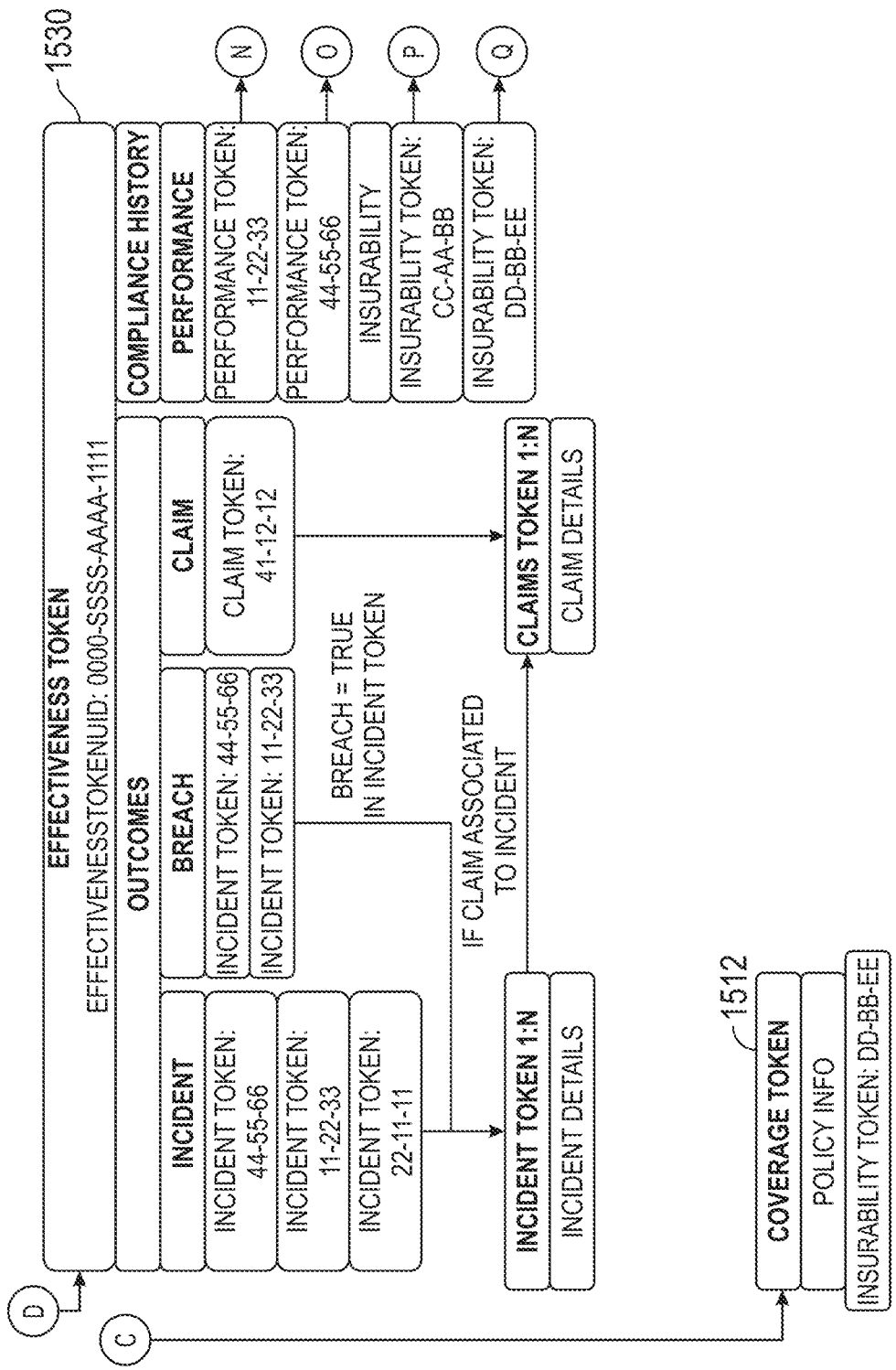

Referring now to FIG. 15C, a coverage token 1512 can be linked to the dynamic passport 1232 via node C. In some examples, the coverage token 1512 can be generated by the token system 1102 can include cyber protection information such as policy information (e.g., policy number, type, etc.) and various tokens including insurability information (e.g., an insurability token). In some implementations, the effectiveness token 1530 can be linked to the dynamic passport 1232 via node D. The effectiveness token 1530 can include various data corresponding to cyber resilience outcomes, such as incident data (e.g., via incident tokens 1 through N), corresponding breach data (e.g., via incident tokens 1 through N), and/or corresponding claims data (e.g., via claims tokens 1 through N associated with incident tokens 1 through N). In some implementations, the effectiveness token 1530 can include various data corresponding to cyber resilience compliance history, such as historical performance data. For example, the performance data can include multiple performance tokens including respective timestamps or identifiers corresponding to cyber resilience performance of an entity during one or more incidents/breaches or claims associated with incident tokens and/or claims tokens, and/or the performance tokens (e.g., performance tokens 1580a-1580b) can be linked to other data/systems via node N and node O. In some implementations, the effectiveness token 1530 can include insurability data, such as one more insurability tokens (e.g., received via coverage token 211). In some examples, the insurability tokens (e.g., insurability tokens 1570a-1570b) can be linked to other data/systems via node P and node Q.

Figure 15D:
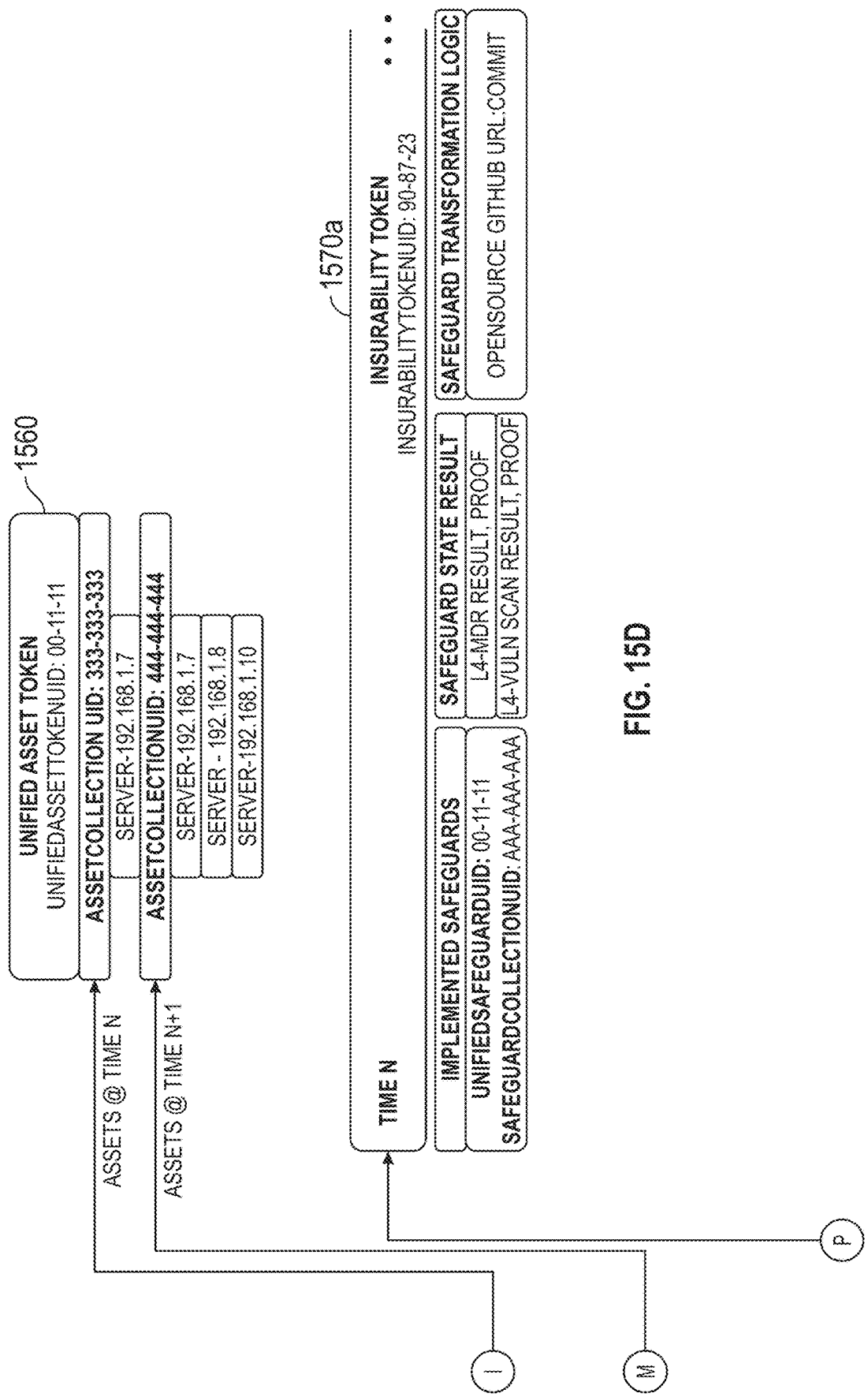
Figure 15E:
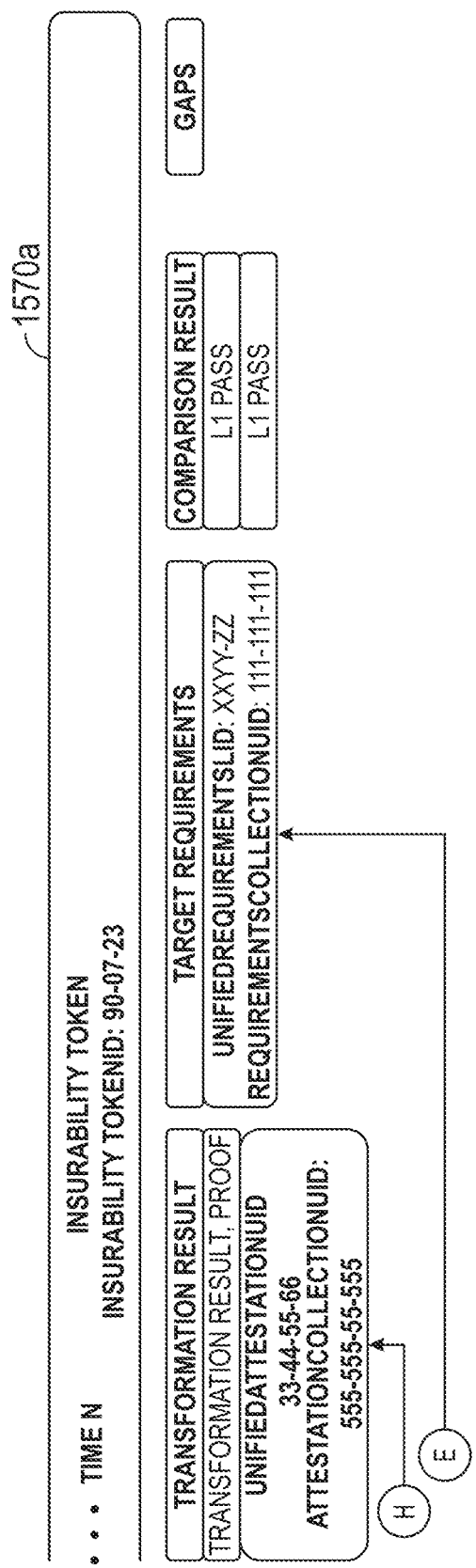

Referring now to FIG. 15D, the dynamic passport 1232 can be linked to the unified asset token 1560 via node I and/or via node M. For example, the unified asset token 1560 can be generated by the token system 1102 and can include a first grouping of assets (e.g., server identifier 1) at a first time (e.g., time N) and a second grouping of assets (e.g., server identifier 1, server identifier 2, server identifier 3, etc.) at a second time (e.g., time N+1). In some implementations, the insurability token 1570a can be linked to the dynamic passport 1232 via node P with the effectiveness token 1530. For example, the insurability token 1570a can include insurability data at a first time (e.g., time N), such as implemented safeguards and associated identifiers, safeguard state results (e.g., L4-MDR result and proofs, L4-vulnerability scan results and proofs), and/or safeguard transformation logic (e.g., accessible via a URL or other link). Referring now to FIG. 15E, the insurability token 1570a can further include a transformation result and/or proof, which can be linked via UIDs to node H with the unified attestation token 1540. The insurability token 1570a can further include target requirements, which can be linked via UIDs or other identifiers with the unified requirements token 1520. The insurability token 1570a can further include comparison results (e.g. L1) pass, gap data (e.g., data of missing and/or inadequate cyber protections), and/or more.

Figure 15F:
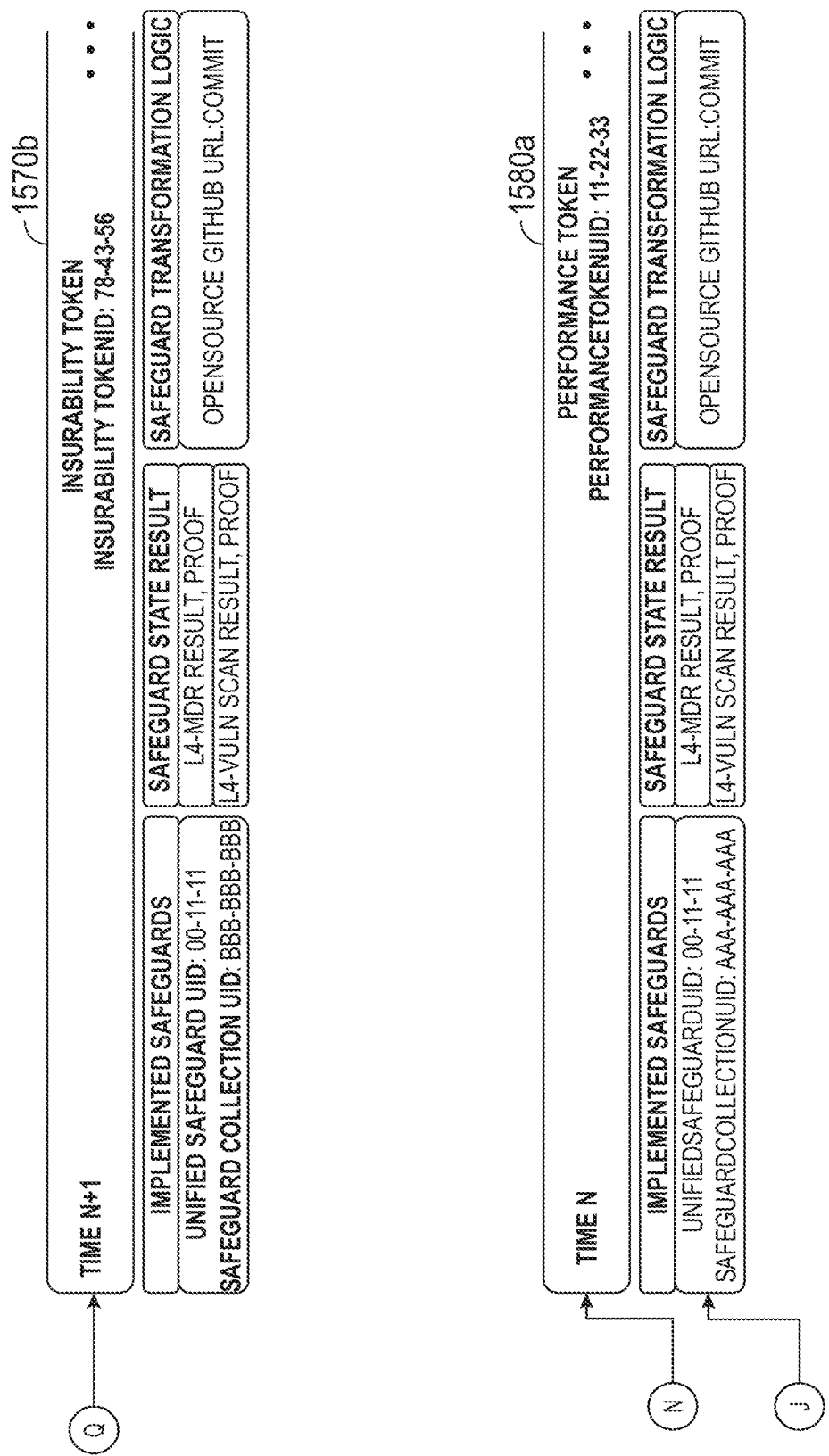

Referring now to FIG. 15F, the dynamic passport 1232 can be linked to the insurability token 1570b via node Q. As shown in FIG. 15F, the insurability token 1570b can be generated by the token system 1102 and can include insurability data at a second time (e.g., time N+1), such as implemented safeguards and associated identifiers, safeguard state results, and/or safeguard transformation logic. For example, the insurability token 1570b can include encrypted data of implemented safeguards, such as firewall configurations or endpoint protection settings, verified against cyber resilience requirements. The encrypted data can be encapsulated within a control structure configured to restrict updates or access based on cryptographic proofs, allowing authorized entities (e.g., those with permitted access based on RBACs) to modify, create, view, and/or retrieve the data in accordance with access controls defined for the dynamic passport 1232. In some implementations, the dynamic passport 1232 can be linked to the performance token 1580a via node N with the effectiveness token 1530. In some examples, the performance token 1580a can include performance data of an entity at a first time (e.g., time N), including implemented safeguards, results, transformation logic, etc. In some implementations, the implemented safeguards can be linked, via node J, with a configuration of the unified safeguard token 1510.

Figure 15G:
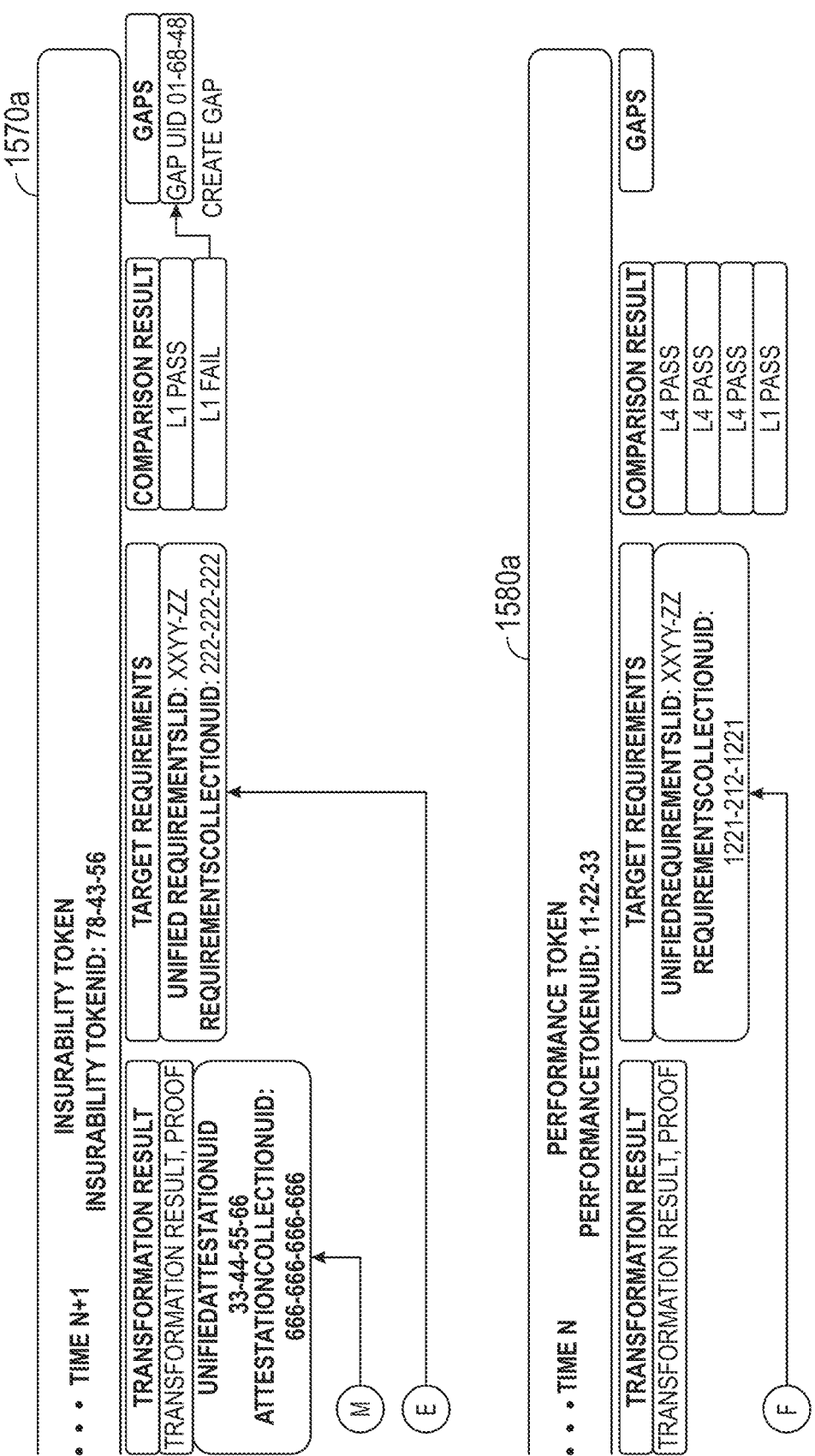

Referring now to FIG. 15G, the insurability token 1570b can further include a transformation result and/or proof, which can be linked via UIDs to node M with the unified attestation token 1540. In some implementations, the insurability token 1570b can be generated by the token system 1102 and can further include target requirements, which can be linked via UIDs or other identifiers with the unified requirements token 1520 via node E. Further, the insurability token 1570a can further include comparison results (e.g. L1 pass/fail), gap data (e.g., gap UIDs), etc. In some implementations, the performance token 1580a can further include transformation results and/or proofs, comparison results (e.g., L4 pass/fail), and/or gaps. Further, the insurability token 1570b (or another token) can store cryptographic proofs of provenance corresponding with and entity and/or associated cyber resilience data. In some examples, the performance token 1580a can include target requirements and associated IDs, accessible via node F, from the unified requirements token 1520.

Figure 15H:
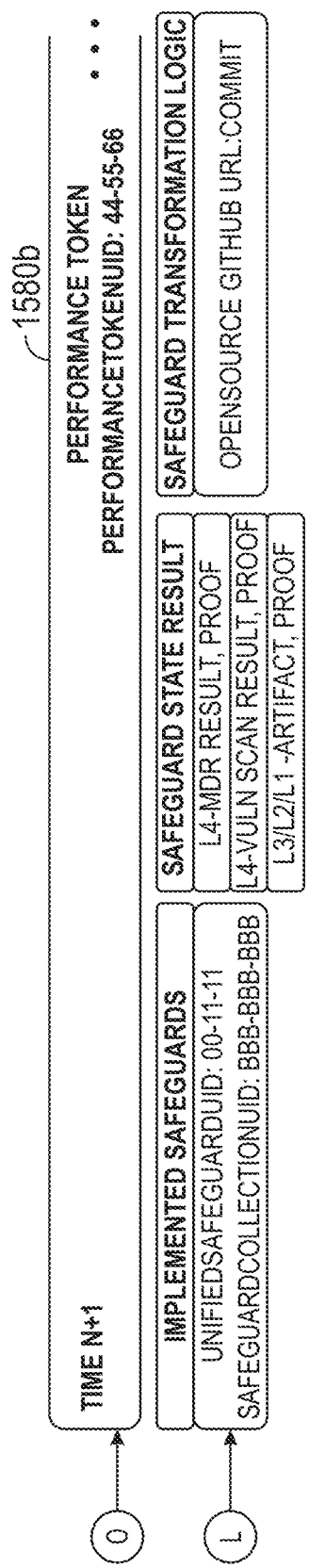
Figure 15I:
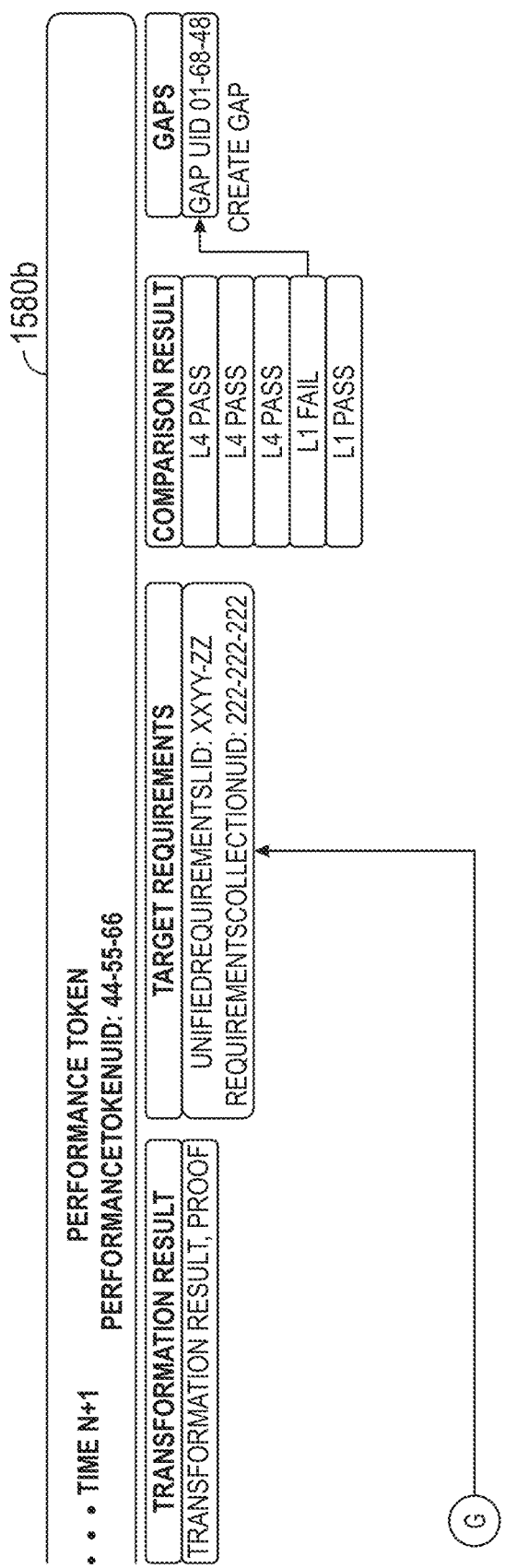

Referring now to FIG. 15H, the dynamic passport 1232 can be linked to the performance token 1580b via node O with the effectiveness token 1530. In some examples, the performance token 1580b can be generated by the token system 1102 and can include performance data of an entity at a second time (e.g., time N+1), including implemented safeguards, results, transformation logic, etc. For example, the performance token 1580a and the performance token 1580b can include performance data sets encapsulated within a control structure corresponding to the dynamic passport 1232, and/or access to data of the performance tokens 1580a-1580b can be granted based on an access data structure compatible with a control structure (e.g., allowing authorized entities to retrieve and/or update metadata of the performance token 1580b based on access controls, restricting access and/or updates to the performance data based on access controls, etc.). In some implementations, the implemented safeguards can be linked, via node L, with a configuration of the unified safeguard token 1510. Referring now to FIG. 15I, the performance token 1580b can further include transformation results and/or proofs, comparison results, and/or gaps. The performance token 1580b can also include target requirements and identifiers received via node G with the unified requirements token 1520.

Figure 16:
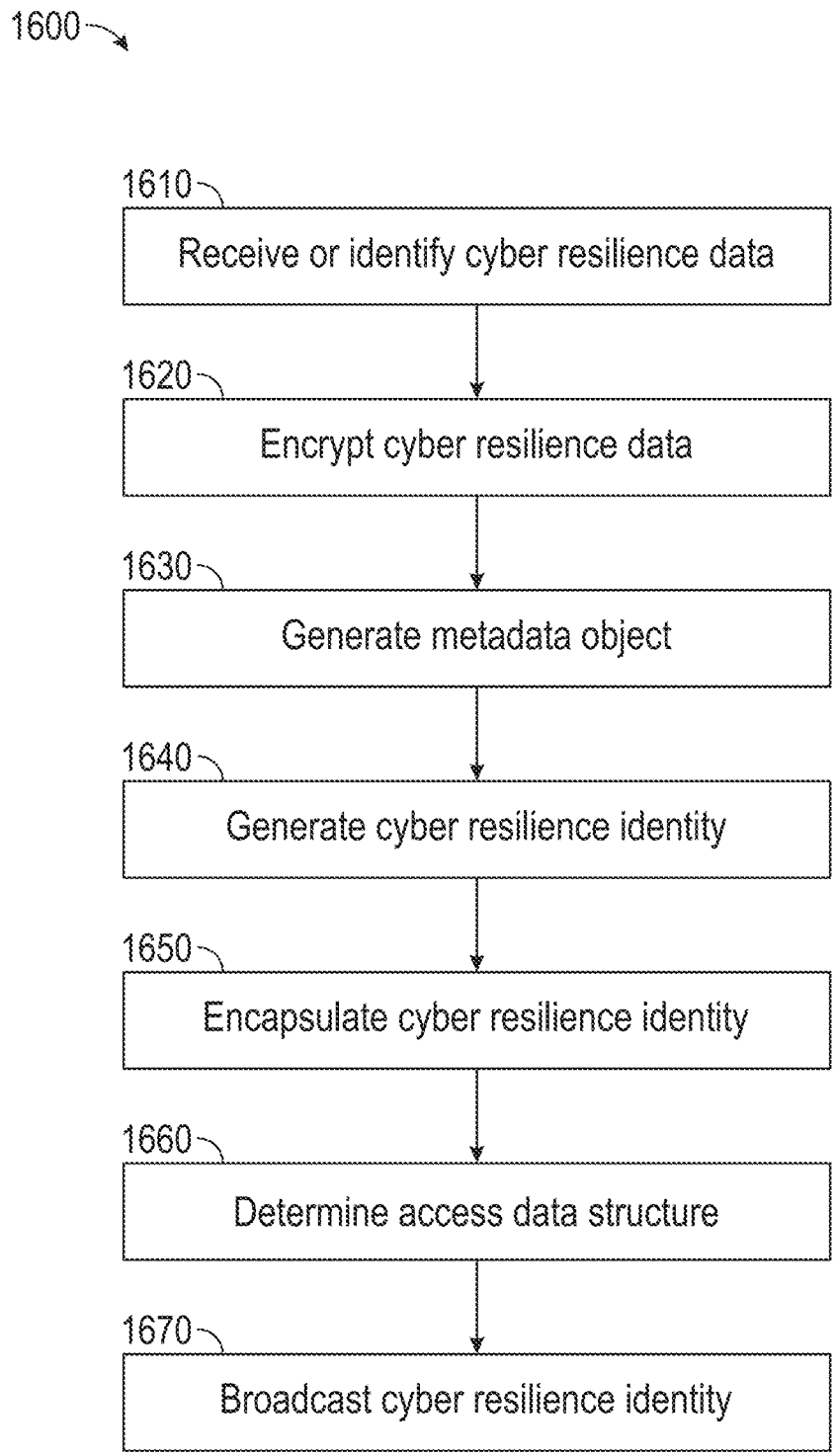
FIG. 16 depicts a flowchart for a method of modeling cyber resilience data using cyber resilience identities and associated metadata, according to some implementations.

Referring now to FIG. 16, a flowchart for a method 1600 of modeling cyber resilience data using cyber resilience identities and associated metadata is shown, according to some implementations. One or more of the components described with respect to FIGS. 1A-1B or FIG. 11 can be used to perform the steps of method 1600. For example, the response system 130 of FIGS. 1A-1B or the passport system 1120 of FIG. 11 can perform one or more of the steps of the method 1600. Additional, fewer, and/or different operations can be performed depending on the particular implementation. In some implementations, some, and/or all operations of method 1600 can be performed by one or more processors executing on one or more computing devices, systems, and/or servers. In some implementations, at least one (e.g., each) operation can be re-ordered, added, removed, and/or repeated.

In a broad overview of method 1600, at block 1610, the one or more processing circuits (e.g., passport system 1120 of FIG. 11) can receive or identify cyber resilience data. At block 1620, the one or more processing circuits can encrypt the cyber resilience data. At block 1630, the one or more processing circuits can generate a metadata object. At block 1640, the one or more processing circuits can generate a cyber resilience identity. At block 1650, the one or more processing circuits can encapsulate the cyber resilience identity. At block 1660, the one or more processing circuits can determine an access data structure. At block 1670, the one or more processing circuits can broadcast the cyber resilience identity.

In some implementations, at block 1610, the one or more processing circuits can receive or identify cyber resilience data. For example, the metadata collection system 1126 of the passport system 1120 can gather performance data 1310a, firmographics data 1310b, safeguard data 1310c, policy data 1310d, incident data 1310e, and/or claims data 1310f. In some examples, the passport system 1120 can interface with blockchain 1170 to retrieve historical cybersecurity events and insurance-related data. In another example, the token system 1102 can provide data corresponding to token transactions and associated cyber resilience metadata, and/or the passport system 1120 can receive or identify the tokenized cyber resilience data via interactions with various tokens (e.g., performance tokens, roll-up tokens, etc.). In another example, the metadata collection system 1126 can receive cyber resilience data from user computing systems 1110 or from third-party systems 150 through the ledger interface 1124. In another example, the metadata collection system 1126 can receive encrypted cybersecurity posture information and insurance data when a company signs up on the platform. In some implementations, the passport system 1120 can collect and process retrieved cyber resilience data related to the historical cybersecurity performance of the company and current risk assessments. Further, in another example, the passport system 1120 can gather data from external cybersecurity assessment tools integrated via the ledger interface 1124. For example, the passport system 1120 can collect data from outputs of autonomous agent operations.

In some implementations, at block 1620, the one or more processing circuits can encrypt the cyber resilience data. For example, the cryptographic system 1122 of the passport system 1120 can apply various encryption algorithms or techniques (e.g., AES-256, RSA, ECC (Elliptic Curve Cryptography), etc.) to encrypt various types of cyber resilience data (e.g., performance data 1310a, safeguard data 1310c, etc.). For example, the cryptographic system 1122 can apply a quantum-safe encryption protocol to generate a protected data package including the cyber resilience data. In some implementations, at block 1620, the one or more processing circuits can encrypt a portion of the cyber resilience data. That is, the passport system 1120 can selectively encrypt portions of the cyber resilience data (e.g., encrypting attributes within policy data 1310d or particular records in claims data 1310f) received at block 1610 based on determined parameters (e.g., sensitivity, relevance, etc.) corresponding to the data or based on various additional factors (e.g., entity preferences, regulations, policy requirements, etc.). For example, the cryptographic system 1122 can selectively encrypt attributes within policy data 1310*d*, such as encryption of policy coverage data, while leaving other attributes unencrypted. In another example, the passport system 1120 can apply encryption to claims data 1310*f* to encrypt sensitive or private data such as financial amounts or claim descriptions based on determined sensitivity levels or regulatory requirements, and/or the passport system 1120 can not apply encryption to other received data (e.g., firmographics data 1310*b*) such that at least a portion of data received at block 1610 is encrypted. Further, the passport system 1120 can perform encryption dynamically as data is ingested or updated (e.g., encrypting transaction data when such data is entered into the system or encrypting data subsets based on access control policies).

In some implementations, at block 1630, the one or more processing circuits can generate a metadata object. In some examples, a metadata object generally refers to a structured set of data that provides information about other data, including data such as identification information, descriptive information, administrative information, structural information, and/or contextual information to assist in organizing, finding, and/or understanding the underlying data. For example, the passport system 1120 can generate a metadata object including various attributes such as data collection timestamps, data source identifiers, and/or categorization tags. In another example, the metadata object can be generated to include information about the cyber resilience data, such as data on the origin of the data (e.g., user computing systems 1110 or third-party systems 150), data processing stages, and/or data types (e.g., performance data 1310*a* or policy data 1310*d*). In some implementations, at block 1630, the one or more processing circuits can generate a metadata object including metadata of cyber resilience data. For example, the passport system 1120 can generate a metadata object (e.g., information of a token) to encapsulate data related to the encrypted cyber resilience data (e.g., encryption algorithms used, encryption timestamps) and include references to related events or records (e.g., linking policy data 1310*d* that can be encrypted to security incidents or compliance checks). Further, the metadata object generated by the passport system 1120 can incorporate contextual information about data handling practices (e.g., data access controls, audit trails) and compliance measures (e.g., adherence to industry standards or internal policies) corresponding to cyber resilience data received or collected at block 1610.

In some implementations, at block 1640, the one or more processing circuits can generate a cyber resilience identity. In some examples, a cyber resilience identity generally refers to a dynamic, identifier that encapsulates various aspects of an entity or organization cyber resilience posture (e.g., dynamic passport 1232). For example, the passport system 1120 can generate a dynamic passport 1232 that includes a link to the metadata object, and/or the metadata object can provide context about the cyber resilience data (e.g., data type, encryption data, data source information, etc.). In some implementations, the passport system 1120 can generate a cyber resilience identity linked to a unique identifier (UID) of an entity or organization. For example, the UID can be assigned by the passport system 1120 to reference and track the cyber resilience data of the entity and provide the entity with access to such data. Further, in some examples, the passport system 1120 can generate a cyber resilience identity incorporating or being otherwise linked to a performance event dataset (e.g., cyber resilience dataset used to record performance metrics, security incidents, and/or compliance activities linked to the data of the entity). For example, the passport system 1120 can generate the dynamic passport 1232 to reflect updates from performance tokens, track incident logs, and/or link such records with relevant compliance checks. Further, as new data or events occur, the passport system 1120 can update the cyber resilience identity (e.g., dynamic passport 1232) to reflect new or updated information.

In some implementations, at block 1650, the one or more processing circuits can encapsulate the cyber resilience identity. For example, encapsulation can generally include securing, containerizing, and/or packaging the cyber resilience identity within a data structure. In some implementations, at block 1650, the one or more processing circuits can encapsulate the cyber resilience identity within a control structure restricting one or more updates or redemptions of the metadata object. For example, the passport can be linked to a control structure which can define permissions or conditions under which a metadata object (e.g., data of tokens) can be altered or accessed. In some examples, the control structure can include tokens that represent secure access points or validation measures for the encapsulated identity. In another example, the passport system 1120 can use a digital signature within the control structure to verify the authenticity of the encapsulated cyber resilience identity and protect the identity and corresponding resilience data from tampering. Additionally, the passport system 1120 can implement access controls (e.g., RBACs) within the control structure that restrict access based on user roles or access levels to verify that authorized entities can modify or view elements of the cyber resilience identity. For example, the control structure can incorporate a dynamic passport 1232, which can include tokens 1234*a*-1234*e* (e.g., resilience tokens), at least one (e.g., each) linked to a metadata interface 1270 with metadata objects 1272*a*-1272*e*. In some examples, encapsulating can include the passport system 1120 storing or aggregating the dynamic passport 1232 and tokens 1234 and setting corresponding access permissions (e.g., based on compliance with cyber resilience standards). For example, the control structure processor 1230 can output the encapsulated data when conditions or permissions are verified or when a valid decryption key is presented. For example, encapsulating can include or refer to encrypting the cyber resilience identity using quantum-safe encryption protocols or signing the identity based on a quantum-safe digital signature protocol.

In some implementations, at block 1660, the one or more processing circuits can determine an access data structure. For example, an access data structure can define a format and/or organization of data that specifies how access permissions and conditions are structured and/or enforced. For example, the access data structure can incorporate access control lists (ACLs) or attribute-based access control (ABAC) mechanisms to specify access rights and restrictions based on user attributes or roles. In some implementations, at block 1660, the one or more processing circuits can determine at least one access data structure being compatible with the control structure. For example, the passport system 1120 can identify an access data structure that aligns with the permissions and constraints established by control structure processor 1230. For example, the passport system 1120 can identify an access data structure that conforms to the permissions and constraints established by the smart contract control structure 1220. Additionally, the passport system 1120 can integrate the access data structure with the smart contract control structure 1220 by implementing token-based authorization or rule-based access controls to manage access to the cyber resilience identity. Further, the passport system 1120 can configure the access data structure to enforce access permissions and conditions using control protocols (e.g., token validation procedures through token interface 1210 or multi-factor authentication settings within the smart contract control structure 1220). For example, the passport system 1120 can configure an access data structure that uses token-based authorization to allow entities with valid tokens (e.g., tokens 1234a-1234e) generated by token generator 1240 to access certain metadata objects 1272 within the dynamic passport 1232.

In some implementations, at block 1670, the one or more processing circuits can broadcast the cyber resilience identity. For example, the passport system 1120 can broadcast the generated cyber resilience identity, including its associated metadata and performance event dataset, to a distributed ledger such as blockchain 1170 or to agent network 140. In some examples, broadcasting can include the passport system 1120 using the blockchain interface 1260 to transmit the identity and associated data so that it is securely recorded and accessible across the distributed ledger network. In some implementations, at block 1670, the one or more processing circuits can broadcast the cyber resilience identity to a ledger or distributed ledger. For example, the passport system 1120 can use the blockchain interface 1260 to broadcast the cyber resilience identity to blockchain 1170, where it can be immutably stored and made accessible for future verification and audit. In another example, the passport system 1120 can broadcast the identity to multiple nodes within a distributed ledger, distributing the validation and recording of the cyber resilience identity across the network. Further, the broadcast can include cryptographic proofs or signatures to authenticate the identity, restricting updates or accesses to the identity as recorded on the ledger to authorized entities. For example, the passport system 1120 can broadcast the dynamic passport 1232, along with linked tokens 1234a-1234e and associated metadata objects 1272a-1272e, to blockchain 1170, where the broadcasted information can be validated by consensus mechanisms and securely stored across the distributed ledger.

In some implementations, the one or more processing circuits can receive an access request for the cyber resilience identity. In some implementations, the one or more processing circuits can receive, from an entity computing system corresponding to the cyber resilience identity or from an authorized entity computing system corresponding to an authorized entity of a plurality of authorized entities, an access request including at least one access data structure compatible with a control structure for restricting one or more updates and redemptions of a metadata object corresponding with the cyber resilience identity. That is, the passport system 1120 can receive an access request that includes data structures, such as access tokens or certificates, which are evaluated against role-based access controls (RBACs) defined by the control structure (e.g., smart contract). In some examples, the cyber resilience identity can be associated with an entity and can be encapsulated within a control structure that links the identity to various tokens, such as performance tokens or safeguard tokens, which authorized entities (e.g., vendors, insurers) can request access to (e.g., a type of access such as read access, write access, etc.).

In some implementations, the one or more processing circuits can verify the access data structure. In some implementations, the one or more processing circuits can verify the at least one access data structure using the control structure. For example, the control structure (e.g., smart contract) can assess whether the access request complies with the predefined role-based access controls (RBACs) and cryptographic validation protocols. That is, verifying can include determining if the requesting entity has the permissions to access or modify tokens or tokenized data within the cyber resilience identity, allowing authorized entities to interact with the associated metadata objects or performance event datasets in various ways based on various access controls.

In some implementations, the one or more processing circuits can grant access to the metadata object and the performance event dataset of the cyber resilience identity. In some implementations, the one or more processing circuits can grant access to the metadata object and the performance event dataset to the entity or the authorized entity. For example, after verifying the access request, the passport system 1120 can grant access to tokens within the cyber resilience identity, such as performance tokens or safeguard tokens. That is, granting access can include permitting or allowing the user computing system 1110 or the authorized entity computing system (e.g., third-party system 150 or user computing system 1110) to retrieve information about the cyber resilience performance of the entity over time or to view and interact with tokenized data, depending on the permissions defined by the RBACs.

In some implementations, the one or more processing circuits can decrypt the metadata object. In some implementations, the one or more processing circuits can decrypt the metadata object after access is granted. For example, the passport system 1120 can use the cryptographic system 1122 to decrypt tokens or portions of tokenized data as permitted by the verified access request. That is, the decryption process can be applied selectively, allowing the data segments authorized by the RBACs to be decrypted and made accessible to the requesting entity. Additionally, the decryption can be performed in real-time as the access request is processed, maintaining the security of the metadata object throughout the interaction.

In some implementations, the one or more processing circuits can provide access to the metadata object and the performance event dataset. In some implementations, the one or more processing circuits can provide access to the metadata object and the performance event dataset by facilitating retrieval using a secure interface between the one or more processing circuits and the entity computing system or the authorized entity computing system. For example, the passport system 1120 can use a secure interface, such as a blockchain interface 1260, to allow the user computing system 1110 or the authorized entity computing system to retrieve and interact with the decrypted metadata object and performance event dataset. That is, the interface enforces the RBACs and control structure policies during data retrieval, restricting access to the performance tokens and other sensitive information to authorized entities. Additionally, encryption protocols can be applied during data transmission to protect the integrity and confidentiality of the data as it is accessed by the requesting entity.

In some implementations, the control structure includes a verification function to restrict the one or more updates and redemptions of the metadata object. For example, the smart contract control structure 1220 can include a verification function that validates requests to update or redeem the metadata object based on predefined rules or policies. This function can operate within the control structure to restrict any attempted updates or redemptions to those that meet verification criteria. In some implementations, the verification function is executable by control structure to validate one or more of the one or more updates and redemptions of the metadata object by verifying one or more cryptographic proofs of authorization of authorized entities prior to updating the cyber resilience identity. For example, the smart contract control structure 1220 can execute a verification function that checks cryptographic proofs, such as digital signatures or hashed authentication tokens, from multiple authorized entities before processing any changes to the metadata object. In another example, the verification function can cross-reference these cryptographic proofs with a list of pre-approved entities stored within the smart contract control structure 1220 to verify that entities with the correct authorization can initiate updates. Additionally, the verification function can include multi-factor authentication protocols, where authorized entities provide multiple forms of verification (e.g., a combination of cryptographic proofs and biometric data) before any updates to the cyber resilience identity (e.g., dynamic passport 1232) are processed.

In some implementations, the one or more processing circuits can be further configured to receive or identify additional cyber resilience data of an entity corresponding to the cyber resilience identity. For example, the metadata collection system 1126 of the passport system 1120 can gather additional data that complements the performance data 1310$a$, safeguard data 1310$c$, and/or other cyber resilience data previously received at block 1610. This additional data can include updated incident data 1310$e$ or newly identified vulnerabilities from third-party systems 150. In some implementations, the one or more processing circuits can be further configured to receive at least one cryptographic proof of provenance of the additional cyber resilience data. For example, the passport system 1120 can generate a cryptographic proof of provenance by creating a secure hash (e.g., using SHA-256) of the additional cyber resilience data, such as a software update or new compliance report. This proof of provenance can be used to verify the origin and integrity of the data, ensuring that it has not been tampered with during transmission or storage. In some implementations, the one or more processing circuits can be further configured to verify, using the verification function of the control structure, the at least one cryptographic proof of provenance. For example, the smart contract control structure 1220 can compare the cryptographic proof with existing transaction records and digital signatures stored within blockchain 1170 or other distributed ledgers, validating the authenticity and integrity of the newly received data before it is appended to the cyber resilience identity.

In some implementations, the one or more processing circuits can be further configured to update, using the control structure, the cyber resilience identity by updating the metadata object or appending the additional cyber resilience data to the performance event dataset. For example, the smart contract control structure 1220 can automatically update the metadata object to reflect new security incidents or append the additional data to the performance event dataset, linking the metadata object with existing records in dynamic passport 1232. In some implementations, the one or more processing circuits can be further configured to broadcast, using the control structure, the updated cyber resilience identity to the ledger or the distributed ledger. For example, the passport system 1120 can use blockchain interface 1260 to broadcast the updated cyber resilience identity and verify that nodes within blockchain 1170 receive the update and that the updated identity is securely recorded across the distributed ledger for future verification and access.

In some implementations, the one or more processing circuits can be further configured to receive, from an entity computing system of an entity corresponding to the cyber resilience identity or from an authorized entity computing system corresponding to an authorized entity of a plurality of authorized entities, an access request for the cyber resilience identity. For example, the passport system 1120 can receive an access request from third-party systems 150 or user computing systems 1110, where the request can originate from an entity seeking to access or update the cyber resilience identity. This request can be routed through the ledger interface 1124, which can validate the origin of the request and determine the appropriate access level. The request can involve accessing data, such as policy data 1310$d$ or performance data 1310$a$, with verification against stored access control policies. In some implementations, the access request includes the at least one access data structure. For example, the request can include an access data structure such as a token-based authentication key or a cryptographic certificate that aligns with the predefined access protocols of the smart contract control structure 1220 to identify and authenticate the requesting entity.

In some implementations, the one or more processing circuits can verify, using the control structure, the at least one access data structure. For example, the smart contract control structure 1220 can cross-reference the access data structure with stored access permissions, checking against the ACLs or ABAC mechanisms to determine if the requesting entity is authorized to access or modify the cyber resilience identity. In some implementations, the one or more processing circuits can be further configured to grant access to the metadata object and the performance event dataset within the cyber resilience identity to an entity or an authorized entity. For example, upon successful verification, the passport system 1120 can unlock portions of the metadata object and performance event dataset, allowing the authorized entity to retrieve and view the data through a secure access protocol. In some implementations, the one or more processing circuits can be further configured to decrypt the metadata object. For example, the cryptographic system 1122 of the passport system 1120 can apply decryption algorithms to the metadata object, such as decrypting policy data or incident logs for an authorized entity to review. In some implementations, the one or more processing circuits can be further configured to provide access to the metadata object and the performance event dataset by facilitating retrieval using a secure interface between the one or more processing circuits and the entity computing system or the authorized entity computing system. For example, the passport system 1120 can establish a secure communication channel with the entity computing system via the ledger interface 1124, transmitting the metadata object and performance event dataset to the verified entity or authorized entity.

In some implementations, the cyber resilience identity is a data structure encapsulating a plurality of resilience tokens. For example, the passport system 1120 can generate a dynamic passport 1232 that includes multiple resilience tokens 1234. In some implementations, at least one (e.g., each) of the plurality of resilience tokens corresponds to a cybersecurity dimension of a posture of an entity corresponding to the cyber resilience identity. For example, the unified tokens 1212, real-time tokens 1214, and/or effectiveness tokens 1216 can at least one (e.g., each) represent distinct cybersecurity dimensions, such as implemented safeguards, compliance with requirements, and/or ongoing security assessments. That is, a cybersecurity dimension can correspond to an aspect or category of an overall cybersecurity posture of the entity, such as a performance, requirements, insurability, and/or incident response readiness category. For example, one dimension can include the technical measures in place to prevent unauthorized access (e.g., encryption standards, firewall configurations), and/or another dimension can assess the adherence of the entity to industry regulations (e.g., GDPR compliance). The various tokens described herein collectively provide a multi-faceted or multi-dimensional perspective on the cybersecurity posture of the entity, reflecting various aspects or dimensions of the security over time.

In some implementations, the plurality of resilience tokens can include at least one unified token including the cyber resilience data captured over a period of time, at least one evaluation token including the cyber resilience data captured at a plurality of points in time over the period of time, and/or at least one roll-up token including data of the at least one unified token and the at least one real-time corresponding with a security performance of the entity over the period of time. For example, the unified token processor 1222 of the smart contract control structure 1220 can generate unified tokens 1212 that aggregate cybersecurity data (e.g., safeguards, policies, incidents) over a period of time, providing an overview of the cybersecurity measures of the entity. The real-time token processor 1224 can generate real-time tokens 1214 (e.g., evaluation) that capture snapshots of the cybersecurity posture of the entity at various intervals, reflecting the ongoing security status of the entity. The effectiveness token processor 1226 can generate effectiveness tokens 1216 (e.g., roll-up) by combining data from the unified tokens 1212 and real-time tokens 1214, providing an assessment of the security performance of the entity over time, including significant events or changes in security posture.

In some implementations, the at least one unified token can include a unified safeguard token including data of implemented safeguards and configurations over the period of time, a unified requirements token including data of entity-specific requirements and third-party requirements over the period of time, a unified asset token including data of a plurality of assets of the entity over the period of time, and/or a unified attestation token including data of entity attestations over the period of time. For example, the unified token processor 1222 can generate a unified safeguard token that includes records of security measures implemented by the entity, such as firewall settings or encryption protocols, over a specified period. In another example, the unified token processor 1222 can generate a unified requirements token that captures compliance data related to internal policies and third-party security standards, tracking how the entity meets these requirements over time. The unified token processor 1222 can also generate a unified asset token that records information about the assets of the entity, such as servers, network devices, and/or software licenses, and/or their associated security configurations during the period. Additionally, the unified token processor 1222 can generate a unified attestation token that includes data on certifications, audits, and/or attestations made by the entity regarding its cybersecurity posture over the period.

In some implementations, the at least one real-time token can include a plurality of evaluation tokens including data of at least one of a posture of the entity, a state of the entity, and/or a protection of the entity at a point in time of the plurality of points in time over the period of time. For example, the real-time token processor 1224 of the smart contract control structure 1220 can generate evaluation tokens that capture snapshots of the cybersecurity posture of the entity at various points in time. These tokens can include data on the state of implemented security measures (e.g., firewall rules, encryption status), the overall security posture of the entity (e.g., risk levels, compliance status), and/or the effectiveness of protection mechanisms deployed across the infrastructure of the entity. In another example, the evaluation tokens can reflect the response of the entity to incidents or threats, documenting how the security systems were adjusted or enhanced in real-time. The real-time token processor 1224 can also generate tokens that track the operational status of systems within the entity, such as the availability of services or the integrity of key data at intervals. These tokens provide a time-stamped record of the security environment of the entity, which supports analysis of how the cybersecurity posture of the entity changes over time.

In some implementations, the one or more processing circuits can be further configured to generate the at least one access data structure for at least one of an entity computing system of an entity corresponding to the cyber resilience identity or an authorized entity computing system corresponding to an authorized entity of a plurality of authorized entities. For example, the passport system 1120 can generate an access data structure that defines access permissions and conditions for the cyber resilience identity, incorporating attributes such as user roles, access levels, and/or data access rights. In another example, the passport system 1120 can generate a role-based access control (RBAC) mechanism, where at least one (e.g., each) role is associated with predefined access rights and permissions linked to aspects of the cyber resilience identity. Alternatively, in some implementations, the one or more processing circuits can be further configured to receive, from at least one of the entity computing system or the authorized entity computing system, the at least one access data structure. For example, the passport system 1120 can receive an access data structure from a third-party system 150, where the structure includes access control lists (ACLs), attribute-based access control (ABAC) definitions, RBAC policies, and/or various additional and/or alternative controls. In another example, the passport system 1120 can receive access tokens or digital certificates from the authorized entity computing system, specifying access permissions and conditions for interacting with the cyber resilience identity.

In some implementations, the least one access data structure can include a token, key, certificate, and/or access mechanism. For example, the passport system 1120 can generate a digital token that grants access rights to an authorized entity to interact with certain components of the dynamic passport 1232. In another example, the passport system 1120 can issue a cryptographic key or digital certificate to decrypt certain portions of the cyber resilience data or verify the authenticity of transactions related to the dynamic passport 1232. In some implementations, the one or more processing circuits are further configured to, in determining the at least one access data structure being compatible with the control structure, in response to receiving the at least one access data structure, configure the at least one access data structure by updating the control structure to enforce restrictions on the one or more updates and redemptions of the metadata object. For example, the passport system 1120 can receive a token from an authorized entity computing system and update the smart contract control structure 1220 to restrict the modification of metadata objects linked to the dynamic passport 1232 based on the permissions encoded within the token. In another example, the passport system 1120 can update the smart contract control structure 1220 to incorporate the received access data structure, thereby enforcing restrictions on how and when metadata objects can be accessed or modified.

In some implementations, updating the control structure includes updating one or more access parameters of the control structure. For example, the passport system 1120 can modify access control lists (ACLs) or role-based access control (RBAC) settings within the smart contract control structure 1220 to align with the permissions granted by the new access data structure. For example, RBACs can include rules for accessing tokenized data (e.g., metadata object) based on roles (e.g., entity types or roles of a user within an entity) or other access control parameters (e.g., date/time, user preferences, etc.) In some examples, users or entities associated with a cyber resilience identity (e.g., passport) can select or provide information used for generated RBACs (e.g., based on consent preferences selected via a user interface, other data sharing preferences associated with an entity, regulations, etc.). For example, the passport system 1120 can modify access control lists (ACLs) or role-based access control (RBAC) settings within the smart contract control structure 1220 to align with the permissions granted by the new access data structure. That is, the passport system 1120 can dynamically adjust the control structure to reflect changes in authorized entities, permission levels, and/or data access restrictions as defined by the new access data structure. Further, the passport system 1120 can update cryptographic keys or tokens associated with the control structure to ensure that the entities with the updated permissions can access or modify the cyber resilience identity. Additionally, the passport system 1120 can track and log these updates in the distributed ledger.

In another example, the passport system 1120 can adjust encryption parameters or key management policies within the smart contract control structure 1220 to confirm that entities with a correct or matching access data structure can interact with the dynamic passport 1232. In some implementations, the one or more processing circuits are further configured to, in determining the at least one access data structure being compatible with the control structure, in response to generating the at least one access data structure, provide, to the entity computing system or the authorized entity computing system, the at least one access data structure. For example, the passport system 1120 can generate a digital certificate or token and transmit it to the authorized entity computing system, granting access to components of the dynamic passport 1232 based on the permissions encoded within the access data structure. In another example, the passport system 1120 can provide an access key to the entity computing system, authorizing interaction with the metadata object or performance event dataset associated with the dynamic passport 1232 (e.g., interaction with the tokens 1234) to one or more entities (e.g., an entity corresponding to the passport, another authorized entity such as an insurer of a group of approved insurers, etc.).

In some implementations, the cyber resilience data can include at least one of firmographics data, safeguard data, performance data, policy data, incident data, and/or claims data. For example, the passport system 1120 can collect and categorize cyber resilience data from various sources, such as firmographics data 1310*b* detailing organizational characteristics, safeguard data 1310*c* describing implemented security measures, performance data 1310*a* capturing cybersecurity performance metrics, policy data 1310*d* outlining internal and external security policies, incident data 1310*e* reporting security breaches or vulnerabilities, and/or claims data 1310*f* related to insurance or legal claims following security incidents. For example, the one or more processing circuits can receive cyber resilience data 310 from one or more agents and/or via outputs of one or more operations performed by the one or more agents. In some implementations, the control structure can include a smart contract, and/or the control structure can include a smart contract control structure. For example, a smart contract generally refers to a self-executing contract with the terms of the agreement written into code. In some examples, the smart contract control structure can manage the execution of rules and conditions tied to the cyber resilience identity. For example, the smart contract control structure can automate token transactions, verify cryptographic proofs, and/or enforce access control measures without manual intervention. The smart contract can interact with the tokens (e.g., unified tokens 1212, real-time tokens 1214, effectiveness tokens 1216) to validate actions such as updating the metadata object, transferring ownership of tokens, and/or adjusting permissions within the control structure. The smart contract control structure can also execute predefined functions based on the conditions encoded in the smart contract, such as triggering updates to the dynamic passport 1232 when new resilience data is received or when certain criteria are met.

In some implementations, tokenization of the data can provide a secure and efficient method for clients to share their cyber risk information with brokers and carriers. For example, the passport system 1120 can use a tokenization process to convert cyber resilience data into tokens that can be securely shared and managed. In some implementations, DNFTs can include a journal of performance history events, such as cybersecurity management events or insurance-related events. For example, the passport system 1120 can generate DNFTs verifiable through a multi-signature wallet or a signature verification mechanism within the smart contract, involving trusted entities to sign off on events they participated in. In some implementations, insureds can create and manage their DNFTs using an interface provided by the passport system 1120, securely storing their cybersecurity posture and insurance information for updates. In some examples, DNFTs can track and verify performance history events, maintaining authenticity and transparency.

In some implementations, access to sensitive data can be controlled through an access control mechanism within the smart contract, restricting decryption and access to authorized parties. For example, the passport system 1120 can manage access controls to sensitive data, ensuring authorized entities can decrypt and access data. The DNFT structure can feature an identifier, encrypted metadata, and/or a list of performance history events. The passport system 1120 can use an updateDNFT function (e.g., DNFT.updateDFNT( )) to update the encrypted metadata link in the DNFT, and/or a signEvent function to verify the authenticity of performance history events by including a fee in tokens, allowing the DNFT owner to add event signatures. The passport system 1120 can implement DNFT visibility and access control through an access control mechanism in the smart contract or the API.

In some implementations, the components and data flow for creating a dynamic NFT (DNFT) for at least one (e.g., each) business that tokenizes its security posture can include business registration and data collection. For example, the passport system 1120 can facilitate the registration process, where businesses provide information, including firmographics, posture information, and/or insurance data. Once the data is collected, it can be encrypted using key management via an API and stored in a secure data storage service. The passport system 1120 can deploy a smart contract to facilitate the creation, update, and/or transfer of DNFTs, using blockchain oracles to access encrypted data from the API and include it in the DNFT as metadata.

In some implementations, the DNFT structure can include an identifier, encrypted metadata linked to data accessible via the API, and/or a journal of performance history events. For example, as a cybersecurity posture of a company and insurance information change, the encrypted data can be updated in secure storage, and/or the metadata link in the DNFT can be revised. The passport system 1120 can use a multi-signature wallet or a signature verification mechanism within the smart contract to maintain the authenticity of performance history events, involving trusted entities to sign off on events they were involved in. For example, authorized parties can access the encrypted information via an access control mechanism in the smart contract or the API, restricting decryption and access to the DNFT owner, authorized insurers, and/or brokers. The architecture of the passport system 1120 can achieve tokenization of a cybersecurity posture of a business while maintaining data confidentiality and allowing authorized parties to securely access the information.

In some implementations, a company can register on a platform and create an account. For example, the passport system 1120 can facilitate the company in uploading its encrypted cybersecurity posture and insurance information to the platform. The company can create metadata from the uploaded information, encrypt it with key management systems, and/or upload it to a secure data storage service. The passport system 1120 can facilitate the creation of the DNFT using platform-acquired tokens and incorporate the encrypted data as metadata within the DNFT. In some implementations, the company can view and manage its DNFTs through an interface provided by the passport system 1120. For example, this can involve handling performance history events, such as cybersecurity management events or insurance-related events, and/or updating the encrypted metadata link. The passport system 1120 can use a signEvent function to verify the authenticity of events, including a fee paid in tokens and engaging trusted entities to sign off on events they participated in. In some implementations, insurers or brokers can access the encrypted information in the DNFTs with the permission of the company to assess risk and propose suitable insurance policies. For example, the passport system 1120 can provide a method for authorized parties to securely manage and verify the cybersecurity posture and insurance information of a company, improving trust and reducing the likelihood of fraud.

Configuration of Exemplary Implementations

While this specification contains many implementation details, these should not be construed as limitations on the scope of any disclosure or of what can be claimed, but rather as descriptions of features of particular implementations of the systems and methods described herein. Certain features that are described in this specification in the context of separate implementations can also be implemented and/or arranged in combination in a single implementation. Conversely, various features that are described in the context of a single implementation can also be implemented and arranged in multiple implementations separately or in any suitable subcombination. Moreover, although features can be described above as acting in certain combinations and even initially claimed as such, one or more features from a claimed combination can in some cases be excised from the combination, and/or the claimed combination can be directed to a subcombination or variation of a subcombination.

Additionally, features described with respect to particular headings can be utilized with respect to and/or in combination with illustrative implementation described under other headings; headings, where provided, are included solely for the purpose of readability and should not be construed as limiting any features provided with respect to such headings.

Similarly, while operations are depicted in the drawings in a particular order, this should not be understood as requiring that such operations be performed in the particular order shown or in sequential order, and/or that all illustrated operations be performed, to achieve desirable results. In some cases, the actions recited in the claims can be performed in a different order and still achieve desirable results. In addition, the processes depicted in the accompanying figures do not necessarily require the particular order shown, and/or sequential order, to achieve desirable results.

In certain circumstances, multitasking and parallel processing can be advantageous. Moreover, the separation of various system components in the implementations described above should not be understood as requiring such separation in all implementations, and/or it should be understood that the described program components and systems can generally be integrated together in a single software product or packaged into multiple software products.

Having now described some illustrative implementations, implementations, illustrative implementations, and/or arrangements it is apparent that the foregoing is illustrative and not limiting, having been presented by way of example. In particular, although many of the examples presented herein involve combinations of method acts or system elements, those acts, and/or those elements can be combined in other ways to accomplish the same objectives. Acts, elements and features discussed only in connection with one implementation are not intended to be excluded from a similar role in other implementations.

The phraseology and terminology used herein is for the purpose of description and should not be regarded as limiting. The use of "including" "including" "having" "containing" "involving" "characterized by" "characterized in that" and variations thereof herein, is meant to encompass the items listed thereafter, equivalents thereof, and/or additional items, as well as alternate implementations consisting of the items listed thereafter exclusively. In some implementations, the systems and methods described herein consist of one, at least one (e.g., each) combination of more than one, and/or all of the described elements, acts, and/or components.

Any references to implementations, arrangements, and/or elements or acts of the systems and methods herein referred to in the singular can also embrace implementations including a plurality of these elements, and/or any references in plural to any implementation, arrangement, and/or element or act herein can also embrace implementations including only a single element. References in the singular or plural form are not intended to limit the presently disclosed systems or methods, their components, acts, and/or elements to single or plural configurations. References to any act or element being based on any information, act or element can include implementations where the act or element is based at least in part on any information, act, and/or element.

Any implementation disclosed herein can be combined with any other implementation, and/or references to "an implementation," "some implementations," "an alternate implementation," "various implementation," "one implementation" or the like are not necessarily mutually exclusive and are intended to indicate that a particular feature, structure, and/or characteristic described in connection with the implementation can be included in at least one implementation. Such terms as used herein are not necessarily all referring to the same implementation. Any implementation can be combined with any other implementation, inclusively or exclusively, in any manner consistent with the aspects and implementations disclosed herein.

Any implementation disclosed herein can be combined with any other implementation, and/or references to "an implementation," "some implementations," "an alternate implementation," "various implementations," "one implementation" or the like are not necessarily mutually exclusive and are intended to indicate that a particular feature, structure, and/or characteristic described in connection with the implementation can be included in at least one implementation. Such terms as used herein are not necessarily all referring to the same implementation. Any implementation can be combined with any other implementation, inclusively or exclusively, in any manner consistent with the aspects and implementations disclosed herein.

References to "or" can be construed as inclusive so that any terms described using "or" can indicate any of a single, more than one, and/or all of the described terms.

Where technical features in the drawings, detailed description or any claim are followed by reference signs, the reference signs have been included for the sole purpose of increasing the intelligibility of the drawings, detailed description, and/or claims. Accordingly, neither the reference signs nor their absence have any limiting effect on the scope of any claim elements.

The systems and methods described herein can be embodied in other forms without departing from the characteristics thereof. Although the examples provided herein relate to controlling the display of content of information resources, the systems and methods described herein can include applied to other environments. The foregoing implementations are illustrative rather than limiting of the described systems and methods. Scope of the systems and methods described herein is thus indicated by the appended claims, rather than the foregoing description, and/or changes that come within the meaning and range of equivalency of the claims are embraced therein.

What is claimed is:

1. An autonomous agent, comprising:
   one or more processing circuits configured to:
   receive or identify a dynamic data structure comprising one or more functions or one or more frameworks for performing a plurality of cyber resilience operations;
   register the autonomous agent with a decentralized network, centralized network, or data source (DNCNDS) to cause the one or more processing circuits to be discoverable on the DNCNDS;
   receive or identify, from at least one computing system external or internal to the DNCNDS, cyber resilience data;
   perform, in real-time, at least one cyber resilience operation of the plurality of cyber resilience operations based at least on:
   selecting at least one function of the one or more functions of the dynamic data structure based at least on the cyber resilience data, wherein the at least one function corresponds to (i) updating a computing environment, (ii) generating and providing an assessment to a plurality of computing systems, (iii) updating a dashboard; or
   generating a new function based at least on the one or more frameworks of the dynamic data structure, wherein the new function corresponds to generating at least one new cyber resilience operation based on to the cyber resilience data;
   update the dynamic data structure based on the at least one cyber resilience operation performed;
   wherein performing the at least one cyber resilience operation comprises generating one or more tokens comprising at least one proof of the at least one cyber resilience operation, wherein the at least one proof corresponds with a verification; and
   wherein registering with the DNCNDS allows the autonomous agent to be discoverable by at least one entity computing system via the DNCNDS, wherein registering with the DNCNDS comprises causing the one or more processing circuits and one or more of the one or more functions or one or more of the one or more frameworks received by the dynamic data structure to be discoverable on the DNCNDS.

2. The autonomous agent of claim 1, wherein performing the at least one cyber resilience operation comprises:
   generating a data package corresponding to the new function or at least one function of the one or more functions, wherein the data package comprises one or more deployable sub-functions of the new function or at least one function of the one or more functions; and
   providing, via the DNCNDS, the data package configured to deploy on at least one entity computing system.

3. The autonomous agent of claim 1, wherein generating the new function comprises:
   storing the new function in the dynamic data structure; and
   providing the new function and corresponding performance data to at least one second autonomous agent of the DNCNDS, wherein the new function and the corresponding performance data causes the at least one second autonomous agent of the DNCNDS to update a corresponding dynamic data structure.

4. The autonomous agent of claim 1, wherein the one or more processing circuits are further configured to:
   apply the at least one cyber resilience operation as input to an artificial intelligence (AI) model to cause the AI model to generate a performance metric corresponding with selecting the at least one function of the one or more functions or generating the new function; and
   update the dynamic data structure based at least on the performance metric.

5. The autonomous agent of claim 1, wherein performing the at least one cyber resilience operation comprises:
   responsive to determining the cyber resilience data corresponds with a verification request, transmitting, by the one or more processing circuits, at least one of the one or more tokens to the DNCNDS for verification of the at least one cyber resilience operation or cyber resilience data.

6. The autonomous agent of claim 1, wherein the one or more processing circuits are further configured to:
   re-register with the DNCNDS to cause the one or more processing circuits to be discoverable on the DNCNDS with the updated dynamic data structure.

7. The autonomous agent of claim 6, wherein re-registering with the DNCNDS allows the autonomous agent to be discoverable by at least one entity computing system via the DNCNDS, wherein registering and re-registering with the DNCNDS comprises causing the one or more processing circuits and one or more of the one or more functions or one or more of the one or more frameworks received by the dynamic data structure to be discoverable on the DNCNDS.

8. The autonomous agent of claim 1, wherein the one or more processing circuits are configured to:
   identify (1) a portion of the at least one cyber resilience operation to perform corresponding to at least one of the one or more functions or one or more frameworks of the dynamic data structure and (2) a portion of the at least one cyber resilience operation to transmit to the DNCNDS for performance by a second agent; and
   provide usage statistics and metrics of the dynamic data structure to the DNCNDS for the DNCNDS, the second agent or an entity to track activity levels and resource consumption.

9. The autonomous agent of claim 1, wherein receiving or identifying cyber resilience data from at least one computing system external to the DNCNDS comprises receiving or identifying cyber resilience data from an entity computing system, third-party computing system, or data source and receiving or identifying cyber resilience data from at least one computing system internal to the DNCNDS comprises receiving or identifying cyber resilience data from an agent network, second autonomous agent, or orchestration computing system.

10. A method for executing an autonomous agent, comprising:
    receiving or identifying, by one or more processing circuits, from at least one computing system external or internal to a decentralized network, centralized network, or data source (DNCNDS), cyber resilience data;
    performing, by the one or more processing circuits, in real-time, at least one cyber resilience operation of a plurality of cyber resilience operations based at least on:
        selecting at least one function of one or more functions of a dynamic data structure based at least on the cyber resilience data, wherein the at least one function corresponds to (i) updating a computing environment, (ii) generating and providing an assessment to a plurality of computing systems, (iii) updating a dashboard; or
        generating a new function based at least on one or more frameworks of the dynamic data structure, wherein the new function corresponds to generating at least one new cyber resilience operation based on to the cyber resilience data;
    updating, by the one or more processing circuits, the dynamic data structure based on the at least one cyber resilience operation performed;
    wherein performing the at least one cyber resilience operation comprises generating one or more tokens comprising at least one proof of the at least one cyber resilience operation, wherein the at least one proof corresponds with a verification;
    wherein the autonomous agent is registered with the DNCNDS to allow the autonomous agent to be discoverable by at least one entity computing system via the DNCNDS, wherein registering with the DNCNDS comprises causing the one or more processing circuits and one or more of the one or more functions or one or more of the one or more frameworks received by the dynamic data structure to be discoverable on the DNCNDS.

11. The method of claim 10, wherein performing the at least one cyber resilience operation comprises:
    generating a data package corresponding to the new function or at least one function of the one or more functions, wherein the data package comprises one or more deployable sub-functions of the new function or at least one function of the one or more functions; and
    providing, via the DNCNDS, the data package configured to deploy on at least one entity computing system.

12. The method of claim 10, wherein generating the new function comprises:
    storing the new function in the dynamic data structure; and
    providing the new function and corresponding performance data to at least one second autonomous agent of the DNCNDS, wherein the new function and the corresponding performance data causes the at least one second autonomous agent of the DNCNDS to update a corresponding dynamic data structure.

13. The method of claim 10, further comprising:
    applying, by the one or more processing circuits, the at least one cyber resilience operation as input to an artificial intelligence (AI) model to cause the AI model to generate a performance metric corresponding with selecting the at least one function of the one or more functions or generating the new function; and
    updating, by the one or more processing circuits, the dynamic data structure based at least on the performance metric.

14. The method of claim 10, wherein performing the at least one cyber resilience operation comprises:
    responsive to determining the cyber resilience data corresponds with a verification request, transmitting, by the one or more processing circuits, at least one of the one or more tokens to the DNCNDS for verification of the at least one cyber resilience operation or cyber resilience data.

15. The method of claim 10, further comprising:
    re-registering, by the one or more processing circuits, with the DNCNDS to cause the one or more processing circuits to be discoverable on the DNCNDS with the updated dynamic data structure.

16. The method of claim 15, wherein re-registering with the DNCNDS allows the autonomous agent to be discoverable by at least one entity computing system via the DNCNDS, wherein registering and re-registering with the DNCNDS comprises causing the one or more processing circuits and one or more of the one or more functions or one or more of the one or more frameworks received by the dynamic data structure to be discoverable on the DNCNDS.

17. The method of claim 10, further comprising:
    identifying, by the one or more processing circuits, (1) a portion of the at least one cyber resilience operation to perform corresponding to at least one of the one or more functions or one or more frameworks of the dynamic data structure and (2) a portion of the at least one cyber resilience operation to transmit to the DNCNDS for performance by a second agent; and
    providing, by the one or more processing circuits, usage statistics and metrics of the dynamic data structure to the DNCNDS for the DNCNDS, the second agent or an entity to track activity levels and resource consumption.

18. The method of claim 10, wherein receiving or identifying cyber resilience data from at least one computing system external to the DNCNDS comprises receiving or identifying cyber resilience data from an entity computing system, third-party computing system, or data source and receiving or identifying cyber resilience data from at least one computing system internal to the DNCNDS comprises receiving or identifying cyber resilience data from an agent network, second autonomous agent, or orchestration computing system.

19. A non-transitory computer readable medium (CRM) comprising one or more instructions stored thereon and executable by one or more processors to:
  receive or identify a dynamic data structure comprising one or more functions or one or more frameworks for performing a plurality of cyber resilience operations;
  register an autonomous agent with a decentralized network, centralized network, or data source (DNCNDS) to cause the one or more processors to be discoverable on the DNCNDS;
  receive or identify, from at least one computing system external or internal to the DNCNDS, cyber resilience data;
  perform, in real-time, at least one cyber resilience operation of the plurality of cyber resilience operations based at least on:
    selecting at least one function of the one or more functions of the dynamic data structure based at least on the cyber resilience data, wherein the at least one function corresponds to (i) updating a computing environment, (ii) generating and providing an assessment to a plurality of computing systems, (iii) updating a dashboard; or
    generating a new function based at least on the one or more frameworks of the dynamic data structure, wherein the new function corresponds to generating at least one new cyber resilience operation based on to the cyber resilience data;
  update the dynamic data structure based on the at least one cyber resilience operation performed;
  wherein performing the at least one cyber resilience operation comprises generating one or more tokens comprising at least one proof of the at least one cyber resilience operation, wherein the at least one proof corresponds with a verification; and
  wherein registering with the DNCNDS allows the autonomous agent to be discoverable by at least one entity computing system via the DNCNDS, wherein registering with the DNCNDS comprises causing one or more of the one or more functions or one or more of the one or more frameworks received by the dynamic data structure to be discoverable on the DNCNDS.

20. The CRM of claim 19, wherein performing the at least one cyber resilience operation comprises:
  generating a data package corresponding to the new function or at least one function of the one or more functions, wherein the data package comprises one or more deployable sub-functions of the new function or at least one function of the one or more functions; and
  providing, via DNCNDS, the data package configured to deploy on at least one entity computing system.

* * * * *